US007962512B1

(12) United States Patent  (10) Patent No.: US 7,962,512 B1
Sholtis et al.                (45) Date of Patent:     Jun. 14, 2011

(54) FEDERATED SYSTEM AND METHODS AND MECHANISMS OF IMPLEMENTING AND USING SUCH A SYSTEM

(75) Inventors: Steven Sholtis, El Dorado Hills, CA (US); Terry LeClair, Fremont, CA (US); Kenneth Jerome Henderson, Folsom, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 12/762,239

(22) Filed: Apr. 16, 2010

Related U.S. Application Data

(63) Continuation of application No. 10/633,338, filed on Jul. 31, 2003, now Pat. No. 7,702,636.

(60) Provisional application No. 60/400,440, filed on Jul. 31, 2002, provisional application No. 60/402,206, filed on Aug. 9, 2002.

(51) Int. Cl.
   *G06F 7/00*    (2006.01)
   *G06F 17/30*   (2006.01)
(52) U.S. Cl. ......... 707/777; 707/791; 707/796; 707/802
(58) Field of Classification Search .................. 707/777, 707/791, 796, 802
See application file for complete search history.

(56) References Cited

U.S. PATENT DOCUMENTS

| 5,555,403 A | 9/1996 | Cambot et al. |
| 5,835,601 A | 11/1998 | Shimbo et al. |
| 5,862,223 A | 1/1999 | Walker et al. |
| 5,878,408 A | 3/1999 | Van Huben et al. |
| 5,883,807 A | 3/1999 | Fanjoy |
| 5,933,356 A | 8/1999 | Rostoker et al. |
| 5,970,490 A | 10/1999 | Morgenstern |
| 5,983,227 A | 11/1999 | Nazem et al. |
| 6,058,426 A | 5/2000 | Godwin et al. |
| 6,102,961 A | 8/2000 | Lee et al. |
| 6,141,724 A | 10/2000 | Butler et al. |
| 6,269,467 B1 | 7/2001 | Chang et al. |
| 6,282,546 B1 | 8/2001 | Gleichauf et al. |

(Continued)

FOREIGN PATENT DOCUMENTS

EP       0433066 A2      6/1991

(Continued)

OTHER PUBLICATIONS

Jia-Jia Miao, Kai Du, Ai-Ping Li and Yan Jia—"Detecting Broken Mappings for Deep Web Integration"—Semantics, Knowledge and Grid, Third International Conference, Oct. 29-31, 2007 (pp. 56-61).*

(Continued)

*Primary Examiner* — John Breene
*Assistant Examiner* — Anh Ly
(74) *Attorney, Agent, or Firm* — Vista IP Law Group, LLP

(57) ABSTRACT

A federated system and methods and mechanisms of implementing and using such a system is disclosed. In some embodiments, one or more mappings are created between a taxonomy view at a node and one or more taxonomies of one or more data sources. The one or more data sources can then be accessed via the taxonomy view. In other embodiments, one or more mappings are created between content from different data sources and content from those data sources are merged using the one or more mappings.

20 Claims, 82 Drawing Sheets

U.S. PATENT DOCUMENTS

| | | | |
|---|---|---|---|
| 6,374,250 | B2 | 4/2002 | Ajtai et al. |
| 6,446,061 | B1 * | 9/2002 | Doerre et al. ............... 707/738 |
| 6,574,655 | B1 | 6/2003 | Libert et al. |
| 6,594,799 | B1 | 7/2003 | Robertson et al. |
| 6,711,585 | B1 | 3/2004 | Copperman et al. |
| 6,766,314 | B2 | 7/2004 | Burnett |
| 6,795,868 | B1 | 9/2004 | Dingman et al. |
| 6,851,094 | B1 | 2/2005 | Robertson et al. |
| 6,941,302 | B1 * | 9/2005 | Suchter ................ 707/999.005 |
| 6,983,288 | B1 | 1/2006 | Kirkwood et al. |
| 6,985,905 | B2 | 1/2006 | Prompt et al. |
| 7,080,092 | B2 | 7/2006 | Upton |
| 7,133,864 | B2 | 11/2006 | Roth |
| 7,392,255 | B1 | 6/2008 | Sholtis et al. |
| 7,506,257 | B1 * | 3/2009 | Chavez et al. ............... 715/714 |
| 7,716,257 | B2 * | 5/2010 | Thomson et al. ............ 707/802 |
| 2001/0034733 | A1 | 10/2001 | Prompt et al. |
| 2001/0042081 | A1 | 11/2001 | Macfarlane et al. |
| 2002/0087516 | A1 | 7/2002 | Cras et al. |
| 2002/0156791 | A1 | 10/2002 | Nesamoney et al. |
| 2002/0194196 | A1 | 12/2002 | Weinberg et al. |
| 2003/0041053 | A1 | 2/2003 | Roth |
| 2003/0093402 | A1 | 5/2003 | Upton |
| 2003/0167283 | A1 | 9/2003 | Remsen et al. |
| 2003/0229612 | A1 | 12/2003 | Keller et al. |
| 2005/0071362 | A1 | 3/2005 | Nelson et al. |
| 2005/0234957 | A1 | 10/2005 | Olson et al. |
| 2007/0156677 | A1 * | 7/2007 | Szabo ............................... 707/5 |

FOREIGN PATENT DOCUMENTS

| | | |
|---|---|---|
| EP | 0433066 A3 | 5/1993 |
| EP | 0944002 A1 | 9/1999 |
| EP | 1063599 A2 | 12/2000 |
| EP | 1063599 A3 | 10/2003 |
| WO | WO 01/42969 A2 | 6/2001 |
| WO | WO 01/42969 A3 | 6/2001 |
| WO | WO 01/65422 A2 | 9/2001 |
| WO | WO 01/65422 A3 | 9/2001 |
| WO | WO 01/65423 A2 | 9/2001 |
| WO | WO 01/65423 A3 | 9/2001 |

OTHER PUBLICATIONS

Jitae Shin, Jong Won Kim and Kuo, C. C. J.—"Quality-of service mapping mechanism for packet video in differentiated Services Network"—IEEE Transactions on Multimedia, vol. 3, issue 2, Jun. 2001 (pp. 219-231).*

Erhard Rahm and Philip A. Bernstein—"A Survey of Approaches to automatic Schema Matching"—The VLDB Journal, vol. 10, No. 4, Feb. 5, 2001 (pp. 334-350).*

Notice of Allowance dated Dec. 1, 2009 for U.S. Appl. No. 10/633,338.

Non-Final Office Action dated May 8, 2009 for U.S. Appl. No. 10/633,338.

Non-Final Office Action dated Aug. 18, 2008 for U.S. Appl. No. 10/633,338.

Final Office Action dated Jan. 21, 2009 for U.S. Appl. No. 10/633,338.

"Efficient Web Acess to distributed biological collections using taxonomy browser"—Richard Leow and Kerry Taylor—Scientific and Statistical database Management, 2000, Proceedings, 12$^{th}$ International conference, Jul. 26-28, 2000 (pp. 25-38).

"A model of multi-media Information retrieval"—Meghini et al.—Journal of the ACM (JACM), vol. 48, issue 5 (Sep. 2001), (pp. 909-970).

"Issues and Approaches of database integration"—Christine parent & Stefano Spaccapietra, Communication of the ACM, vol. 41, issue 5es, (May 1998) (pp. 166-178).

Non-Final Office Action dated Feb. 3, 2006 for U.S. Appl. No. 10/632,769.

Notice of Allowance dated Sep. 12, 2006 for U.S. Appl. No. 10/632,769.

Non-Final Office Action dated May 2, 2007 for U.S. Appl. No. 10/632,769.

Notice of Allowance dated Nov. 1, 2007 for U.S. Appl. No. 10/632,769.

Non-Final Office Action dated Feb. 13, 2006 for U.S. Appl. No. 10/633,277.

Non-Final Office Action dated Sep. 8, 2006 for U.S. Appl. No. 10/633,277.

Non-Final Office Action dated Feb. 7,2007 for U.S. Appl. No. 10/633,277.

Non-Final Office Action dated Aug. 3, 2007 for U.S. Appl. No. 10/633,277.

Benini, L. et al., "*Distributed EDA tool integration: the PPP paradigm*", Proceedings of the International Conference on Computer Design, Oct. 1996, pp. 448-453, IEEE.

Blanchard, D. "*EDA on the WWW PCB CAD*", Printed Circuit Design (Feb. 1998) 15(2):34-37, Miller Freeman.

Brglez, F. et al., "A *universal client for distributed networked design and computing*", Jun. 2001, IEEE, pp. 401-406.

Chan, F.L. et al. ;*WELD—An Environment for Web-Based Electronic Design*, Proceedings of the 35 Annual Conference on Design Automation (May 1998), pp. 146-151.

Dalpasso, M. et al. "*Specification and Validation of Distributed IP-based designs with JavaCAD*", Proceedings of the Conference on Design, Automation and Test in Europe (Mar. 1999) pp. 684-688.

Dalpasso, M. et al., "*Virtual simulation of distributed IP-based designs*" ,Jun. 1999, IEEE, 50-55.

Dieckman, D. et al., "*DISCOE: Distributed Design and Analysis to Preserve Intellectual Property*" ,Sep. 1998, IEEE, pp. 57-60.

Geppert, L., "*The Rising Tide of Web-Based Tools and Services Augurs the Next Sea Change in Electronic Design IC Design on the World Wide Web*", IEEE Spectrum, Jun. 1998, vol. 35, No. 6, pp. 45-50.

Konduri et al. "A *Framework for Collaborative and Distributed Web-Based Design*", Proceedings of the 36$^{th}$ ACM IIEEE Conference on Design Automation (Jun. 1999), pp. 898-903.

Larson, N. et al., "*Managing Design Processes: A Risk Assessment Approach*", Nov. 1996, IEEE, pp. 749-759.

Lee, Dong-Eun et al., "*CADIC: Computer-aided design on internet with cryptosystem*" , Oct. 1998, IEEE, pp. 2670-2674.

Moretti, G. *"Got IP?" Printed Circuit Design* (Oct. 1998) 15(10):31-33.

Orfali, R. et al. "*Essential ClienVServer Survival Guide*" 1996, Katherine Showalter, 2.sup.nd ed., pp. 228-233 and 476.

Perrin, B. *Web-Based Circuit Engineering*,Circuit Cellar INK (Mar. 1999) No. 104, pp.'28-30; 33, 35, 37-38.

Rao, D.M. et al. *Web-Based NetwOrk Analysis and Design*, ACM Transactions on Modeling and Computer Simulation (Jan. 2000) 10(1):18-38.

Schindler, P. et al., ~IP *repository, a Web based IP reuse infrastructure*, Custom Integrated Circuits, May 1999, IEEE, pp. 415-418.

Wen et al., "*Concurrent-Simulation-Based Remote IP Evaluation over the Internet for System-On-Chip Design*" 14.sup.th International Symposium on System Synthesis, Sep. 2001, pp. 233-238.

Wilsey, P., *Web-Based Analysis and Distributed* lpn, Proceedings of the 1999 Winter Simulation Conference, 1445-1453.

Zorian, Y., *Test requirements for embedded core-based systems and IEEE P1500* , Nov. 1997, IEEE, pp. 191-199.

* cited by examiner

Fig. 29b

| Ref | UPN | CPN | DESC | Core Parametric | | | | | Substitution Allowed | Validation Status | Part Source | PPT Status | Part Notice | Part Lookup |
|---|---|---|---|---|---|---|---|---|---|---|---|---|---|---|
| U1 | xxxx | xxxx | xxxx | xxxx | x | x | x | x | No | Active | MyActive Part | | ERRATA | |
| U2 | xxxx | xxxx | xxxx | xxxx | x | x | x | x | Yes | Active | SpinCircuit | | | |
| U3 | xxxx | xxxx | xxxx | xxxx | x | x | x | x | No | Inactive | SpinCircuit | | | |
| C1 | xxxx | xxxx | xxxx | xxxx | x | x | x | x | Yes | Active | MyActive Part | Preferred | EOL | |
| C2 | xxxx | xxxx | xxxx | xxxx | x | x | x | x | Yes | Active | SpinCircuit | Preferred | | |
| C3 | xxxx | xxxx | xxxx | xxxx | x | x | x | x | Yes | Active | MyActive Part | | PCN | |
| C4 | xxxx | xxxx | xxxx | xxxx | x | x | x | x | Yes | Active | SpinCircuit | | | |
| C5 | xxxx | xxxx | xxxx | xxxx | x | x | x | x | Yes | Active | SpinCircuit | | | |
| C2 | xxxx | | | | | | | | | | | | | |

3002 — Validation Status column
3004 — Publish Part List
3000 — table

Fig. 30a

| Reference ID | U1 | |
|---|---|---|
| | | Max 1000 items |
| | | Each item = nxxxx |
| | | Where n=alpha & x=num |
| UPN | xxxx-xxxxx | Optional |
| CPN | HPxxxxxxx | Optional |
| Description | xxxxxxxxxxxx | Optional |
| Core Parametric 1 | Motorola | Required |
| Core Parametric 2 | 10pf | Required |
| Core Parametric n | xx | Required |
| Substitution Allowed | Yes / No | Required |
| Part Status | Active / Inactive | Required |
| Validation Status | OK / Error | Required |
| Part Source | MyActive Part / SpinCircuit | Required |
| PPT Status | Preferred / blank | Required |

Fig. 30b

| Ref | UPN | CPN | DESC | Core Parametric | | | | | | Substitution Allowed | Validation Status | Part Source | PPT Status | Part Notice | Part Lookup |
|---|---|---|---|---|---|---|---|---|---|---|---|---|---|---|---|
| C2 | xxxx | xxxx | xxxx | xxxx | x | x | x | x | x | Yes | Active | MyActive Part | Preferred | | |
| C2 | xxxx | xxxx | xxxx | xxxx | x | x | x | x | x | No | Active | SpinCircuit | | | |

{ yellow (left braces around Ref/C2 rows) }
{ yellow (around Validation Status column) }
{ green (around Part Lookup column) }

Fig. 30c

| Ref | UPN | CPN | DESC | Core Parametric | Substitution Allowed | Validation Status | Part Source | PPT Status | Part Notice | Part Lookup |
|---|---|---|---|---|---|---|---|---|---|---|
| U1 | | | xxxx | xxxx x x x x | No | InActive } red | | | | |

Fig. 30d

| Ref | UPN | CPN | DESC | Core Parametric | Substitution Allowed | Validation Status | Part Source | PPT Status | Part Notice | Part Lookup |
|---|---|---|---|---|---|---|---|---|---|---|
| | xxxx | xxxx | | | | | | Preferred | | |
| | xxxx | xxxx | | | | | | | | |

Fig. 30e

| Ref | UPN | CPN | DESC | Core Parametric | Substitution Allowed | Validation Status | Part Source | PPT Status | Part Notice | Part Lookup |
|---|---|---|---|---|---|---|---|---|---|---|
| | xxxx | xxxx | | | | | SpinCircuit | | | |
| | xxxx | xxxx | | | | | MyActive Part | | | |

| Ref | UPN | CPN | DESC | Core Parametric | Substitution Allowed | Validation Status | Part Source | PPT Status | Part Notice | Part Lookup |
|---|---|---|---|---|---|---|---|---|---|---|
| | xxxx | xxxx | | | No | | | | | |
| | xxxx | xxxx | | | Yes | | | | | |

Fig. 30i

| Ref | UPN | CPN | DESC | Core Parametric | Substitution Allowed | Validation Status | Part Source | PPT Status | Part Notice | Part Lookup |
|---|---|---|---|---|---|---|---|---|---|---|
| | xxxx | xxxx | | | | | | | *EOL* | |
| | xxxx | xxxx | | | | | | | *Errata* | |

} yellow

Fig. 30j

| UPN | Manufacturer | MFG PN | Description | Seminars | Feedback | Experts | Data sheet | Footprint |
|---|---|---|---|---|---|---|---|---|
| UPN001 | Co. 1 | SN7400J | Nand Gate | Browse... | Browse... | Browse... | Browse... | DIP14 |
| UPN... | Co. 1 | SN7400K | Nand Gate | Browse... | Browse... | Browse... | Browse... | SOIC14 |
| UPN438 | Co. 2 | Roto00 | Nand-O-Ro... | Browse... | Browse... | Browse... | Browse... | MOT14 |

Fig. 31a

| Parameter N | UPN001 | UPN... | UPN438 |
|---|---|---|---|
| Manufacturer | Co. 1 | Co. 1 | Co. 2 |
| MFG Part # | SN7400J | SN7400K | Roto00 |
| Description | NAND Gate | NAND Gate | NAND-o-rolla |
| Seminars | Browse... | Browse... | Browse... |
| Feedback | Browse... | Browse... | Browse... |
| Experts | Browse... | Browse... | Browse... |
| Data Sheet | Browse... | Browse... | Browse... |
| Symbol | 7400 | 7400 | 7400M |
| Footprint | DIP14 | SOIC14 | MOT14 |
| Others go bel... | | | |

Fig. 31b

| *JOE_MANUFACTURER_NAME ▾ STATUS | *JOE_MPN | *JOE_DESCRIPTION | DA |
|---|---|---|---|
| ⊟ ALLEGRO | | | 64 |
| ⊞ NONPREFERRED | BAY99L(A7) | A0263806 DIODE,DUAL | |
| | BAY99L(A7) | A0263806 DIODE,DUAL | 64 |
| ⊞ AMP | 869504-1 | CONN AMP 869504-1 | 56 |
| ⊞ ANALOG DEVICES | OP284FS | IC,OP AMP, OP284FS, SO-8, +18V,4... | 50 |
| ⊞ ARR | 11038B-C | PROM ORCAD\AO | 63 |
| ⊞ AVX | 06035C102MAT2A | CAP FCD 1001 50 20S | 29 |
| ⊟ NONPREFERRED | 06035A471LAT2A | CAP MB 470PF5%50V0603 | 116 |
| ⊞ OBSOLETE | 06035A330JAT | CAP ACC CER CHIP 33.0PF 5 | 120 |
| ⊟ PREFERRED | 06035A2R2CAT2A | CAP 2.2PF +- 0.25PF0603 50V | 26 |
| | 06035C102MAT1A | CAP FCD 1001 50 20S | 28 |
| | 06035C102MAT2A | CAP FCD 1001 50 20S | 29 |
| | 06035C102MATMA | CAP FCD 1001 50 20S | 30 |
| | 06035A470KAT2A | CAP FCD 47R0 50 10S | 31 |
| | 06035A470KATMA | CAP FCD 47R0 50 10S | 32 |
| | 06035C103KAT1A | CAP FCD 1002 50 10S | 33 |
| | 06035C103KAT2A | CAP FCD 0603 X7R 10NF 10% | 37 |
| ⊞ BI | B0N4D182JE | RES NET 1.8K SMT | 13 |
| ⊞ BI TECHNOLOGIES | B0N1D102JE(em) | CPN B7RESISTOR ARRAY,1.0K,+/-5... | 7 |

| | JOE_MPN | JOE_MANU | JOE_DESCRIPTION | Grade | DAYS1 | STATUS |
|---|---|---|---|---|---|---|
| 1 | 1-10397S- | AMP | 06-01039 CON HDR M R 4 2R | 19 | 98 | NONPREFERR... |
| 2 | RMT3B2HTE4R... | KOA ELECTRO... | 13D-1018-00 RES SMD 1/2 | 30 | 6 | PREFERRED |
| 3 | OP284FS | ANALOG DEVIC... | 17-OP284FS AMPLIFIER DUAL | 30 | 5 | PREFERRED |
| 4 | BAV99-GS08 | INFINEON | 200-00006-40 DIODE,..6A | 10 | 106 | OBSOLETE |
| 5 | MF55D2431F | KOA | 97-MF55D2431F RES MF 2.4 | 30 | 4 | PREFERRED |
| 6 | RK73H1JT001F | KOA | 97-RK73H1JT001F RES 0.0 | 30 | 2 | PREFERRED |
| 7 | BAV99(47) | ZETEX | A0263806 DIODE DUAL | 15 | 74 | NONPREFERR... |
| 8 | BAV99E-6433 | SIEMENS | A0263806 DIODE DUAL | 15 | 73 | NONPREFERR... |
| 9 | BAV99(47) | SIEMENS | A0263806 DIODE DUAL | 15 | 72 | NONPREFERR... |

| Line | Ref Desig | UPN | CPN | Symbol Na | Input Parametrics |
|---|---|---|---|---|---|
| 1 | D1 | | | DIODE_ZE | MPN=MMBZ5226BLT1,SC_UPN=04-414-9362-000516420 |
| 2 | D2 | | | DIODE_ZE | MPN=MMBZ5226BLT1,SC_UPN=04-414-9362-000516420 |
| 3 | D3 | | | DIODE_ZE | MPN=MMBZ5226BLT1,SC_UPN=04-414-9362-000516420 |
| 4 | D4 | | | DIODE_ZE | MPN=MMBZ5226BLT1,SC_UPN=04-414-9362-000516420 |
| 5 | D5 | | | DIODE_ZE | MPN=MMBZ5226,SC_UPN=null |
| 6 | DN1 | 04-414-93.. | | DS_DUAL | MPN=BAS40-04L,SC_UPN=null |
| 7 | DN2 | 04-414-93.. | | DS_DUAL | MPN=BAS40-04L,SC_UPN=null |
| 8 | DN3 | 04-414-93.. | | DS_DUAL | MPN=BAS40-04LT1,SC_UPN=04-414-9362-000516784 |
| 9 | Q1 | | | NPN_BEC | MPN=MMBT100,SC_UPN=00-489-5751-000582796 |
| 10 | Q2 | | | NPN_BEC | MPN=MMBT100,SC_UPN=00-489-5751-000582796 |
| 11 | Q3 | | | NPN_BEC | MPN=MMBT100,SC_UPN=00-489-5751-000582796 |
| 12 | Q4 | | | NPN_BEC | MPN=MMBT100,SC_UPN=00-489-5751-000582796 |
| 13 | R1 | | | R | MPN=CRCW0603103J,SC_UPN=00-726-5382-001423727 |
| 14 | R2 | | | R | MPN=CRCW0603103J,SC_UPN=00-726-5382-001423727 |

|  | Use It | Annotate | Search By | Call It |  | Use Model | | | | | | | Form | Fit | Function |
|---|---|---|---|---|---|---|---|---|---|---|---|---|---|---|---|
|  |  |  |  |  |  | EPN | CPN | GPN | OPN | GPN | MPN | UPN |  |  |  |
| EPN | Y | Y | Y |  |  |  |  |  |  |  |  |  |  |  |  |
| CPN | Y | Y | Y | CPN | AAAXXXXX |  | M | X |  |  |  |  |  |  | X |
|  |  |  |  |  |  |  |  |  |  |  |  |  |  |  |  |
| OPN |  |  |  |  |  |  |  |  |  |  |  |  |  |  |  |
| GPN |  |  |  |  |  |  |  |  |  |  |  |  |  |  |  |
| GMPN |  |  |  |  |  |  |  |  |  |  |  |  |  |  |  |
| MPN | Y | Y | Y | MPN |  |  | M |  |  |  | S |  |  |  | X |
| UPN |  |  |  |  |  |  |  |  |  |  |  |  |  |  |  |

Fig. 58

FEDERATED SYSTEM AND METHODS AND MECHANISMS OF IMPLEMENTING AND USING SUCH A SYSTEM

CROSS-REFERENCE TO RELATED APPLICATIONS

The present application is a Continuation of U.S. application Ser. No. 10/633,338, filed on Jul. 31, 2003, now U.S. Pat. No. 7,702,636 B1, which claims the benefit of U.S. Provisional Application No. 60/400,440, filed on Jul. 31, 2002, and U.S. Provisional Application No. 60/402,206, filed on Aug. 9, 2002, all of which are hereby incorporated by reference in their entireties for all purposes as if fully set forth herein.

BACKGROUND AND SUMMARY

The present invention is related to management of information. More particularly, the present invention is directed to a federated system and methods and mechanisms of implementing and using such a system.

Users attempting to locate specific information may need to access multiple data sources as information is frequently distributed across several data sources. Accessing multiple data sources individually, however, can be time consuming and complex, especially if the data sources are heterogeneous and/or have varying schemas. When the data sources are heterogeneous, a different adapter may be needed to access each type of data source. In addition, when schemas differ, knowledge of the schema of each data source to be queried may be necessary. Thus, there is a need to provide access to multiple data sources without requiring users to have knowledge of the format and schema of each data source.

One solution is to aggregate the data into a central location, e.g., a data warehouse, such that users will only need to access the data warehouse to find specific information. This solution, however, may be more expensive due to the costs of translating and/or duplicating the data and the additional resources that will be needed to maintain the data warehouse. Errors may also be introduced during the aggregation process through translation from one format to another. In addition, data sources may be located across company or organizational boundaries. Owners of these data sources, although willing to give others access to the information therein, may not consent to the information being duplicated and stored at another location. Moreover, the data warehouse may have duplicated pieces of information since various data sources may have identical pieces of information. Thus, there is also a need to provide a blend of information that is available from multiple data sources without having duplicated data, while allowing the information to remain in its original locations.

The present invention provides a federated system and methods and mechanisms of implementing and using such a system. In one embodiment, a federated system includes multiple data sources and one or more nodes. In the embodiment, each data source is associated with a taxonomy and at least one of the nodes includes a taxonomy view. One or more of the data sources are defined on the at least one node. The at least one node also includes one or more mappings between the taxonomy view of the node and the taxonomy of each data source defined on the node. The node may be connected to one or more clients in some embodiments.

In another embodiment, multiple data sources are defined on a node. Each data source is associated with a taxonomy. A taxonomy view is established at the node and one or more mappings between the taxonomy view of the node and the taxonomy of at least one of the data sources defined on the node are created. The data sources are then accessed via the taxonomy view of the node.

In a further embodiment, various data sources with content are accessed. Content from at least two of the data sources are obtained and one or more mappings between the content of the at least two data sources are created. The obtained content from the at least two data sources are merged using the one or more mappings and the merged content is provided to one or more clients.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

FIGS. 29a-29d are various screen shots of a browser application according to some embodiments of the invention.

FIGS. 30a-30j show interfaces of a validation tool according to some embodiments of the invention.

FIGS. 31a-31b illustrate sample displays of a part table according to some embodiments of the invention.

FIGS. 33-53 are various screen shots of illustrative client desktop applications according to some embodiments of the invention.

FIG. 57 is an example mapping according to an embodiment of the invention.

FIG. 58 shows a sample organization schema according to one embodiment of the invention.

DETAILED DESCRIPTION

A federated system and methods and mechanisms of implementing and using such a system are disclosed. The federated system allows access to multiple data sources without requiring storage of content from the multiple data sources at a centralized location. Although various embodiments of the invention are described in the context of managing electronic components, embodiments of the invention are not limited to management of component data. The methodologies and solutions described herein are applicable to any situation where there is a need to access data sources that cannot be aggregated for one reason or another, e.g., owned by different organizations, prohibited under law, etc., and where the data sources may have different organizational structure, ID scheme, and/or key values. Examples of other types of content that may be managed using the methodologies and solutions described herein include web-based content, medical records, marketing information, etc.

Figure 1:
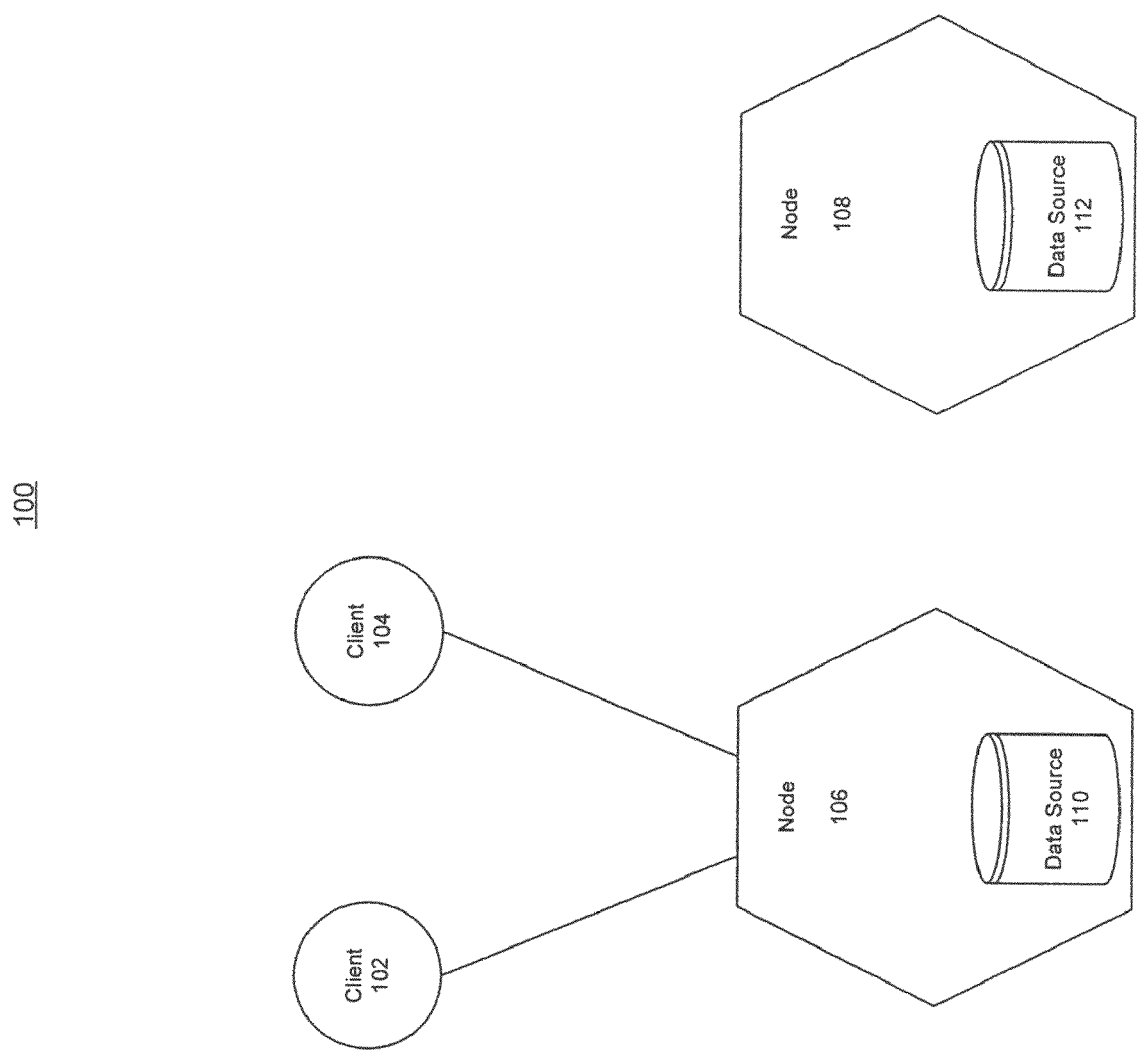
FIG. 1 is a federated system according to one embodiment of the invention.

Illustrated in FIG. 1 is a federated system 100 according to an embodiment of the invention. System 100 includes two clients 102-104, two nodes 106-108, and two data sources 110-112. Both clients 102-104 are connected to node 106. Data source 110 resides on node 106 and data source 112 resides on node 108. Each data source 110-112 may be defined on one or both of nodes 106-108. The node that a data source is defined on does not necessarily have to be the node where the data source resides. In other embodiments, data sources may not reside on a node.

Figure 2:
FIG. 2 shows an example of a taxonomy of a data source and a taxonomy view of a node according to an embodiment of the invention.

Each data source is associated with a taxonomy. A taxonomy may include, for example, an organizational structure and/or a classification scheme. Each taxonomy may also include metadata objects. Metadata objects are described in further detail below. FIG. 2 shows a data source 200 with a taxonomy 202. In the illustrative embodiment, data source 200 contains information on different types of computers, computer peripherals, etc. Taxonomy 202, as depicted in FIG. 2, includes various objects, e.g., computers, monitors, laptops, desktops, flat screen, cathode ray tube (CRT), manufacturer, model, price, processor speed, physical storage device such as memory or hard drive, etc. An object may be, for example, a category or a property/attribute. There are several categories and sub-categories in taxonomy 202, including computers, monitors, laptops, desktops, flat screen, and CRT. Sub-categories laptops, desk-tops, flat screen, and CRT each includes several properties/attributes, e.g., manufacturer, model, price, processor speed, memory, hard drive, screen size, weight, and resolution. Some properties/attributes, such as manufacturer, model, and price exist in multiple categories, while other properties/attributes, such as resolution, only exist in one category.

A taxonomy view may be established at each node. In one embodiment, the taxonomy view of a node is a snapshot of the taxonomy of a data source defined on that node. For example, in FIG. 2, data source 200 is defined on node 204, which includes a taxonomy view 206. Taxonomy view 206 is a partial snapshot of taxonomy 202 as taxonomy view 206 does not include all of the objects in taxonomy 202. In other embodiments, taxonomy view 206 may be an exact duplicate of taxonomy 202. Additionally, a taxonomy view may be a composite of several taxonomies in further embodiments.

Figure 3:
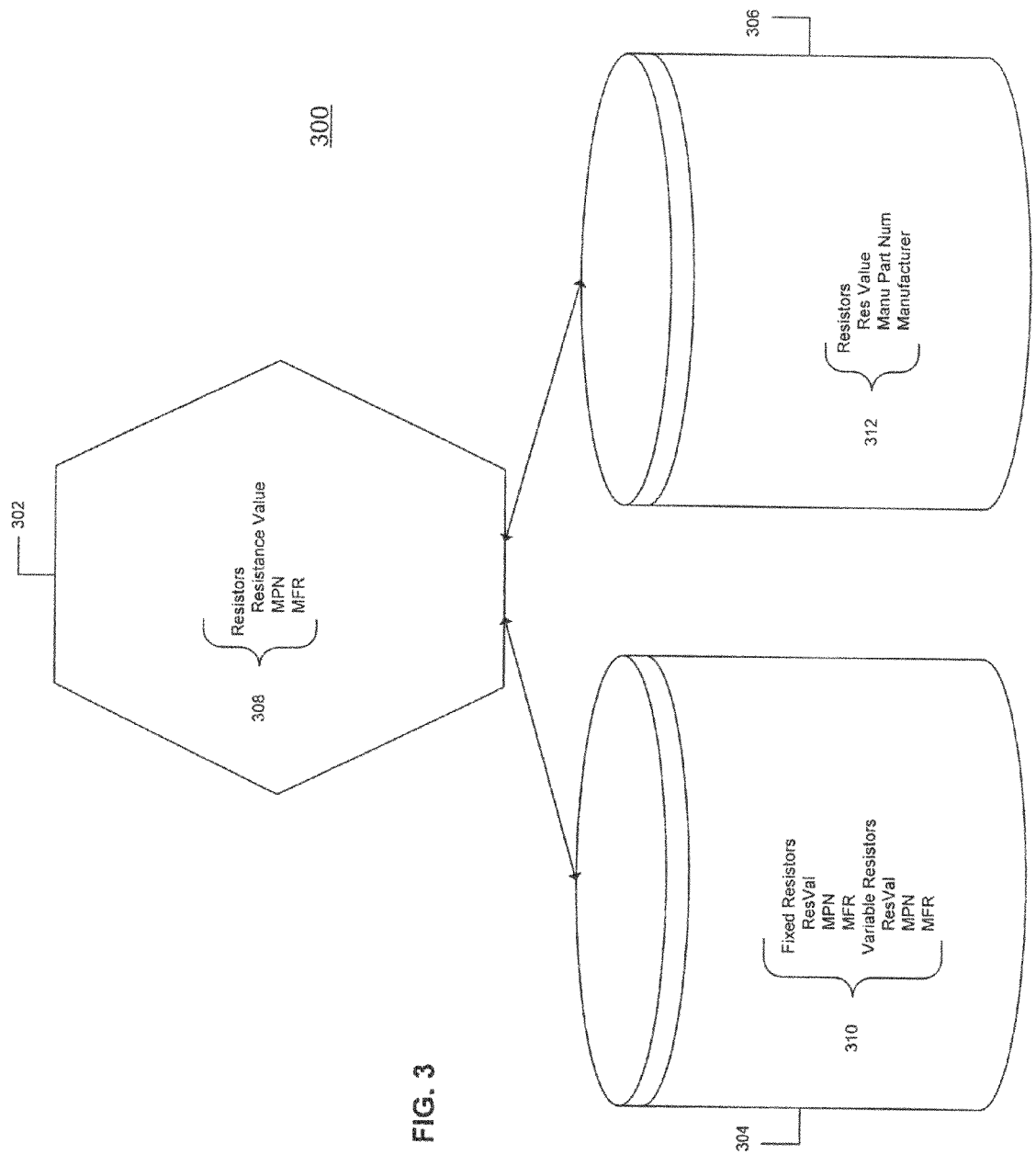
FIG. 3 illustrates a federated system according to another embodiment of the invention.

Each node may include one or more mappings between the node's taxonomy view and the taxonomy of one or more data sources defined on the node. Illustrated in FIG. 3 is a federated system 300 with a node 302 and two data sources 304-306. Data sources 304-306 are defined on node 302. In the example, node 302 includes a taxonomy view 308, data source 304 is associated with a taxonomy 310, and data source 306 is associated with a taxonomy 312. Mappings can be created between object "Resistors" in taxonomy view 308 and objects "Fixed Resistors" and "Variable Resistors" in taxonomy 310. Another mapping can also be created between object "Resistors" in taxonomy view 308 and object "Resistors" in taxonomy 312.

Mappings between objects in the taxonomy view of a node and the taxonomy of a data source can be one-to-one, one-to-many, or many-to-many. For example, mappings between taxonomy view 308 and taxonomy 312 are one-to-one, whereas mappings between taxonomy view 308 and taxonomy 310 are one-to-many since taxonomy 310 differentiates between fixed and variable resistors. In other embodiments, only a portion of the taxonomy of a data source may be mapped to the taxonomy view of a node the data source is defined on. In further embodiments, not all of the objects in the taxonomy of a data source may be available for mapping as one or more nodes controlling the data source can limit the portion of the taxonomy that is made available for mapping.

The taxonomy view of a node allows any data source, regardless of data source type, location, configuration, design, etc., to be integrated into a single standardized schema. This permits access to the data sources without requiring knowledge of each data source's format or schema.

In some embodiments, content in data sources 304-306 may be different even though both data sources 304-306 contain information on resistors. For instance, each data source may have information on resistors made by different manufacturers.

Figure 4:
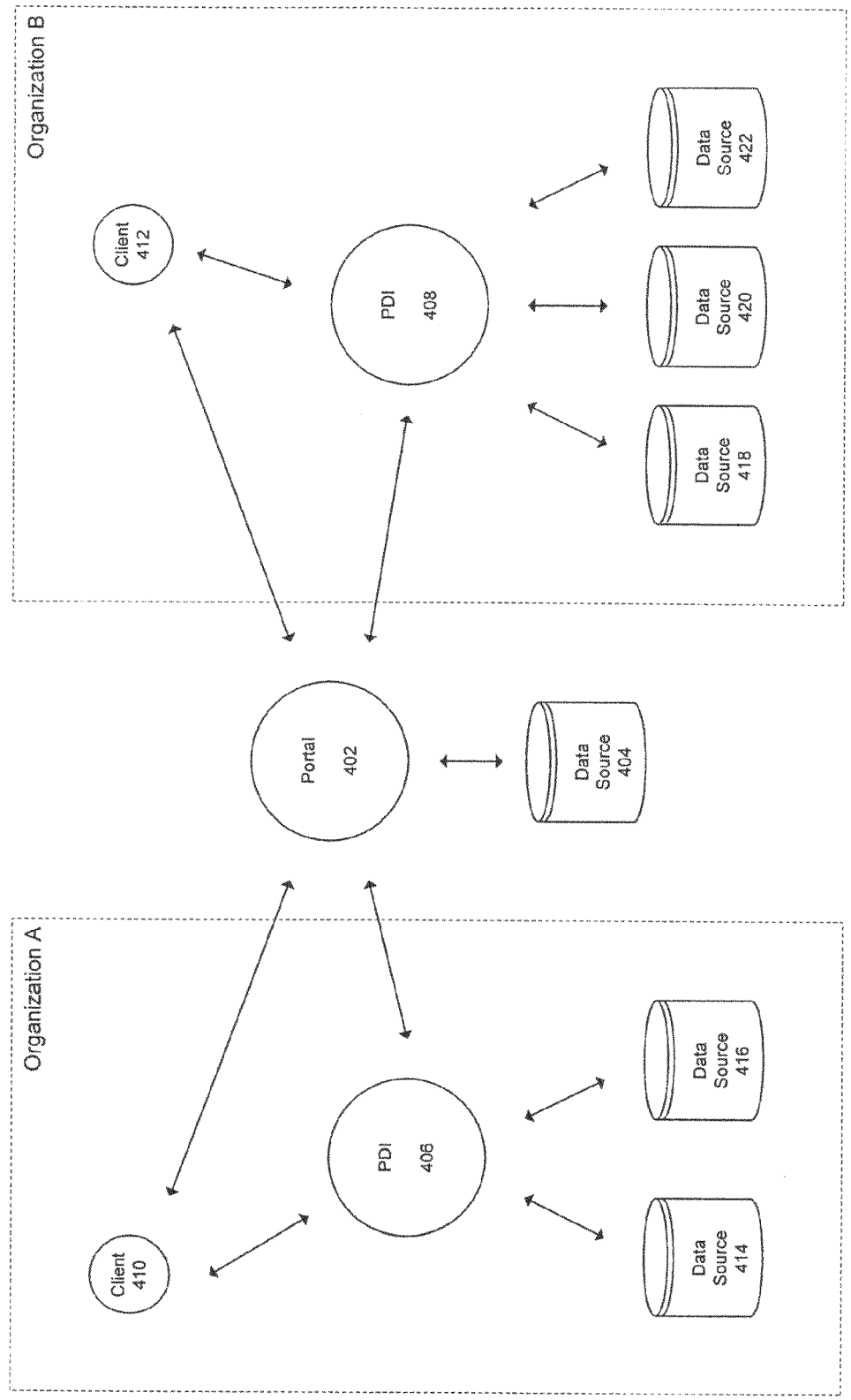
FIG. 4 depicts another example of a federated system according to a further embodiment of the invention.

A node may be a portal or a private data interchange (PDI). According to an embodiment of the invention, a PDI is a data server that hosts an organization's data and user information. An organization may be a company, a division of a company, a government agency, a school, etc. FIG. 4 is an example of a federated system 400 according to another embodiment of the invention. System 400 includes a portal 402, a PDI 406 at organization A, and a PDI 408 at organization B. In other embodiments, each organization may have more than one PDI. Both PDIs 406-408 are connected to portal 402. Also included in system 400 are six data sources 404 and 414-422. Each data source may be defined on portal 402, PDI 406, and/or PDI 408.

Each organization in the example also includes a client 410-412. In other embodiments, there may be multiple clients at each organization. Clients 410-412 are connected to portal 402 and their respective PDIs 406-408. The connection between portal 402 and PDI/client 406-412 may be over a distributed electronic network, e.g., Internet. In further embodiments, each client may be connected to more than one PDI. In FIG. 4, data source 404 is controlled by portal 402, data sources 414-416 are controlled by PDI 406, and data sources 418-422 are controlled by PDI 408.

Portal 402 may facilitate communication between a client and non-local PDIs. For example, if organizations A and B share information and client 410 at organization A wishes to find information that is only available from organization B, client 410 will log onto portal 402. Portal 402 will then verify that client 410 has permission to request information from organization B. Permissions may be based on ID and/or password. In addition, permission may be organization-based rather than client-based. For instance, portal 402 may verify client 410 based on organization A's ID and password. In other words, every client at organization A can log onto portal 402 using the same organization ID and password, provided the client has access to the organization ID and password.

Once client 410 has been authenticated, portal 402 communicates the request from client 410 to PDI 408. PDI 408 then gathers the requested information from data source 418, data source 420, and/or data source 422 and returns the requested information to portal 402. Portal 402 then forwards that information onto client 410. If the request is made to all three data sources 418-422 controlled by PDI 408, PDI 408 may first combine the requested information before sending it to portal 402. In addition, if client 410 also requested information from other PDIs, portal 402 may combine the information received from each PDI before sending the combined data to client 410.

In one embodiment, information needed to connect to PDI 408 is stored and encrypted on portal 402. Hence, client 410 would not be able to directly query PDI 408 because it would not know the required authentication information. In order to provide for privacy and security control, client 410 may only know the authentication information needed to log onto portal 402.

The identity of the requesting organization and/or client may be communicated to PDI 408 along with the request. Based on the identity of the organization and/or client, PDI 408 may alter or filter the information that is sent back to portal 402 to be forwarded to client 410. Each PDI may have business rules and/or filters to be applied to the information in the data sources defined on and/or controlled by the PDI, and passwords and/or IDs restricting the level of access. The business rules and filters may be based on the client and/or organization seeking access. For example, PDI 408, knowing that client 410 from organization A is seeking access to information, may filter out certain information, e.g., price, require information to be displayed in a certain way, control how client 410 uses the information, e.g., view only, manipulate the information, e.g., reducing all of the prices by 10%, and/or replace one or more values with other values. Business rules and filters are described in further detail below.

Other PDIs may also control what information client 410 has access to and/or how client 410 can use that information. For instance, PDI 406, which is client 410's default or home PDI in the embodiment, may filter out, for example, parts from non-approved manufacturers or parts above a certain price. In other embodiments, clients may also be controlled by non-home or non-default PDIs.

In addition to facilitating communication between clients and non-local PDIs, portal 402 may send copies of some or all of the information in data source 404 to PDIs 406-408 so that each PDI has a copy of some or all of the information in data source 404. Information in data source 404 may include links to other sources of content (e.g., supplier data sheets), product change notifications (PCNs) (e.g., end of life notification for a part), and updates to software applications. Portal 402 may also host symbols of components, which can be downloaded by clients 410-412 to be used in the design of a system. Requests from clients 410-412 may also be processed by portal 402. Clients 410-412 may request new parts, additional manufacturers, new component symbols, etc. Moreover, portal 402 may control software access, e.g., the software applications each client or organization has access to. These applications may be stored on one or more clients and/or one or more PDIs in each organization.

PDIs 406-408, in addition to servicing local and non-local clients 410-412 for content, may perform batch automation processes (e.g., alignment and cleansing of the content in respective data sources 414-422), deliver updates to software applications to respective clients 410-412, authenticate clients, and/or control access to and view of content in respective data sources 414-422 (e.g., what content each user has access to, how that content is presented to and used by each user, etc.). Moreover, PDIs 406-408 may synchronize with one another and/or other PDIs that may or may not be within the same organization. In some embodiments, synchronization may exclude user, project, and/or role information.

Each client may have access to a plurality of software applications or tools that may be utilized by end-users and/or administrators. More tools may be available for administrators than end-users. For example, tools that facilitate setting up new data sources, configuring PDIs, aligning information in data sources, managing user access, and controlling authentication information may only be available to administrators. Tools that are available to end-users may facilitate searching for parts in data sources 414-422, viewing components for purposes of placing them into schematics, optimizing a bill of materials (BOM) (e.g., verifying that the BOM includes clean and orderable parts), scrubbing parts of an existing schematic (e.g., verifying that the schematic follows certain business rules), and procuring components. Examples of applications/tools that may be utilized by end-users and/or administrators are described below in further detail.

Figure 5:
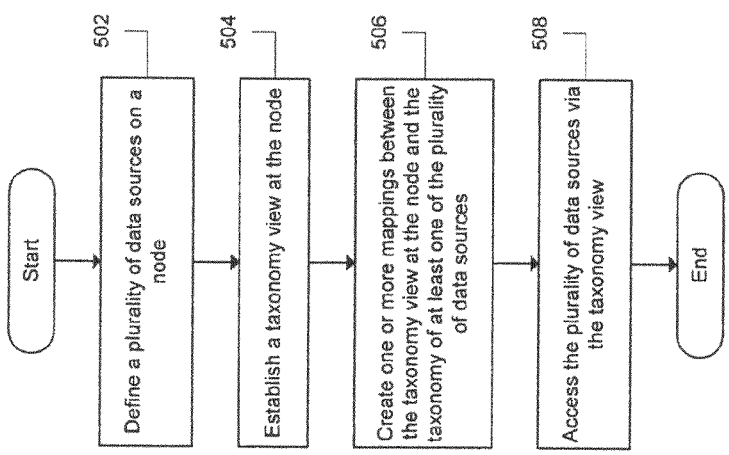

FIGS. 5-12 depict various methods of implementing and using a federated system. In FIG. 5, a plurality of data sources are defined on a node at 502. Each data source is associated with a taxonomy. A taxonomy view is established at the node (504) and one or more mappings between the taxonomy view at the node and the taxonomy of at least one of the plurality of data sources are created (506). The plurality of data sources are then accessed via the taxonomy view at the node (508). For example, users can query the plurality of data sources by querying the taxonomy view. The query will be translated into a plurality of queries using the one or more mappings, one for each data source.

Figure 6:
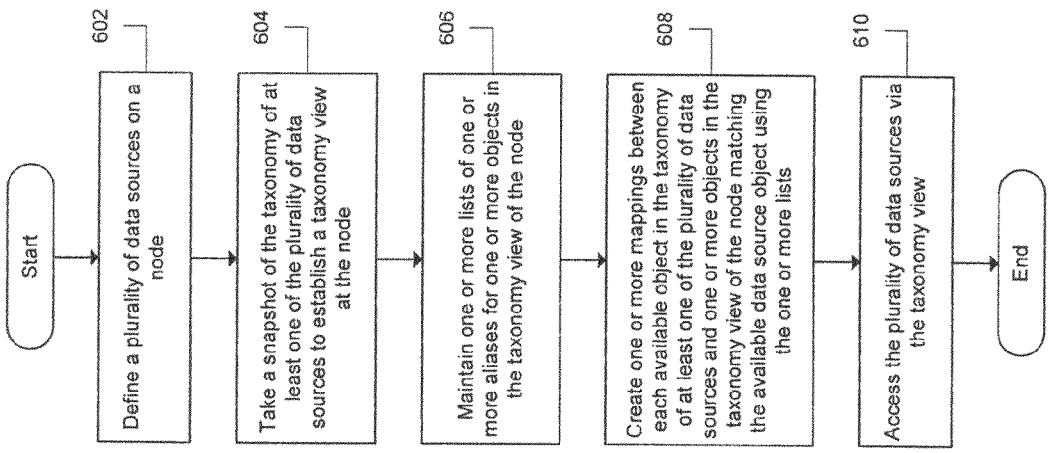
FIGS. 5-12 are process flows of various methods of implementing and using a federated system according to some embodiments of the invention.
Figure 13:
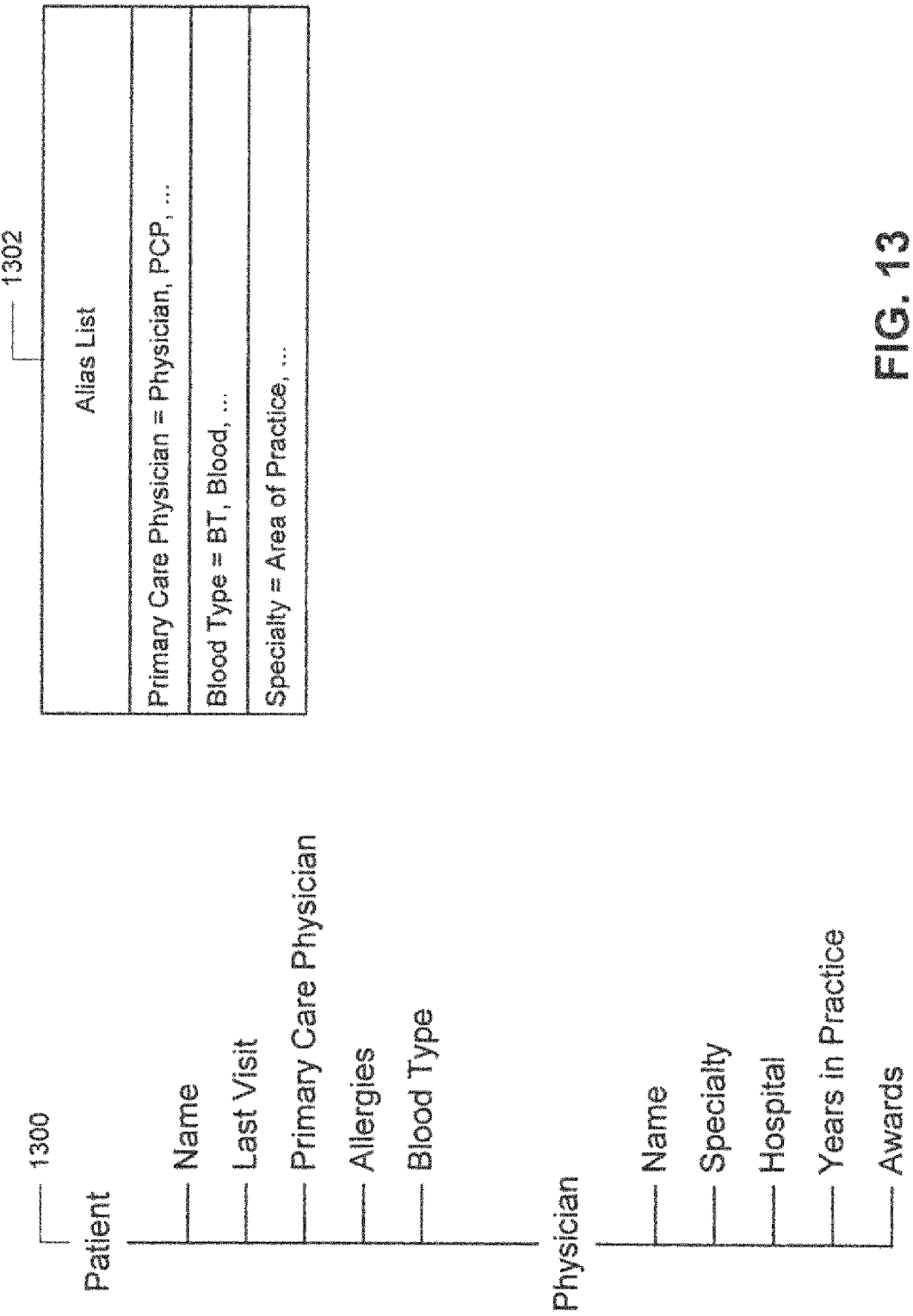
FIG. 13 shows an illustrative taxonomy view and alias list according to one embodiment of the invention.

In FIG. 6, a plurality of data sources with taxonomies are defined on a node (602). A snapshot of the taxonomy of at least one of the plurality of data sources is taken to establish a taxonomy view at the node (604). Each data source taxonomy includes one or more available objects, the one or more available objects may be less than all of the objects in the data source taxonomy. One or more lists of one or more aliases for one or more objects in the taxonomy view of the node are maintained (606). An example of an alias list 1302 for one or more objects in a taxonomy view 1300 is depicted in FIG. 13. In the embodiment, taxonomy view 1300 includes various objects relating to medical information. Alias list 1302 includes aliases for three of the objects in taxonomy view 1300—'Primary Care Physician', 'Blood Type', and 'Specialty'.

The one or more lists are then used to create one or more mappings between each available object in the taxonomy of at least one of the plurality of data sources and one or more objects in the taxonomy view of the node matching the available data source object (608). In some embodiments, matching objects may not be identical. The plurality of data sources are then accessed via the taxonomy view at 610.

Figure 7:
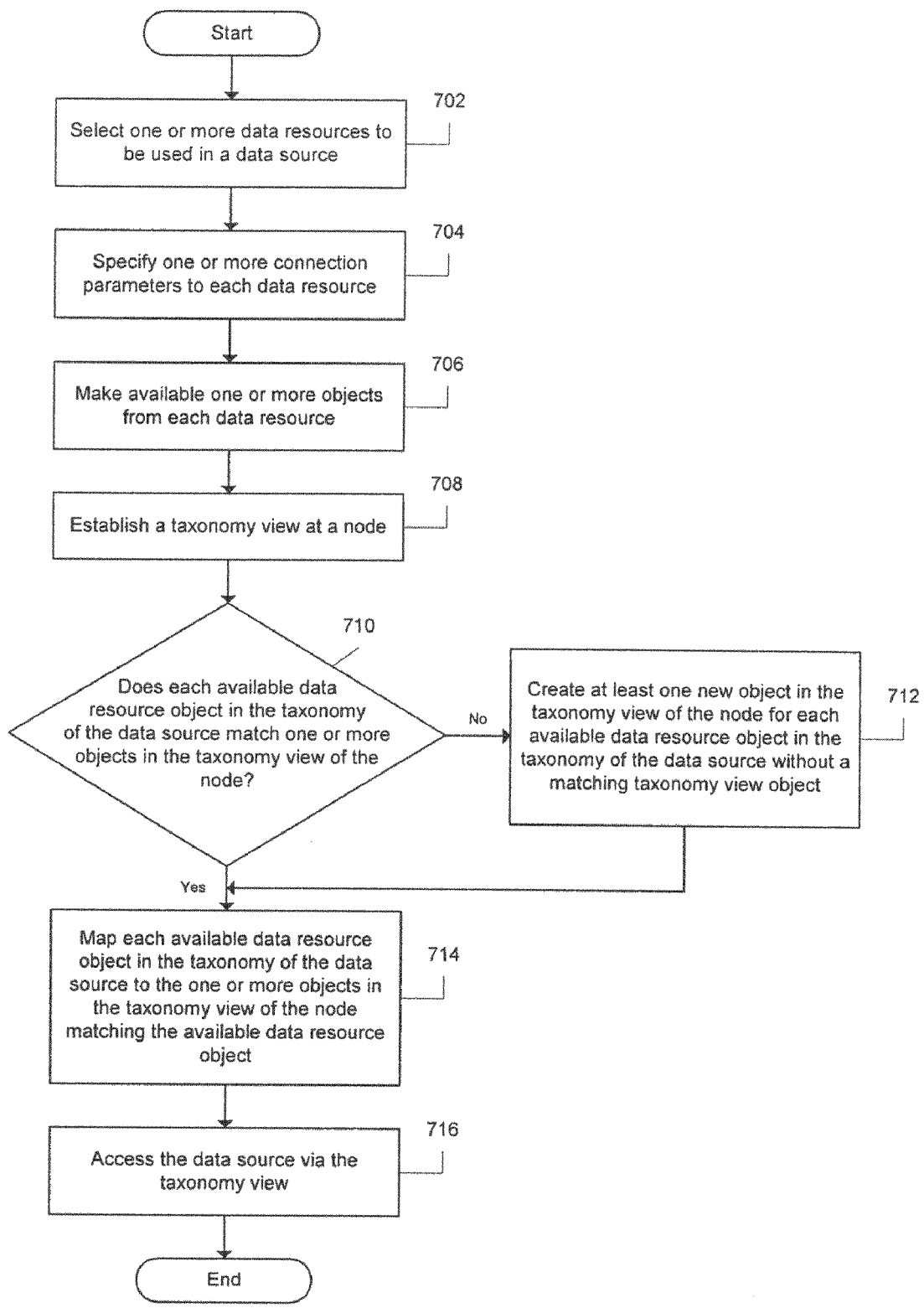

In the embodiment of FIG. 7, one or more data resources are selected at 702 to be used in a data source. At 704, one or more connection parameters to each data resource are specified. One or more objects from each data resource are made available (706) and a taxonomy view is established at a node (708). The taxonomy of the data source includes the one or more available data resource objects.

A determination is made at 710 as to whether each available data resource object in the taxonomy of the data source matches one or more objects in the taxonomy view of the node. If not all of the available data resource objects have at least one matching taxonomy view object, then at least one new object is created in the taxonomy view of the node for each available data resource object in the taxonomy of the data source without a matching taxonomy view object (712). Once every available data resource object has at least one matching taxonomy view object, each available data resource object in the taxonomy of the data source is mapped to the one or more objects in the taxonomy view of the node matching the available data resource object (714). The data source is then accessed via the taxonomy view at 716.

Figure 8:
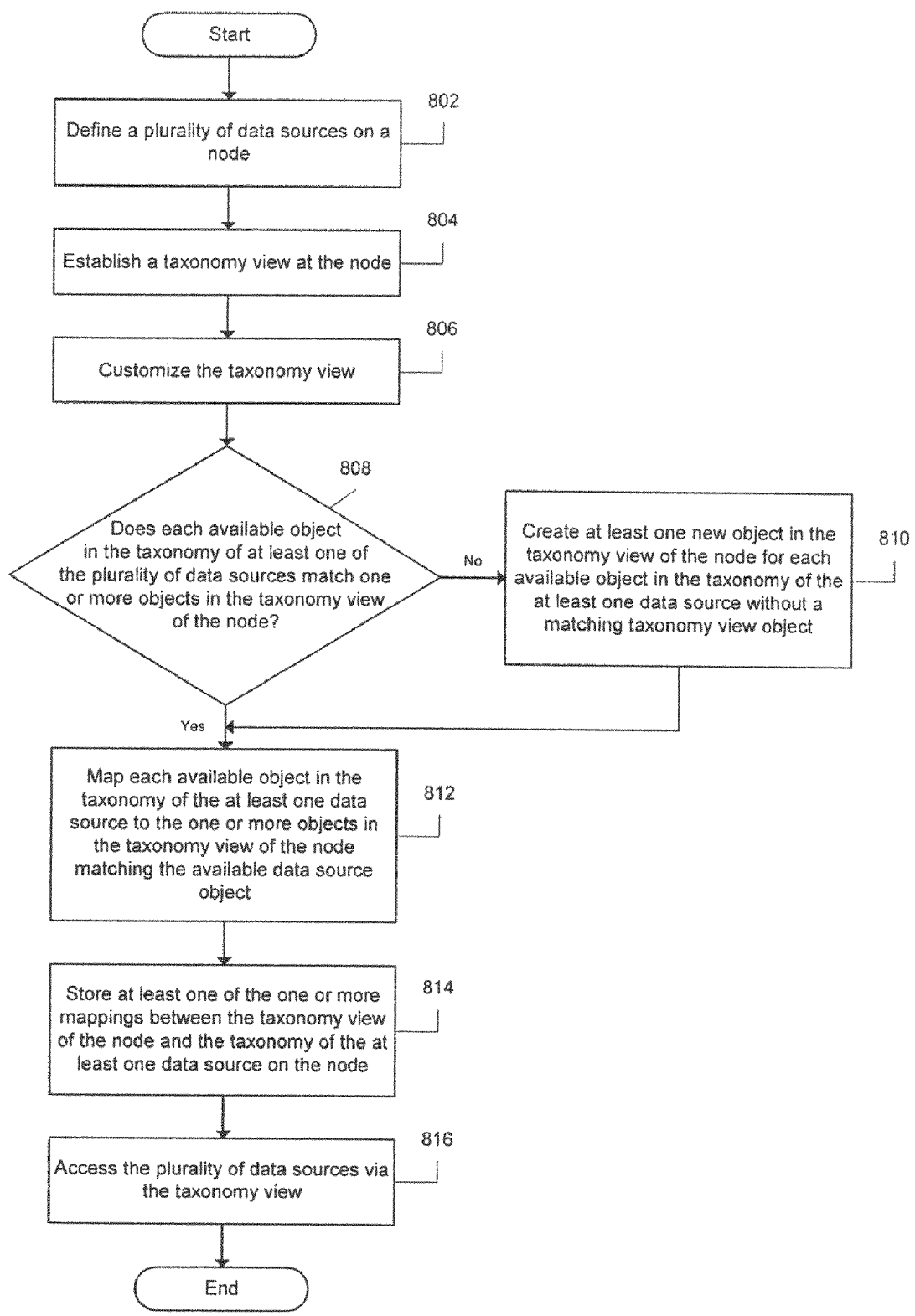

A plurality of data sources are defined on a node at 802 in FIG. 8. Each data source is associated with a taxonomy and each taxonomy includes one or more available objects. At 804, a taxonomy view is established at the node. The taxonomy view is then customized at 806. Customization may involve, for example, modifying the label of one or more objects in the taxonomy view or changing the hierarchy of the objects in the taxonomy view. A determination is made at 808 as to whether each available object in the taxonomy of at least one of the plurality of data sources match one or more objects in the taxonomy view of the node.

At least one new object is created in the taxonomy view for each available object in the taxonomy of the at least one data source without a matching taxonomy view object (810). Each available object in the taxonomy of the at least one data source is then mapped to the one or more objects in the taxonomy view of the node matching the available data source object (812). One or more of the mappings between the taxonomy view of the at least one data source and the taxonomy view of the node is stored on the node (814). The plurality of data sources are accessed at 816 via the taxonomy view of the node.

Figures 9, 10:
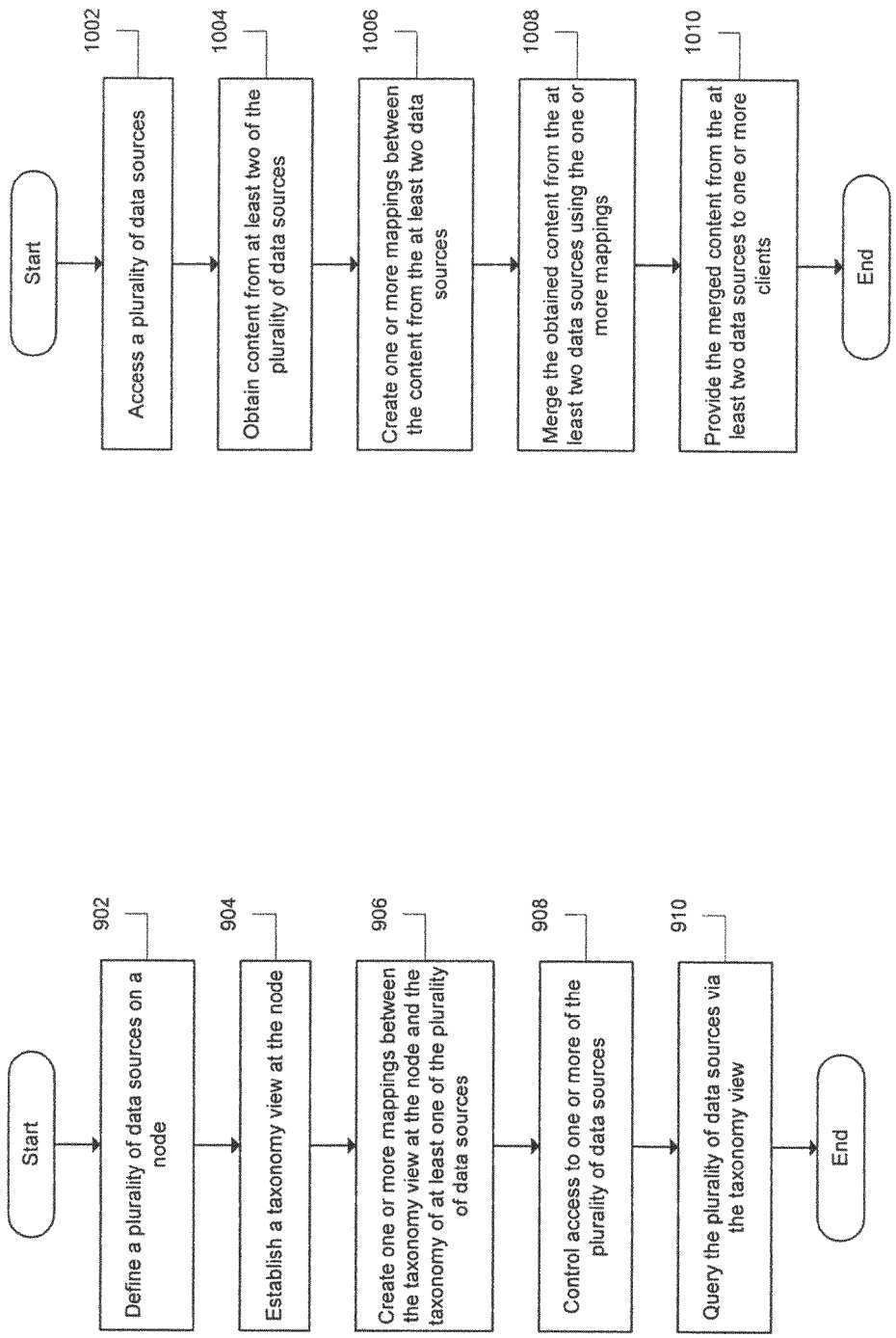

In FIG. 9, a plurality of data sources are defined on a node (902). Each data source is associated with a taxonomy. At 904, a taxonomy view is established at the node. One or more mappings between the taxonomy view of the node and the taxonomy of at least one of the plurality of data sources are created at 906. Access to one or more of the data sources is controlled (908). In some embodiments, access may be controlled by regulating presentation of the content from the one or more data sources. For example, different modes of presentation may be used for different users.

In further embodiments, access to the one or more data sources may be controlled by altering the content from the one or more data sources or managing how content from the one or more data sources can be used. For example, one or more values in the content from the one or more data sources may be increased, decreased, or replaced with other values. In some embodiments, business rules and/or filters may be used to control access to the one or more data sources. These filters and/or business rules may be stored on the node. At 910, the plurality of data sources are queried via the taxonomy view. Further details regarding access and control of data sources are discussed below.

A plurality of data sources are accessed at 1002 in FIG. 10. At 1004, content from at least two of the plurality of data sources are obtained. One or more mappings between the content from the at least two data sources are created (1006) and content obtained from the at least two data sources are merged using the one or more mappings (1008). In some embodiments, less than all of the content from the at least two data sources are mapped. In further embodiments, less than all of the content from the at least two data sources are merged. The merged content is then provided to one or more clients at 1010.

Figure 11:
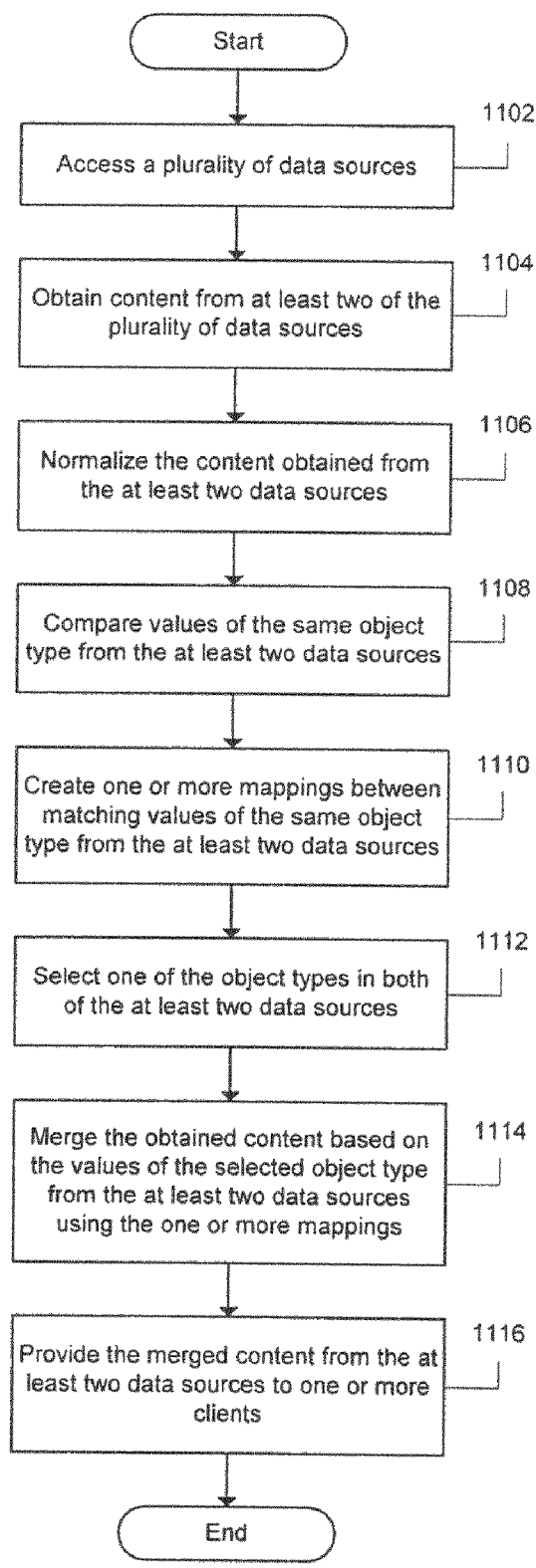

In FIG. 11, a plurality of data sources are accessed at 1102. Content from at least two of the plurality of data sources are obtained (1104) and normalized (1106). Values of the same object type in the content from the at least two data sources are compared (1108) and one or more mappings are created between matching values of the same object type (1110). In some embodiments, matching values may not be identical values. At 1112, one of the object types found in each of the at least two data sources is selected and content obtained from the at least two data sources are merged based on the values of the selected object type using the one or more mappings at 1114. The merged content from the at least two data sources is then provided to one or more clients (1116).

Figure 12:
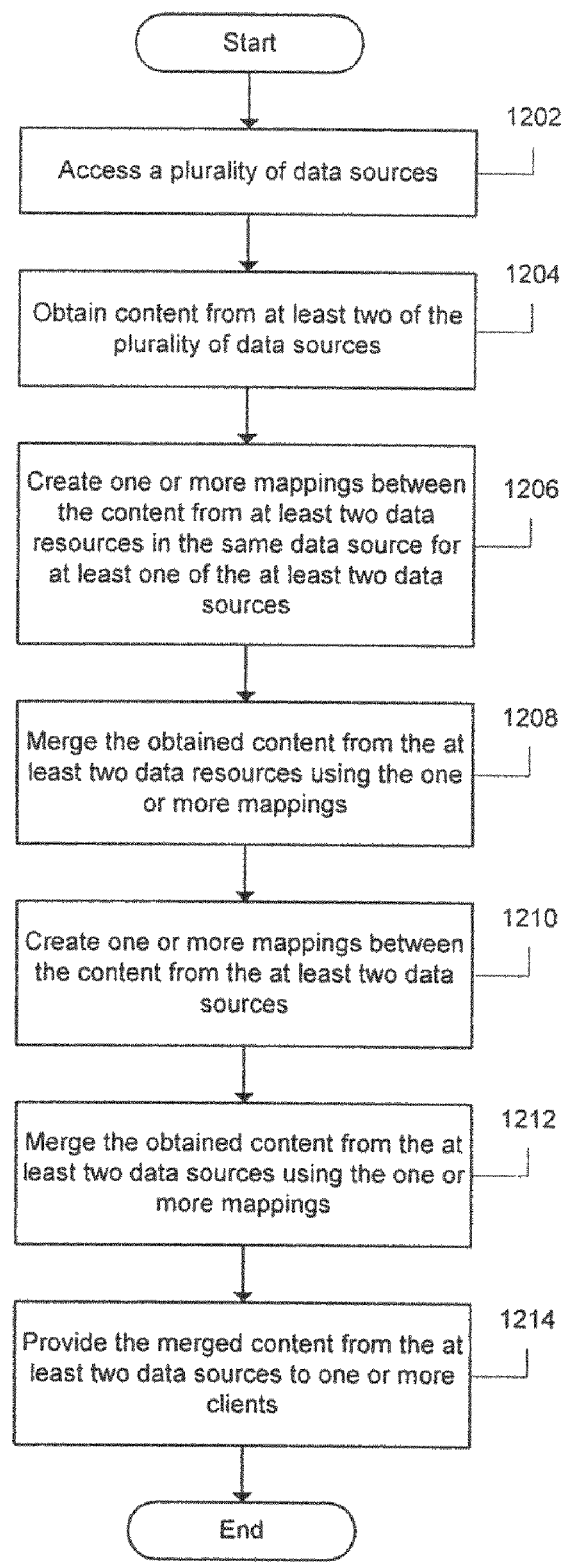

At 1202 in FIG. 12, a plurality of data sources are accessed. Content from at least two of the plurality of data sources are obtained (1204). Each data source includes one or more data resources. One or more mappings are created between the content from at least two data resources in the same data source for at least one of the at least two data sources (1206). Content obtained from the at least two data resources are merged using the one or more mappings (1208). At 1210, one or more mappings are created between the content from the at least two data sources. The content obtained from the at least two data sources are merged using the one or more mappings (1212). The merged content from the at least two data sources is then provided to one or more clients at 1214. In some embodiments, a data resource may be associated with more than one data source. Merging content from data sources is described in further detail below.

System Architecture

Figure 14A:
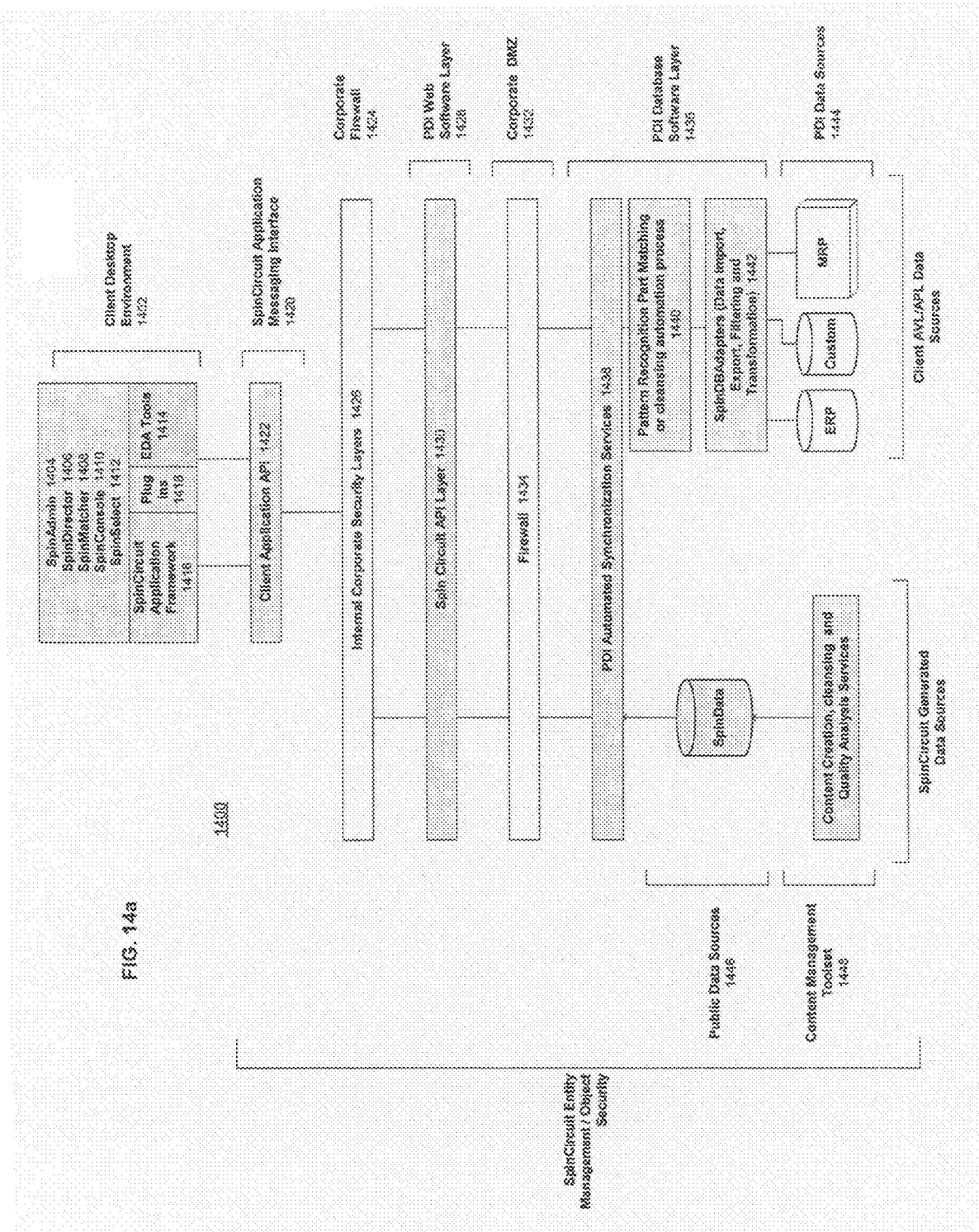
FIGS. 14-15 illustrates architectural overviews of an integrated component management system according to some embodiments of the invention.
Figure 14B:
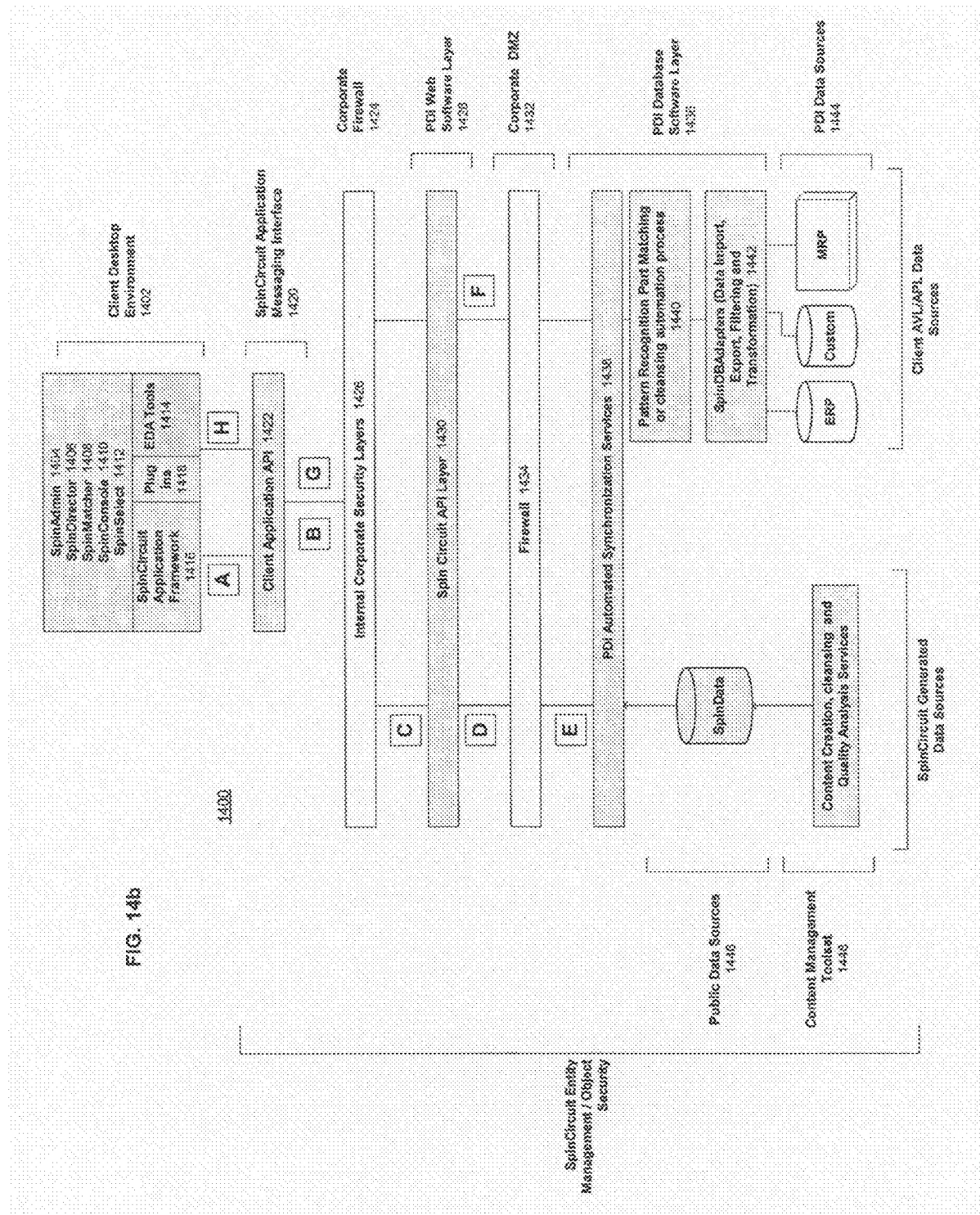
Figure 15:
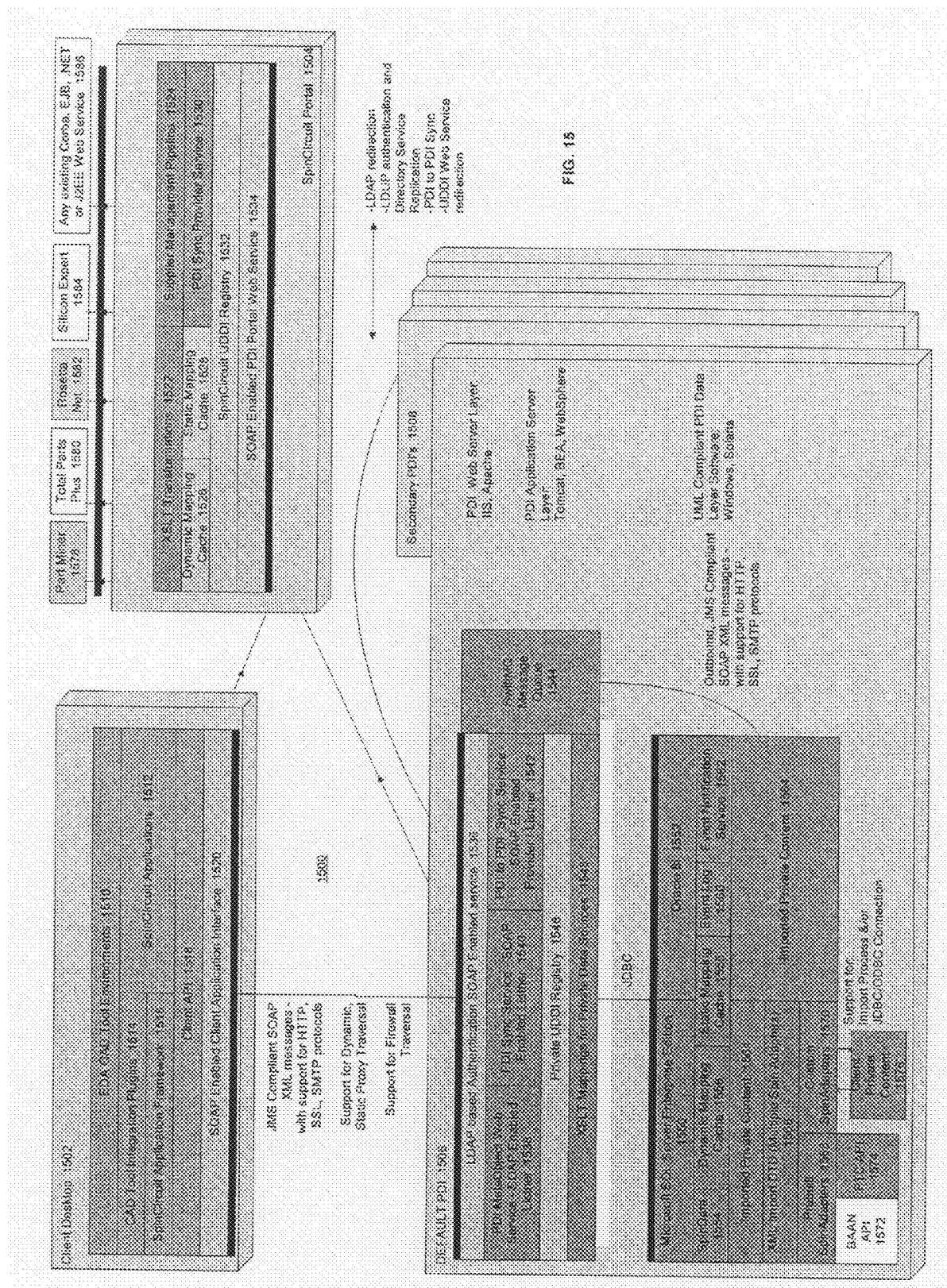
Figure 17:
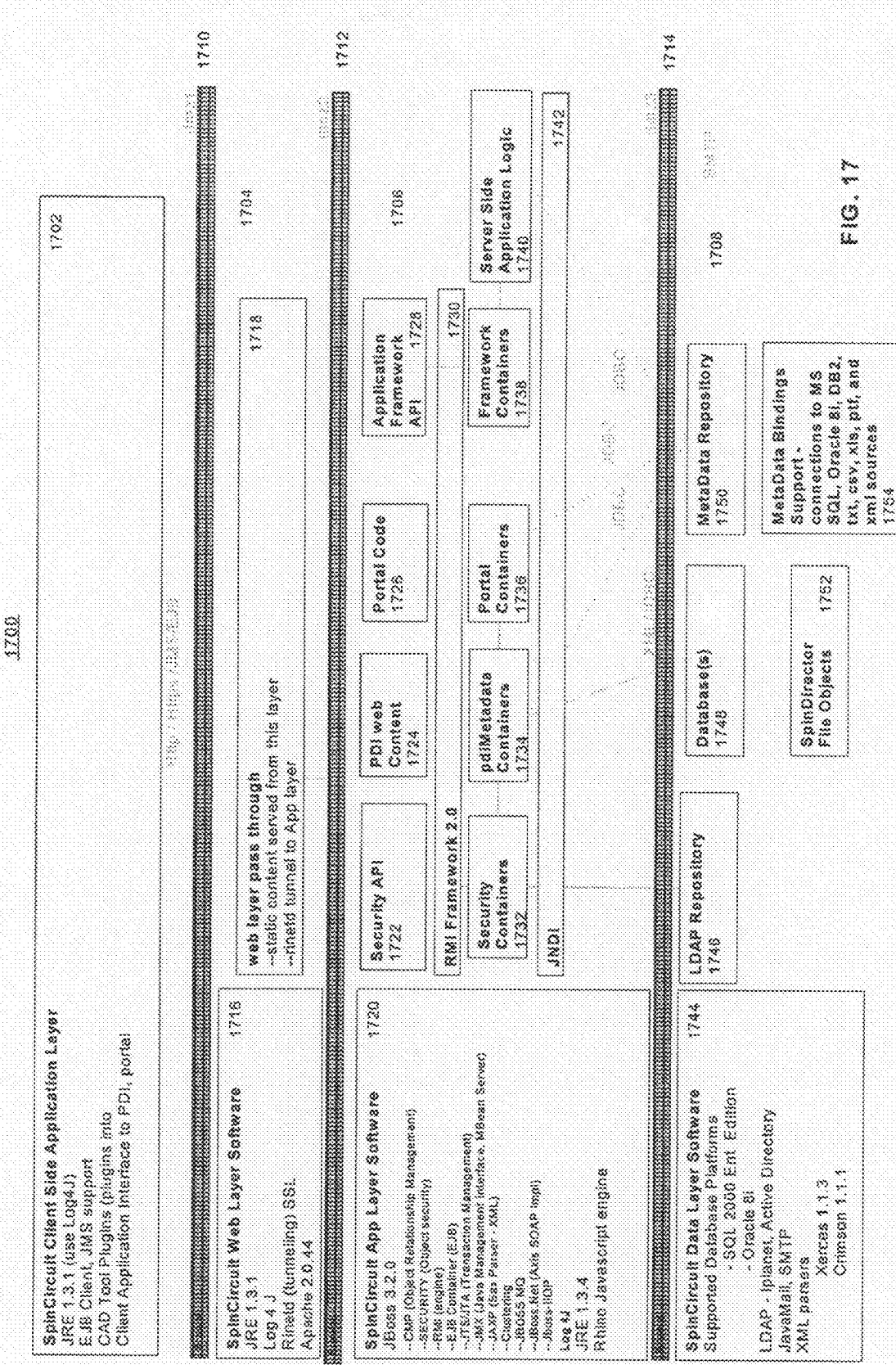
FIG. 17 is a view of an integrated component management system architecture according to one embodiment of the invention.

Depicted in FIGS. 14-15 and 17 are various architectural views of an illustrative integrated component management system that incorporates some of the embodiments of the invention. An implementation of an example integrated component management system, such as the system shown in FIGS. 14-15 and 17, is called SpinCircuit, which is available from Cadence Design Systems, Inc. of San Jose, Calif.

Architecture 1400 in FIG. 14 includes a client desktop environment 1402. Several applications 1404-1412 reside on client desktop environment 1402—an administrative tool 1402, which is described herein and illustrated in FIG. 14 as "SpinAdmin"; an information management tool 1406, which is described herein and illustrated in FIG. 14 as "SpinDirector"; a validation and optimization tool 1408, which is described herein and illustrated in FIG. 14 as "SpinMatcher"; a PDI management tool 1410, which is described herein and illustrated in FIG. 14 as "SpinConsole"; and a selection tool 1412, which is described herein and illustrated in FIG. 14 as "SpinSelect".

SpinAdmin 1404 manages user access, application and file permissions, and external participant access. SpinDirector 1406 provides a 'work in progress' file storage and retrieval space where information can be collaboratively and securely exchanged with specified internal and external project participants. SpinDirector 1406 also manages information flowing in and out of other applications, and provides access to outsourced services sanctioned from service partners.

SpinMatcher 1408 is designed to 'match' BOMs at the individual component level with supply chain information to ensure validity and facilitate optimization. SpinConsole 1410 is a management environment for PDIs. SpinConsole 1410 allows for dynamic loading and management of data into an organization's PDI network for the purpose of content cleansing, validation, and optimization.

SpinSelect 1412 is a component search, research, and selection tool that influences choices according to business rules and preferences. SpinSelect 1412 can be fully integrated into electronic design automation (EDA) tools 1414 to facilitate design for supply chain by blending multiple approved vendor lists (AVL) from internal and external sources such as electronic manufacturing solution (EMS) providers.

Client desktop environment 1402 may also include other applications, such as a scrubbing tool, which is described herein as "SpinScrubber", an exchange tool, which is described herein as "SpinConnect", and a gateway tool, which is described herein as "SpinServices". SpinScrubber is an EDA tool integrated application that 'scrubs' schematic designs for component validity within the supply chain according to business rules and preferences. SpinScrubber also allows for rapid component replacement if required. SpinConnect provides BOM exchange capability with many product data management (PDM) systems. SpinServices is a gateway to content services within an organization's corporate library process for new part requests. A SpinCircuit application framework 1416 and plug-ins 1418 are also included in client desktop environment 1402. Further details regarding client desktop environment 1402, application framework 1416, applications 1404-1412, and other applications residing on client desktop environment 1402 are described below.

Architecture 1400 also includes an application messaging interface 1420 with a client application API (Application Programming Interface) 1422, a corporate firewall 1424 with internal corporate security layers 1426, a web layer 1428 with an API layer 1430, a de-militarized zone (DMZ) 1432 with a firewall 1434, a database layer 1436 with automated synchronization services 1438, automation processes 1440 for pattern recognition, part matching, or cleansing, and database adapters 1442, data sources 1444-1446, and a content management toolset 1448.

Java Message Service (JMS) messaging technologies may be used to route messages from applications 1404-1412 to web layer 1428. Application API 1422 may use standard ports for Hypertext Transfer Protocol (HTTP) and/or Hypertext Transfer Protocol Secure (HTTPS) communication to allow for transversal of corporate firewall 1424. Applications 1404-1412 may be written with Java programming language. API layer 1430 may include software for retrieving information from a PDI and may be written with Java Server Pages (JSP). Services 1438, processes 1440, and adapters 1442 provide the workflow, process automation, and data transformation engine for managing content within a PDI. A combination of exact systems and fuzzy logic pattern recognition logic may be used to perform part number and manufacturer alias mapping.

FIG. 14b shows an illustrative example of a process flow through architecture 1400. At step A, one of the applications 1404-1412 on client 1402 initiates a request transaction for data. At step B, client application API 1422 prepares a request message object. The request message object can then transmitted to the PDI using HTTP/SSL (Secure Socket Layer) protocol. At step C, API layer 1430 authenticates the request, i.e., determines whether data entitlements are available to the user. At step D, data is retrieved from data sources 1444-1446. Java Database Connectivity (JDBC), Open Database Connectivity (ODBC), or JMS message-based connectivity protocols may be used to retrieve data. At step E, database layer 1436 returns viewable data to web layer 1428. At step F, web layer 1428 constructs a response message object and sends it to client application API 1422. The response message object is then accepted by application API 1422 for processing at step G. At step H, client application API 1422 returns data set to client 1402.

In embodiments where a client is seeking access to data at a non-local PDI via a portal, client requests may be sent via the same process as discussed above in FIG. 14b. In the embodiments, the portal web layer will authenticate the request, verify access rights, identify data entitlements, and prepare a shared data request message object. The shared data request message object will then be transmitted to the web layer on the non-local PDI. The non-local PDI web layer will authenticate the shared data request, identify data shared with client, and make a call to the data layer for shared data. The non-local PDI data layer will then return the shared data to the web layer, which will construct a shared data response message object and transmit the message object to the portal web layer. When the portal web layer receives the shared data response message object, it may aggregate it with response message objects for the client from other PDIs, and then redirect the compounded shared data response message object to the client application API. The client application API will then return the response to the client.

Architecture 1500 in FIG. 15 includes a client desktop 1502, a portal 1504, a default PDI 1506, and secondary PDIs 1508. Client desktop 1502 includes an EDA CAD (Computer-Aided Design) tool environments 1510, SpinCircuit applications 1512, CAD tool integration plugins 1514, an application framework 1516, a client API 1518, and a SOAP (Simple Object Access Protocol) enabled client application interface 1520. Client API 1518 is a set of Java objects used by applications 1512 to initiate requests to and receive payloads from PDIs.

Portal 1504 includes XSLT (Extensible Stylesheet Language Transformation) transformations 1522, a supplier management pipeline 1524, a dynamic mapping cache 1526, a static mapping cache 1528, a sync provider service 1530, a UDDI (Universal Description, Discovery, and Integration) registry 1532, and a SOAP enabled web service 1534.

PDI 1506 includes an LDAP (Lightweight Directory Access Protocol) based authentication SOAP enabled service 1536, a MetaObject web service 1538, a PDI sync service 1540, a PDI to PDI sync service 1542, a swift message queue 1544, a private UDDI registry 1546, XSLT mappings for private data sources 1548, a Microsoft® SQL server enterprise edition software application 1550, an Oracle® 8i software application 1552, SpinData 1554, a dynamic mapping cache 1556, a static mapping cache 1558, an event log 1560, an event notification service 1562, imported private content 1564, XML import DTD (Document Type Definition) 1566, pre-built SpinAdapters 1568, custom SpinAdapters 1570, BAAN API 1572, PTC API 1574, and client private content 1576. BAAN is the name of an enterprise resource planning (ERP) package. An ERP package is an example of a type of data source for supply chain information. PTC is the name of a product data management (PDM) solution. A PDM solution is an example of a type of data source for BOM and component information.

Service 1536 may use LDAP-based client server protocol for all authentication requests against PDI 1506. LDAP service 1536 may provide access to a read-only directory hosted on a data layer of PDI 1506, which in turn provides support for users, roles, groups, taxonomy, a PDI network domain, and other PDIs in the domain. Service 1536 may also handle multi-master replication and allow writes and updates to be performed against all PDIs within the PDI network domain.

PDI MetaObject web service 1538 may act as the primary interface for all calls against PDI 1506 from SOAP enabled client application interface 1520. Web service 1538 may provide access to metadata objects in a MetaObject Factory and may be registered by default with UDDI registry 1546 hosted on PDI 1506. MetaObjects and MetaObject factories are described in more detail below.

PDI sync service 1540 on default PDI 1506 may provide support for the request, receipt, and processing of all PDI sync-based update requests from portal 1504. PDI sync service 1540 may initiate and maintain an outbound connection to portal 1504 utilizing certain default protocols and port configurations. Service 1540 may also be registered with UDDI registry 1546. In one embodiment, only a local administrator will have access to view and administer service 1540.

PDI to PDI sync service 1542 may provide a master or multi-subscriber replication mechanism. Service 1542 may leverage the same port configurations as that of service 1540. In addition, service 1542 may also be registered with UDDI registry 1546. Further, access to view and administer service 1542 may be limited to local administrators as with service 1540.

All message routing may utilize queue 1544 for the storage, forwarding, and receipt of JMS compliant SOAP messages to and from PDI 1506. Queue 1544 may reside on the web and application layer of PDI 1506.

Interfaces, protocol bindings, and deployment details of network services hosted on PDI 1506 may be described using Web Services Description Language (WSDL). WSDL files can be created to describe the interface and protocol bindings for registered network web services in UDDI registry 1546 in a uniform manner. WSDL files may be created from any native Java, .Net, JSP, and/or Cobra based API or website. Once a WSDL file is created, an associated web service code with SOAP messaging may be automatically created. The newly created client or server service can then be registered in UDDI registry 1540 as an available service.

Figure 16:
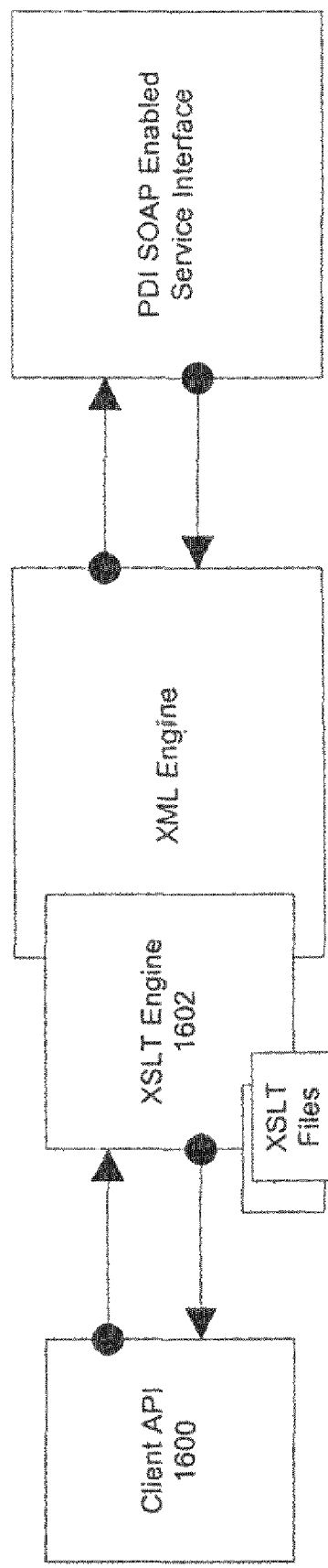
FIG. 16 depicts a process flow for automatically creating SOAP messaging according to an embodiment of the invention.

XSLT mappings 1548 in PDI 1506 may be used to associate objects from one web service WSDL definition to another. Each XSLT file may be associated with a particular web service. Within the file, XSLT object pairs may be associated to application names in a request or response transform pair. Utilizing the above method, non-SOAP messages from a client API 1600 can be transformed by an XSLT engine 1602 into SOAP messages as illustrated in FIG. 16. This allows for requests to be passed onto any number of existing web services, such as Part Miner 1578, Total Parts Plus 1580, Rosetta Net 1582, Silicon Expert 1584, and more 1586 in a standard format.

MetaObject service 1538 can generate a request to an appropriate service registered in UDDI registries 1532 or 1546. The schema of the service will be mapped to the schema of the PDI requests and an XSLT file will be generated. At runtime, the outgoing query requests to each service are converted into the appropriate format for that specific service. Likewise, they are transformed back on the response.

When a user subscribes to a content providing service such as Silicon Expert 1584 or Total Parts Plus 1580, that user will have the ability to immediately start querying against that service for all fields listed as available to that user for that service. A MetaObject Factory (not shown) on portal 1504 will receive a request to query against a field listed as being in that given service. The MetaObject Factory on portal 1504 will then call a UDDI interface to determine the Uniform Resource Locator (URL) for the given service. The MetaObject Factory will also call the XSLT engine associated with the service and pass the request for content to the given service. The request will be made against the given API hosted by the content provider and a response will be returned including a given set of part numbers and manufacturer names as well as associated third-party content.

At this time, a dynamic lookup will happen to match the returned part numbers and manufacturer names against data (not shown) hosted on portal 1504. If a match occurs, a cache record will be stored in dynamic mapping cache 1526 on portal 1504, the cache record will retain the part number mapping and associated returned content. Cache 1526 will also retain the reference ID returned from the service. This reference ID may then be used in future queries as a fast lookup mechanism for subsequent queries. A date time stamp may be associated with the cache record. Records in cache 1526 may be dropped after aging over a predetermined range of time.

If, instead, the services of the content providers are registered in UDDI registry 1532 on portal 1504, then static mappings can be created. Static mapping cache 1528 on portal 1504 serves as a fixed mapping cache between data on portal 1504 and other web services. Cache 1528 can be automatically pre-built. Records in cache 1528 will be retained until they are dropped manually or programmatically. Thus, unlike cache 1526, cache 1528 will not age.

SpinData 1554 on PDI 1506 may include millions of the most actively used components. Event log 1560 on PDI 1506 may be used to view all event messages generated by applications and PDIs. When event notification service 1562 on PDI 1506 receives notifications from applications and/or PDI processes, it routes the events to the appropriate receivers or logs as required. Service 1562 may link application and PDI error codes to a standardized error code listing. Event notification service 1562 may also interpret codes to associate additional information to the code.

Imported customer content may be stored in imported private content 1564 on PDI 1506. Private content section 1564 will provide support for content from multiple data sources. In addition, section 1564 will provide support for MetaObjects, which allows customers to define objects on the fly as required for a given data source schema.

Illustrated in FIG. 17 is another view of an illustrative integrated component management system architecture 1700. Architecture 1700 includes a client side application layer 1702, a web layer 1704, an application layer 1706, a data layer 1708, and three DMZs 1710-1714. Client side application layer 1702 includes a Java Runtime Environment (JRE), an Enterprise Java Beans (EJB) client, JMS support, and CAD Tool plugins. Client side application layer 1702 communicates with web layer 1704 via HTTP/HTTPS/JMS/EJB protocol.

Web layer 1704 includes a web layer software 1716 and a web layer pass through 1718. Web layer software 1716 includes a JRE, a log, an rinetd SSL tunnel, which can be used to redirect Transmission Control Protocol (TCP) connections, and an Apache application. Web layer pass through 1706 includes static content and an rinetd tunnel to application layer 1706.

Application layer 1706 includes an application layer software 1720, a security API 1722, web content 1724, portal code 1726, an application framework API 1728, a remote invocation method (RIM) framework 1730, security containers 1732, metadata containers 1734, portal containers 1736, framework containers 1738, server side application logic 1740, and a Java Naming and Directory Interface (JNDI) 1742. Application layer software 1720 includes a JBOSS application server, a JRE, and a Rhino Javascript engine.

Data layer 1708 includes a data layer software 1744, an LDAP repository 1746, database(s) 1748, a metadata repository 1750, file objects 1752, and metadata bindings 1754. Data layer software 1744 supports Microsoft SQL 2000 enterprise edition and Oracle 8i database platforms. It also includes XML parsers, JavaMail, and an LDAP directory. Database(s) 1748 communicates with metadata containers 1734 using XML/JDBC protocol. Metadata repository 1750 communicates with containers 1734-1738 and application logic 1740 using JDBC protocol. Metadata bindings 1754 support connections to Microsoft SQL, Oracle 8i, IBM DB2, text, PTF, XML, Microsoft Excel, and CSV (Comma Separated Value) sources.

Application Framework

Figure 18:
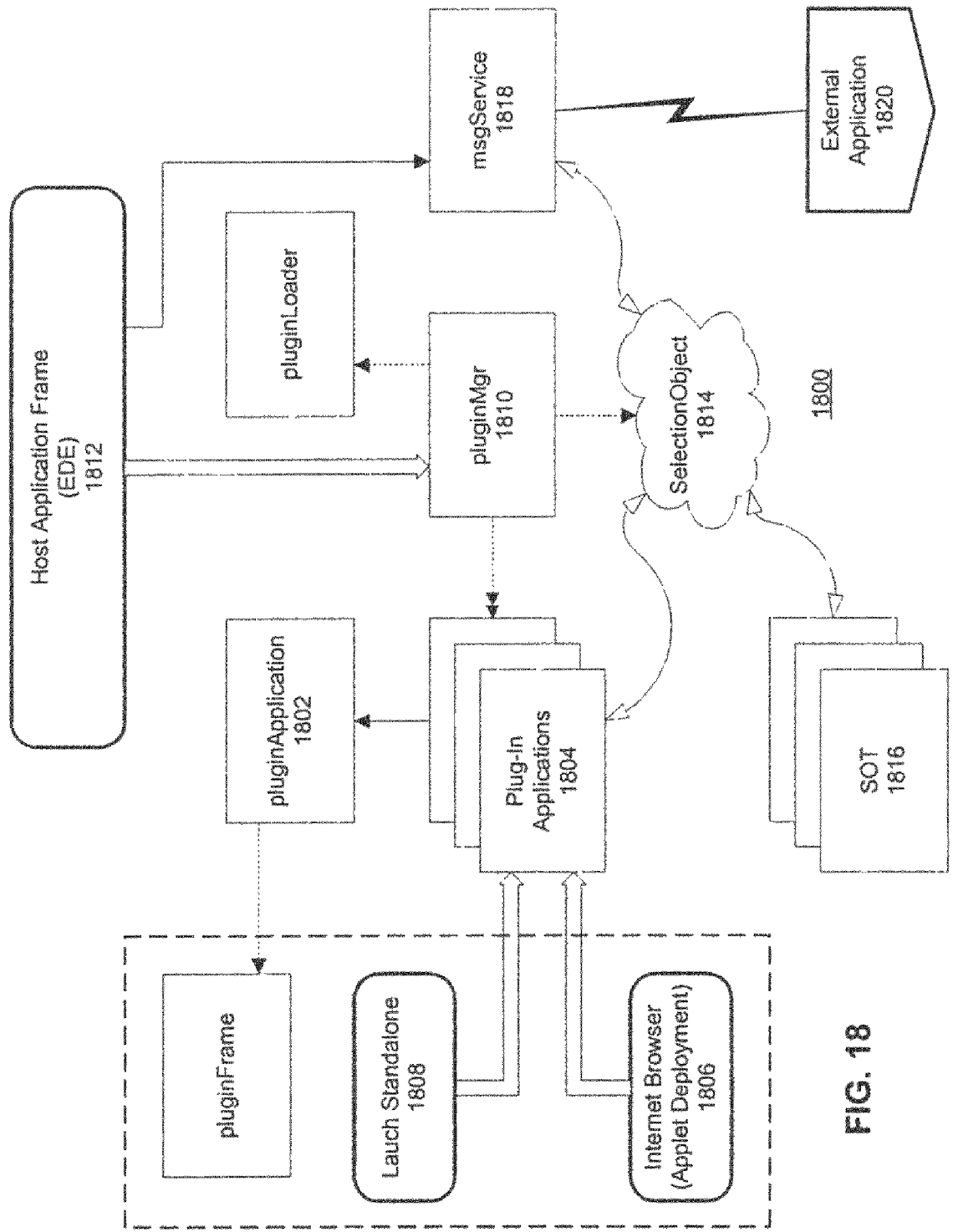
FIG. 18 shows an application framework according to an embodiment of the invention.

An application framework (AFW) 1800 according to one embodiment of the invention is depicted in FIG. 18. AFW 1800 allows for flexible deployment of applications. An application may represent a specific set of functionality that performs a business process. As seen in FIG. 18, an application may be deployed as a plug-in application 1802-1804, an applet 1806, or a stand-alone application 1808. An applet is an application that can be executed from a web page. A plug-in application is an application that plugs into another application.

AFW 1800 includes a plug-in manager 1810, which may be used by a host application 1812 in an enterprise desktop environment (EDE) to load and activate plug-in applications 1802-1804. One of the plug-in applications 1804 can use plug-in manager 1810 to contain its own internal plug-in application 1802. Plug-in application 1802 may be used to customize the external plug-in application 1804.

Plug-in manager 1810 may contain one or more application entitlements (not shown) and various APIs (not shown), such as an application API, a selection object API, a process flow API, an application call stack API, and a plug-in registration API. In one embodiment, one or more applications are derived from the application API. The application API contains three entry points that allow the derived applications to be placed in any frame-based applet, application, or other plug-in-based application.

Data may be passed from one plug-in to another using a selection object 1814 in some embodiments. A selection object can be thought of as a container of data. In one embodiment, selection objects are derived from the selection object API. The derived selection object is then defined to contain the data necessary to define the selection. In one embodiment, each plug-in registers the type of selection objects that it can read and write. This information may be used by the process flow API to determine all of the plug-in applications that can make use of objects produced by a given plug-in application.

Figure 19:
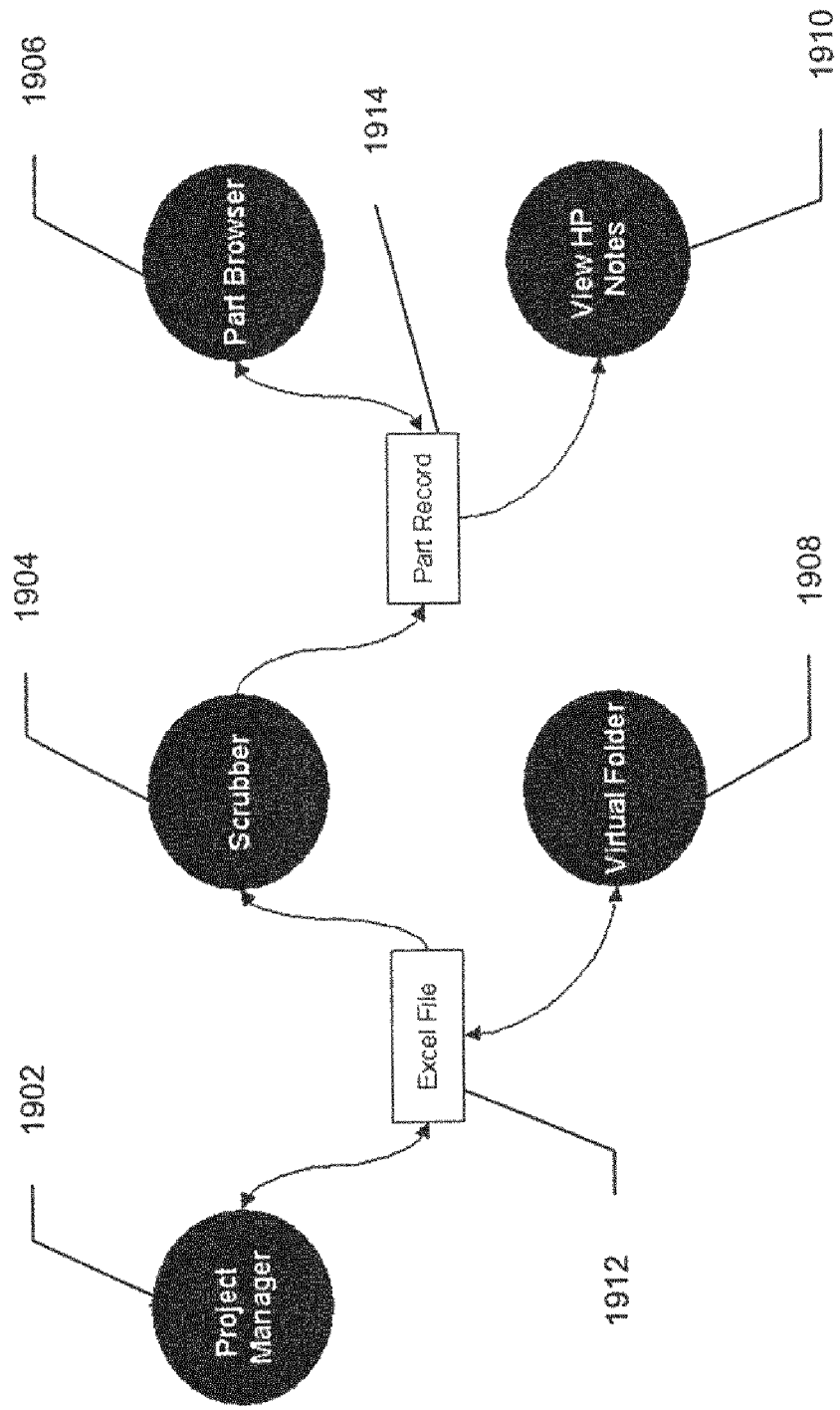
FIG. 19 illustrates examples of plug-in applications and selection objects according to some embodiments of the invention.
Figure 20:
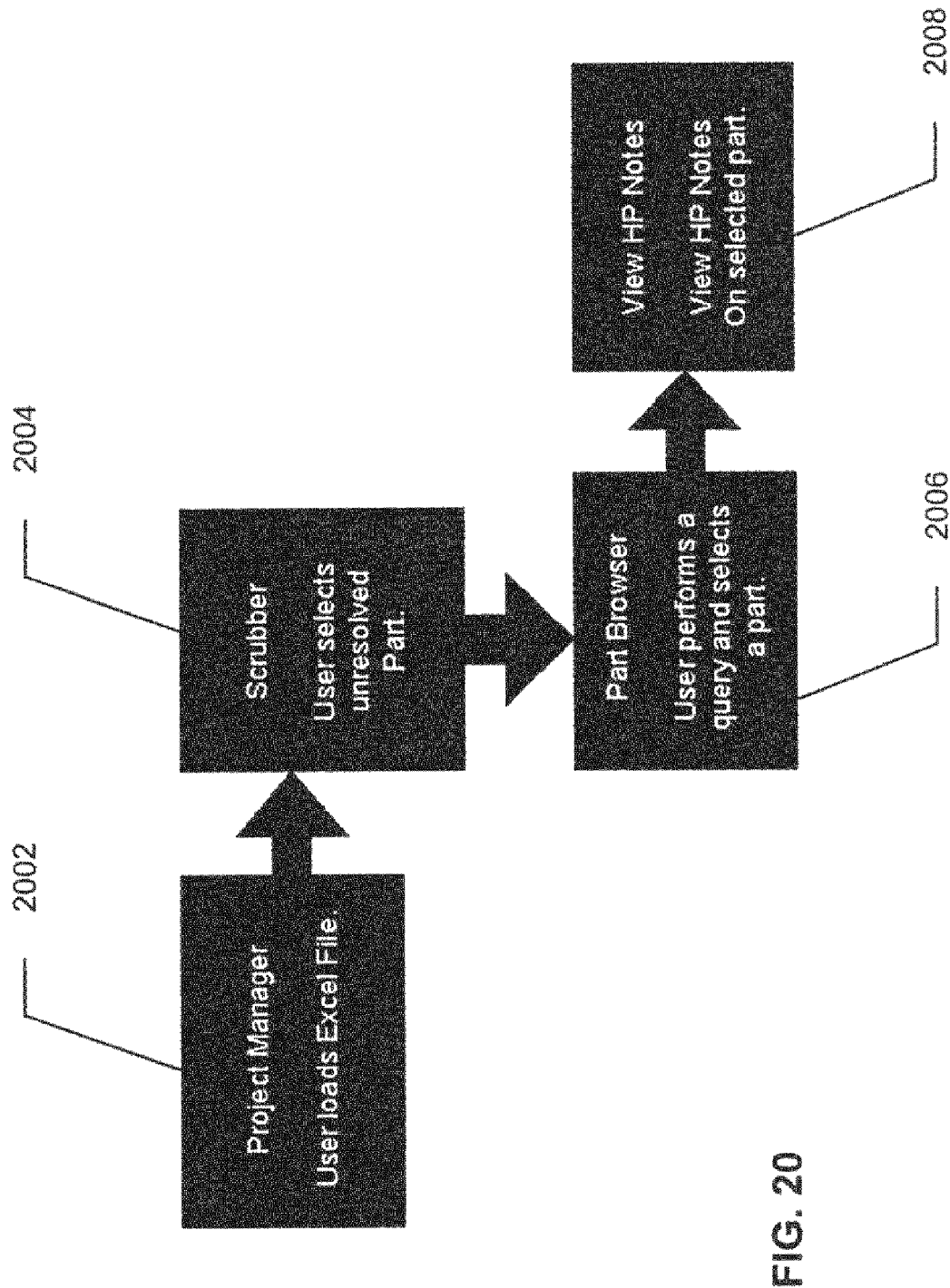
FIG. 20 depicts an illustrative process that may be used to determine the dynamic process flow in view of the example plug-ins in FIG. 19.

FIG. 19 shows a diagram of a set of sample plug-ins 1902-1910 and various types of selection objects 1912-1914 plug-in applications 1902-1910 can read and write. FIG. 20 illustrates an example process that may be used to determine the dynamic process flow given the example plug-ins shown in FIG. 19. A user loads an Excel file selection object 1912 in project manager 1902 at 2002. At 2004, the user selects an unresolved part in scrubber 1904. The user then performs a query and selects a part in part browser 1906 (2006). Notes on the selected part is then viewed in view notes 1910 at 2008.

In some embodiments, a new plug-in may be introduced to affect the available process flows without needing specific process flow definitions. This is especially useful in environments that host many plug-in applications. The process flow API may also include methods for fetching a list of plug-in applications that can be activated based on the active plug-in application. It may be up to host application 1812 to use this information in an appropriate manner.

In some cases it may be necessary for special translators to be written that can handle the translation of one selection object type to another. For example, in FIG. 19, Excel file object 1912 may be translated into a common object before it is read by an application. A selection object translator (SOT) 1816 in FIG. 18 may be used to perform this task. In one embodiment, SOT 1816 is packaged as a special type of plug-in. Plug-in manager 1810 recognizes SOT 1816 as an invisible plug-in that can translate a selection object from one type to another.

Figure 21:
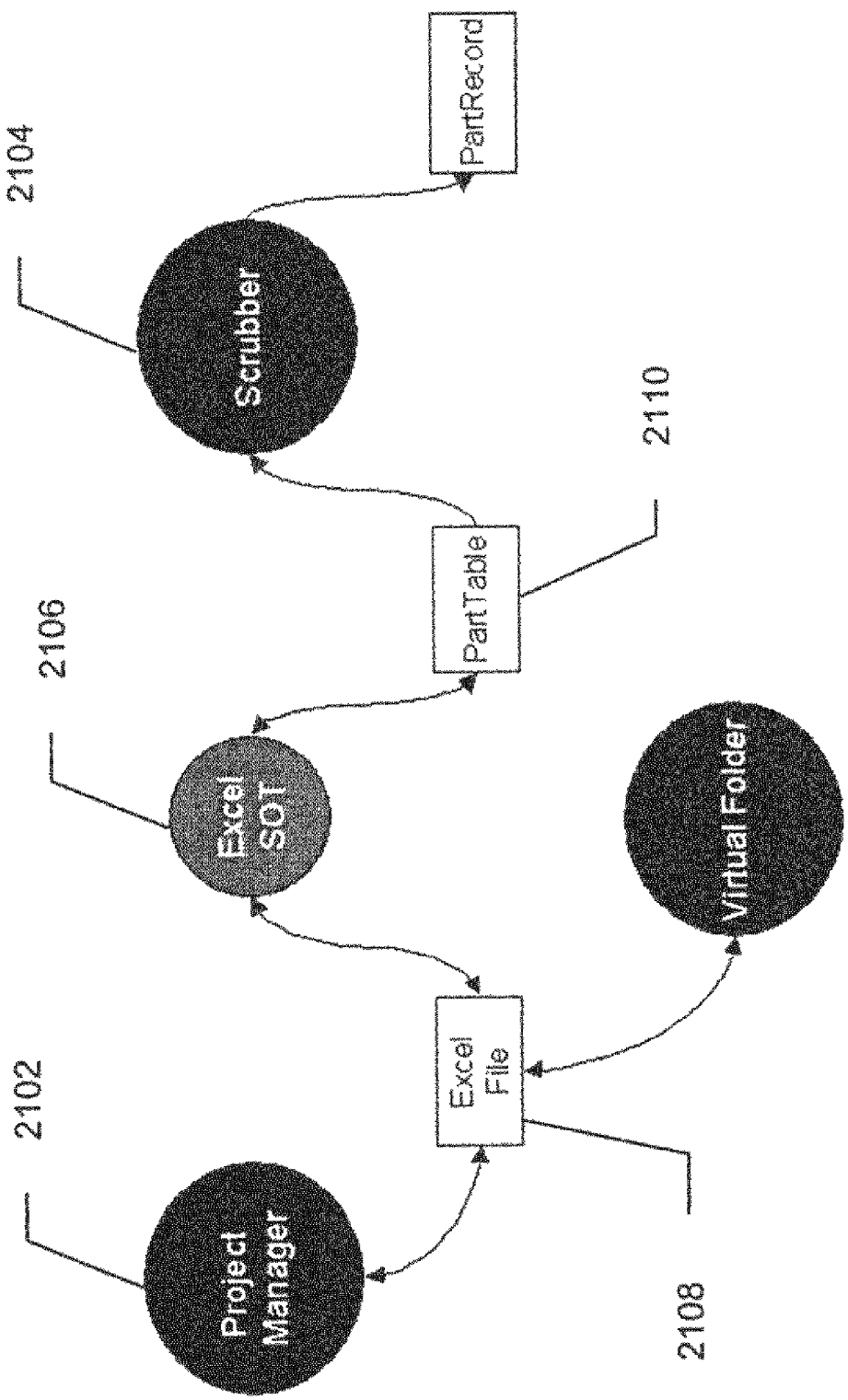
FIG. 21 is an example of how FIG. 19 can be modified through the use of a selection object translator.

In the embodiment of FIG. 19, scrubber 1904 is shown as being able to read Excel file 1912 produced by project manager 1902. However, as shown in FIG. 21, the process can be modified by using an SOT 2106 to translate an Excel file selection object 2108 into a common object, e.g., a Part Table object 2110. Plug-in manager 1810 will recognize that scrubber 2104 can read the Excel output 2108 of project manager 2102 via SOT 2106.

An SOT may enable the abstraction of common tasks to be completely removed from an application. This abstraction allows new functionality to be created by simply adding a new SOT. In some cases it my be necessary for an SOT to a display graphical user interface (GUI) to aid in the translation. In one embodiment, this is done in modal dialog boxes that appear before a receiving application is activated. SOT is then able to complete the translation before the receiving plug-in application is activated.

Plug-in manager 1810 may also maintain a call stack (not shown). In some embodiments, host application 1812 has the responsibility of calling the call stack API to inform plug-in manager 1810 when (a) a plug-in should be activated; (b) the active plug-in should be cancelled; (c) the active plug-in has finished and the previous plug-in should be reactivated. The call stack API provides methods for these types of plug-in transitions as well as query methods to enable host application 1812 to obtain information about the current call stack, active plug-in, etc.

In one embodiment, plug-in manager 1810 performs all activation, deactivation, and selection object notification tasks, Host application 1812 need only initiate the process as a result of host events triggered by the application interface.

A plug-in is considered modal in the stack of active plug-ins, e.g., when the plug-in application is pushed to make another plug-in application active, it becomes dormant and is not reactivated until all subsequently activated plug-in applications are popped from the stack. Thus, a plug-in may perform background tasks while another task is active by launching another instance of host application 1812.

An active plug-in can lock plug-in manager 1810 from activating another plug-in or deactivating itself. This permits long processes to finish. The plug-in application, however, may allow a user to cancel a long operation. Host application 1812 may be notified of the lock and request that the active plug-in cancel its current operation.

Plug-ins are registered with plug-in manager 1810 in some embodiments. The registration may include information on (a) one or more plug-in categories, (b) application label, (c) application icons, (d) input selection objects, (e) output selection objects, (f) input messages handled, and/or (g) output messages generated. Plug-in manager 1810 may use the plug-in registration API to register a plug-in as it is loaded.

In one embodiment, each plug-in is designed for a specific use and advertises the category it belongs to. Plug-in manager 1810 may use the category to ensure that only appropriate plug-ins for host application 1812 is loaded. When host 1812 initializes it's instance of plug-in manager 1810, it passes the category of plug-ins it wishes plug-in manager 1810 to load. Plug-in manager 1810 then loads all appropriate plug-ins of the specified category. Before a plug-in is loaded, plug-in manager 1810 may verify that a user is entitled to use the plug-in. If the user is entitled to use the plug-in, then it is loaded. If the user is not entitled to use the plug-in, then it is not loaded or presented to the user.

Application message service (AMS) 1818 may enable external application 1820 to communicate with applications derived from AFW 1800. In one embodiment, AMS 1818 is implemented using sockets and integrated with plug-in manager 1810. AMS 1818 may communicate received messages with plug-ins by creating a selection object designed for the specific message. Plug-in manager 1810 is then used to activate the first plug-in that is capable of receiving the message selection object.

AFW 1800 may also include a history API (not shown), which can be used by applications to denote the steps users have taken. A history file can then be used to debug customer problems. In addition, the history file can be used to reproduce the steps taken by users. AFW 1800 may also include a logging API (not shown) that maintains a set of debug log statements. The logging API may use an optional local property file to enable logging.

MetaObjects

System metadata is data that transcends, is more comprehensive, and exists at a higher state of development than traditional system data. It captures various ways information may be used, e.g., what is used, how it is used, who uses it, when it is used, how to access it, etc. Thus, when the physical structure of data sources change, the applications are unaffected because the metadata performs the necessary translations to and from the data sources. In addition, when new functionality becomes available, it is reflected in metadata for use by applications that care to use it, while those that don't care to use the new functionality, remain unaffected.

Figure 22:
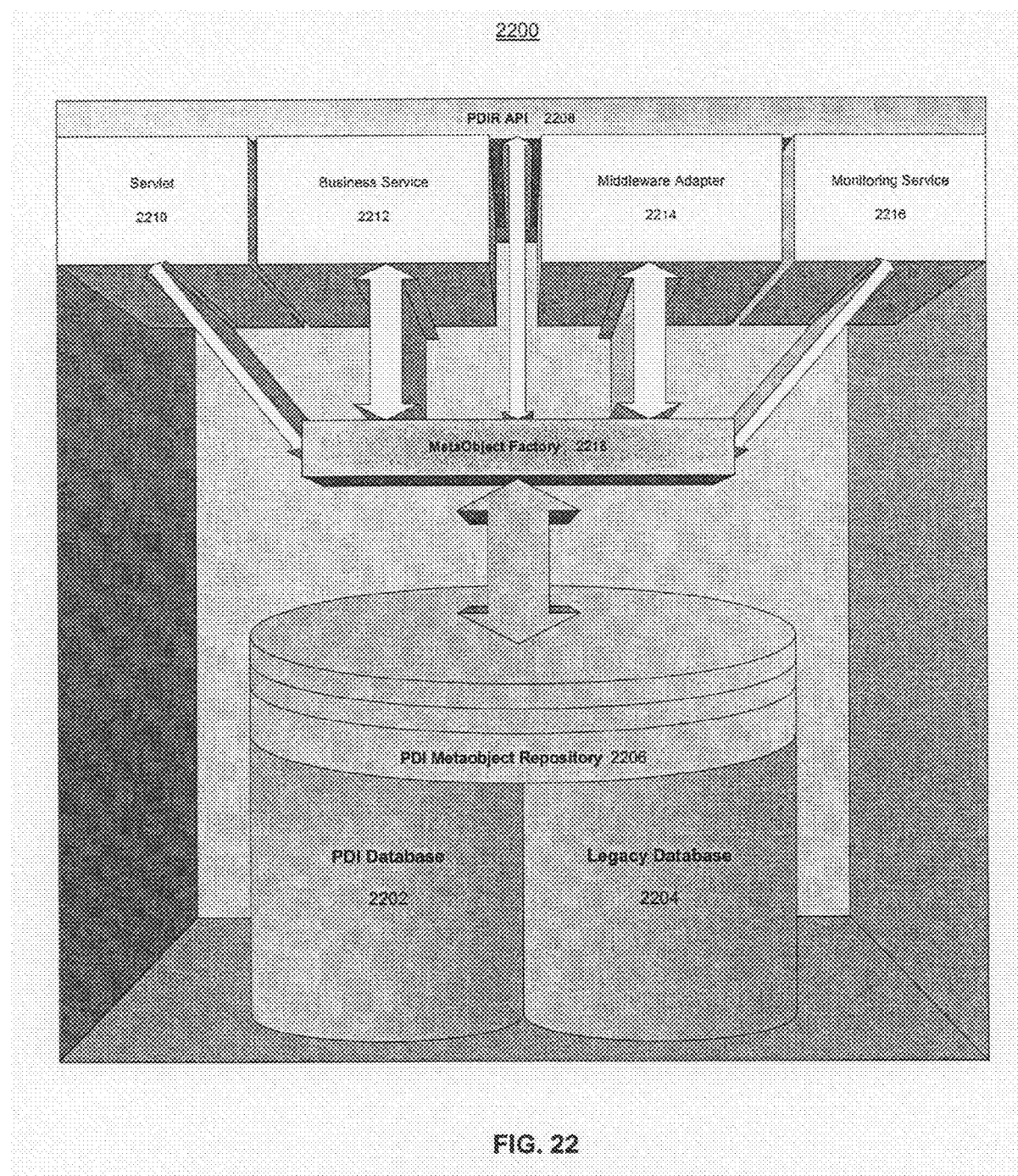
FIGS. 22-23 show various embodiments of a federated system.

Illustrated in FIG. 22 is system 2200 according to one embodiment of the invention. System 2200 includes two databases 2202-2204. On top of databases 2202-2204 is a MetaObject repository 2206. MetaObject repository 2206 is a warehouse of metadata. In one embodiment, it provides metadata for all use, including by a PDI Repository API (PDIRAPI) 2208. In some embodiments, PDIRAPI 2208 provides a standardized access to data for applications (not shown) into MetaObject repository 2206 and databases 2202-2204 supported by repository 2206. Also included in system 2200 is a servlet 2210, a business service 2212, a middleware adapter 2214, and a monitoring service 2216. In the embodiment, PDIRAPI 2208, servlet 2210, business service 2212, middleware adapter 2214, and monitoring service 2216 all use a MetaObject factory 2218 to access MetaObject repository 2206 and databases 2202-2204.

MetaObjects are conceptual objects that have an object-oriented encapsulation of metadata. Each MetaObject may have a class, attribute(s), method(s), event(s), exception(s), table(s), column(s), table association(s), schema(s), and/or rule(s). In some embodiments, all access to databases are performed through the use of MetaObjects. Applications and business services 2212 may access and manage documents as well as information related to or about those documents through MetaObjects instantiated through PDIRAPI 2208 or directly from MetaObject factory 2218. PDIRAPI 2208 is an entry point into MetaObject factory 2218 for client applications.

MetaObject factory 2218 may act as facilitator, mediator, and/or translator of information contained in MetaObjects. It may also isolate applications and business services 2212 from the details of database structure and access. MetaObject factory 2218 may also provide backwards-compatible support to older or custom applications where backwards compatibility is necessary and/or problem resolution to applications where backwards compatibility is unavailable.

Some of the most commonly used, customer-specific information may be stored in database 2202 without database modification. Database 2202 may also be extended through templates that can be understood by metadata, thereby permitting the metadata to be extended to satisfy the need for custom data.

Metadata in MetaObject repository 2206 may include objects such as stored procedures, business services, operating system (O/S), hardware, etc. This makes systems diagnostics possible. Metadata may also be stored in a user repository (not shown). The user repository may include objects such as part lists, which permit applications to utilize personalized document sources.

Client-side API (not shown) may permit a user to instantiate a single instance of a MetaObject interface for MetaObjects in multiple PDIs and personal data sources. This permits the user to enumerate results from multiple data sources, and/or combine them for consolidated presentation to the user. PDIRAPI 2208 may permit cache-controlled and free-threaded access to MetaObjects, which allows users to perform multi-tasked, asynchronous manipulation of data. A proof-of-concept business service (not shown) for the importing and exporting of bulk data may also be included in system 2200.

Figure 23:
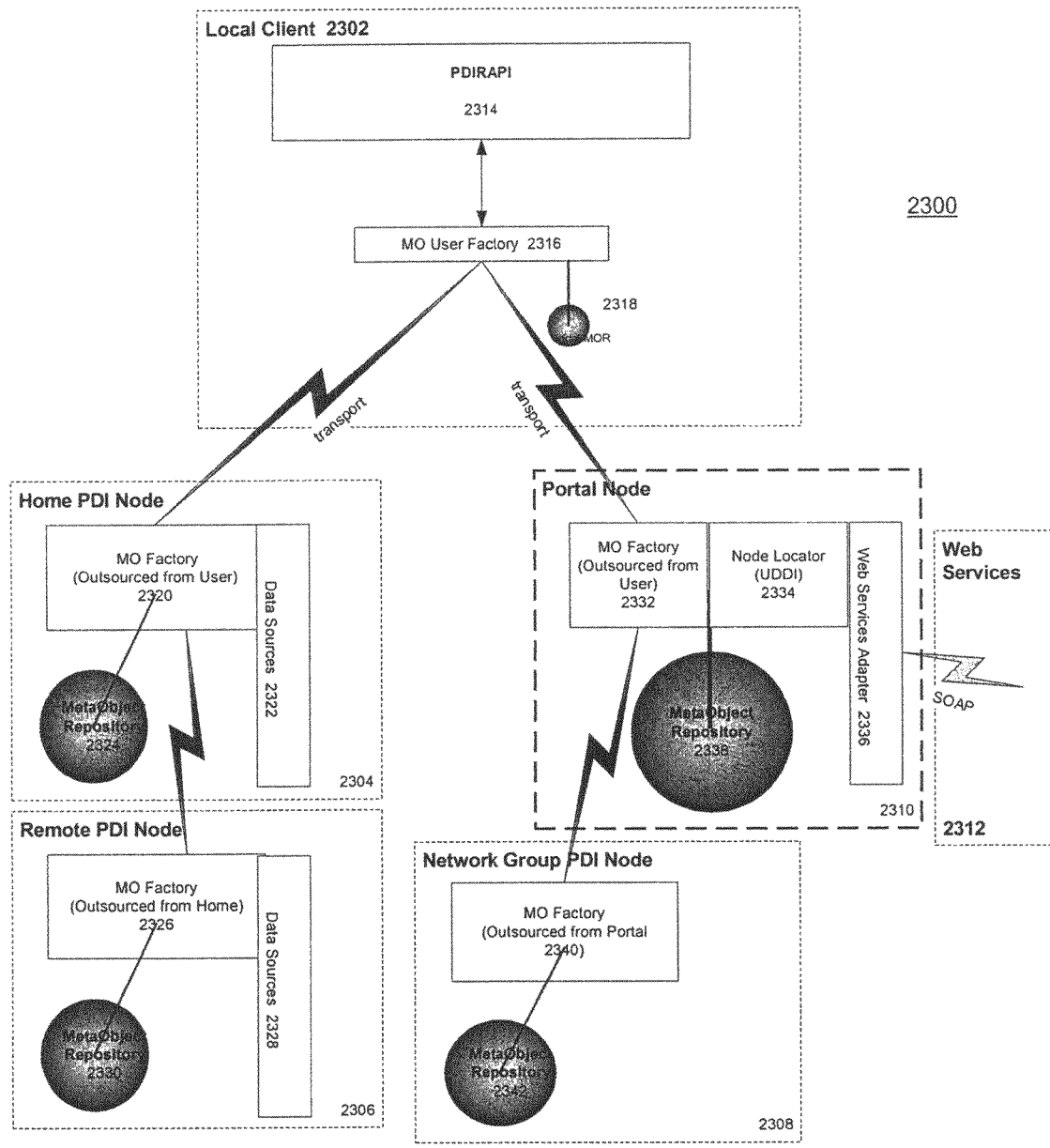

FIG. 23 depicts a system 2300 with a client 2302, nodes 2304-2310, and a web services 2312. In the embodiment, client 2302 includes a PDIRAPI 2314, a MetaObject factory 2316, and a MetaObject repository 2318. Client 2302 communicates with nodes 2304 and 2310. Node 2304 contains a MetaObject factory 2320, a MetaObject repository 2324, and data sources 2322. Node 2310 also has a MetaObject factory 2332 and a MetaObject repository 2338. A node locator 2334 and a web services adapter 2336 are also included in node 2310. Node 2310 communicates with web services 2312 via web services adapter 2336. Node 2304 is connected to node 2306, which contains a MetaObject factory 2326, a MetaObject repository 2330, and data sources 2328. Node 2310 is connected to node 2308, which includes a MetaObject factory 2340 and a MetaObject repository 2342.

In one embodiment, PDIRAPI 2314 and MetaObject factory 2316 are collectively referred to as "the metadata API." The metadata API provides access to a framework that uses metadata to manage and exchange data that may be in a multi-networked, multi-enterprise environment. PDIRAPI 2314 may work with factory 2316 to deliver data and metadata to applications (not shown). PDIRAPI 2314 may also package repetitive and/or common tasks that are not available in factory 2316.

Each MetaObject factory 2316, 2320, 2326, 2332, and 2340 may make use of metadata stored in the respective repositories 2318, 2324, 2330, 2338, and 2342 to access and manage information contained in nodes 2304-2310. MetaObject factory 2316 may also provide limited support for offline use, metadata cache, interacting with nodes 2304-2310, and managing data flow to and from factories 2320, 2326, 2332, and 2340.

MetaObject repositories 2324, 2330, 2338, and 2342 may be structured to provide any metadata about the respective node 2304, 2306, 2308, or 2310. Metadata for each node may include a data dictionary and one or more data sources. Factories 2316, 2320, 2326, 2332, and 2340 may utilize the data dictionary and data sources to perform data queries and process business rules. A data dictionary contains metadata that describes particular elements of data. It may include, for example, business attributes, which provide typing of other elements. Examples of data sources include Microsoft® SQL Server, Oracle® Server, etc. In other embodiments, MetaObject repositories 2324, 2330, 2338, and 2342 may also provide metadata about information and processes that are permitted to interact in a multi-network environment on the respective nodes 2304-2310 and publications and subscriptions that describe what information is available to users of a node.

Each data source may be divided into catalogs, logical data resources, and data resource mappings. A catalog may represent one or more databases. Logical data resources may be made up of data found in one or more catalogs that are grouped according to some pre-defined criteria. In one embodiment, each catalog is characterized as having an owner, tables, views, store procedures, etc. A repository stores metadata independently from a catalog. A user may be permitted to discover the structure, i.e., metadata of a data source in a node, which can then be manipulated for subsequent application usage and persisted in a repository.

A logical data resource may represent data that has been produced by a specific entity for consumption by other entities. For instance, if an organization purchases subscription data from another organization, and the first organization wants to access its two legacy data resources ($A_1$ and $A_2$) as well as the new data resource (B) from the other organization, but the first organization does not want to mix the data to do so, then a logical data resource can be established for each legacy data resource of the first organization and another for the data resource of the other organization as long as there is some way to separate the first organization from the second, and data resource $A_1$ from data resource $A_2$.

Figure 24:
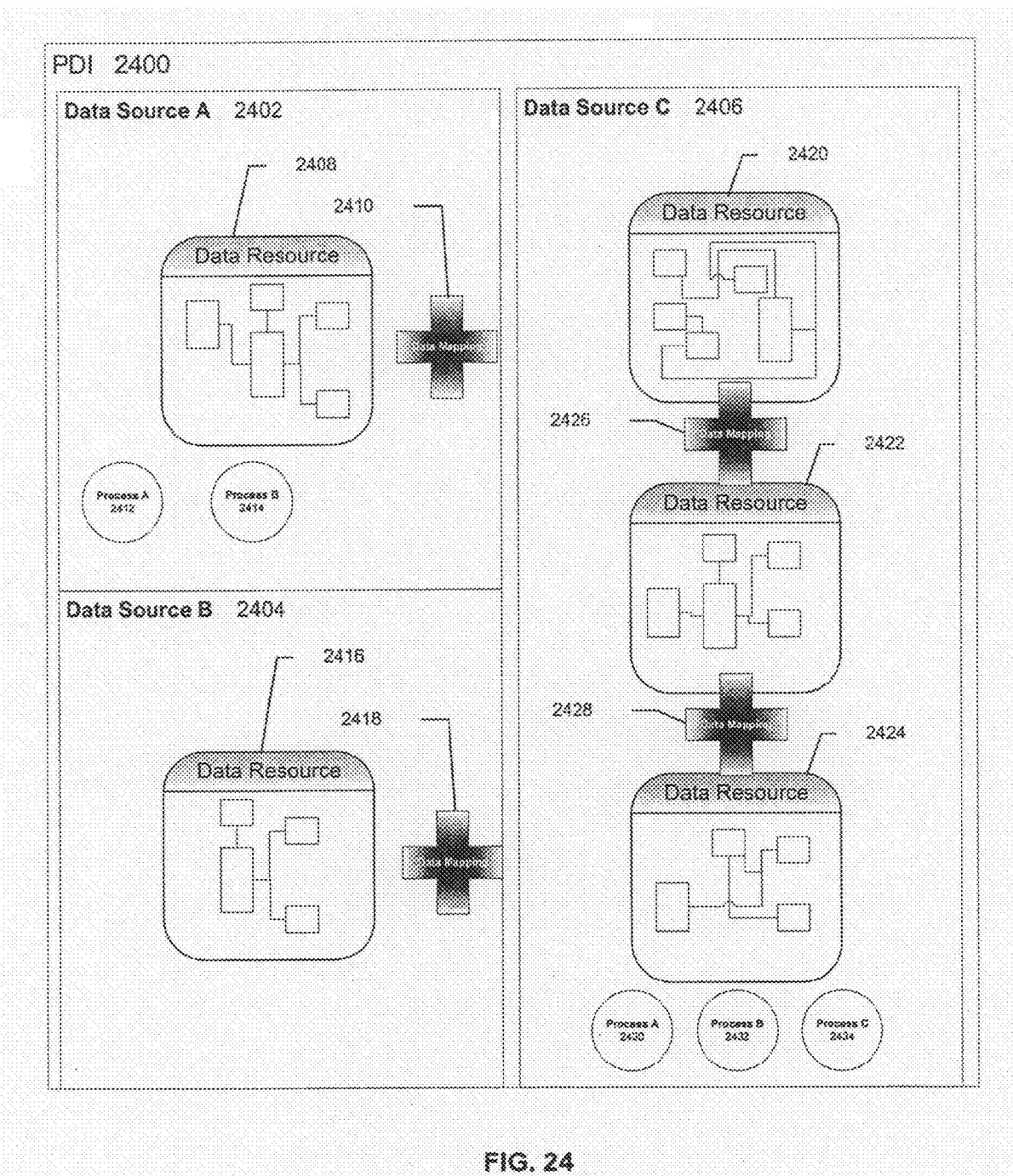
FIG. 24 depicts examples of different data resource and logical data source configurations that may be supported by a MetaObject repository.

In one embodiment, data resource mappings are sets of data that link data between data resources. A mapping can tie one or more logical data resources together. FIG. 24 illustrates examples of different data source and logical data resource configurations that may be supported by a MetaObject repository. Shown in FIG. 24 is a PDI 2400 with data sources 2402-2406. Data source 2402 includes a data resource 2408, a data mapping 2410, and two processes 2412-2414. Data source 2404 includes a data resource 2416 and a data mapping 2418. Data source 2406 includes data resources 2420-2424 linked by data mappings 2426-2428 and processes 2430-2434.

Figure 25:
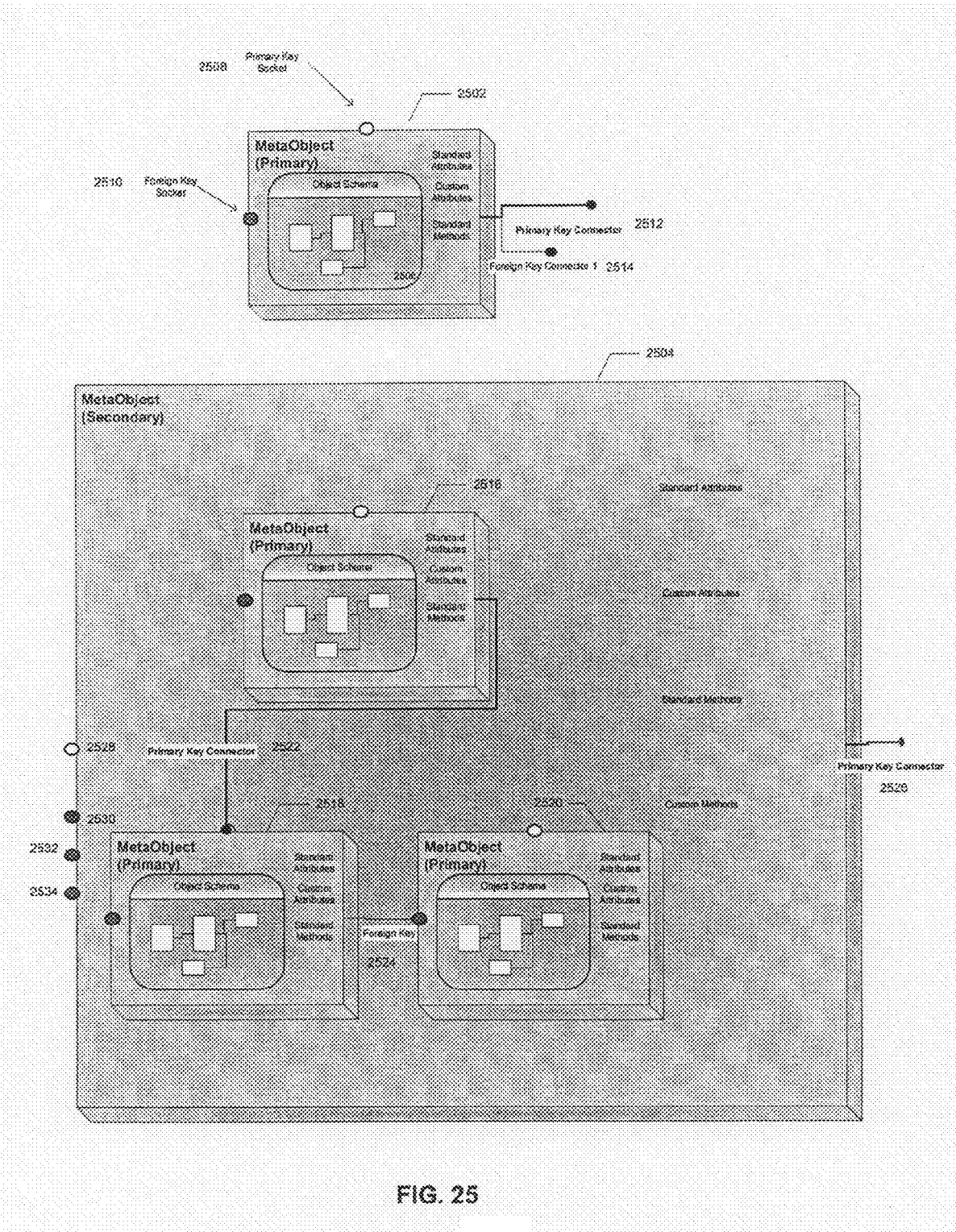
FIG. 25 includes illustrative embodiments of MetaObjects.

Shown in FIG. 25 are illustrative embodiments of MetaObjects 2502 and 2504. MetaObject 2502 includes an object schema 2506, a primary key socket 2508, a foreign key socket 2510, a primary key connector 2512, and a foreign key connector 2514. Also included in MetaObject 2502 are standard and custom attributes and standard methods. MetaObject 2502 is a primary MetaObject. MetaObject 2504 is made up of several primary MetaObjects 2516-2520. MetaObjects 2516 and 2518 are connected via a primary key connector 2522. MetaObjects 2518 and 2520 are connected via a foreign key connector 2524. MetaObject 2504 also includes standard attributes and methods and custom attributes and methods. In addition, MetaObject 2504 has a primary key connector 2526 along with several sockets 2528-2534. MetaObject 2504 is a secondary or composite MetaObject. In other embodiments, a composite MetaObject may be made up of primary and/or other composite MetaObjects.

MetaObjects may be composed of an interface layer and a binding layer (not shown). The interface layer permits an application to understand and access the data represented by the MetaObject without knowing how the data is physically managed by the binding. The binding layer describes and manages physical data source access for the MetaObject, and allows the interface to use it at runtime. This allows an application seamless, global access to multiple data sources through a single MetaObject interface.

Desktop Environment

Below is a description of a variety of desktop applications and/or tools that may be implemented on one or more client desktop environments. In an embodiment of the invention, the desktop environment comprises an enterprise desktop tool that includes some or all of the following components: (a) a federated content distribution and search mechanism; (b) a content migration mechanism; (c) a unified content maintenance mechanism; (d) an administrative configuration and use model mechanism; and (e) a client configuration and use model mechanism. These components allow users (e.g., design engineers) to use the enterprise desktop tool (which is hereby referred to as the "Active Enterprise Desktop") as a federated search engine and interface to the design desktop and the manufacturing supply chain.

Figure 26A:
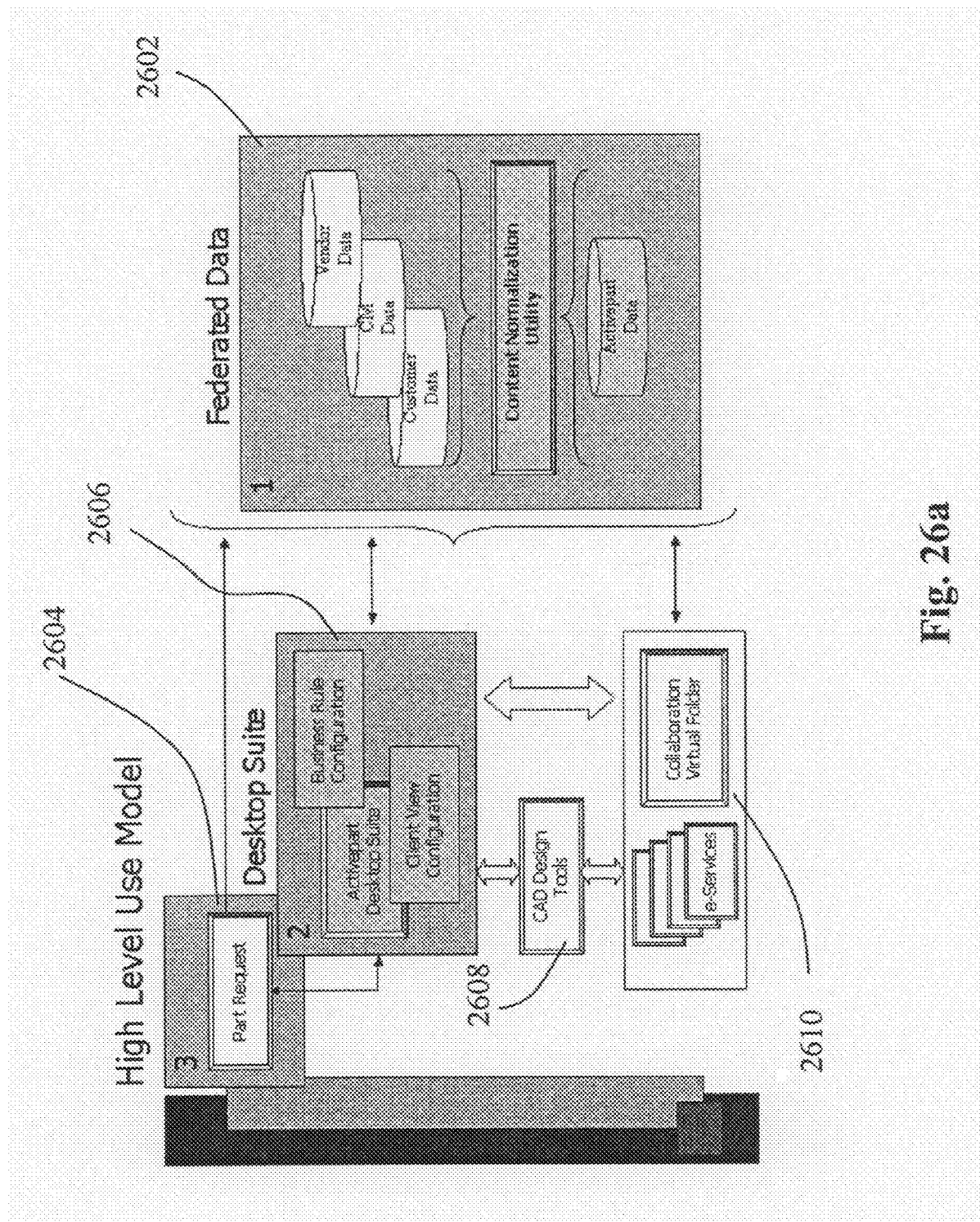
FIG. 26a shows a desktop tool according to one embodiment of the invention.

FIG. 26a shows a diagram of an embodiment of a high level use model for the desktop tool. A part request 2604 is received into the system from a user. The part request is processed based upon a set of tools 2606 that is configurable to perform part search operations and then present the search result to the user. As described in more detail below, various browsing, filtering, presentation, and rule-implementing components may be included within tools 2606. Tools 2606 may interface or be integrated with one or more CAD design tools 2608. Tools 2606 will process the part request by accessing a federated data source 2602. Methods and systems for implementing and maintaining a federated database is described elsewhere in this document. The system may interface or include a number of e-services 2610 to process or enhance the processing of the parts request.

According to an embodiment, the desktop application is deployed as a Java Archive (JAR) file that may be accessed as a Java Application. Third party tool integration may be implemented with either a Java or C API. The Java API may also be deployed as a JAR file. The C API may be delivered as a Windows DLL and UNIX shared library. When the application connects to the server, the version of each JAR file is checked and the new JAR file is downloaded as needed, if a new version of the Desktop is available, users may be prompted to restart schematic design tool for the new version to run.

Figure 26B:
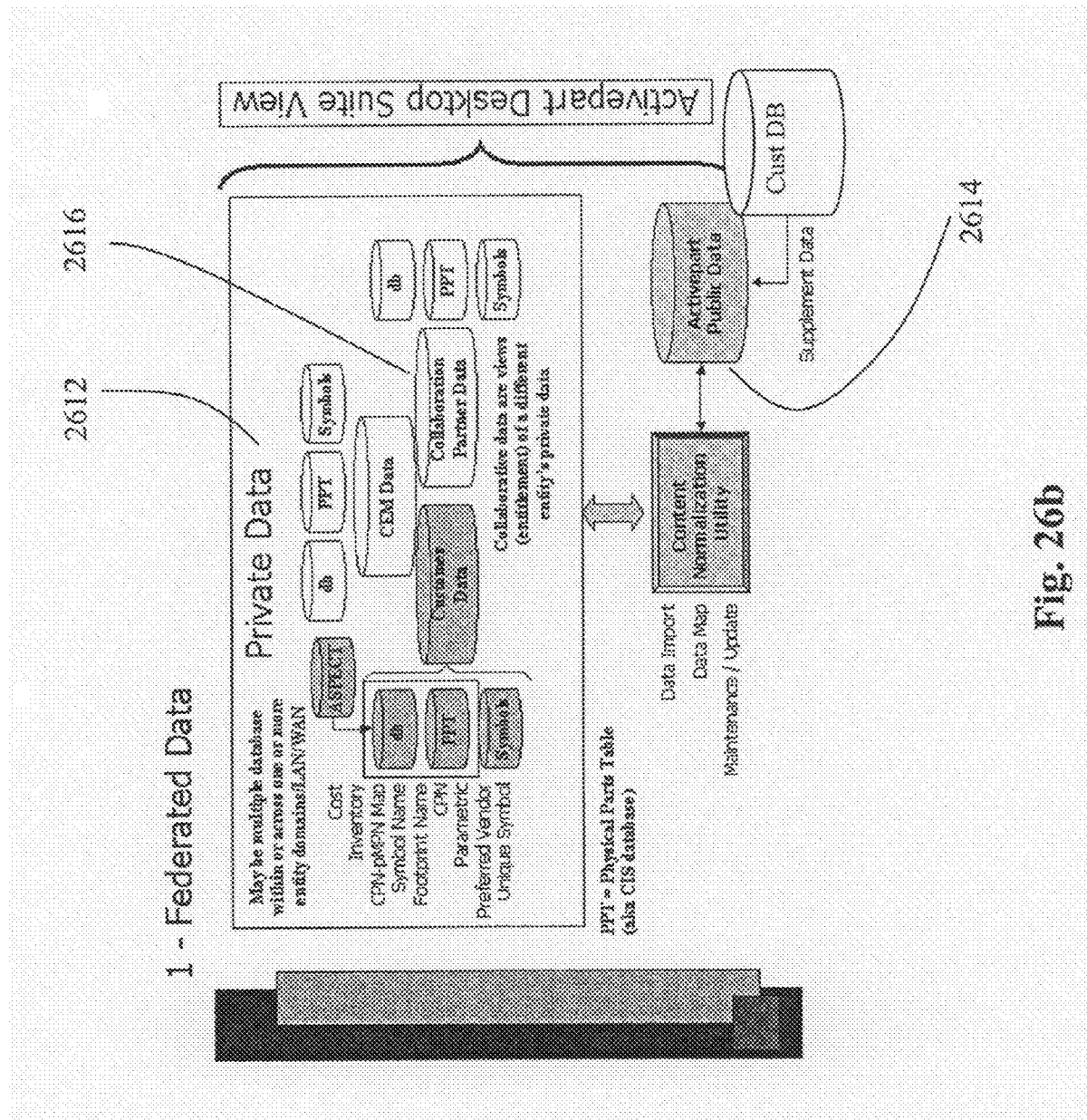
FIG. 26b illustrates an architecture diagram for a federated data model according to an embodiment of the invention.

FIG. 26b shows an architecture diagram for a federated data model according to an embodiment of the invention. In this model, the user can select databases across local area network (LAN)/wide area network (WAN) and multiple domains and firewalls. Access to these databases may be controlled via an entitlement bundle. Databases may be classified as private 2612, public 2614, and/or collaborative 2616 and could be from a variety of vendors, in a variety of formats, or even formed as a flat ASCII text file. Private database 2612 may be a local database hosted behind the firewall at the customer or it may be hosted at a central access location. The configuration can be set to allow access to this central database to be limited to the entity that owns it. Public database 2614 is the central database ("SpinCircuit database" or "Activepart Public Data") hosted, for example, in a commercial hosting service. Access to this database may be available to the general public. Collaborative database 2616 are private database belonging to other entities who provided access via the entitlement bundle. Content extraction may be performed from the private database and mapped to central public content.

Figure 26C:
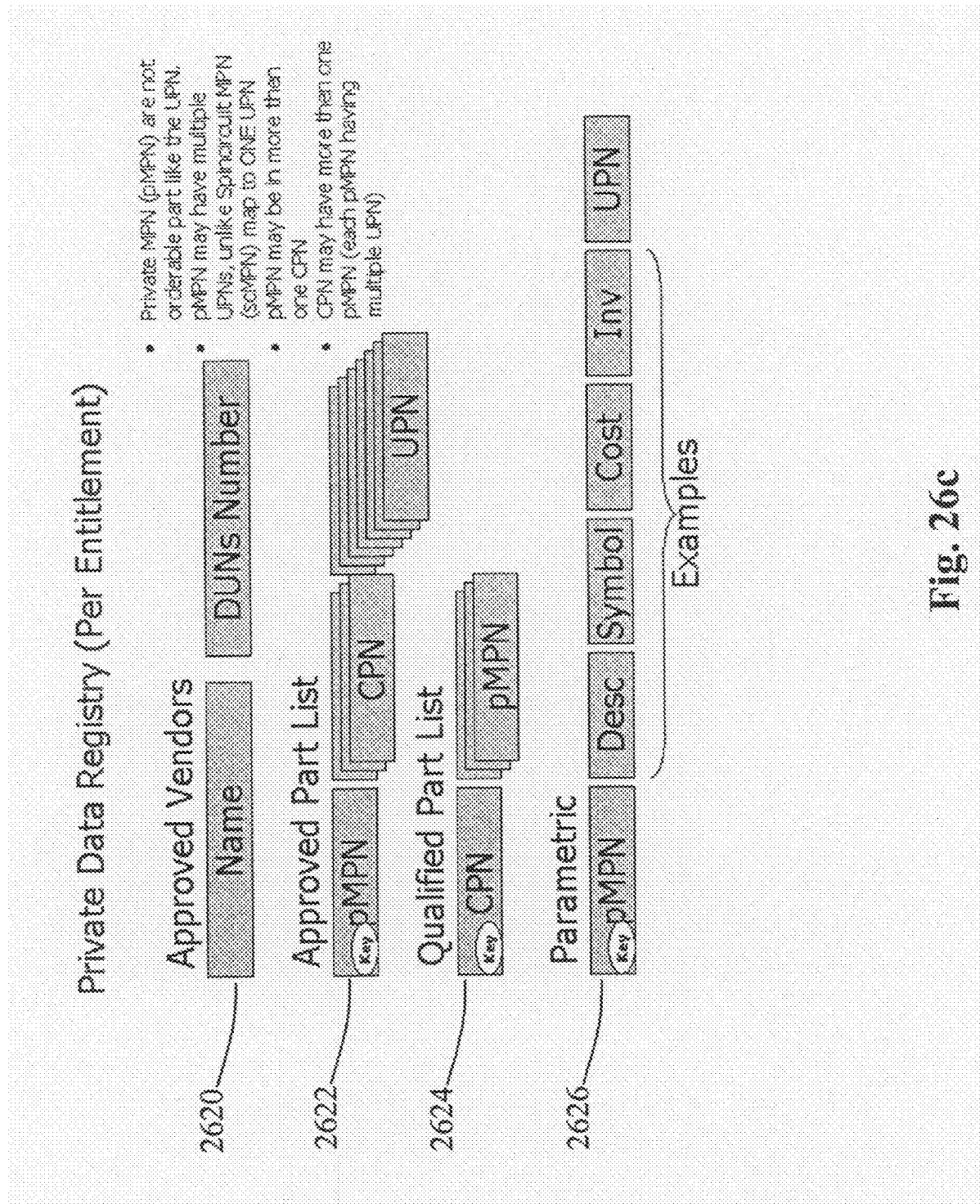
FIG. 26c depicts an example structure for a private data registry according to one embodiment of the invention.

Multiple databases may exist, for each customer and each customer may have unique data format schemes. To create a scalable private data architecture, a standardized database format (referred to as the Private Data Registry) is implemented. An example structure for the Private Data Registry is shown in FIG. 26c. This example structure includes approved vendor information 2620, approved part list information 2622, qualified part list information 2624, and parametric information 2626.

Figure 26D:
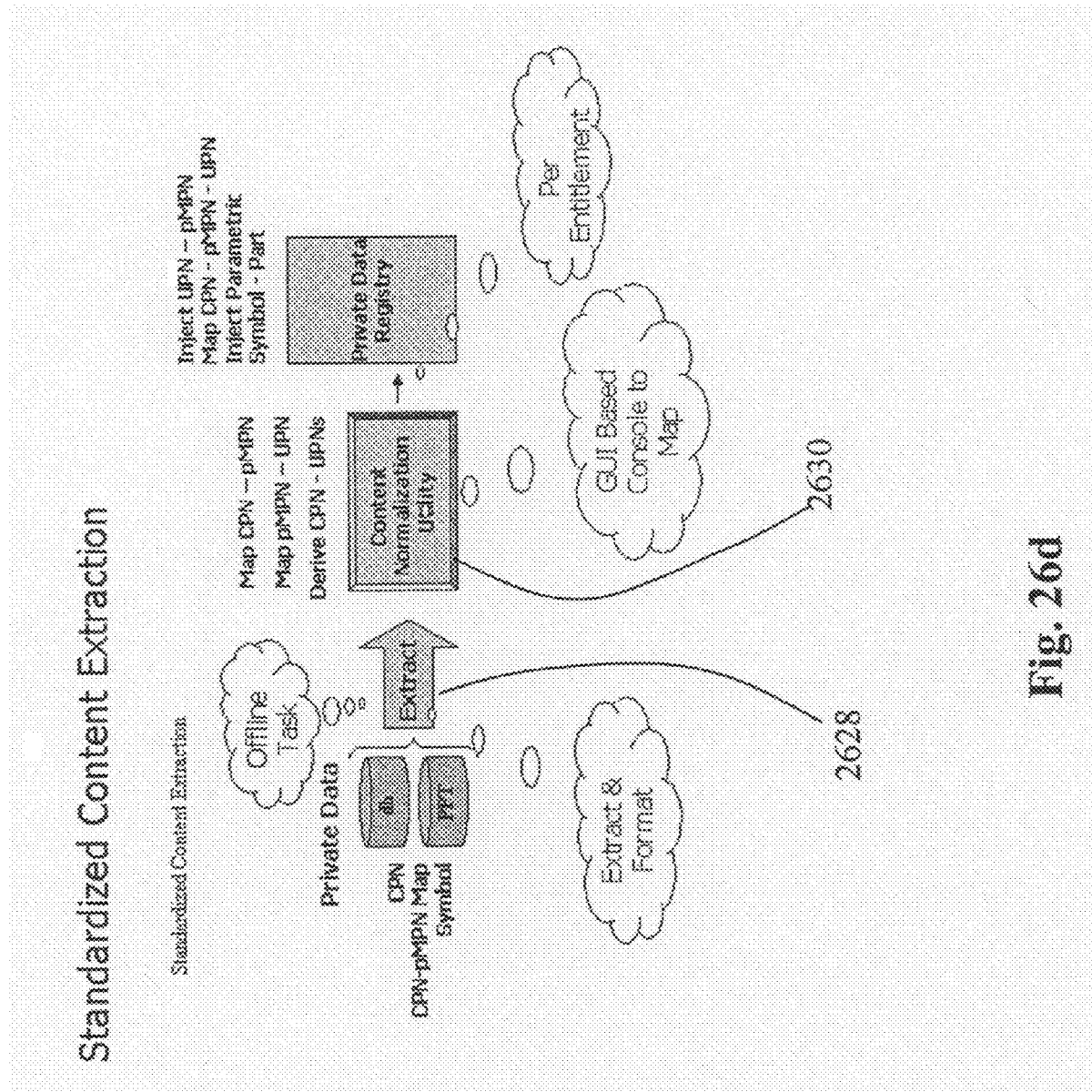
FIG. 26d is a process flow for standardized content extraction according to an embodiment of the invention.

Based on the standardized database format (Private Data Registry), an API can be used to read and write into it. Using the Private Data Registry API, unique customer's database extraction can be accomplished. Standardized content extraction can thereafter be performed using the Private Data Registry, as shown in the example process flow diagram of FIG. 26d. Here, the extraction process 2628 operates upon content-normalized data 2630 from the various data sources.

Content normalization may be performed to map private data extracted from customer's database to content in the central public database. Process actions that are performed in an embodiment to implement content normalization include: (a) extracting customer part number (CPN) from private data; (b) extracting CPN to map to private manufacture part number (pMPN) from private data; (c) extracting symbol name to map to part; (d) extracting private data; (e) mapping pMPN to a universal part number (UPN); (f) deriving CPN To UPNs or UPN to CPNs mapping; (g) injecting UPN to customer site (private database (db) or public table); (h) injecting annotated control and parametric data to private db or public table; (i) placing private symbols if non-AVL (approved vendor list) part placement controls are disabled; and/or (j) placing private and public symbols if non-AVL part placement controls are conditionally or unconditionally configured.

C-Browser/C-Surfer/C-Scrubber

An embodiment of the active desktop (referred to as the C-Surfer family) includes a browser tool (referred to herein as the C-Browser) and a part scrubber tool (referred to as the C-Scrubber). The following section describes an embodiment of the browser and scrubber tools.

The browser tool, referred to herein as "C-Browser" or "C-Surfer", is a tool that can be used to search for and research parts in one or more databases, e.g., a user defined database or a centrally-defined SpinCircuit database.

Among other things, the C-Browser provides a platform to search for parts and parts-related information from a database. In one approach, the database will include information for commercially available off the shelf parts, users/customer's unique custom parts and the ability to identify users/customer's unique preferred parts & vendors. In addition, the C-Browser allows one to select and transfer symbol for placement to end user's schematic PCB (Printed Circuit Board) tool as well as to perform research on parts and applications. Moreover, it will provide functionality to obtain direct notification on parts designed into their products from part distributors and manufactures on part end of life, product change notification, and other part related information.

The C-Browser provides a list of topics via a tree control that is used to select search criteria. The tree is built using a dynamic taxonomy tree. The top-level tree node, called Searchables, will contain a list of taxonomy nodes. A separate taxonomy will be designed for each database that the user can search in. For example, there can be a taxonomy definition established for any or all of the following databases: (a) Electrical Parts; (b) Preferred Parts; (c) Book Marked Parts; and/or (d) Others as they become available.

The Preferred Parts item refers to a preferred parts table (PPT) defined by the user. This table will allow the C-Surfer to provide basic CIS (component information system) functionality.

When the user selects a child node of any searchable taxonomy, the tool will present the associated properties, attributes and valid ranges via an input and output GUI. In one approach, the databases on the server will define the taxonomy and the input/output GUI fields. This functionality can be implemented using the approach that HTML (HyperText Markup Language) based web search pages are dynamically created.

Figure 26E:
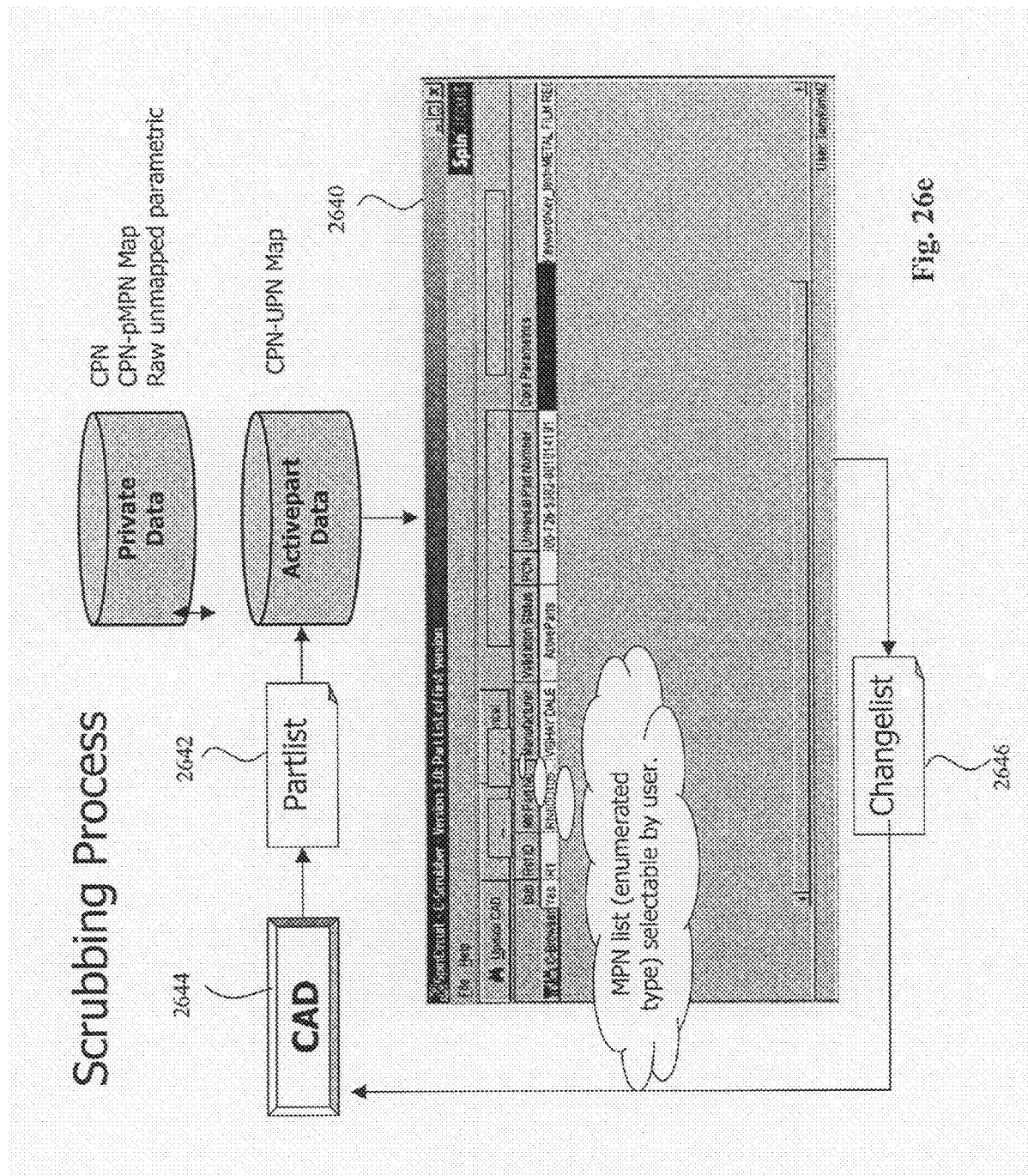
FIGS. 26e-26f show illustrative scrubbing processes according to some embodiments of the invention.
Figure 26F:
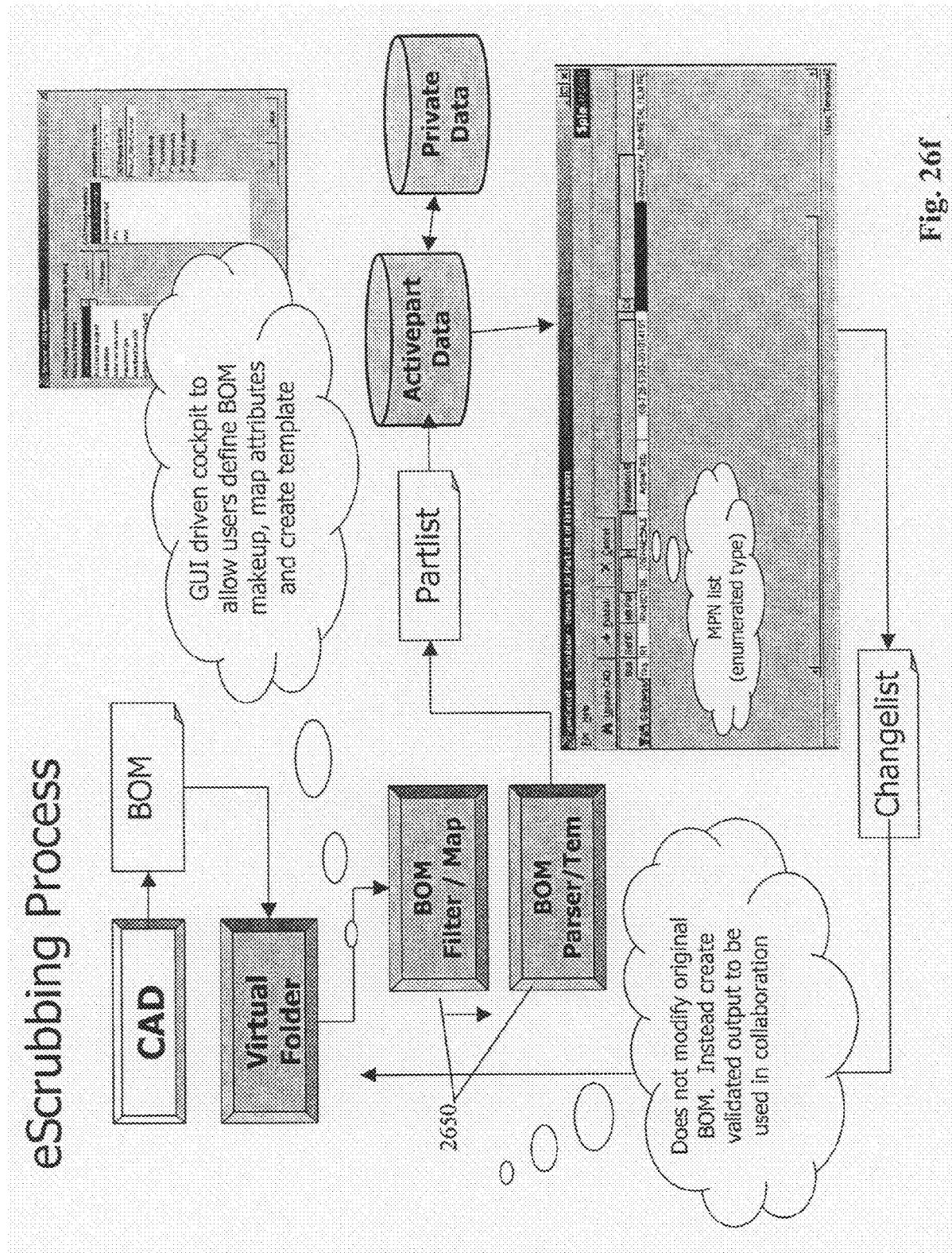

Referring to FIG. 26e, the scrubber tool 2640, referred to as "C-Scrubber", can be used to receive a part list 2642 from a schematic/CAD tool 2644, validate the list, back annotate correction 2646 to the schematic tool and route the validated list to a bill of material application. Among other things, the C-Scrubber provides a platform to: (a) accept a parts list from an end user's schematic PCB design tool and validate the parts list against a parts database; (b) differentiate parts on the part lists from preferred part list; (c) back annotate part correction to the schematic PCB design tool; and/or (d) send validated parts list for publishing to a BOM management system 2650 (FIG. 26O.

C-Scrubber may aid users in creating a validated parts list that will be sent to a BOM manager (not shown). The input into C-Scrubber may be a parts list and user modifiable parts parametric from the schematic tool. The parts list may contain all information known about each part in the design. This information may be used to identify the exact part to be installed during manufacturing. Parts are identified by a UPN, which will uniquely identify each part. It should be noted that special UPNs may be provided for the user's PPT. C-Scrubber may output a validated parts list that can be published to the BOM manager.

In an embodiment, both C-Browser and C-Scrubber will be launched as client JAVA applications from a schematic EDA design tool, such as the Capture and Concept schematic design tools available from Cadence Design Systems Inc. of San Jose, Calif. The C-Surfer can be implemented using the Sun Java 1.2.2 virtual machine (VM), which includes the Swing extensions. The embodied tools can be deployed as a JAR file that will be accessed as a Java application. The third party tool integration can be implemented with either a Java or C/C++ API. The Java API can be deployed as a JAR file. The C API can be implemented as a Windows DLL and UNIX shared library.

In an embodiment, C-Browser and C-Scrubber reside on a client desktop and may be launched from $3^{rd}$ party schematic design tool via menu options. The component taxonomy (as well as other related taxonomies) can be implemented as a table in the database. This taxonomy can be read dynamically and used as it is described in the database. C-Browser can access external/internal websites to provide part parametric, links to part updates (errata, EOL (end of life)), news, FAE (Field Application Engineer) support, component feedback and seminars. C-Scrubber may provide a validated parts list to the BOM manager.

To meet the integration requirements of many CAD systems, the C-Surfer architecture in the present embodiment supports two example use models described here. First is the C-Surfer model and second the Component Information System (CIS) model. Each of these models is described in further detail below.

Figure 27:
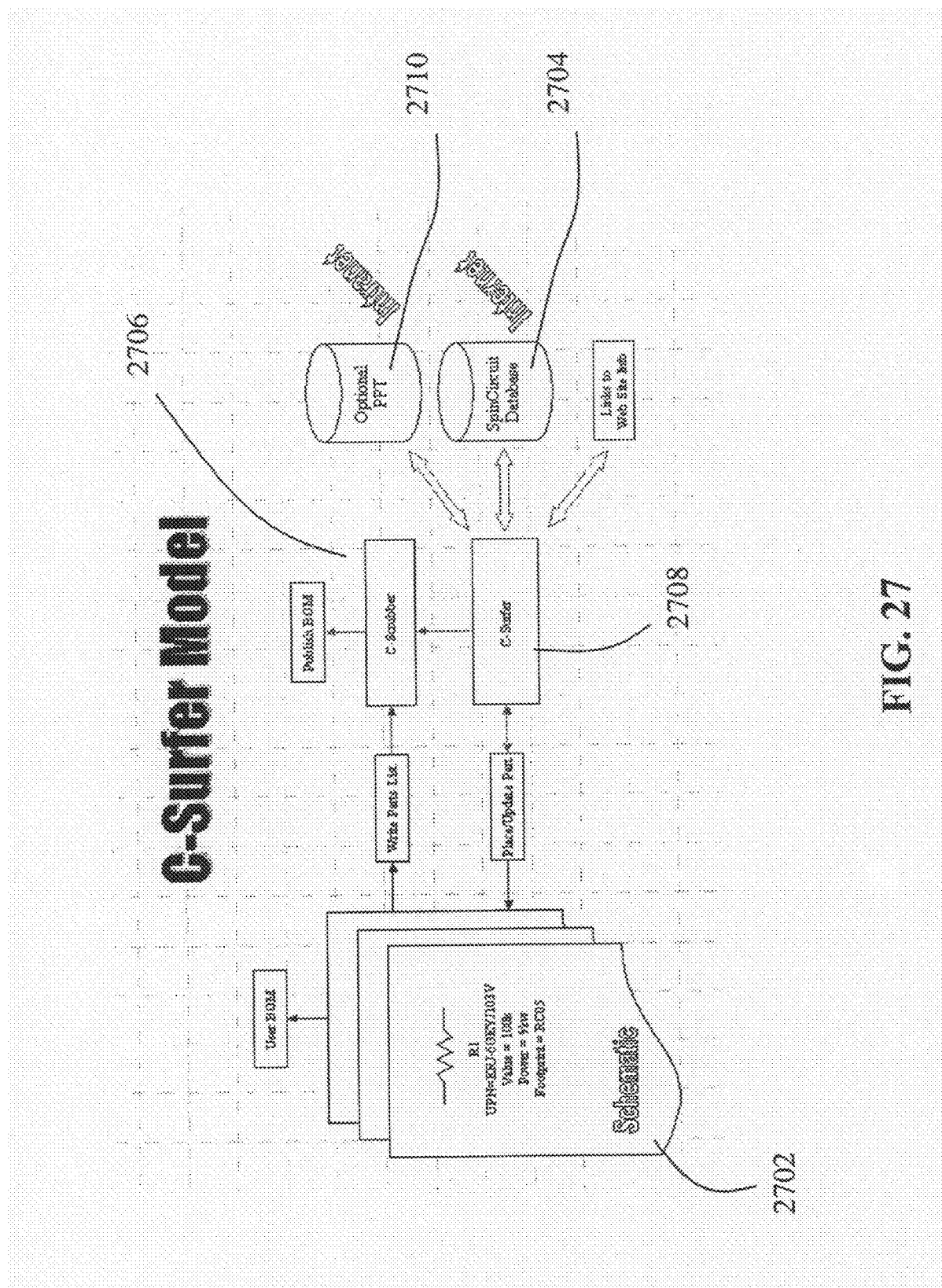
FIG. 27 illustrates a C-Surfer model according to one embodiment of the invention.

The flow of an embodiment of the C-Surfer model is shown in FIG. 27. The C-Surfer model includes three main components, a Schematic Capture tool 2702, a C-Browser tool 2708, and a C-Scrubber tool 2706.

Schematic capture tool 2702 drives the need for component information. When a symbol is instantiated on a schematic page, properties that represent the part's core parametric values need to be added to the symbol instance that uniquely identifies the physical part that the symbol instance represents.

In addition to the core parametric values, a UPN property may be added. The UPN may be defined by an administrative entity, e.g., at the central database server, and may be transparent to the user. The UPN is an internal part identifier associated to parts found in SpinCircuit database 2704. C-Surfer 2708 may be used interactively or through a query process to search for a part in SpinCircuit database 2704 (e.g., by UPN, manufacturer number, core part parametric, or any combination and set of property values).

Further in the design process, the user may initiate the C-Scrubber 2706 from the schematic capture tool 2702 to pass parts used in the design. Additionally, the user may pass parts stored in the bookmark for C-Surfer 2708 to C-Scrubber 2706. Parts passed to C-Scrubber 2706 may be validated using SpinCircuit database 2704 and a validated Parts List may be derived. The validated parts list may be sent to a BOM manager (not shown) for additional functions such as used by a Contract Manufacturer (CM) to quote the cost of building the finished product.

Optional user-specific ("MyActive") part database (not shown) and Preferred Part Table (PPT) databases 2710 can be configured and created. The user-specific database may contain company specific information and additional taxonomy not covered by SpinCircuit database 2704, while PPT database 2710 may contain a list of company preferred parts.

Figure 28:
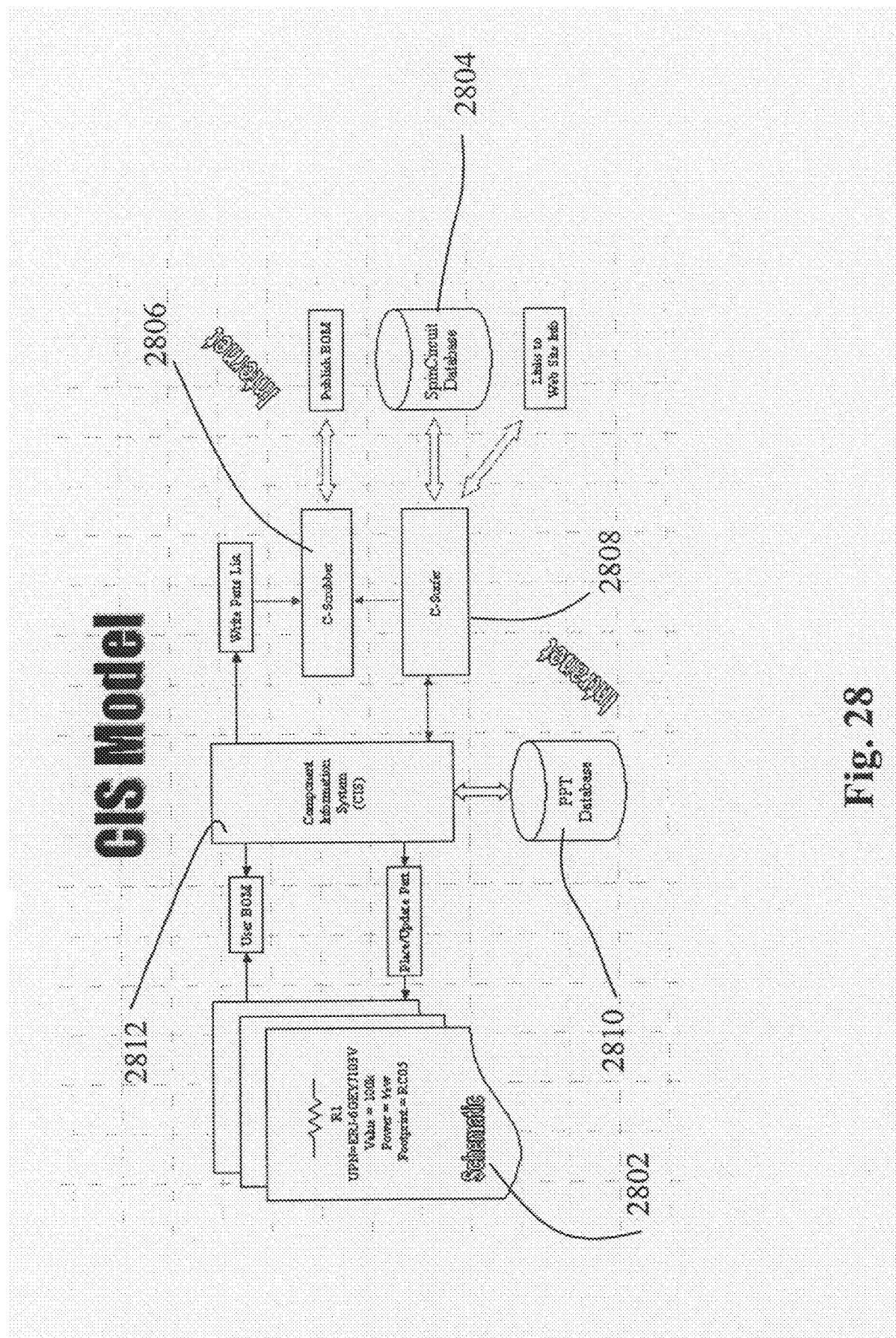
FIG. 28 depicts a CIS model according to an embodiment of the invention.

The flow of an embodiment of the CIS model is shown in FIG. 28. The CIS model is a super set of the C-Surfer use model with the addition of a CIS tool 2812 provided with a Schematic tool 2802. Organizations/users that wish to use a $3^{rd}$ party CIS tool may not use a PPT database 2810 maintained by C-Surfer tool 2808.

CIS tool 2812 may be used to search PPT database 2810 for a desired part. If the user is unable to find the desired part in PPT database 2810, the user can use C-Surfer tool 2808 to search a SpinCircuit database 2804 (e.g., over the Internet) for the required part. Once the part is found in SpinCircuit database 2804, the part's UPN, and some of the other database field values are returned to CIS tool 2812. CIS tool 2812 can then add a new part entry in PPT database 2810.

In addition to the part properties, the SpinCircuit part record may contain a schematic symbol and PCB layout footprint that can be retrieved by the calling application (CIS tool 2812). The mechanism for doing this is discussed below.

When a C-Surfer session is started the user will be prompted to login. The user profile will contain information about the user to validate their access to the site as well as information used by the C-Surfer to customize the display of appropriate data.

Some aspects of an example user profile implementation according to an embodiment are as follows:
  (a) The user profile is stored in SpinCircuit database and managed by the user via a Profile Manager. The user profile may be appended with the user's corporate profile (managed by the corporate administrator);
  (b) The corporate administrator will manage inclusion to the user's corporate profile via the Profile Manager;
  (c) Registration is required to obtain a user id.
  (d) C-Surfer application will have a unique session ID provided each time a user logs in.
  (e) Password timeout will be enforced after 30 minutes idle time. Profile Manager will monitor the session ID to verify idle time. Password re-entry is required to log back in.
  (f) The profile will contain a set of "MyActive Part" linkage, PPT, and Bookmark lists. These lists and table are used when performing part searches.
  (g) Corporate entity may require PPT & "MyActive Part" linkage as optional or required for use.

If corporate PPT & "MyActive Part" linkage is optional, then user has the option to use or not use it. However, if the PPT & "MyActive Part" linkage is required, then the user will use it. The user may be independent or belong to a corporate entity. If the user is independent, then the user may also be the system administrator for its local site. If the user belongs to a corporate entity, then a corporate profile is overlaid on the user. Each system administrator may have control over the PPT and "MyActive Part" lists. In one approach, each entity may have one "MyActive Part" database and multiple PPT databases. The system administrator may prioritize, name, and maintain each corporate PPT and "MyActive Part" lists. The administrator may also define the use model for PPT & "MyActive Part" lists.

Unique C-Surfer application session ID will be provided during user login to monitor and enforce the idle/timeout function. During initial login to the server, the following example information will be made available to the C-Browser application: (a) taxonomy tree ID and last update date; (b) PPT list name, last update date and priority value; (c) "MyActive Part" list, last update date and priority value; and/or (d) Bookmark, last update date and priority value.

A description will now be provided for an embodiment of the C-Browser user interface (UI). An example user interface

Figure 29A:
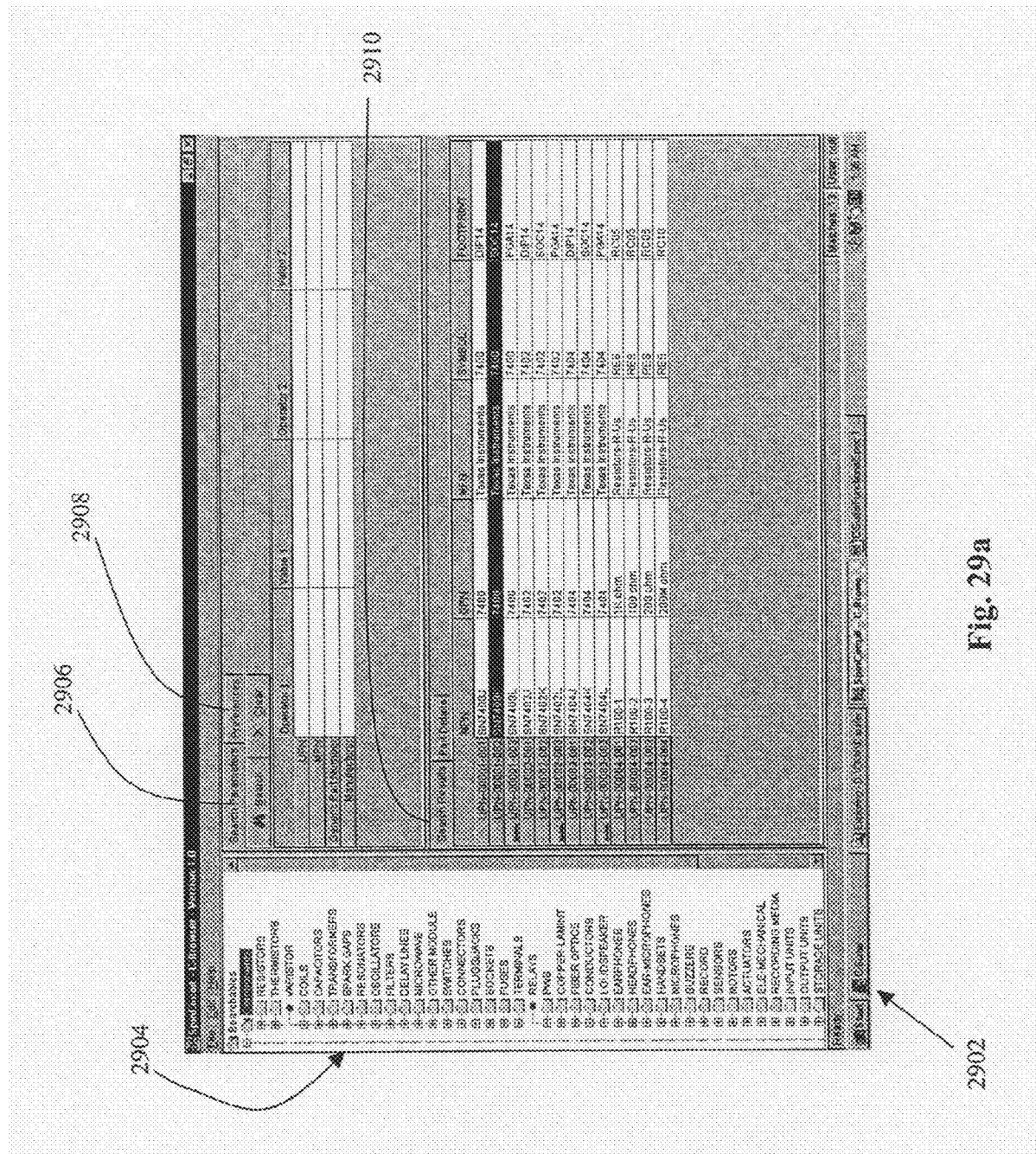

2902 is shown in FIG. 29*a*. The following describes each of the components of the UI and their function. A searchable tree 2904 for UI 2902 is built using dynamic taxonomy definition tables. A separate taxonomy can be designed for each database that the user can search in. The following sub-sections describe some example taxonomies for an embodiment of the invention:

- The Components node will contain all of the centrally defined parts. It will have approximately 3 to 5 levels (part categories).
- The Preferred Parts Table in one embodiment may not really be a taxonomy "tree" in that it only has 1 level. It will contain a single node labeled "Preferred Parts Table". When the user clicks on this node they will be able to search for parts in their PPT.
- The Book Marked Parts node is like the PPT in one embodiment since it may not have explicit multiple levels. However it could contain a parent node labeled "Book Marked Parts" with a child node for each part the user has placed a bookmark on. The purpose of bookmarks is to provide the user a quick way to return to a part found while searching either the Component or PPT databases. When the user selects one of the parts in this node, the search parameters will be entered in the Search Parameters tab and the search performed. In one embodiment, bookmarked parts may be edited (e.g., deleted) by selecting the bookmarked part and user hit "delete" key.

The Search Parameters Tab 2906 is tab that contains a part table with two columns. The left column contains parameter names for the selected taxonomy node. The right column contains the values to search upon. Once a set of parametric values has been entered, the user can press the Search button above the part table to search the selected database. The results of the search will be displayed in the Search Results tab described below. The Clear button above the part table is used to clear the attributes of the parameter for new searches.

Figure 29B:
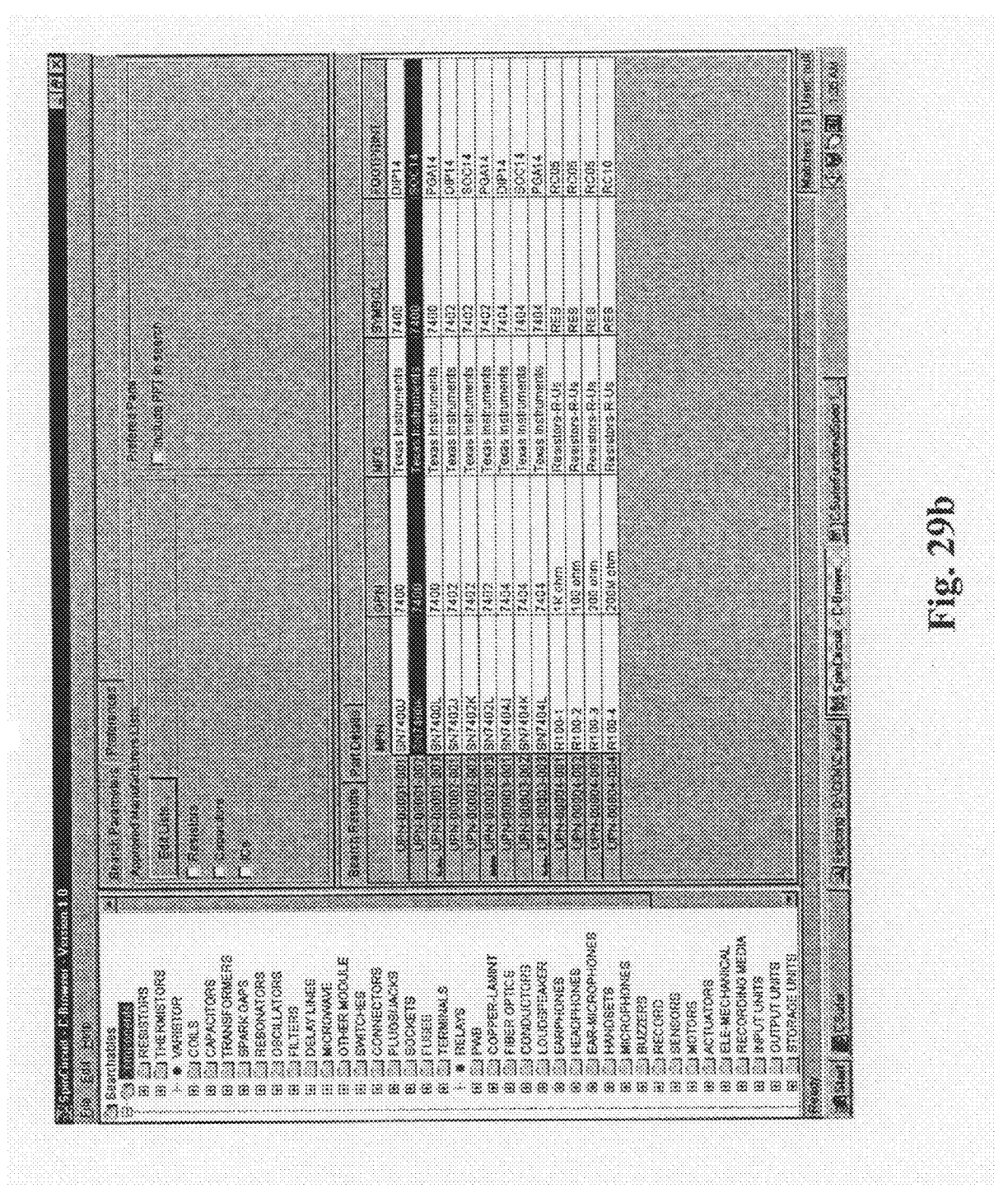

In addition to entering search parameter in the Search Parameters tab, the user will be able to add other filters to the search criteria using the preferences tab 2908. This can be seen in the example view of FIG. 29*b*. The tab will have 2 sections that allow the user to identify preferred parts and additional information from MyActive Part. Checking the MyActive Part box will show additional information for a corporate, division, site, etc. The PPT preferences section consist of a check box that will enable the search to use or not use the PPT. Multiple lists are allowed so the user can have lists for different types of PPT. For example, the following are example lists that me be created: Corporate Level, Division Level, Region Level, or personal.

Once a search is performed the C-Browser will activate (e.g., show) the Search Results tab 2910. This tab corresponds to a part table showing all of the parts found in the search. Each part will be displayed horizontally in rows. The columns will be used to display a basic set of the part parametric. The part list will be scrollable up and down via a scroll bar to the right. Hot Logic components will be identified via an icon next to the UPN. Search results will show information, such as UPN, Manufacturer, Manufacturer Part Number (MPN), Description, Package, and Data Sheet URL, and/or L in respective order. Datasheet are implemented as URL tags. Selecting it will launch a web browser and send the user to the URL. If a part does not have an URL, the field will be blank. Datasheet URL status and the URL location will be retrieved from the Active Parts database.

Figure 29C:
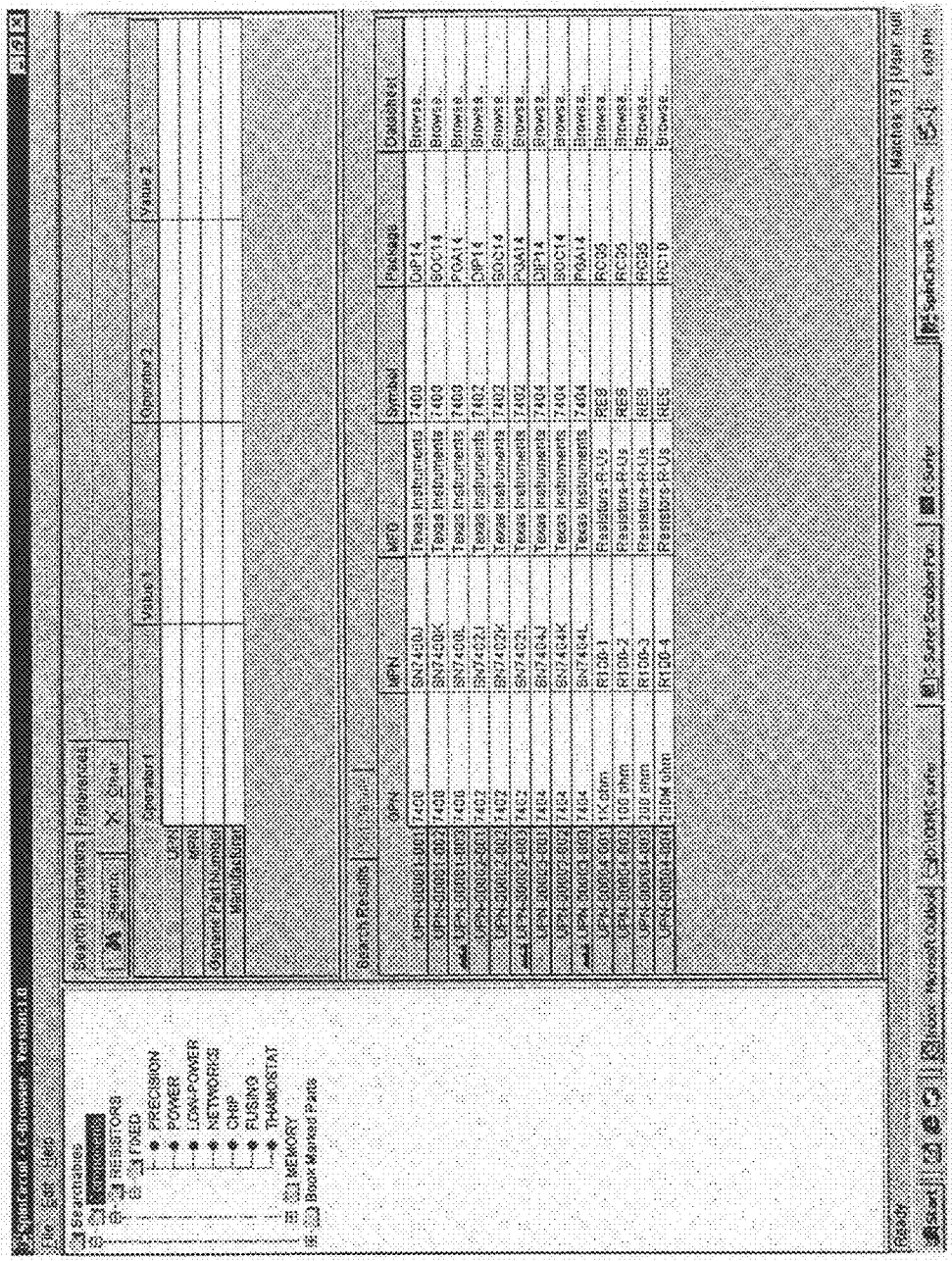

Default part display order in one embodiment will be Preference Filtered Parts first (which can be highlighted). The display order can also be based on UPN order, as can be seen in the example view of FIG. 29*c*.

Selecting one of the header buttons, e.g., for the UPN, Manufacture, MPN, Package, Data Sheet columns, etc., will sort the parts based on the alphanumeric order of that column. Selecting the same column will reverse the sort order. Preference Filter Parts (highlighted parts) will be sorted like non-highlighted parts. Part (or multiple parts via the shift and/or Ctrl+mouse click) can be selected and detailed part information can be obtained by selecting the Part Detail tab. A maximum of 3 parts may be selected and subsequently displayed. In one embodiment, when more than 100 parts are found in a search, only the first 100 parts will be displayed. The number can be changed in the Environment Option Menu under "edit". In addition, the tab may state 100 of x total parts shown.

In one approach, the user can see more detailed information on a given part or to compare multiple parts side-by-side. This is done by selecting the desired parts in the table by clicking on the UPN button (left column) next to each part. Once all parts are highlighted the user will press the Part Details tab, described below, to see more detailed information.

Figure 29D:
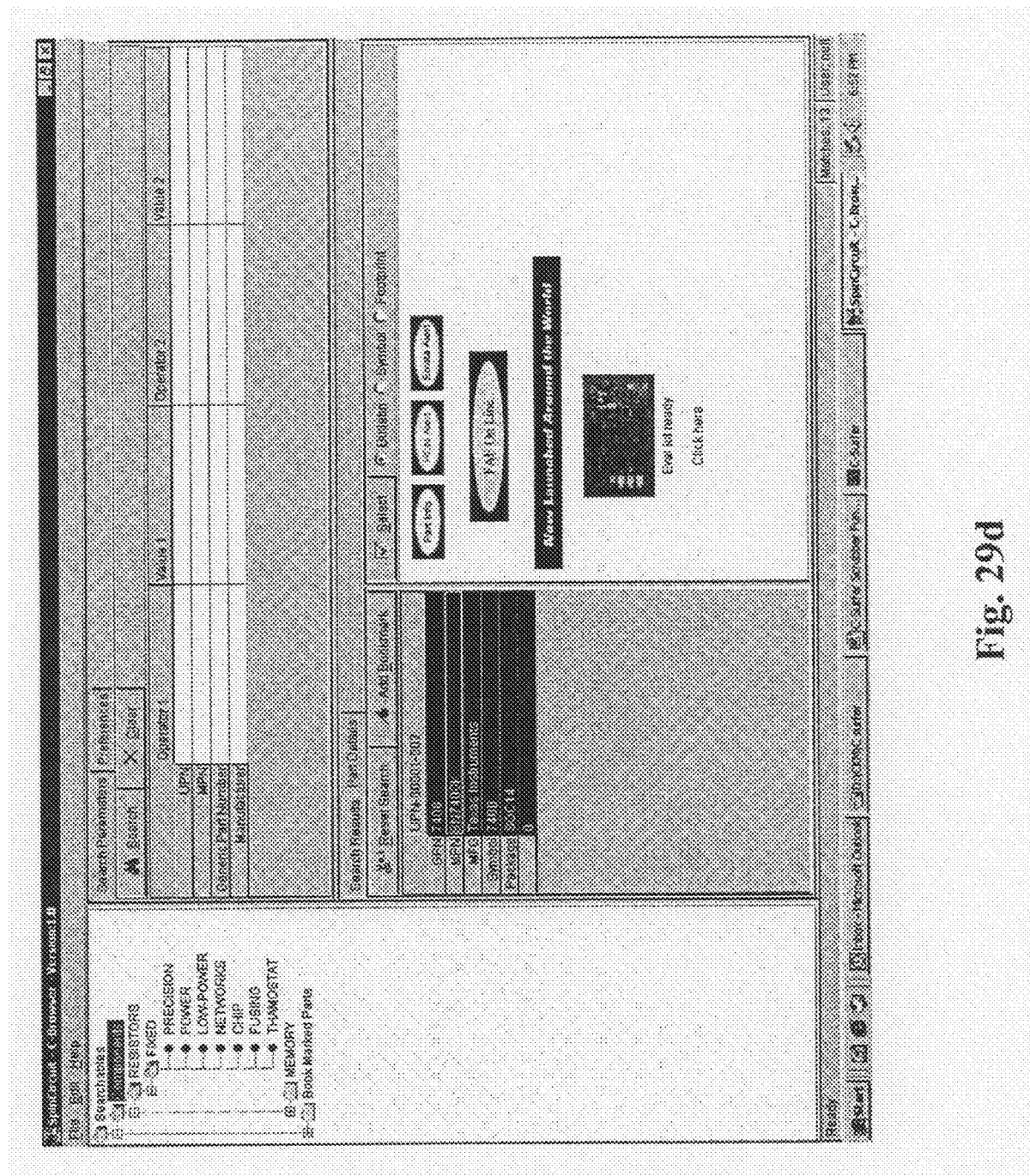

The parts detail table will control a view of a part table for all of the parts selected in the Search Results part table. In addition to the parts table will be a viewer window used to display symbol, footprint and news HTML pages for the selected part. Each part will be displayed vertically in columns. The rows will be used to display the complete set of part parametric values for the parts. This type of display will allow a side-by-side comparison of the displayed parts. As can be seen in the example view of FIG. 29*d*, at least two significant control buttons are available in this table:

- Selecting a part and selecting the Reset Search button will populate the search parameter area with the selected part attributes for each properties. The user may then change the attributes for separate search.
- The Bookmark button will place the selected part in the user's personal bookmark.

A part can be selected by selecting in any cell of the part's column. When a part is selected the viewer window will be updated. This window is described below. The part detail tab/viewer can be used to display symbol, place selected part to schematic PCB tool, back annotate selected part to schematic PCB tool, show footprint or bulletin information for the part selected in the Part Details parts table.

The default view is the Bulletin when a part is selected. To switch between the allowed views the user will select one of the radio buttons labeled Symbol, Footprint and Bulletin. The Place or Link button will be shown based on the following:

- The Place button will be shown if the Symbol radio button is selected and if the C-Browser finds that the part contains a symbol association. The Place button will place a selected part to schematic PCB. It is noted that in an embodiment, the place button will be shown only if the C-Browser was called from a schematic PCB tool. Alternatively, the UI will to place symbols to a schematic PCB tool even if the C-Browser is not called from the schematic PCB tool.
- The Link button will be shown to back annotate the selected part to schematic PCB tool if the C-Browser was called from the C-Scrubber and if the C-Browser finds that the part contains a symbol association.

The bulletin view will contain an HTML page, which is dynamically created by the SpinCircuit server. This page will contain content that is specific to the selected part. When the Bulletin View is selected, the C-Browser will send a request to SpinCircuit web site with a UPN. SpinCircuit web site will return an HTML page with UPN related information.

The symbol view will contain a picture of the symbol for the selected part. In one approach, the Symbol button will only be enabled if the selected part was found in the SpinCircuit database and a symbol was associated with the part.

The footprint view will contain a picture of the PCB footprint for the selected part. In one approach, the Footprint button will only be enabled if the selected part was found in the SpinCircuit database and a footprint was associated with the part.

When the user selects the Environment Options command under the Edit menu, the Environment Options dialog will be displayed. This dialog will be used to configure the options, such as: (1) The maximum number of results to display in a search (e.g., "Up to 100 parts"); (2) The user profile edit (e.g., to launch the SpinCircuit web page).

The C-Browser window will contain a status bar as commonly seen on windowed type applications. The status bar will contain information such as the user name, database search result count and so on.

A description of the C-Scrubber user interface will now be provided. A screenshot of an embodiment of a C-Scrubber UI 3000 is shown in FIG. 30*a*. In one embodiment, C-Scrubber will be launched from a dedicated menu option of a 3$^{rd}$ party schematic PCB design tool. C-Scrubber will aid the user in creating a validated parts list that will be sent to the BOM manager. The scrubbing process may be in batch mode (all parts verified at once) each time the C-Scrubber is launched.

The input to the C-Scrubber will be a parts list and user modifiable parts parametric from the schematic tool. The parts list will contain all information known about each part in the design. This information will be used to identify the exact part to be installed during manufacturing. Parts are identified by a UPN, which will uniquely identify each part. It is noted that special UPNs can be provided for the user's PPT. C-Scrubber will output a validated parts list that will be published to a BOM manager (not shown).

The window status component which is a process indicator to let the user know that C-Scrubber is working/active will be displayed to provide feedback to the user. C-Scrubber also contains a tool bar 3002 containing one or more control buttons. An example control button 3004 is shown to control the action to "Publish Part List". When the button 3004 is selected, the following process actions occur:

(a) User name ID is sent;
   If session is active, continue;
   If session is closed, logon with password;
(b) The example information as shown in FIG. 30*b* is received in recursive form, e.g., via CSV format.

The Part header section in one embodiment may contain the following information: (a) a Reference ID, which is the unique reference id for each part; (b) a UPN, which is the unique part identification number; (c) a CPN Number, which is the unique company part number; (d) a part description information; (e) part parametric information; (f) part substitution information and user's requirement for a part; (g) validation status/result information; (h) part source and part database association information; (i) PPT status and preferred part identification; (j) part notification; and/or (k) part lookup information, e.g., by looking up a part via the C-Browser.

Validation results can be shown for each part. The Reference ID can be a unique identifier for each part. For the validation process, each part will have a unique ID. For the field source and option, this will be provided from the schematic PCB tool and is required in one embodiment. An example field display is as follows:

C1, C2, C3, Cn
U1, U2, U3, Un
R1, R2, R3, Rn
Yellow

If multiple parts have same reference ID independent from any other field, then all parts with the same reference ID will have its field highlighted, e.g., colored yellow and the Validation Status field will show a yellow icon, as shown in FIG. 30*c*. Validation process will continue for other fields. The UPN and/or CPN may be shown for each part. In one embodiment, it is possible to have none for an item.

The following describe process actions for an embodiment of a validation process:

If UPN or CPN are not present, then a part is considered inactive and not validated.
If UPN and CPN are present, then the UPN will be used to reference call the C-Browser.
If UPN only is present, then the UPN will be used to reference call the C-Browser.
If CPN only is present, then the CPN will be used to reference call the C-Browser and a pop-up dialog will be displayed to ask the user to select an MPN to be mapped to the CPN.
For each UPN and MPN (if CPN only is shown), display the PPT status.
Then display the part source and validation status.

Figures 30G, 30H:
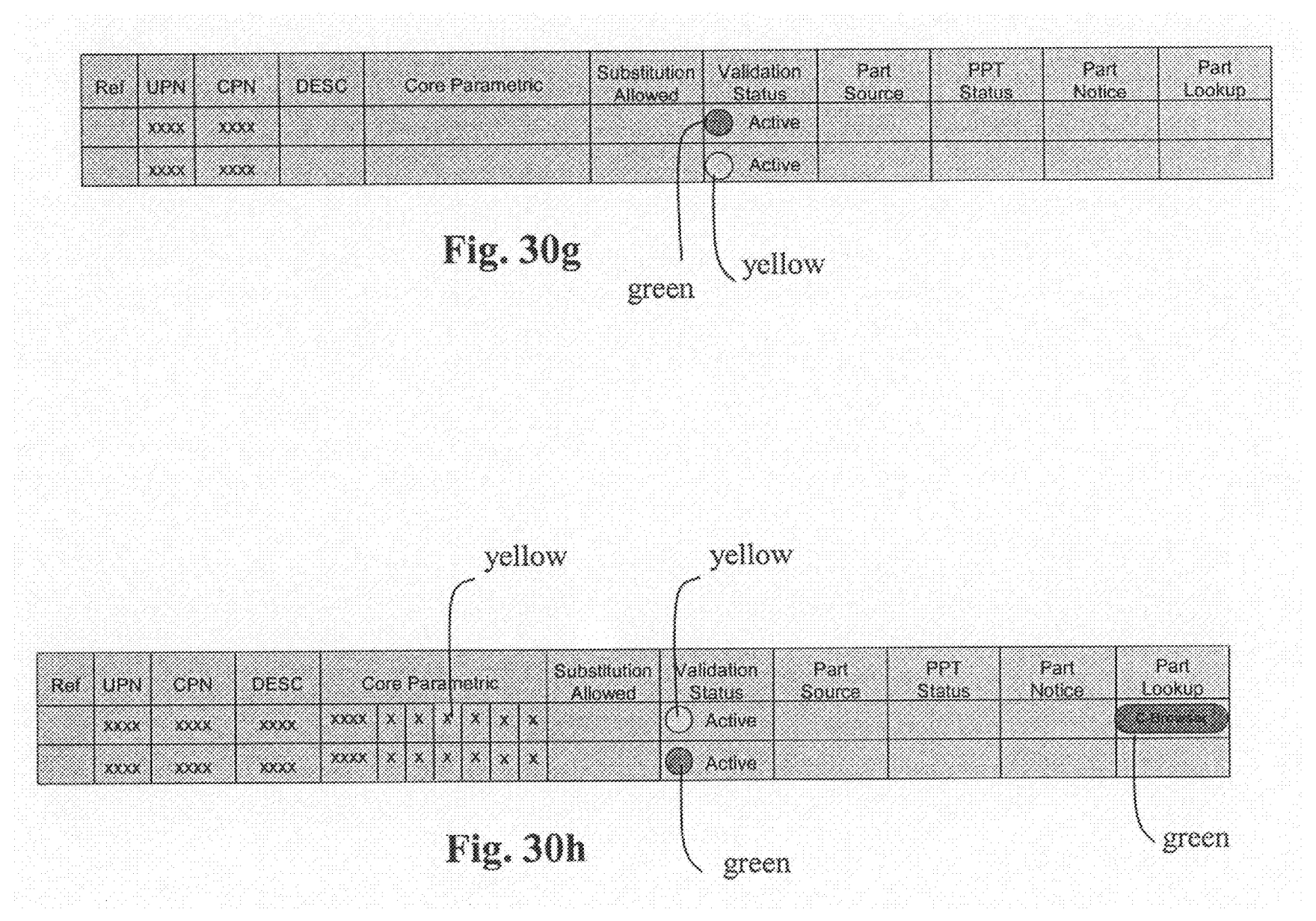

For the validation result, if UPN and CPN are NOT present, or UPN and CPN are not found in SpinCircuit or MyActive Part database, then the Validation Status field will show "Inactive" with a red icon, as shown in FIG. 30*d*. If UPN and CPN are present, the UPN is used for searching. If UPN is present and CPN not present, the UPN is used for searching. If UPN is not present and CPN present, the CPN is used for searching and the user is asked for an associated MPN. FIG. 30*e* depicts an entry in the Show PPT status field (e.g., can be Preferred or blank). FIG. 30*f* depicts an entry in the Show Part source field (e.g., SpinCircuit or MyActive Part). FIG. 30*g* depicts a colored icon entry in the Show Validation status field (e.g., Green or Yellow)

Core parametric data from schematic PCB tool can be validated against the SpinCircuit database. The validation process will validate schematic PCB tool values against the SpinCircuit database. For the validation result, if any core parametric differs during the validation, then the field will be colored yellow and Validation Status field will show "Active" with a yellow icon. A C-Browser icon will be shown in Part Lookup field. Otherwise the Validation Status field will show "Active" with a green icon. The validation process will continue for other fields. An example view is shown in FIG. 30*h*.

The end user may identify a part to allow substitution or request that substitution is not allowed. An example UI view for this is shown in FIG. 30*i*. During the validation process, SpinCircuit database may identify a part with a special notice. During the validation process, if any part has a part notice, then the notice type URL will be shown (colored yellow), and Validation Status field will show "Active" with a yellow icon. An example UI view is shown in FIG. 30*j*.

Details regarding an example taxonomy implementation according to an embodiment will now be described. The C-Browser tool populates and interacts with taxonomy trees. The C-Browser tool can dynamically handle changes to the taxonomy definitions. Examples of such changes include: (a) Adding new taxonomy nodes; (b) Removing existing taxonomy nodes; (c) Modifying taxonomy tree hierarchies; and/or (d) Modifying the parametric value sets within a given taxonomy. A common taxonomy control can be implemented. The control requests taxonomy definition data and populates the tree control with the necessary data. A selection model will also be implemented such that the caller of the control will be notified of events such as node and leaf selections.

Since downloading the taxonomy trees is a time consuming task and limited by bandwidth, in one embodiment, taxonomy tree population will only be done when an update is needed.

First use by the user will initiate the taxonomy tree download and store the tree id, tree update date, and associated taxonomy data in the user's local hard disk. Each time the C-Browser is launched, the tree id and tree update date is verified. Existing tree version updates (if tree update date is different) and new trees will be downloaded.

The Searchables tree may be populated with a series of taxonomy trees. The list of trees and their description may be obtained by sending HTTP messages to the public server. The messages may all make requests for tables that contain metadata. The following sections describe example messages that can be used.

The "Request Taxonomy Names" message may be sent by the client to obtain metadata for the all taxonomies. The table contains the following fields in a present embodiment.

| | |
|---|---|
| Name | Taxonomy name (primary key). |
| Label | Taxonomy label. |
| Description | Help text. |
| Hierarchies Version | Current hierarchy version number. |
| Properties Version | Current properties version number. |

The "Request Taxonomy Definition" message may be sent by the client to obtain metadata that describes a specific taxonomy hierarchy. The table will contain the following fields in an embodiment.

| | |
|---|---|
| Id | Unique numeric id (primary key). |
| Name | Category name. |
| Label | Display label. |
| Description | Help text. |
| Parent Taxonomy | Parent taxonomy name. |
| Display Type | Displayable or hidden, only leafs can be hidden. |

The "Request Taxonomy Properties" message will be sent by the client to obtain metadata that describes all properties associated with a specific taxonomy node. The table will contain the following fields in this embodiment.

| | |
|---|---|
| Id | A unique numeric id (primary key). |
| Name | Column name in the data table. |
| Label | Display label. |
| Description | Help text. |
| Data Type | Data type, numeric/string/date, other? |
| Search Type | Searchable or for retrieval only. |
| Property Type | Electrical/mechanical/etc, to be defined. |
| UOM | Unit of measure. |
| Min Value | For numeric properties only. |
| Max Value | For numeric properties only. |
| Enumerated Values | A list of permitted values, pipe separated, for string properties only. |

The taxonomy tree control may implement a selection model that notifies the owner of the control when a selection has been made. The owner can then query the control for the specific type of selection. C-Browser may then update the part table in the Search Parameters tab based on the selection. A search in the component database can be performed on any of the levels (e.g., 5 levels) of component taxonomy.

When a first level node is selected, the part table will be populated with UPN and Manufacturer for search parameters. When a second level node is selected the part table will be populated with the first level properties (as well as other desired parameters). When a third level node is selected the part table will only be populated with the second level properties (and other desired parameters). When a fourth and fifth level node is selected the part table will be populated with all available properties. Properties associated with node levels are associated core properties.

A common part table control can be implemented that can be shared. This table can be implemented as a Java Swing JTable, which implements a configurable spreadsheet.

The part table will be used to display database search results. The table can be configured to display the part records horizontally or vertically.

When part records are displayed horizontally each row will contain a single part as shown in FIG. 31a. Each column will contain the part parameter values. The first row will contain the name of the parameter being displayed. When displaying part data, the UPN parameter will be displayed in the left column.

When part records are displayed vertically, each column will contain a single part, as shown in FIG. 31b. When displaying part data, the UPN parameter will always be displayed in the top row. Each row will contain one part parameter value. The first column will always contain the name of the parameter being displayed.

The first row in the table is referred to herein as the table header. The header may be displayed as 3D buttons. Values will be displayed in table cells based on the value type. Following is a list of types of cell display types used in one embodiment:

Hot Logic: Parts identified as less than one month old are referred to as hot logic parts. These parts will be indicated to the user by displaying a chili pepper to the left of the UPN value.

Validation Status: Parts identified as being active/inactive, having different parametrics from the SpinCircuit database, or having a part notification (errata, EOL, etc.), then a colored icon and status message will be shown.

Color Code: Certain fields will be colored to highlight differences to the user. Yellow will be used to identify the fields.

URL: Some parameter values will contain a URL. The user can click on the URL to display the content at the URL in the system registered Internet browser (i.e., Netscape). URLs will be displayed as underlined blue text. When the mouse cursor is moved over the URL the cursor will be changed to a pointing hand much the same as the cursor used by Netscape.

The integration interface between C-Surfer and a schematic tool can be implemented similar to the interface used between C-Surfer and a CIS tool. For the sake of discussion, both the schematic and CIS tools will be referred to as CAD tools in the rest of this subsection. The API in an embodiment provides two methods to integrate CAD tools with C-Surfer. One method is for the CAD tools to drive C-Surfer and the other is to allow C-Surfer to drive the CAD tools.

To provide C-Surfer to CAD tool integration, C-Surfer will allow interfaces to be written that will register C-Surfer listeners. C-Surfer will fire events to the listeners whenever a requested service is entered. The interface then cause the CAD tool to react. For the purpose of explanation, with respect to the processes that should be integrated, the remainder of this section will explain a CAD tool driven interface.

There are two sides of every interface point, the CAD side and the C-Surfer side. The CAD side consists of the request for the desired C-Surfer service followed by the action to complete the request. The C-Surfer side consists of the API for making a service request and returning the requested data. For example, consider the place part interface process. The process starts when the CAD side of the interface makes a call to the C-Surfer API to find a part to place. The C-Surfer API will return the part information to be placed after which the CAD side will perform the symbol transfer (if any) and placement operations.

The following describe both sides of the interface processes according to an embodiment for placing a part (C-Browser):
- CAD side: Calls the C-Surfer API function from the C-Surfer shared library.
- C-Browser side: Opens the C-Browser GUI for the user to query for and select the desired part.
- C-Browser side: If the user cancels the operation, returns a cancel state value.
- C-Browser side: If the user selects a part and presses the Place button, fills in the symbol and property name/value buffers and returns a success state value.
- CAD side: If the API returns a success state value, determines if the symbol name to be placed exists in the local CAD library database. If not then a call to the C-Browser API will be made to request the symbol in either native or XML format and add the symbol to the local library. Once the symbol is located or added, the symbol will be placed and properties will be added using the property name/value arrays. It is noted that symbols can be requested in either the native CAD database format or XML. In the case where XML is requested the C-Browser API will compress the data on the server and decompress it on the client before the CAD side receives the symbol.

C-Scrubber provides a method for the CAD side interface to validate the UPN and other properties on a symbol instance against the SpinCircuit part database. The validation process will perform a lookup on the UPN and compare the other property values from the symbol instance against the part record data. If discrepancies are found, the C-Surfer GUI will be displayed to allow the user to resolve the problem. The new UPN and properties will be returned to the CAD side. The CAD side will then update the symbol instance.

The validate part process according to an embodiment includes the following actions:
- CAD side: Calls the C-Scrubber API function to validate a part, passing two string buffer arrays with the property names and values to validate. The first property pair should be the UPN or blank if no UPN is assigned.
- C-Scrubber side: Performs the necessary validation. If the part is validated then a success value is returned and the C-Scrubber GUI will be opened to show that all is valid. If the part is not valid, the C-Scrubber GUI will be opened for the user to query for and select the correct part.
- C-Scrubber side: If the user cancels the operation, returns a cancel state value.
- C-Scrubber side: If the user resolves the invalid part and presses the Select button, fills in the correct property names and values to return and returns a modified state value.
- CAD side: If the API returns a modified state value, modify the properties on the symbol instance using the property name/value arrays.

The user may use C-Scrubber to create a validated parts list used by and sent to the BOM manager. The scrubbing process includes the following actions in an embodiment:
- CAD side: Creates a parts list file consisting of the UPN and other properties from all parts in the design. The parts list can be pre-validated or have raw data with no UPN associated. This will be an ASCII comma separated values (CSV) file to be described in the sections that follow.
- CAD side: Calls the C-Surfer API function to start C-Scrubber, passing the name of the parts list file created in the previous step.
- C-Scrubber side: Shows the C-Scrubber GUI that allows users to scrub the parts list.

During the scrubbing process, the user may define parts and also change part properties. These changes should be back annotated to the CAD system. The C-Scrubber will write these changes to a change file and return a modified state value.
- CAD side: If the API returns a modified state value, the CAD side interface will read the change file and make the necessary changes to the schematic.

C-Scrubber will output a validated parts list that will be published to the BOM manager.

SpinWorkbench/SpinBOM

Details will now be provided for a tool (referred to herein as the SpinWorkbench or SWB) where the functions of cleansing, optimizing, analyzing and enhancing parts are be performed. The SWB environment can be expandable via child plug-ins such that custom and new functionality can be added to meet future needs without having to write a separate tool. In one embodiment, the SWB is not a point tool, but instead operates on a working set of parts provided by other tools, e.g., the SpinBOM tool that will be described later. This tool allows one to load user BOMs that are then mapped to a specific data source configuration. Once this is done the parts from the BOM can be can be passed to the SWB so the user can perform some operation on them such as cleansing unknown parts or finding alternate parts and so forth.

Figure 32:
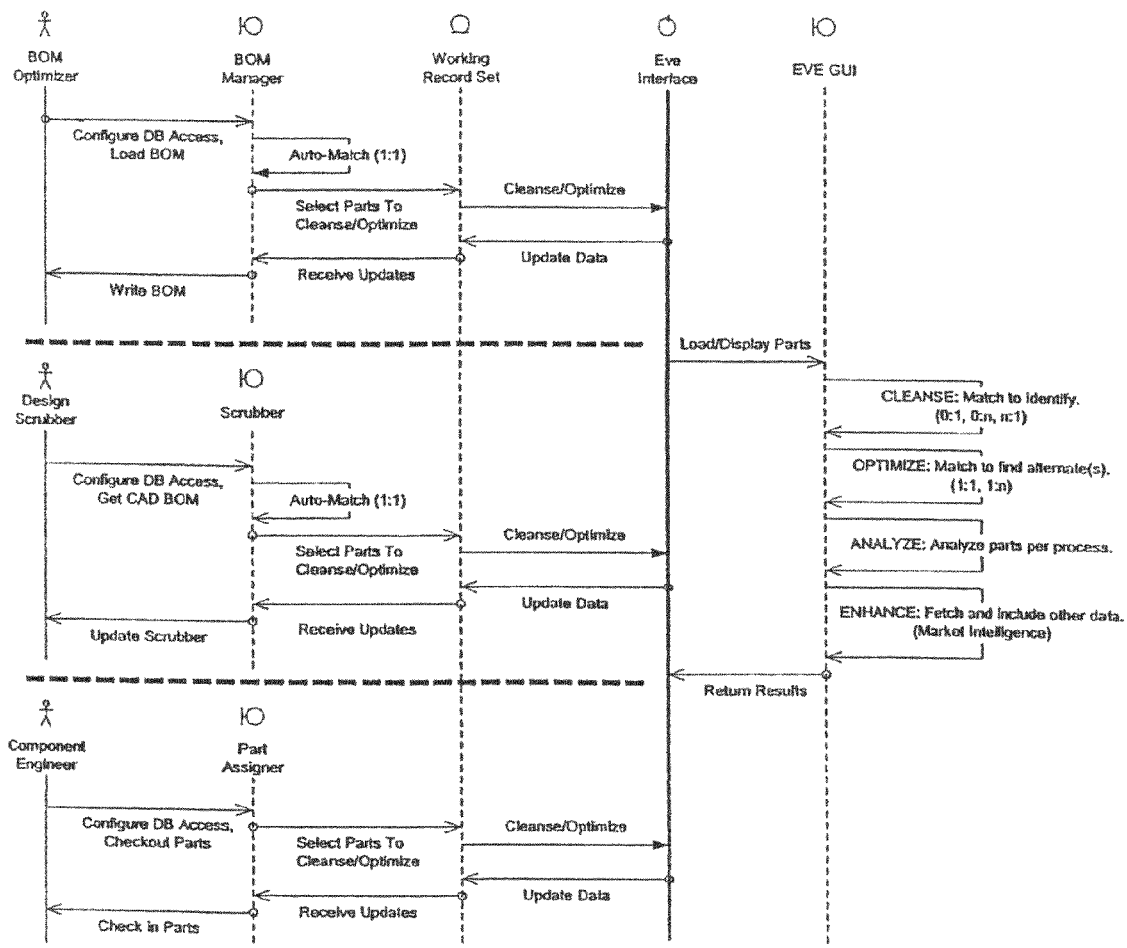
FIG. 32 depicts a logical model according to an embodiment of the invention.

FIG. 32 shows a logic model for the SWB. The logic model shows 3 different types of actors using the SWB to solve problems in the middle of 3 different user models. In this model, there are three different front-end applications that provide data for the SWB. The SWB will then be used to cleanse, optimize, analyze, and enhance the data and then return the updated data, as depicted in the flow shown in FIG. 32.

FIG. 33 shows an example of a "part Table" object that is employed in the present embodiment of the invention. One functional feature of the part table object embodiment is the ability to group parts. Grouping is a type of sorting that can be performed on one or more columns. The example in FIG. 33 shows some sample data that has been grouped by first the JOE_MANUFACTURER_NAME column then second the STATUS column. The grouping feature sorts the data then creates a hierarchical data model representing the rows of data. This new model is then used to create a tree control, which is displayed as the left-most column. Top-level folders are created for each unique value in the first column grouped. Within each top-level folder, sub folders are created using the same grouping methodology. The parts are then added as children to the group they belong to. In this embodiment, there is no limitation to the number of columns that can be grouped; however it is contemplated that in common usage users will only group at most two columns. When a column is added to the group, the normal column is removed from the table since the tree now represents that data.

The part values for non-grouped columns are displayed in the other columns with the following exceptions. There are rows to the right of the tree folder nodes, which will have the normal window background color. The top folder allows the data for a single part within its group to be displayed to the right of the folder. In the example of FIG. 33, rows 1, 4, 5, 6, 7, 21 & 22 are examples of this. What is being displayed is the part within the group, which is considered to be the group-selected part. The group-selected part is indicated with a small arrow in the part icon as seen in rows 3 and 15. The user can change the group-selected part by double-clicking on any part in the group. The display will then reflect the new part. The group-selection feature can be used for any purpose but is designed to allow a user to choose one of the parts in a group folder. The ability to select multiple-group-selections is also present. In the present embodiment, the grouping can be turned on and off. When grouping mode is used normal column sorting and part display rotation is temporarily disabled until the group is reset and the table resumes normal mode.

In an embodiment, the part tables in SpinBOM and Spin-Workbench can display alternate parts associate with a specific part. For example, a BOM contains one or more parts to include in a design. These parts are referred to as primary parts. In addition, the BOM may contain optional parts that can be used in place of the requested primary part. These parts are referred to as alternate parts.

This feature can be implemented in a derivative of the standard table. The new table will keep alternate parts in order after their primary part. That is to say that if alternate parts for a primary exist, they will be in the rows immediately following the primary part row. This will be true even if the user sorts the data. In one example implementation, the exception to this rule is when the Grouping feature is used. When in Group mode both primary and alternate parts will be displayed as individual parts.

Figure 34:
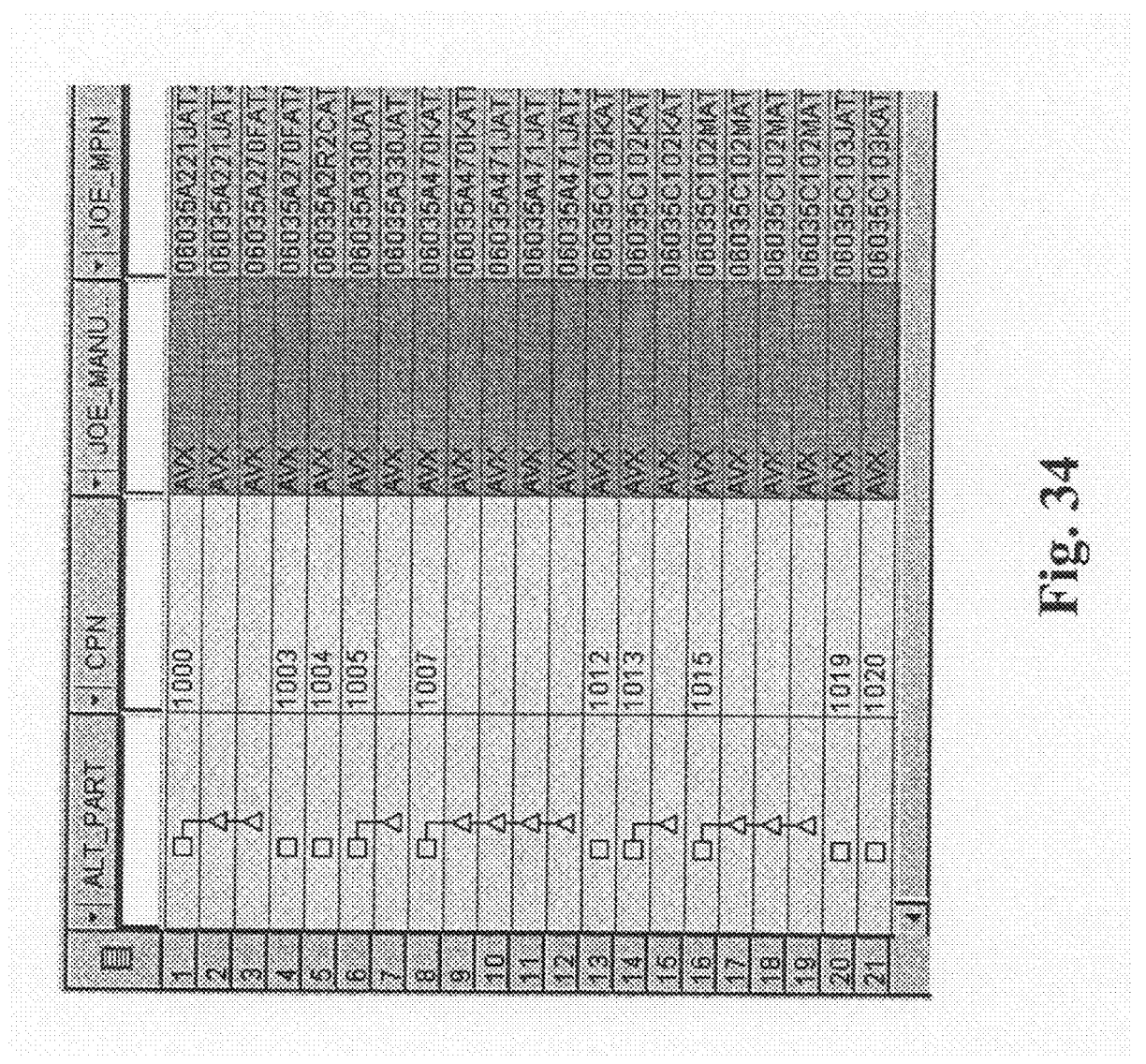

When alternates are defined, the new part table will allow an application to turn on a column that displays primary to alternate part relationships. This column is referred to as ALT PART. The example screenshot in FIG. 34 shows how the ALT PART column can be drawn in an embodiment. The square indicates a primary part and a triangle indicates an alternate part. The lines from the square to the linked triangles indicate the alternates associated with the primary.

Another feature in the part table is the ability to have extended multiple selections using standard Windows selection behavior. Alternatively, only a single row could be selected. A button can be added to the upper left and right corners of the table display. This button contains a small icon (e.g., blue lines and no text). When pressed, all parts in the table will be selected.

A selection feature can be implemented that is enabled when the table is in the group mode. When the user selects a top folder node all parts in that group are considered selected but not necessarily displayed as selected. For example, the user can group by manufacturer name then select a single manufacturer folder. This allows them to operate on all parts of a specific manufacturer without specifically having to select or even see them.

A command component can be added near the Add Column command that allows the user to add specific columns to the part table display. The columns that will be added are all columns that contain values that differentiate the selected parts. For example, consider if the user has the CPN column visible and has 2 parts selected and both parts have the same CPN value. In order to see what differentiates the selected parts, the user may need to start adding columns until they happen to find the columns that contain different data. This feature will perform this task for the user and add all columns in the contained data that contain unique values.

In an embodiment, the SWB includes a Virtual Column plug-in. Virtual columns provide dynamically created (calculated) data that is based on other data in the data model. For example, a part grading plug-in can be added that will calculate a part grade as configured by the user. In this embodiment, the virtual column includes some or all of the following components: (a) the configured column name, which will be displayed as the column heading; (b) the column data type (string, integer, float, date, URL or boolean), which is used to handle the data; (c) the column PDI type (public, private, shared), which is used to identify the accessibility of the data and also provide default color formatting of the table display; (d) a method for obtaining a dynamically calculated value for a specific row in a DataTable; (e) a method to return a JComponent based object that will be used to render the dynamic value; and/or (f) an option dialog, which will be used to modify the VC instance parameters.

The part table object can host a plug-in manager to host plug-ins. FIG. 35 shows a configuration for an example plug-in the custom column named Grade. In one approach, a plug-in has control over how the dynamically created data is displayed since it provides the rendering component. It could render the results with an icon or specially colored text labels as the above example. The example creates a grade value by using the value in the DAYS_IN_STOCK and STATUS column values. The grade is then displayed as text and colored, e.g., in red if the value is less than 11, yellow if less than 16 or green if over 15.

A current Custom Columns dialog box can be provided to the user to create a URL based column that when clicked will launch a web browser with parameters obtained by values for the row that was clicked. This functionality can be replaced with a Web Link plug-in. The Custom Column dialog can therefore be converted into the Web Link parameter dialog box.

Figure 36:
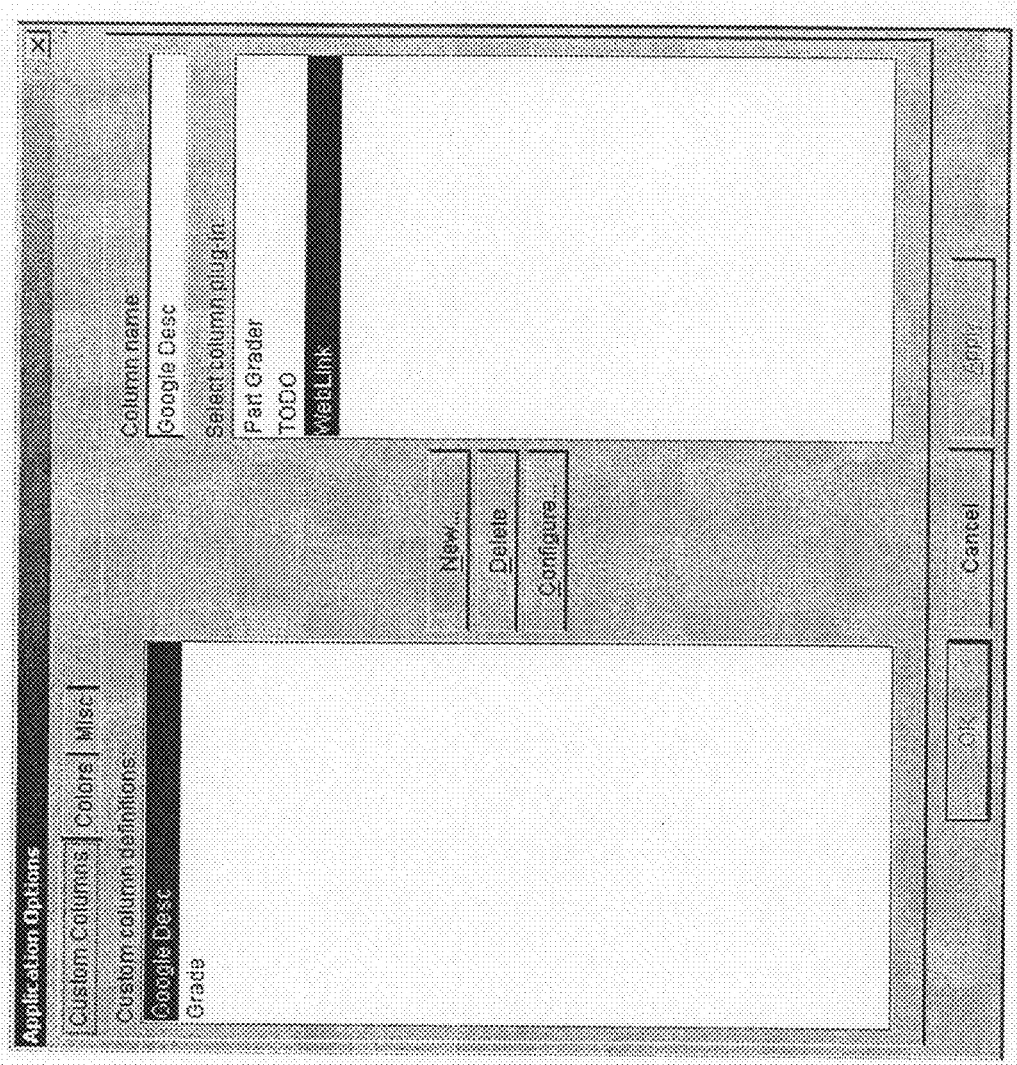

The Custom Columns dialog box shown in FIG. 36 can be implemented that allows the user to create a new column in the display using a) a virtual column plug-in and b) specific settings to the plug-in. For example, the grade example above could be configured to grade based on specific columns to create one custom column named Part Grade and different data columns to create another custom column named Manufacturer Grade. This allows the same plug-in to be used for multiple custom columns.

To create a custom column with this approach, one would first enter a value in the Column name field. Next the virtual column plug-in name is selected and the Add button is actuated. The configuration dialog box for the selected virtual column plug-in will be displayed. To delete or change a custom column configuration, the custom column definition name is selected and then the Delete or Configure button is actuated. A framework object that can be created is an object that can track changes to a DataTable, e.g., an object that can be used to undo or redo an action. A conventional database undo/redo utility/structure can be used to implement this object.

The BOM management tool (referred to as SpinBOM) provides a place for users to load a bill of materials from either the SpinDirector or local file system. A data source configuration is performed for the SpinBOM tool to identify what database(s) should be used and define local database functionality as it relates to the new metadata dictionary. Next the a mapping is performed to map the BOM columns to the data source configuration dictionary items. This provides the tools with the information to perform queries and updates to the BOM parts using the data source. The data source configuration and column mapping objects will follow the data set from the SpinBOM to the SWB.

Figure 37:
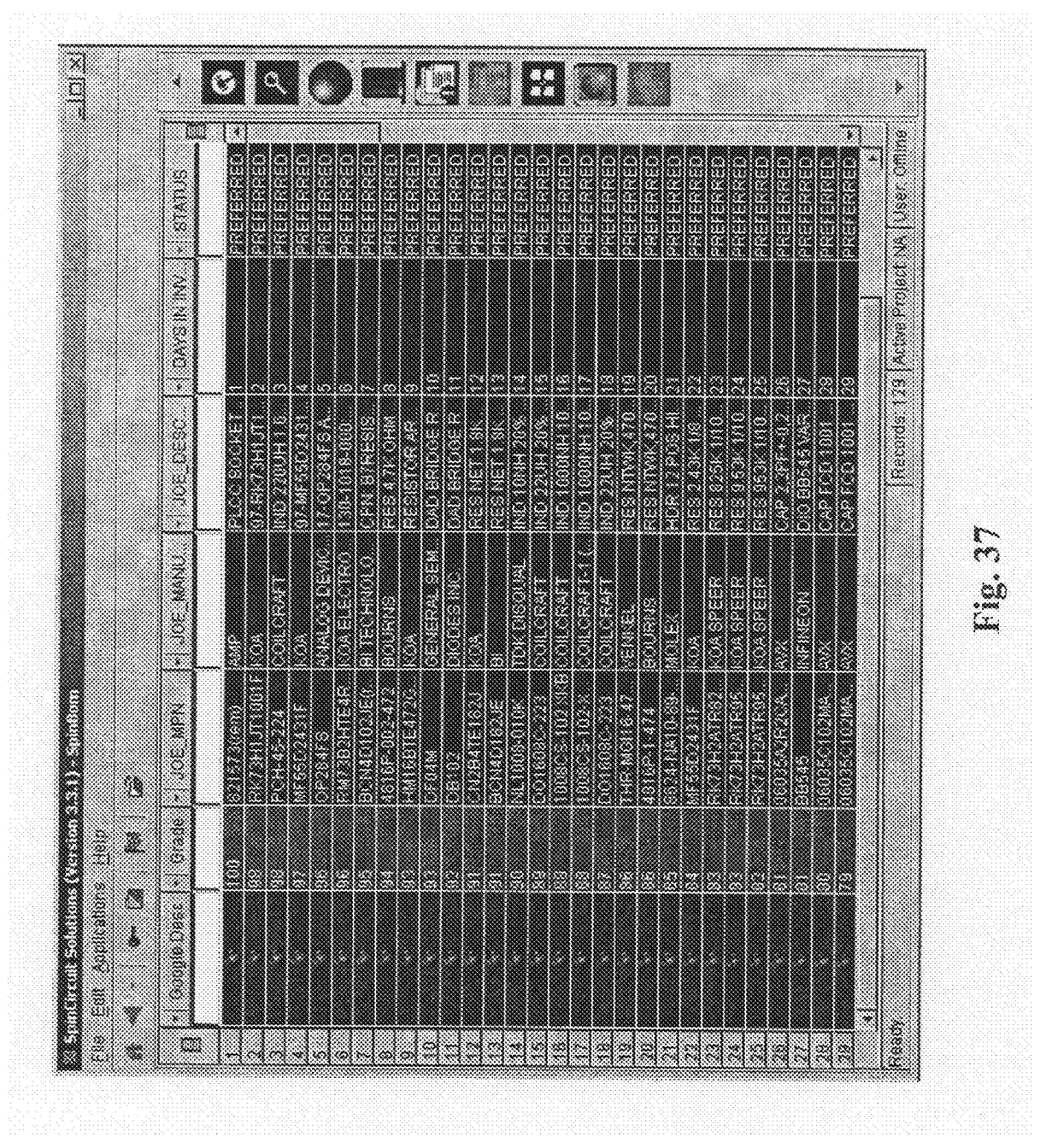

An embodiment of the SpinBOM user interface is shown in FIG. 37. Columns are shown in the example interface that are added/managed by both the SpinBOM and SWB applications. These columns contain information that enable the user to understand various things about a part. Some examples of this information are: (a) whether a one-to-one match found for the part; and (b) whether the part changed by the SWB, and if so, then how.

When one or more parts are selected a selection object will be created with the information, such as the following: (a) the selected parts; (b) the data source configuration; and/or (c) the column-mapping configuration.

In one embodiment, the user can load a BOM file from a spreadsheet or other data file (e.g., Excel data or other value separated files). The import process will attempt to pre-parse the file and determine, (a) the file format, (b) the column delimiter, and (c) the column names. Once this is done the user will be presented with several steps to approve or modify the settings. The user can press the Finish button at anytime to accept the settings. Each step contains a preview table that displays a sample of the data as read via the current settings. This helps the user visually determine if the settings are correct before performing the actual import. Using this technique we will be making the import process much easier (if not automatic) thus eliminating the need to create import templates that store commonly used file format settings.

The following shows example formats for a sample bill of material:
Primary parts without alternate parts:

| CPN | MPN | MFR | MATCHED CPN | MATCHED MPN | MATCHED MFR |
|---|---|---|---|---|---|
| 111-1010 | A123-2 | AMP | 111-1010 | A123-2 | AMP |
| 123-001 | A123-2 | AMP | 123-001 | A123-2 | AMP |
| 323-22 | 32322 | Amp | 323-22 | 32322 | Amp |

Primary parts with alternates identified by blank or "-" for CPN values:

| CPN | MPN | MFR |
|---|---|---|
| 111-1010 | A123-2 | AMP |
|  | 111-11010.T | AMP |
|  | 111-11010.R | AMP |
| - | A123-2 | AMP |
| 123-001 | | |
| 323-22 | 32322 | Amp |

Once the user has loaded a BOM and a data source configuration has been defined, the user can map each BOM column to a business attribute. The column-mapping configuration can be attached to the part data such that other tools know where to find associated data. For example, if the parts are sent to the SpinWorkbench, SpinWorkbench will use the configuration to perform tasks such as part matching and analysis.

Once a BOM has been loaded and data source and mapping configurations have been set, e.g., one to one (1:1), part matching can be performed. This provides a quick way to validate the parts. If all parts are found to have correct information, then no further processing of the BOM may be desired. This same functionality (1:1 Part Matching) can also be performed in conjunction with the scrubbing tool. The 1:1 matching can be configured to match one or more of the BOM columns to mapped data source columns. The 1:1 matching process will annotate the displayed data with a status column indicating the match status.

One or more parts can be selected and actions performed to cleanse (match), analyze, optimize or enhance the part(s). Changes to the part(s) are received back and annotated in the displayed part table. In addition to changes, alternate parts can be added. These parts will be added to the displayed part table.

Figure 38A:
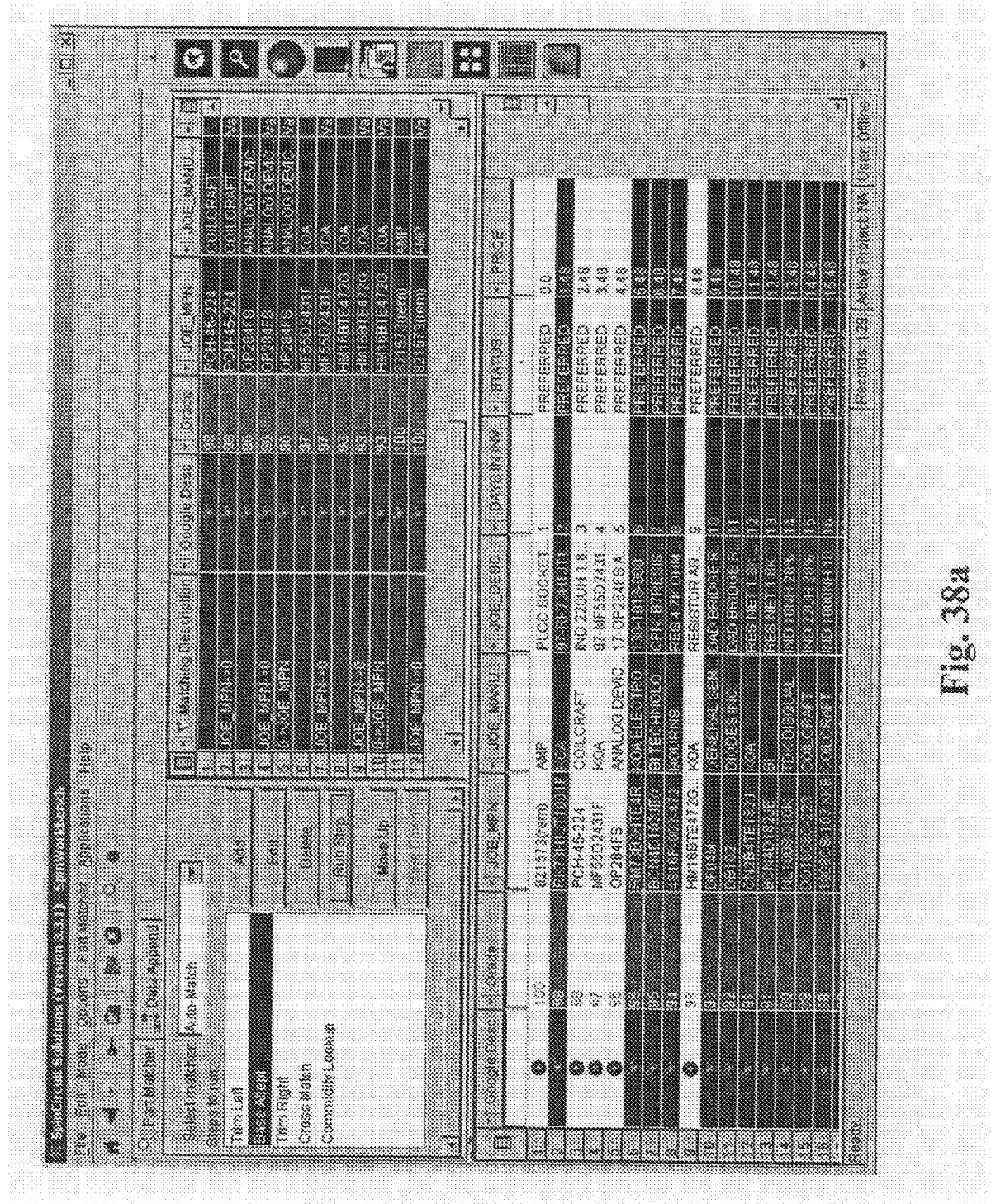
Figure 38B:
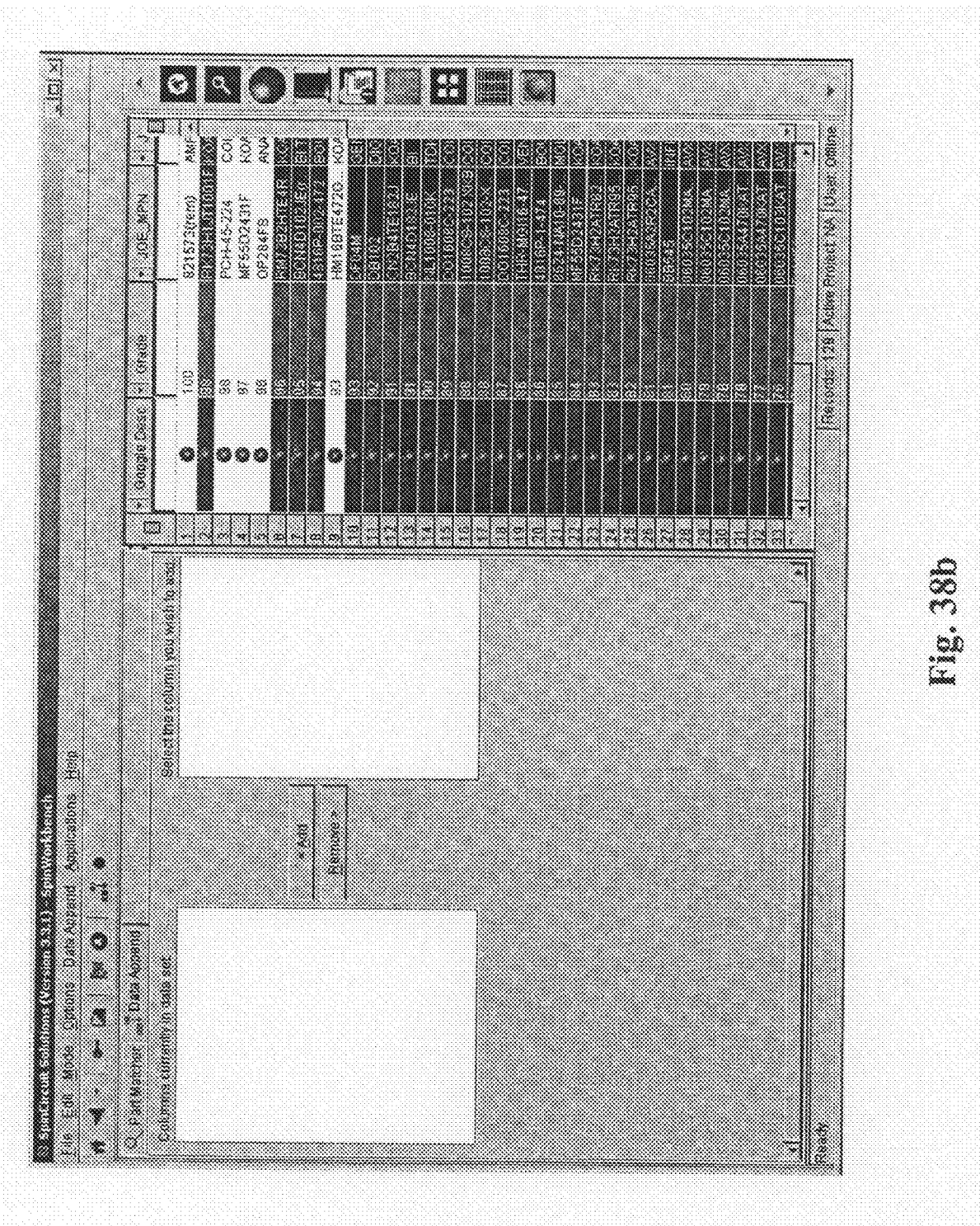
Figure 38C:
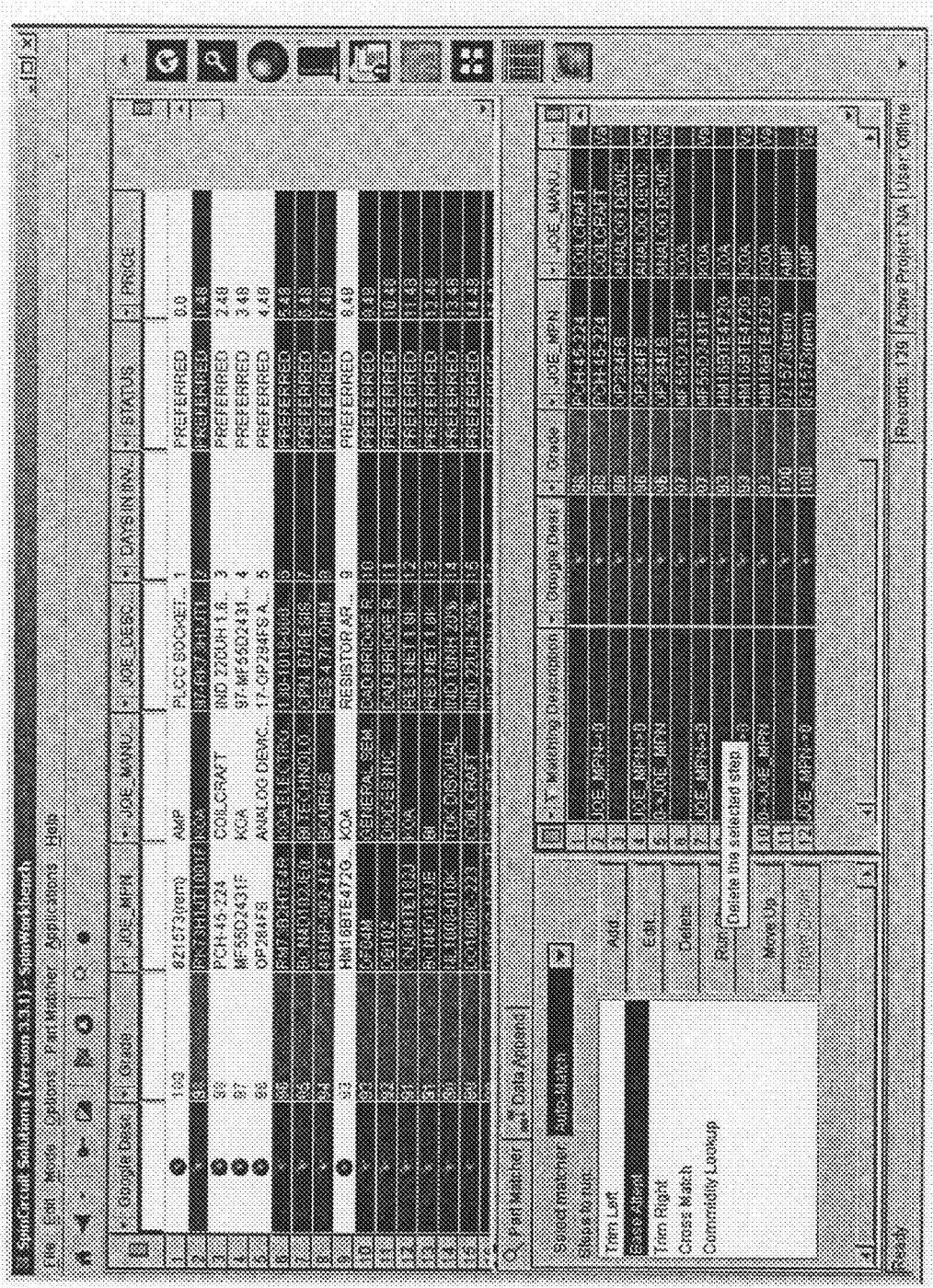
Figure 39:
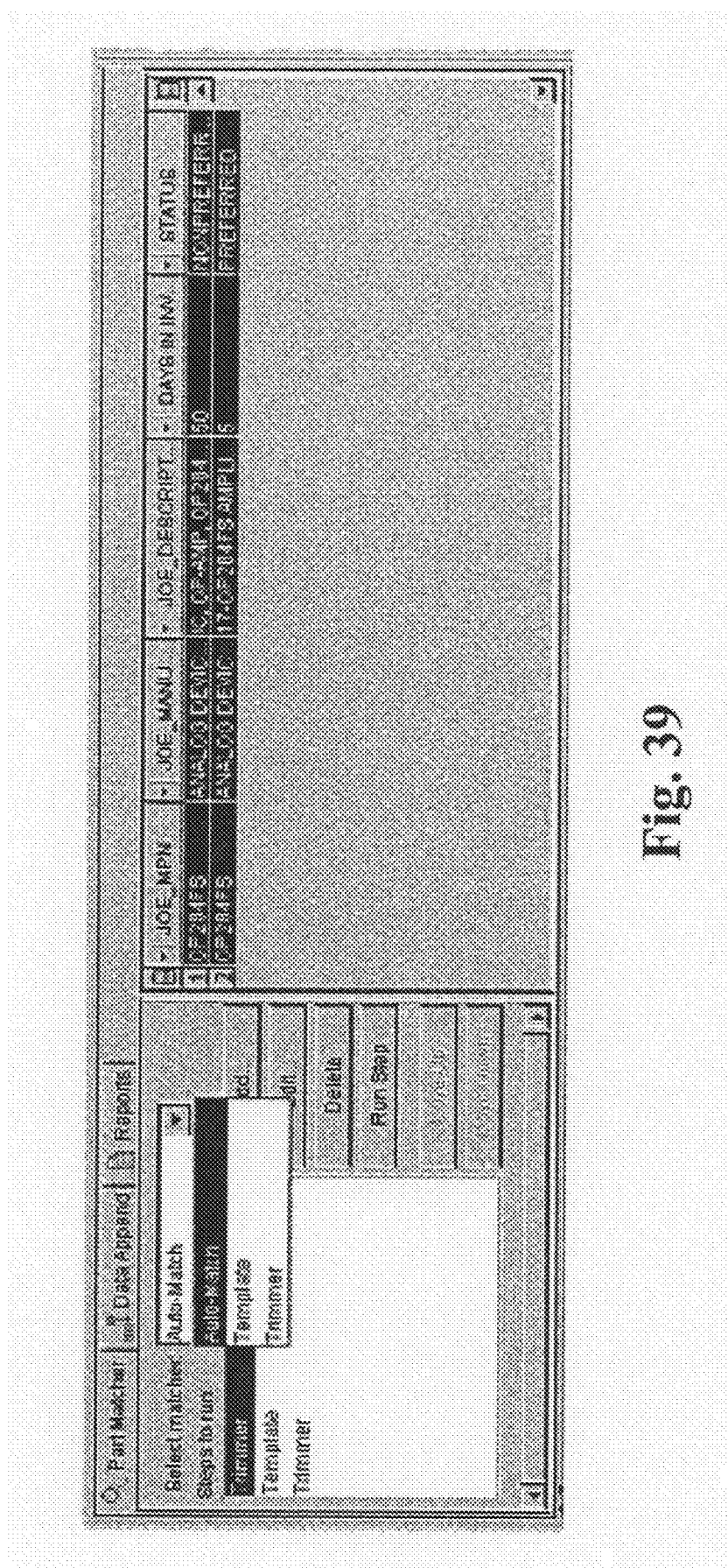

A feature of an embodiment of the SWB is a mechanism to display the working part set and to display a set of tools that allow the user to cleanse (match), optimize, analyze, and enhance the working part set. The screenshot of FIG. 38a shows basic components of an example SWB. The working part set (bottom half) is separated from the tools (top half) via a splitter bar. The user has control (via Option menu commands) to swap these two main areas of the application. The screenshot of FIG. 38b shows the sections rotated so they are separated via a vertical splitter bar. The screenshot of FIG. 38c shows the sections swapped top to bottom. So now the working part set is on the bottom and the tools are on the top. In the present embodiment, the user may choose to configure the 2 sections in any configuration to meet their preferences.

The SWB can be configured such that it allows tool plug-ins. In one embodiment, each plug-in provides the following: (a) the tool name, which is displayed in the tool tab; (b) a 16×16 pixel icon, which is also displayed in the tool tab; (c) a single pull-down menu, which is merged with the SWB menu (after the Options menu); (d) a toolbar fragment, which is appended with the SWB toolbar; and/or (e) the main GUI panel, which is displayed inside the tab. When a tool is activated (tab pressed), its menu and toolbar are dynamically merged with the SWB menu and toolbar. This provides a context driven user interface and does not over power the user with choices. In one approach, a tool will operate on only the selected part(s) in the working set. So the use model is to (1) select the part(s) that the user wishes to work on, then (2) use one or more tools to perform an action on the selected parts. It is anticipated that any number of tools may be added. As used herein, a "mode" is a named collection of tools.

The working part set is displayed in a group capable part table. The tools are notified when the user selects one or more parts. The tools can then operate on the selected parts and optionally update the part data using an API, which is part of the working part set object. Tools can lock the working part set selection so the user cannot change it until the tool has released the lock. For example, if the Part Matcher is in the middle of an automated part matching session, it would not make sense for the user to change the selection until the process is finished or canceled. When the working part set table is in the group mode, the user can select all parts in a group by simply clicking on the top folder.

Tools also have the ability to change the working part set selection. For example, a QA tool that allows a full review of the data for each part in the working part set may wish to have a Next and Previous button. This button could then allow the user to easily and quickly navigate through the working part set for review without having to move the mouse. All changes made to the working part set (via the API) can be undo and subsequently redone by the user. The Edit menu contains the Undo and Redo commands.

When the working part set has alternate parts enabled and alternate parts exist for a primary part, the display table will display the alternate part relationships. The user will be able to make an alternate part the primary part and subsequently convert the primary part to an alternate part.

When the user is finished, a command can be issued that will cause their changes (if any) to be returned to the calling tool. The calling application will use the working record set object API to determine the changes and update the input data.

PartMatcher

As an example, a Part Matcher (PM) tool can be created. There are two features that can be implemented to add to the part matching capability. The first feature is matcher plug-ins. A matcher plug-in in this embodiment provides the following components: (a) the name of the matcher, and (b) a main GUI panel, which is used to configure the matcher. The second feature is a feature called Auto-Match, which allows the users to configure multiple iterations of a select set of matcher plug-ins to be run with varied settings. The PM GUI contains two halves separated by a movable splitter bar. The left half contains the GUI panels provided by the active matcher. The right half contains a table that displays the selected working part records that the matchers can work on. The screenshot of FIG. 24 displays the PM GUI as it is positioned in its tab. Note that the parts displayed on the right are the list of selected parts from the working set. This allows the user to validate changes before committing them to the working set. In addition, the PM GUI will contain several enhanced features in the table display that allow the user to: (a) see what matches have been found and how they were found; (b) select a primary replacement part from the matched list; and/or (c) select one or more secondary parts as alternates to the primary part.

The PM tool can utilize the grouping feature of the table to create a single group for each of the parts in the list. The group will contain the list of matches (one or more) that were found for each part. The first part found would be the group-selection (as indicated by the blue arrow in the icon as described earlier). The user can switch the group-selection (part they wish to use) by double-clicking on the part as described earlier. Once acceptable matches are found an update is made to the working part set with the changes found by the PM.

The Auto-Matcher provides a user definable auto-matching process using the matcher plug-ins. Once one or more matchers have been run, the user will pick a matched part from the PM GUI and accept it. At that point the working part set will be updated. Alternatively, the tool can be configured to allow matches to be automatically accepted.

A match history column can be added to the working set. The PM tool will fill this column with information about (a) which matcher was used and (b) what settings were applied. The column value is appended so the user can track multiple matches on a single part. For example, consider if an unknown part was found using the Trimmer matcher, where an alternative is selected for the part. The history value will contain information about both transactions. This information will be returned to the calling application.

A commodity lookup part matcher can be implemented. This allows a user to obtain a part rating from the lookup tables when doing queries in any application. In an embodiment, this feature is implemented as a special metadata configuration of the PDI.

A cross matcher tool can be implemented. This matcher tool will be used to find parts using a process called cross matching. The cross matching process consists of the following steps:

1. Input a part from the working part set.
2. Get the input value from the input column (configured by user).
3. Search for all records in the data source (configured by user) that have a value matching the input column.
4. Create a list of all unique CPN values from the result set.
5. For each CPN repeat steps 2 through 5 until the desired search depth (configured by user) has been reached.

This functionality can be implemented as a part matcher plug-in.

A Data Append tool can be implemented to provide the user with the ability to append the working part set with additional columns of data from the data source. For example, say the input data contains only the MPN and MfrName columns and the user wishes to append a Description column. The Data Append tool will allow the user to perform this task. The following process actions are performed to implement this tool:

1. When the user defines columns to add to the data set the Data Append tool will first create new columns to the data set and add those columns to the working part set table display.
2. Next, each part in the working part set that has been matched to the data source (either during the one-to-one match or by the Part Matcher) will be modified to contain the data. Data Append will accomplish this by performing a query on the part and adding the new data to the working part set via the provided API.

Parts that have not been matched to the data source will have values filled in the appended columns by other tools such as part matchers. Since the working part set API will be used each action of the Data Append tool may be undone.

An analysis tool plug-in can be implemented to provide the user with the ability to perform report type analysis on the selected parts in the working set. The plug-in will host a plug-in manager specifically for analysis plug-ins. The analysis tool provides ways for users to analyze one or more parts. For example, an analysis plug-in could be written that will analyze the total cost of a set of selected parts. The GUI for this plug-in will contain a pull-down list box that contains the available analysis tool names and a Run button. The user will select an analysis tool and press the Run button. The GUI pane for selected analysis will be displayed next to the above controls. The contents of this pane are controlled by the plug-in. The Analysis tool will perform an analysis on the selected parts in the working part set using a selected analysis plug-in. The output of the analysis will be defined by the analysis plug-in.

An example analysis plug-in is the Target Cost Rollup plug-in that will present the user with cost information for the parts in the working part set. The plug-in will identify and/or generate the elements described below:

Target Cost Objective: The user will be able to enter the target cost objective.

Figure 40A:
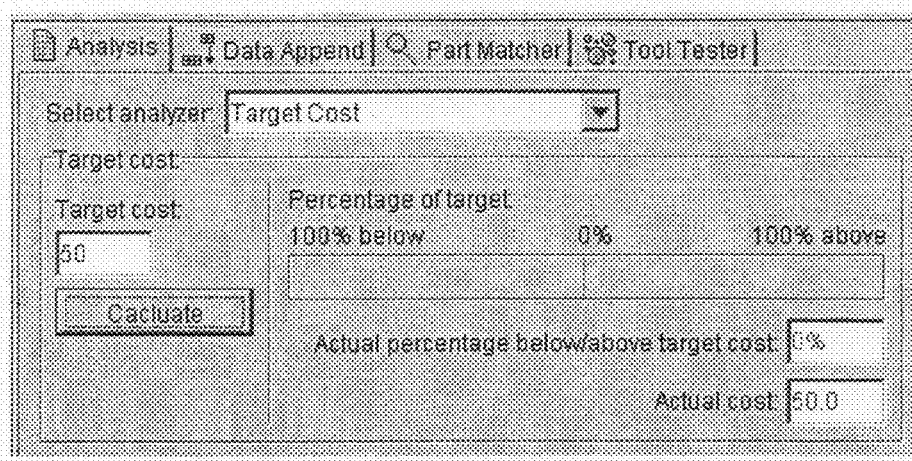
Figure 40B:
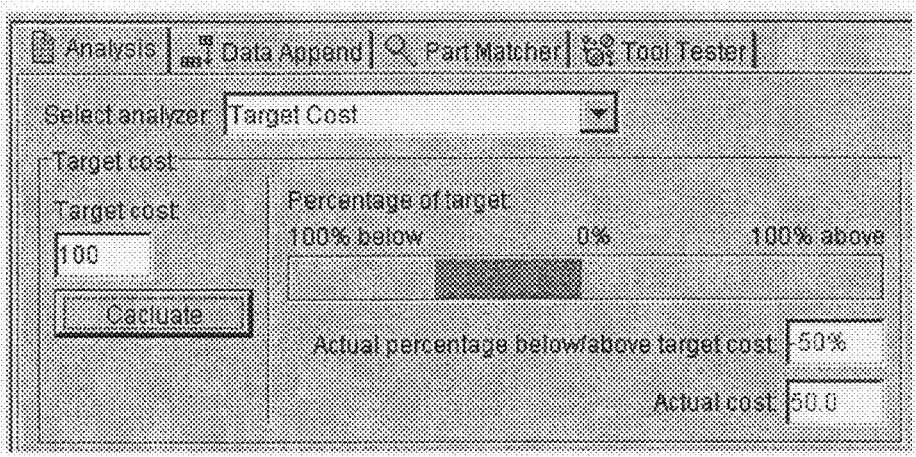
Figure 40C:
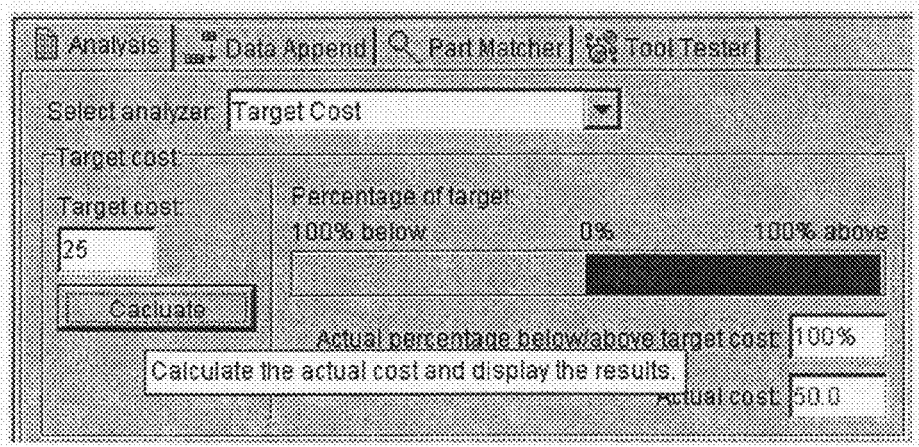

Objective Bar on UI: A control similar to a status bar will be used to display how close the total cost is to the target cost. The bar contains the range from −100% to +100% where 0 is in the middle of the bar. Where 0 represents the exact cost objective, −100% represents 100% under the objective and +100% represents 100% over the objective. The screenshots in FIGS. 40a-c show 3 samples of the objective bar. FIG. 40*a* shows the display when the cost is exactly on target. FIG. 40*b* shows a cost of −50% of the target cost. FIG. 40*c* shows a cost of 100% over the target cost.

Actual Percentage of Target: The actual percentage value (over or under the cost objective) will be generated and displayed if the user has the Actual Target Cost Percentage entitlement to display the value. If the user does not have this entitlement, neither the value nor value label will be displayed.

Actual Cost: The actual cost of the parts will be generated and displayed if the user has the Display Actual Target Cost entitlement. If the user does not have this entitlement, neither the value nor value label will be displayed.

A virtual column plug-in can be implemented that identifies and displays a user-definable grade for a part. One or more field formulas can be defined to contribute to each parts total grade. Example formulas are described below.

A Value Factoring Formula can be implemented for this plug-in to calculate a parts grade. This formula is available for all data type columns. Date data type column values are converted into the number of days from the date value to the current date. String values are converted to float type values. If they are not valid float number then the value is not graded.

When a high number is considered better than a low number the formula is as follows:

TotalPoints=(PercentOfTotal/100)*TotalPartGrade

Grade=FieldValue*(TotalPoints/HighestExpectedValue)

When a low number is considered better than a high number the formula is as follows:

TotalPoints=(PercentOfTotal/100)*TotalPartGrade

Grade=TotalPoints−(FieldValue*(TotalPoints/HighestExpectedValue))

The user can specify a flag indicating that zero values should not be graded. This can avoid creating a high grade when a low value is considered better than a high value. For example, when grading based on part cost a value of zero would indicate the part is free and therefore create a very good grade. This flag works in conjunction with the flag indicating that high values are better than low values. If a value is zero and zero values should not be graded the grade is calculated as follows:

If HigherIsBetterThanLower
Grade=0
Else

Grade=(PercentOfTotal/100)*TotalPartGrade

A Range Check Formula can be implemented for this plug-in to calculate a parts grade using a range of numbers. This formula is available for all data type columns. Date data type column values are converted into the number of days from the date value to the current date. String values are converted to float type values. If they are not valid float number then the value is not graded.

The formula is as follows:

If FieldValue<=FormulaValue_1 then
   Grade=FormulaPoints_1.

Else if FieldValue=<FormulaValue_n then
   Grade=FormulaPoints_n

Else

Grade=FormulaPoints_n

A value set formula can be employed that assigns a parts grade using a set of key values. This formula is available for all data type columns.

The formula is as follows:

If FieldValue==FormulaValue_1 then
   Grade=FormulaPoints_1

Else if FieldValue=FormulaValue_n then
   Grade=FormulaPoints_n

Else

Grade=FormulaPoints_n

Figure 41A:
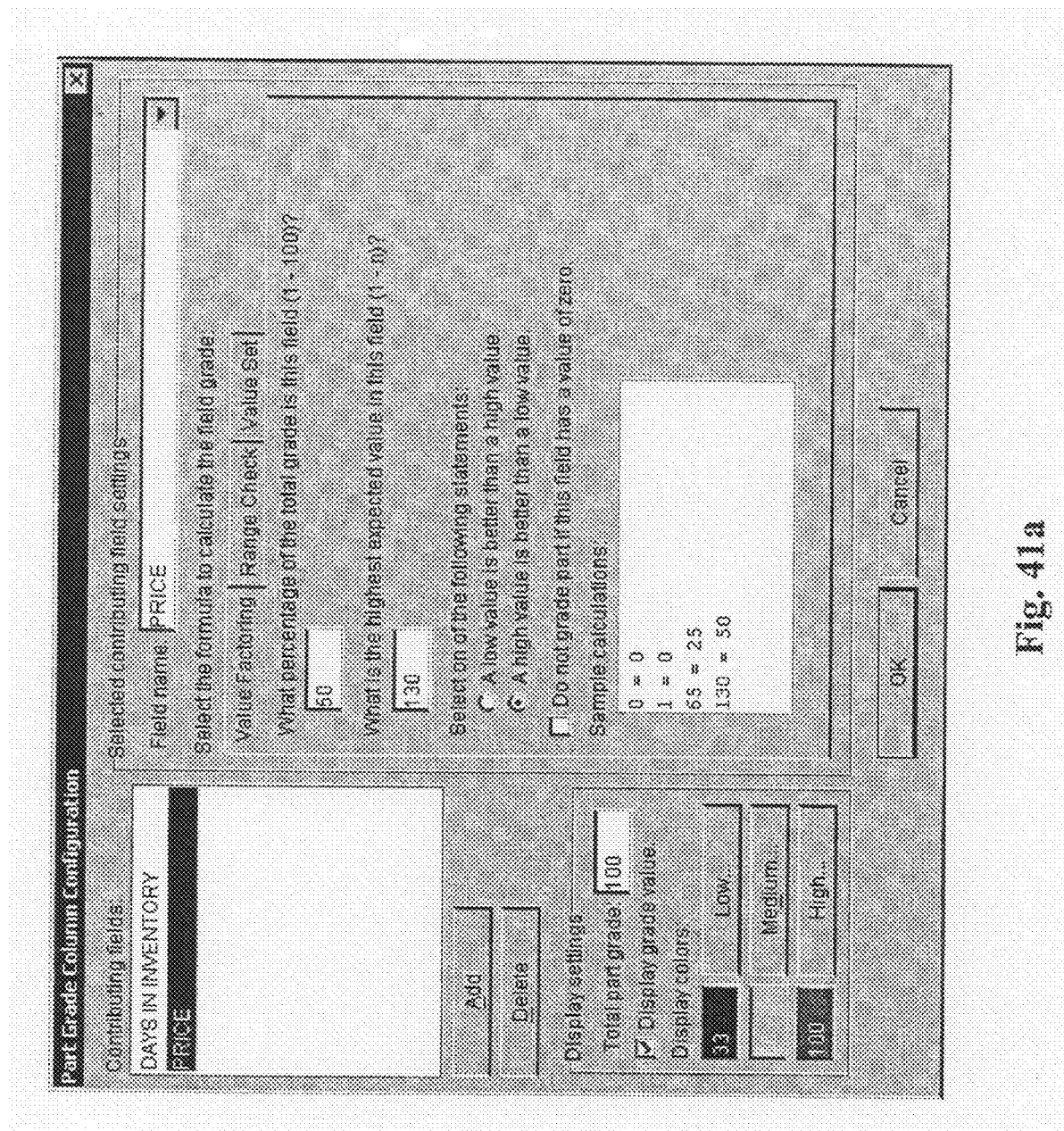

FIG. 41*a* shows an example interface for creating a custom column using the Part Grade plug-in for configuring how parts will be graded. In this example interface, the total part grade field is the highest grade that can be assigned to a part. The display grade value flag indicates that the actual grade value should be displayed in the table. Otherwise only the color will be displayed.

The display colors section contains samples of the colors used to display a low, medium and high part grade. The user can use the buttons adjacent to the sample color to change the display color for the custom column. The contributing fields list box contains the names of fields the user wishes to be graded to contribute to the total part grade. The Add and Delete buttons are used to add and delete contributing fields.

When a new contributing field is added or selected the fields defaults are shown in the Selected contributing field settings group box. The Field name field can be set by either typing a value in the field or selecting the pull-down list to choose a PDI field name. Allowing users to type in a value allows the Part Grade plug-in to grade values in BOM files or local databases without the field names being in the PDI taxonomy. Next, the user selects a formula tab for the formula they wish to apply to the field grade.

The figure shows the Value Factoring formula GUI. Answering the questions on this tab will collect the values needed for this formula as described earlier. Sample calculations are continually displayed based on the settings so the user can see how the answers are used.

Figure 41B:
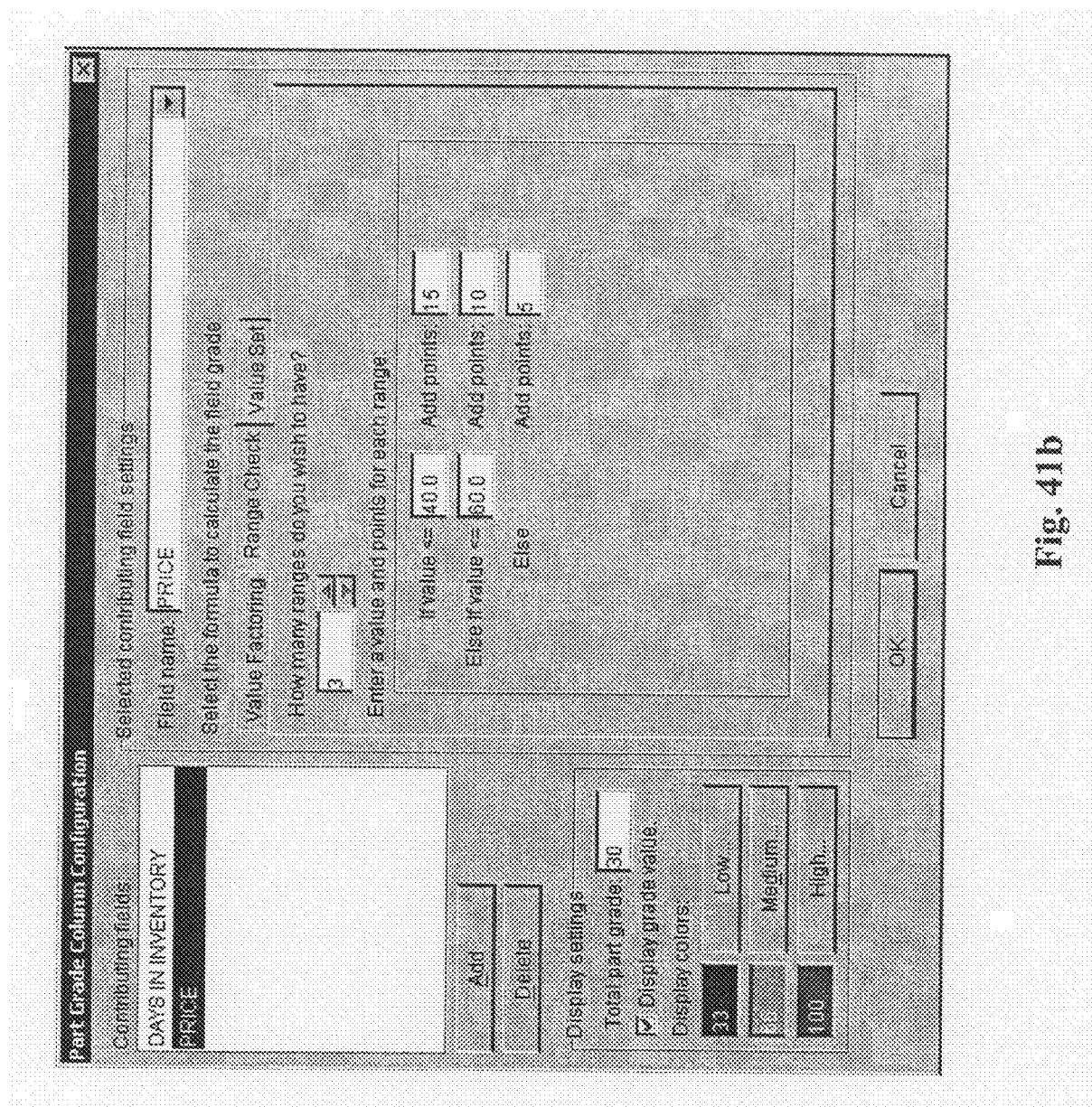

FIG. 41*b* shows the Range Check tab. The user changes the number of ranges they wish to define. This causes a set of dynamically created controls to appear in the scrollable panel. The user will define the value and points to assign.

Figure 41C:
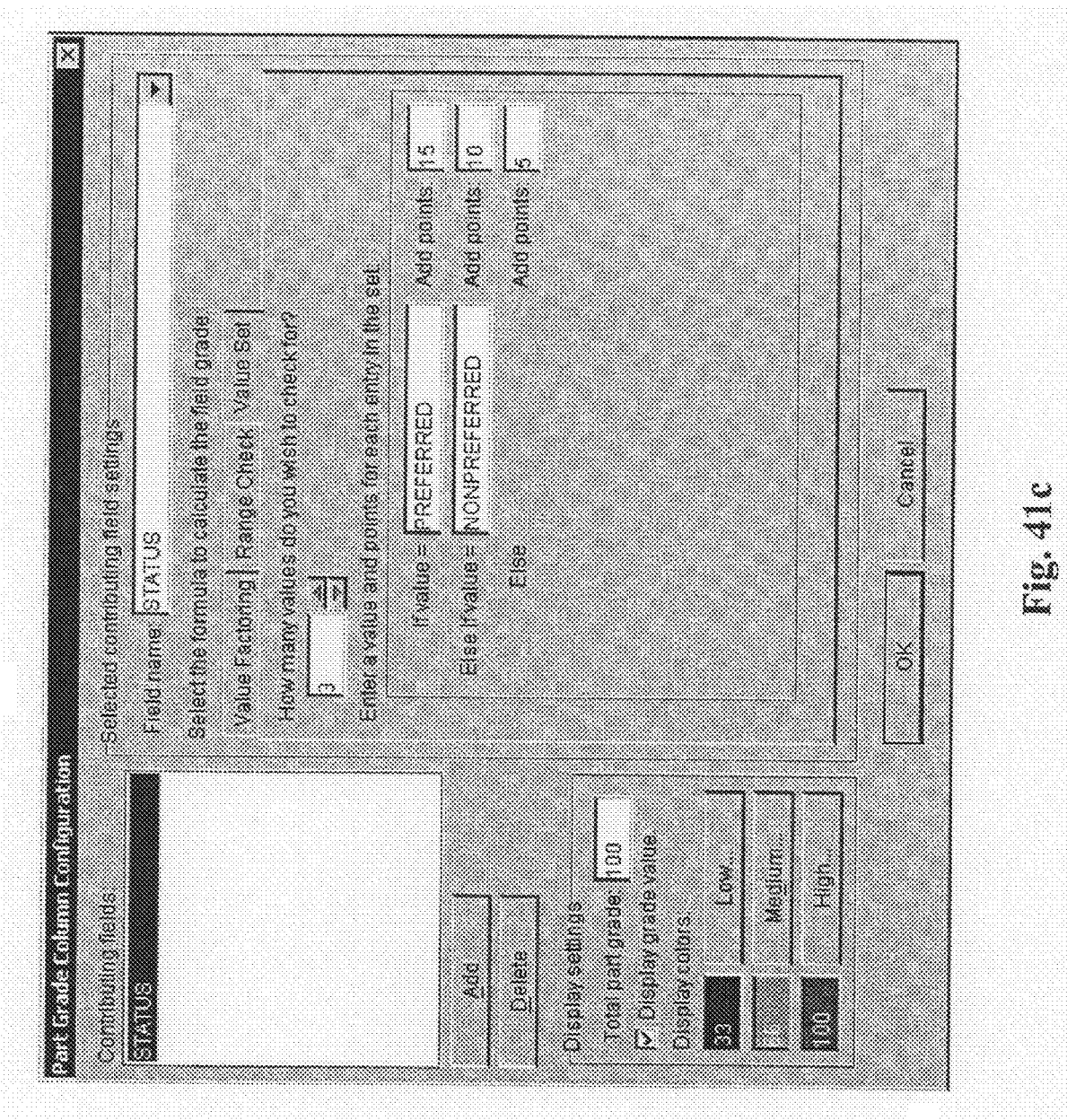

FIG. 41*c* shows the Value Set tab. The user can change the number of values they wish to define. This causes a set of dynamically created controls to appear in the scrollable panel. The user will define the value and points to assign for specific values.

SpinSelect

SpinSelect allows a user to search through a parts database to quickly find desired parts for a design. The process may be performed with a CAD tool and/or with a one-click symbol download to a schematic design. SpinSelect offers fast and easy information access for system design engineers and highly customizable features to increase productivity. Using SpinSelect in conjunction with other processes, such as SpinScrubber for example, improves the supply-chain readiness of a design, and reduces time consuming and costly design changes at a later stage. Functions performed by SpinSelect include parts searching and filtering; integrating with a CAD tool; and linking to a SpinCircuit database for requesting parts.

Comprehensive parts searching and filtering, including parametric, simple, and user-configurable searches, may be performed using SpinSelect. After completing the search, a user can further refine search results by specifying temporary or permanent filtering criteria. The search results can be used to provide a user with accessory information such as real-time pricing, availability, product change and obsolescence notifications, and technical support.

Integration with a CAD tool allows a user to find desired parts, then instantly download the part symbols to a schematic drawing. The user may specify the properties of the symbols to perform additional supply chain and business rule validation using processes such as SpinScrubber process for example.

Direct linking to a database, such as a SpinCircuit parts database, allows a user to request parts. If a desired part is missing from the parts database, the user can request the part to be added. For example, a SpinCircuit Content Services request may be made to add the desired part to the database. A user can also request modification of an existing part in the database. When the new or modified part is available, the user may be notified electronically, with e-mail for example.

Figure 42:
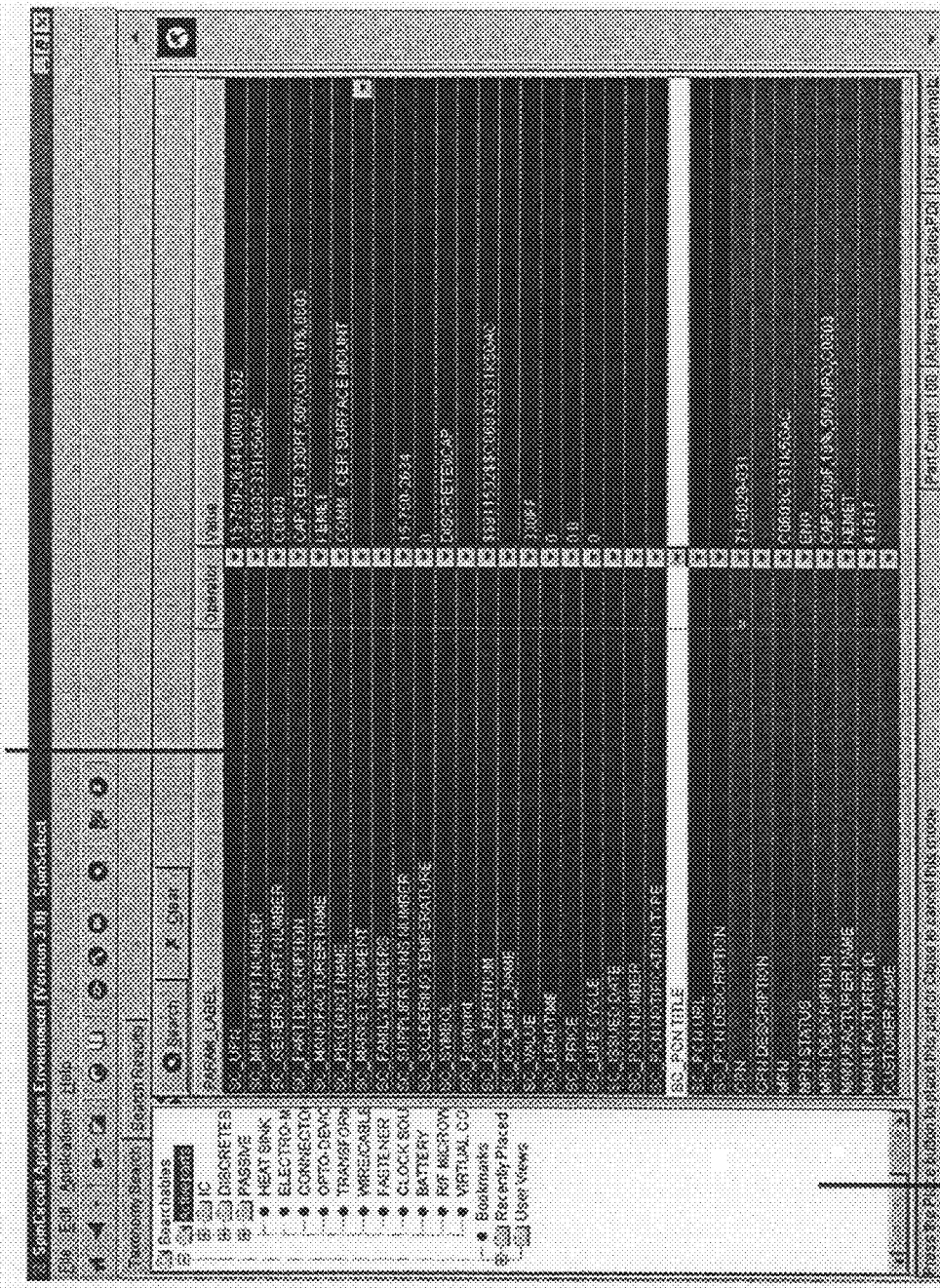

Functions that may be performed with a SpinSelect user interface is shown in FIG. 42, which may be executed as a standalone application or as a plug-in to a CAD tool. The user interface displays a window, including a Command Toolbar, a Taxonomy Search page, and a Search Results page, to the user.

The SpinSelect Command toolbar of FIG. 42 can contain icons which, when selected by a user, cause one or more commands to be executed. Examples of command icons and their corresponding commands include a View Business Rules button to allow a user to view the current applicable Business Rules; an Add Bookmark button to add a selected part to a bookmarked parts list; a Request New Part button to Request SpinCircuit to add a new part or symbol; and a Request Part Change button to Request SpinCircuit to modify a part or symbol, for example.

The Taxonomy Search pane of FIG. 42 allows a user perform advanced searches such as searching by component parameters or by predefined criteria. For example, two panes, such as the Taxonomy Tree pane and the Parametric Entry pane, are shown to the user to help the user create a search query.

The Taxonomy Tree pane of FIG. 42 displays hierarchical component categories, as well as a list of bookmarked parts, recently placed parts, and configurable search criteria. To expand or collapse any item in the hierarchy, a user may click the plus (+) or minus (−) signs in the tree, for example. The Parametric Entry pane displays a list of parameters associated with the component category selected in the Taxonomy Tree pane. A user can specify one or more parameters as search criteria.

Figure 43:
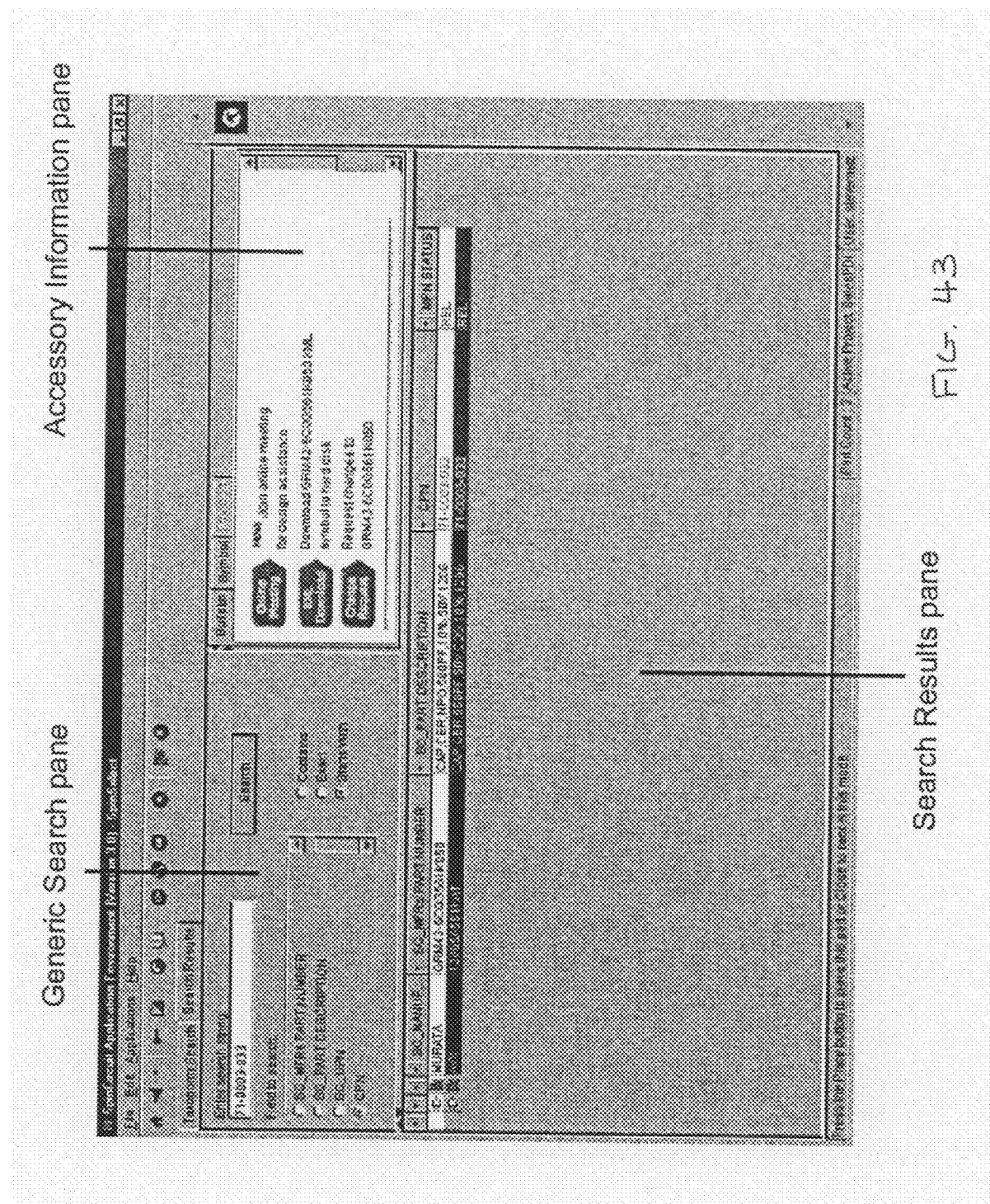

Component search results and accessory information related to components may be viewed on a Search Results page as shown in FIG. 43. This page may also be used to specify simple searches. For example, window panes, such as a Generic Search pane, a Search Results pane, and an Accessory Information pane, can be displayed to the user.

The Generic Search Pane can be used to specify simple searches such as searching by Manufacturer Part Number or Part Description, for example. A user may also specify whether the search should return exact or partial matches. The search results pane displays the matching parts based on the last search criteria. Each matching part has attributes such as a Manufacturer Name, a Manufacturer's Part Number, or a link to datasheet. The user can sort and filter the list of matching parts. The Accessory Information pane displays dynamic information related to a single selected part in the Search Results pane. This information includes product change or obsolescence notifications, pricing and availability, and access to application support personnel, for example.

SpinSelect provides several powerful and flexible ways for users to search for parts. For example, searches may be created and modified depending on what type of parts a user is searching for, and what information the user already has about the parts.

Searching by parameters may be performed if a user already knows the specific component category and parameters of the desired parts. For example, a user could create a detailed search for a specific type of capacitor by providing the capacitance value, tolerance, and operating voltage in the search parameters. Searching by bookmarks can be performed to quickly access bookmarked parts. Searching by recently placed parts may be used to quickly access previously placed parts. For example, the process can save several of a user's most recently placed parts. User views contain search criteria that are user-defined, such as specific component categories and parameters. Searching with user views allows the user to apply the same parametric search multiple times. For example, the user can configure a user view that includes a predefined search. A generic search is useful if a user wants to specify a single search criteria, such as the Manufacturer's Part Number or the Part Description for example typed.

The search methods may use "Contain" or "Exact" parameters. The Contain command searches the description of a part for words beginning with user specified word fragments. The user can search for more than one word fragment by separating each word fragment with a space that represents a logical OR. For example, searching for CER CAP would return parts with descriptions such as CERAMIC CAPACITOR or CAP,CER. This query is same as a query for CER*CAP*. The Exact command searches the description for words that match the exact words specified by the user. The user can search for more than one word by separating each word with a space, which represents a logical AND. For example, searching for CAPACITOR CERAMIC would return parts with descriptions such as CERAMIC CAPACITOR or CAPACITOR, CERAMIC. The table below shows search results based on the following six part descriptions:

CAP,TANT,47UF,6.3V,20%,C
CAP,TANT,47UF,20V,10%,E
CAP,TANT,33UF,16V,20%,D
CAP,TANT,330UF,6.3V,10%,E
CAP,TANT,4.7UF,35V,20%,RDL
CAP,TANT,2.2UF,20V,10%,T

| Search String | Search Method | Matches |
| --- | --- | --- |
| CAP TANT 70% | Contains | CAP, TANT, 47UF, 6.3V, 20%, C |
| | | CAP, TANT, 47UF, 20V, 10%, E |
| | | CAP, TANT, 33UF, 16V, 20%, D |
| | | CAP, TANT, 330UF, 6.3V, 10%, E |
| | | CAP, TANT, 4.7UF, 35V, 20%, RDL |
| | | CAP, TANT, 2.2UF, 20V, 10%, T |
| CAP TANT 70% | Exact | none |
| CAP TANT 20% | Contains | CAP, TANT, 47UF, 6.3V, 20%, C |
| | | CAP, TANT, 47UF, 20V, 10%, E |
| | | CAP, TANT, 33UF, 16V, 20%, D |
| | | CAP, TANT, 330UF, 6.3V, 10%, E |
| | | CAP, TANT, 4.7UF, 35V, 20%, RDL |
| | | CAP, TANT, 2.2UF, 20V, 10%, T |
| CAP TANT 20% | Exact | CAP, TANT, 47UF, 6.3V, 20%, C |
| | | CAP, TANT, 4.7UF, 35V, 20%, RDL |
| | | CAP, TANT, 33UF, 16V, 20%, D |

After a search is completed, the matching parts are displayed in the Search Results pane. A status bar may show the number of matching parts found. The user can modify the view of the search results so that desired information is quickly accessible.

A basic view of search results can include a display of information for each matching part in columns such as, for example, New Part Introduction Status; Symbol Availability Status; Datasheet/Collateral Availability Status; Configurable Column; Generic Part Number; Manufacturer's Name; Manufacturer's Part Number; or Part Description. The user may add columns to show more information about matching parts. The user may also remove a column, move a column, change a width of a column, or sort the search results by column.

A filter may be applied to the search results to locate specific parts. For example, a user can filter matching parts to show those that contain a particular value, such as all parts made by a particular manufacturer. The parts may also be filtered to show those parts that match several different values. For example, a filter could be set to show all parts made by two different manufacturers. The matching parts may also be filtered to show those parts that do not contain a particular value. For example, a filter may be used to show all parts that are not made by a particular manufacturer.

After a user has sorted and filtered the matching parts returned from the search, the user may select a part. For example, a click of an input device when a cursor is in a row of a desired part may be performed to select the part. Additional information about this part may be displayed. The user can place a symbol for this part onto the schematic design in a CAD tool, or use this part's parameters to create a more refined search for similar parts. Additional functions may be performed with the selected part.

For example, the Accessory Information pane, which can contain the Bulletin Board, Symbol, and Footprint pages, may be viewed for the selected part. The Bulletin Board page displays dynamic information related to a single, selected part in the Search Results pane. Clicking a button in this pane launches a web browser to display dynamic information pertaining to this part. The Symbol and Footprint pages are accessible when a graphical view of the logical symbol and the physical footprint for the selected part are available. The selected part may be bookmarked to quickly access it at a later time.

If a desired part is not found in a parts database, or if the part needs to be modified to be used in a design, the user can request a new part to be added, and can review existing parts for modification.

The user can replace a part in a schematic with a part from the parts database. The user can then verify a part to validate the part from the CAD tool, and replace only the parametric annotation of the part.

The user can configure CAD mapping, business rules, bookmarks, generic search, custom column, symbol field and color display options. For example, CAD mapping options may be set to allow a scrub process to be performed on a schematic containing parts placed from a SpinSelect process. Both SpinSelect and SpinScrubber process processes allow the user to choose which parameters are attached as properties to a symbol when placed in a schematic, and whether these properties are used for scrubbing. CAD Mapping Properties can also be used in the generation of a BOM in a SpinScrubber process (each mapped property becomes a column in the BOM). SpinSelect and SpinScrubber process processes also allow the user to create rules regarding which parts should be used when searching parts and scrubbing designs.

These business rules reduce the chance of using unapproved or undesirable parts. Business rules are also useful for catching design violations. Unlike filters, business rules are permanent and are applied before the search returns results.

SpinScrubber

SpinScrubber allows a user to validate the integrity of CAD designs and prepare them for the supply chain. SpinScrubber process may be integrated with a CAD tool, and link directly to SpinSelect.

SpinScrubber imports an existing CAD design and validates multiple factors of design rule integrity. Inconsistencies between Manufacturer Part Numbers (MPNs), values (associated with respective MPNs), and business rules (that may be assigned to a project) are highlighted. Errors can be corrected and back annotated to the CAD design. SpinScrubber also assists in converting CAD designs into supply-chain ready Bills of Materials (BOMs). SpinScrubber integrates with SpinCircuit by offering several features, such as: One-step linkage to SpinSelect for searching components by description, Mfg name, or MPN; and one-step linkage to SpinDirector for uploading and downloading documents, storing or sharing files in a repository, and sending notifications to users related to projects, for example.

Figure 44:
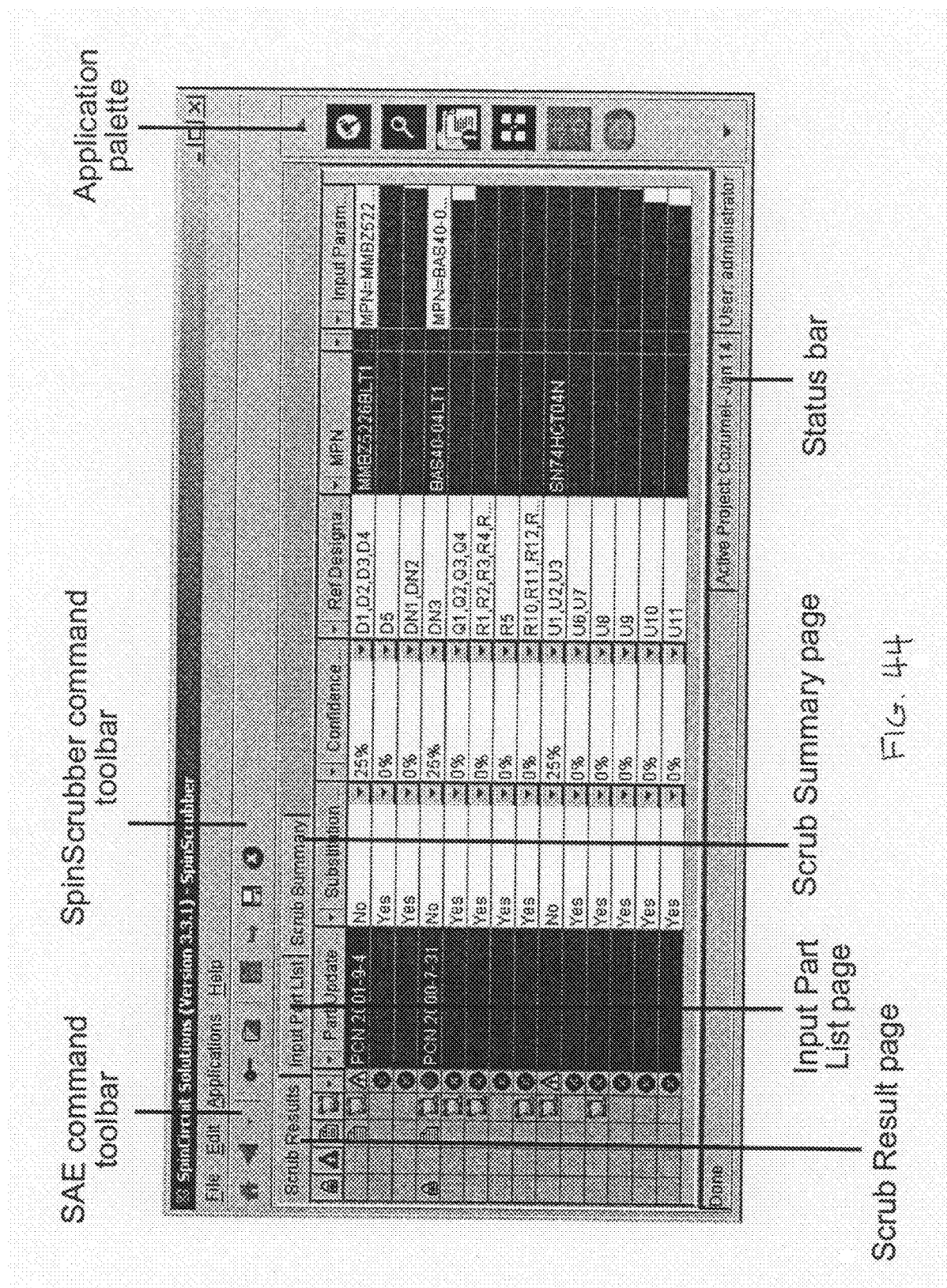

A scrubber interface as shown in FIG. 44 for example may be displayed in a SpinScrubber main window, which may include the command toolbar, the Input Part List page, the Scrub Result page and the Scrub Summary page, for example. The Specify Properties for Scrubbing window is part of the SpinScrubber interface and is accessed from a CAD tool.

The SpinScrubber main window opens when scrubbing is complete, and the Scrub Result page is displayed. The results page displays the SAE command toolbar, the Application palette, and the status bar. The SpinScrubber command toolbar can contain buttons for accessing frequently used SpinScrubber process commands. The Input Part List page shows the parts list passed to SpinScrubber. The Scrub Result page can contain details of the scrubbing results. The Scrub Summary page displays a summary of the scrub result.

The SpinScrubber command toolbar gives the user convenient access to frequently used commands in the SpinScrubber application. For example, the toolbar can contain command buttons such as: a Start Scrubbing button to start scrubbing using the selected scrub configuration; an Update Schematic button to update the schematic; a Publish BOM button to save result and publish a BOM; and a Cancel button to cancel the current mode and close the process.

The Input Parts List Page as shown in FIG. 45 is a view-only page that provides details on each part in the design being scrubbed. The Input Parts List page may contain the following columns: a Line column that displays the line item number; a Ref. Designator column that displays the reference designator of each part in the design; a UPN column that displays the SpinCircuit Universal Part Number column; a CPN column that displays the Company Part Number or Internal Part Number; a Symbol Name column that displays the symbol name of the part; and an Input Parametrics column that displays the parameters chosen in the CAD Mapping properties.

Figure 46:
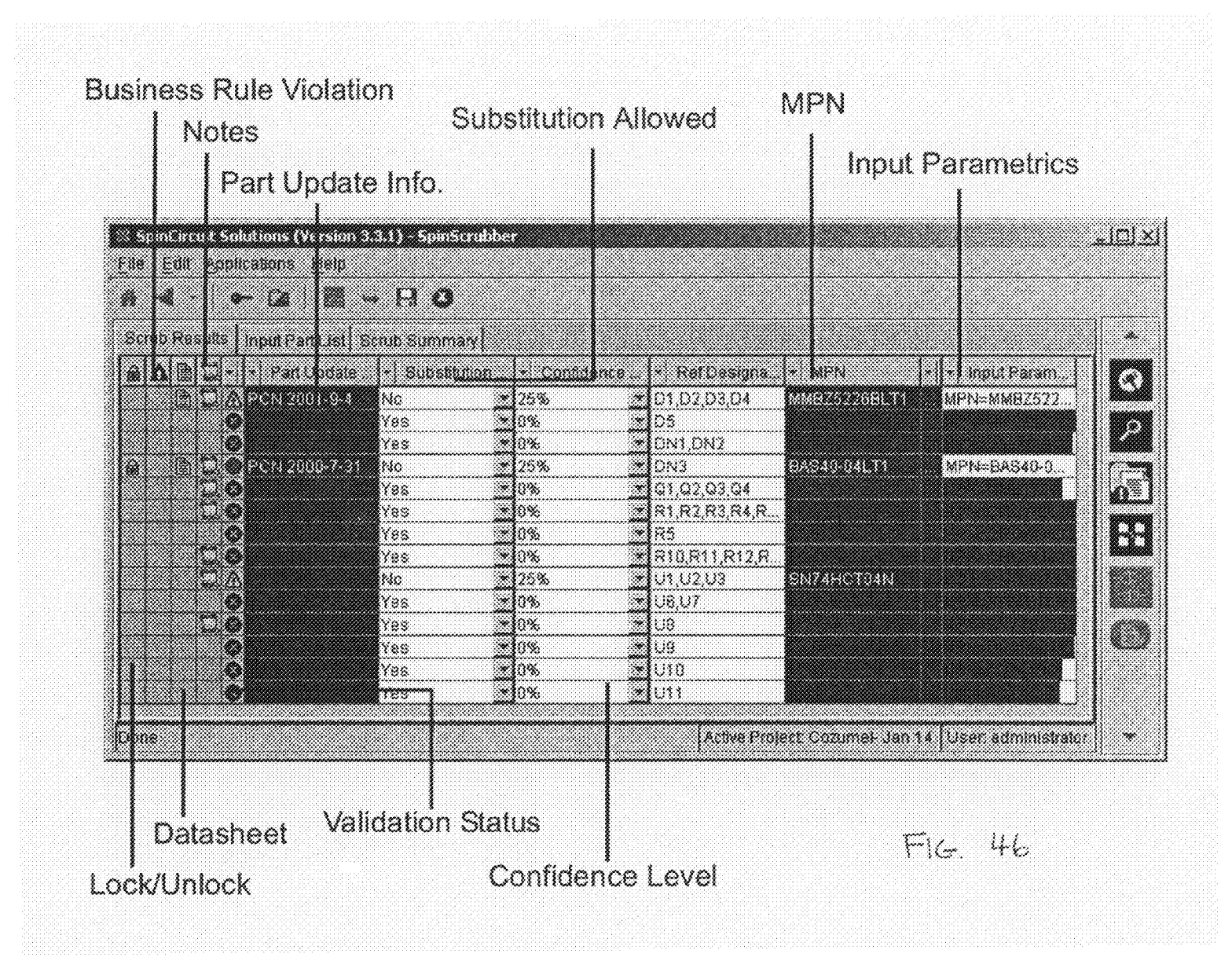

The Scrub Results page as shown in FIG. 46 opens when scrubbing completes. It displays parts matched in the parts database and any inconsistencies between MPNs, part values and with business rules. This page can contain several columns which display information, such as icons, about the scrubbed parts.

A Lock/Unlock column may display a Locked part icon that indicates the correct matching of the part and its attributes in the parts database. No icon indicates that the part needs re-scrubbing. A Business Rule Violation icon indicates that the part violates current business rules. No icon in the business rule violation column indicates that the part does not violate current business rules. A Datasheet availability column displays a supported link to datasheet URL icon, which indicates that a datasheet is available for the part. No icon Indicates that no available datasheet. A Notes icon indicates that text comments exist for the part.

Several icons may be used to provide information about the part's Validation Status. A Part found icon indicates a match occurred in the parts database with no errors and that attributes align with the part. An Alert icon indicates a match occurred in the parts database, but a problem exists. An Error icon indicates no match occurred in the parts database. A Property changed icon indicates a change in a property of the part. A Locked part icon indicates a previously locked and unscrubbed part.

A Substitution Allowed column, if marked Yes, indicates that the part in the schematic can be substituted. A Confidence Level column indicates a Percentage value representing a confidence level in a part. A Part Update Information column indicates that the part has update information on Part Change Notifications (PCNs) and End of Life Notifications (EOLs). This may hyperlink to a browser window containing details on the PCNs and EOLs. An Input Parametrics column displays the attributes that are aligned with a specific MPN. Differences between the MPN and an attribute may be highlighted.

Figure 47:
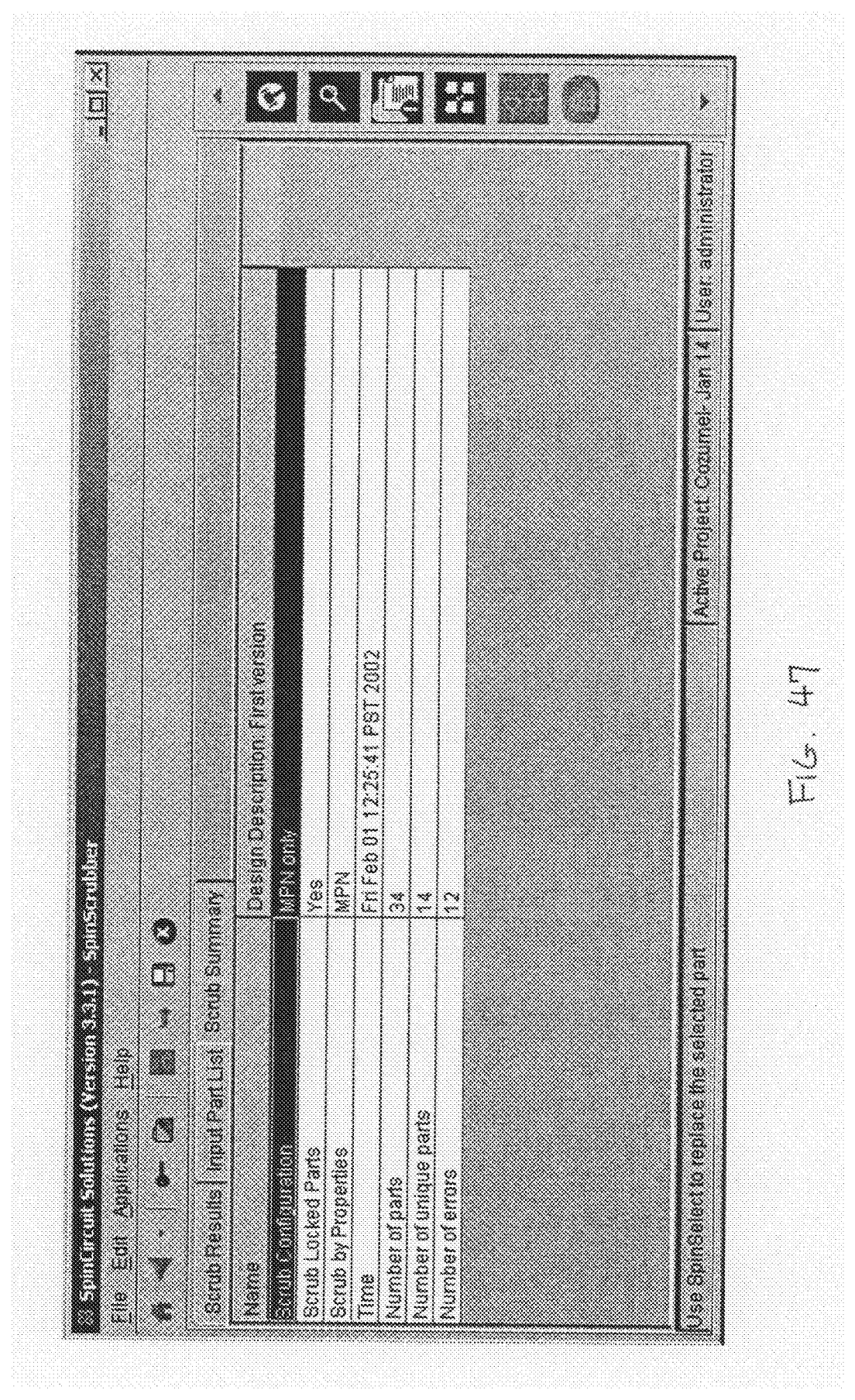

A Scrub Summary Page as shown in FIG. 47 is a view-only page that displays a summary of the most recent scrub results. A Scrub Configuration row displays the name of the scrub configuration used. A Scrub locked parts row indicates whether the user specified that locked parts be scrubbed. A Scrub by properties row displays the part attribute(s) searched for in the parts database by the current scrub configuration. A Time row displays the date and time of the scrub. A Number of Parts row displays the total number of parts imported into the SpinScrubber from the CAD design. A Number of Unique Parts row displays the number of unique parts imported into SpinScrubber from the CAD design. Parts placed multiple times in the design are defined as one unique part number. A Number of Errors row displays the number of errors found in the scrubbed design.

Scrubbing involves searching the parts database for each part in the design, using one or more part attributes as a reference. When an exact match occurs, SpinScrubber further validates the matched part by checking specific part attributes for correctness. The reference attributes and those used for further validation are specified by the user in the Scrub Configuration window.

Figure 48:
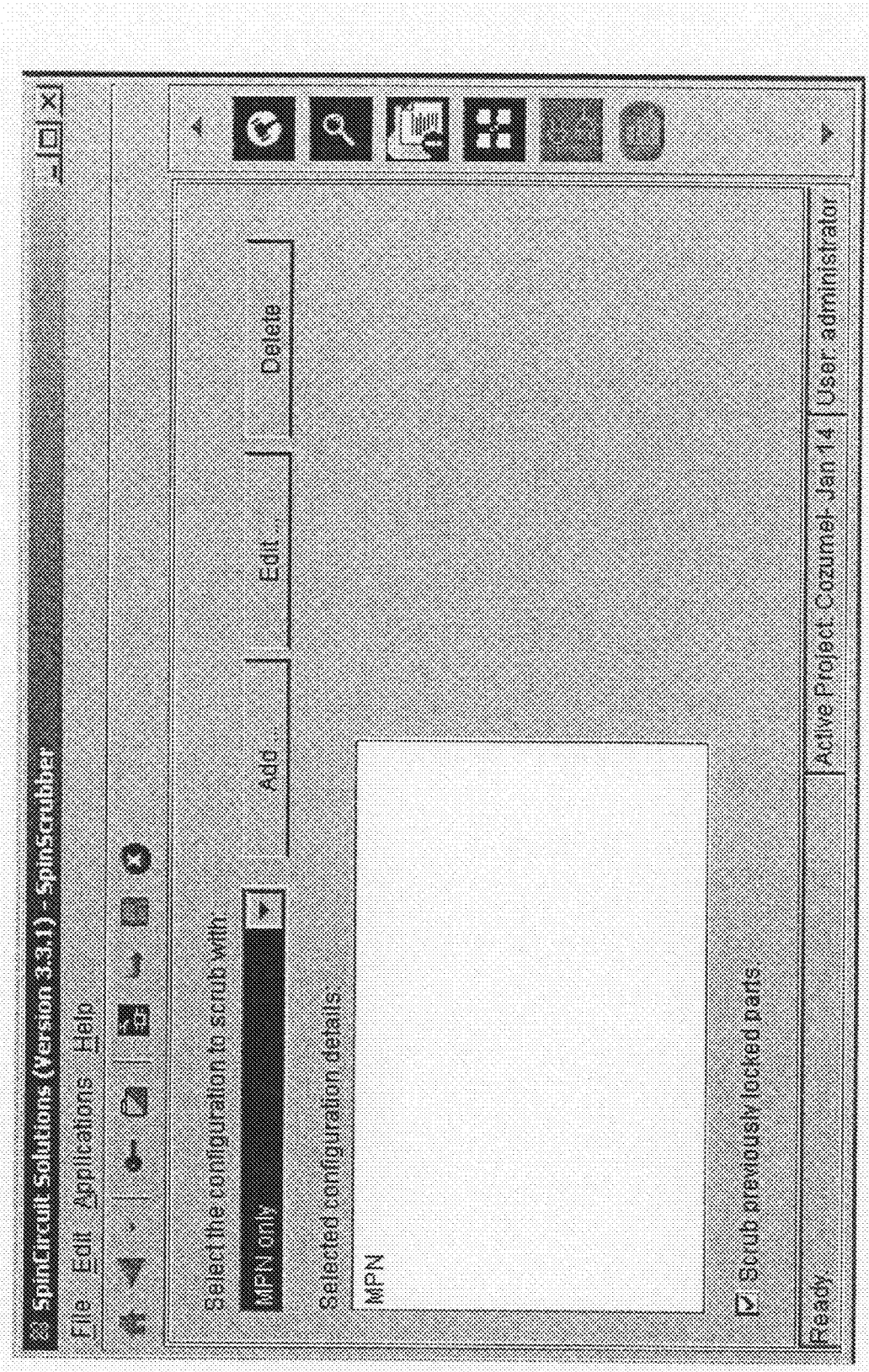

The Scrub Configuration window as shown in FIG. 48 opens when the user initiates a scrub from a CAD tool. This window allows a user to select the properties used for scrubbing a design. A Select Scrub configuration list displays the name of the current scrub configuration, and allows a user to select a different scrub configuration. An Add button field allows a user to add a new scrub configuration to the Select scrub configuration list. An Edit button allows a user to edit the current scrub configuration. A Delete button deletes the selected scrub configuration. A selected configuration details field shows the CAD mapping properties for the selected scrub configuration. The user can edit these properties using the Edit button. A Scrub previously locked parts check box specifies whether to re-scrub parts previously matched and locked.

Before scrubbing, the user can specify options such as which attributes SpinScrubber will scrub against, the business rules the design must follow and the output color display options. The user can also add custom columns to display in the Search Results page.

The user can specify the items which SpinScrubber scrubs against in the CAD by mapping properties of SpinSelect. These items populate the CAD mapping properties lists in the Adding a new scrub configuration and Editing scrub configuration windows in the Scrub Configuration window. Items selected in the CAD Mapping properties may be used in several areas. For example, mapped outputs may later be made available for generating a BOM. Mapped outputs can be made visible in a schematic, and back-annotated into the schematic design with existing properties and any new mapping. Mapped outputs can also be scrubbed against by SpinScrubber.

Business rules can be assigned to a project. If a design is in violation of any assigned business rule, SpinScrubber displays the Business Rule Violation icon in the Scrub Results page. The business rules may be shared with SpinSelect and can be set up using either SpinSelect or SpinScrubber. For example, a business rule can be created, where MPNs associated with a Part Change Notification (PCN) URL or End of Life Notification (EOL) URL are violations. Using this business rule, MPNs associated with PCNs or EOLs will be highlighted after the scrub.

To scrub a design, the user launches SpinScrubber from the CAD tool. SpinScrubber can link to SpinDirector. The user can scrub design files or individual schematics. The Scrub results generated from the CAD design will report on: Business rule violations; Multiple matches to parts; Incorrect part attributes; and Impartial MPNs. After correcting errors and editing parts in the scrub results, the user may update the design schematic with the changes. This is referred to as back-annotating. If multiple matches occur for a given part specification, SpinScrubber generates a list of these parts. The user can select a part from this list to replace the current part.

After a CAD design has been scrubbed and fully validated, the user can generate a BOM from the design or save the scrub results. The scrub results contain all columns displayed in the Scrub Results page. The BOM output can contain the following columns: Part Status; Valid; ValidSource; PPTStatus; Notes; Package Name; and Input Parametrics, for example.

SpinDirector

SpinDirector allows a user to manage design files related to projects and direct these files to other applications. Using SpinDirector, the user can securely share design files with other authorized users to facilitate collaboration. SpinDirector's integrated notification capability keeps project members informed of changes to project files. The user can also launch other applications and services from SpinDirector to obtain supply-chain services. SpinDirector features include improved file management, integrated notification, and convenient interface to services.

To improve file management, SpinDirector sets up a centrally located virtual folder environment on a PDI for users to store project-related folders and files. Only users who are members of a project have access to the folders and files belonging to that project. Users can create new subfolders and upload and download files.

With integrated notification, users can send notifications to other project members regarding recent file changes. For example, other users receive notification when a user uploads a revised version of a file or when a response to a file becomes available.

The convenient interface to services allows users to send project files as input to other applications or supply-chain service providers. For example, a user can send a project bill-of-material (BOM) file to services that return Price & Availability Optimization and Design-for-Manufacturability Grading.

Figure 49:
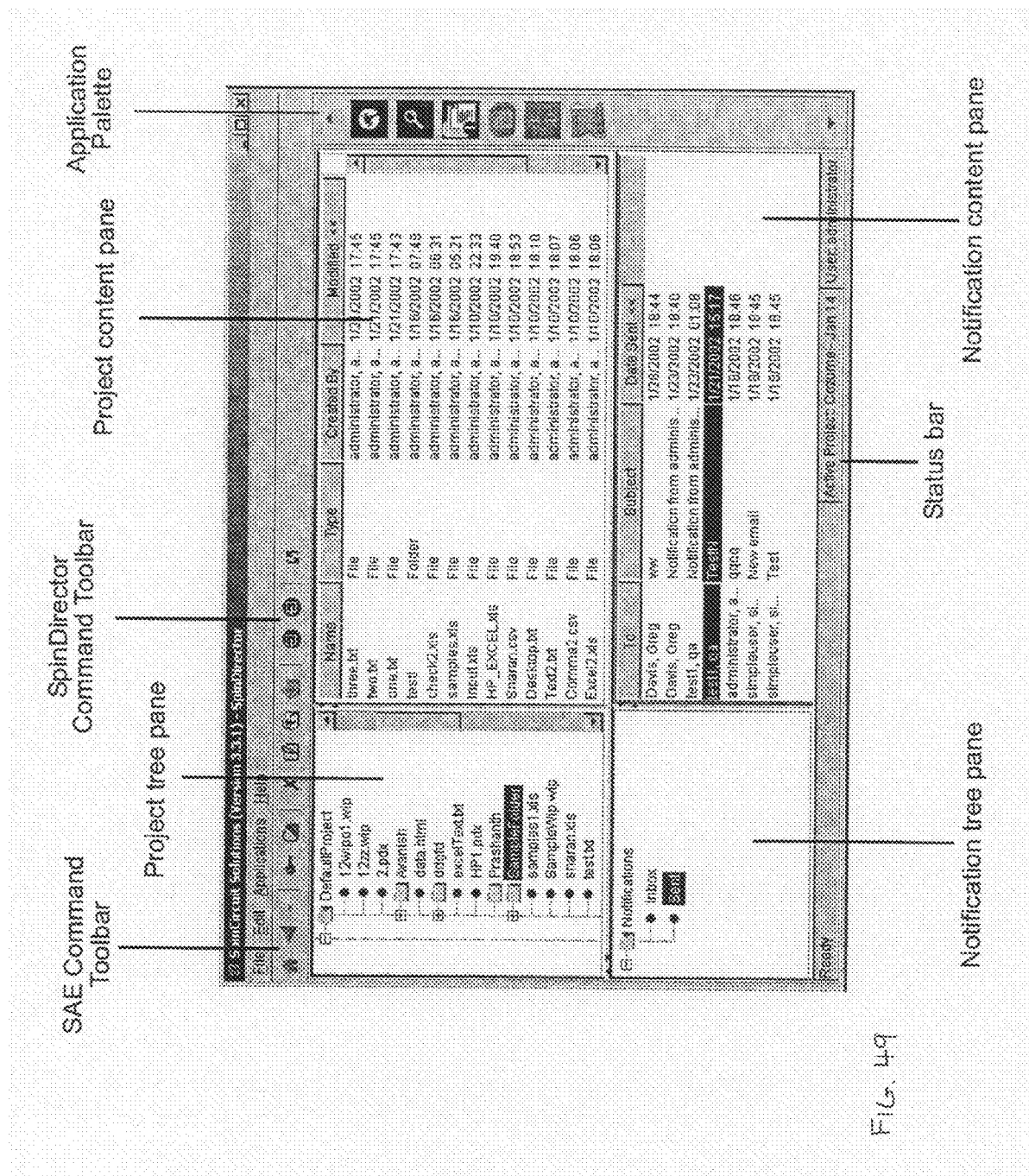

SpinDirector may be integrated with other SpinCircuit tools, such as the SpinCircuit Application Environment (SAE), SpinScrubber, SpinConnect, etc. SpinDirector, as shown in FIG. 49, provides a user interface with intuitive navigation. SpinDirector, by integrating with SpinScrubber, provides a method for receiving validated BOM files. In addition, SpinDirector, in integrating with SpinAdmin, provides a method for managing user access to projects. Further, SpinDirector, by integrating with SpinMatcher, SpinConnect, and SpinServices, provides a method for launching and sending input files to these applications and saving the results generated from these applications.

SpinDirector main window includes the command toolbar, the project and notification tree and content panes, the application palette, and the status bar. The SpinDirector Command toolbar gives the user convenient access to frequently used commands in SpinDirector. The SAE Command toolbar can contain buttons for accessing SpinCircuit Application Environment (SAE) commands. The SpinDirector Command toolbar can contain buttons for accessing frequently used SpinDirector commands.

The Projects tree pane shows the hierarchical structure of projects, folders, and files. The Project content pane Shows detailed content of the selected project or folder in the Projects tree pane. The Notifications tree pane shows the notification folders. The Notifications content pane shows detailed content of the selected folder in the Notifications tree pane. The Status bar shows the current active project and user. The Application palette can contain buttons for accessing other SpinCircuit tools.

The Project and Notification panes display the current user's projects and notifications. SpinDirector displays all the projects the user belongs to, regardless of the active project selected. The notification panes display notifications the current user has received or sent. To browse the project or notification tree panes, collapse and expand the tree by clicking the minus (−) or plus (+) sign next to folders that contain additional items. Right-clicking on a folder or file allows the user to select from a list of available actions, such as Create (new folder/file), Send Notification, and Retrieve Notification. The user can sort items in the project or notification content panes by clicking on a column heading. Click the column heading again to toggle between ascending and descending order. The arrows to the right of the column heading show whether the sort is ascending or descending. For example, clicking the Created by column heading in the Project content pane sorts all items in descending order by their creator. The user can also change the column width by clicking and holding the edge of the column, and dragging to resize, or the user can move the column by click and holding the column and dragging it before or after another column.

SpinMatcher

SpinMatcher allows a user to validate the integrity of Bills of Materials (BOMs) by comparing Manufacturer Part Numbers (MPNs) from input BOMs and verifying that the MPN is correct and the part is orderable. SpinMatcher also allows a user to compare Customer Part Numbers (CPNs) and generate associated MPNs from referenced data sources.

SpinMatcher accelerates the validation and optimization for New Part Introduction (NPI) processes by transforming an "unclean or supply chain blind" BOM output into clean, orderable part numbers and relevant supply chain information. For example, SpinMatcher can alleviate supply chain problems such as input MPNs with inconsistent punctuation, MPNs with incomplete suffixes, incomplete MPNs, and CPNs with no matching MPNs for example.

To address input MPNs with inconsistent punctuation, SpinMatcher uses a fuzzy logic query intelligence to eliminate incorrect spaces, slashes, and dashes in MPNs. The resulting MPN is an EDI orderable part. For example, SpinMatcher can match the MPN CRCW1206-001-FT with CRCW1206-001F-T using fuzzy logic.

If MPNs have incomplete suffixes, SpinMatcher uses wildcard searching and "trimming" to find available suffixes and prefixes for incomplete MPNs. For example, SpinMatcher can find matches for the MPN XXXXXXJATMA by trimming off the last two characters. Examples of MPNs found in this search could be XXXXXXJATRA, XXXXXXJAT2A, and XXXXXXJAT1A.

Incomplete MPNs (any portion) can be addressed by SpinMatcher by linking to SpinSelect to allow wildcard searching for incomplete MPNs. For example, a wildcard search such as CR21*E*471 may be used when searching for the MPN CR21E471 matches MPNs CR21EZFX471, CR21EZFXH471, and CR21EZ471.

If CPNs have no matching MPNs, SpinMatcher allows users to reference MPNs to associated CPNs.

Figure 50:
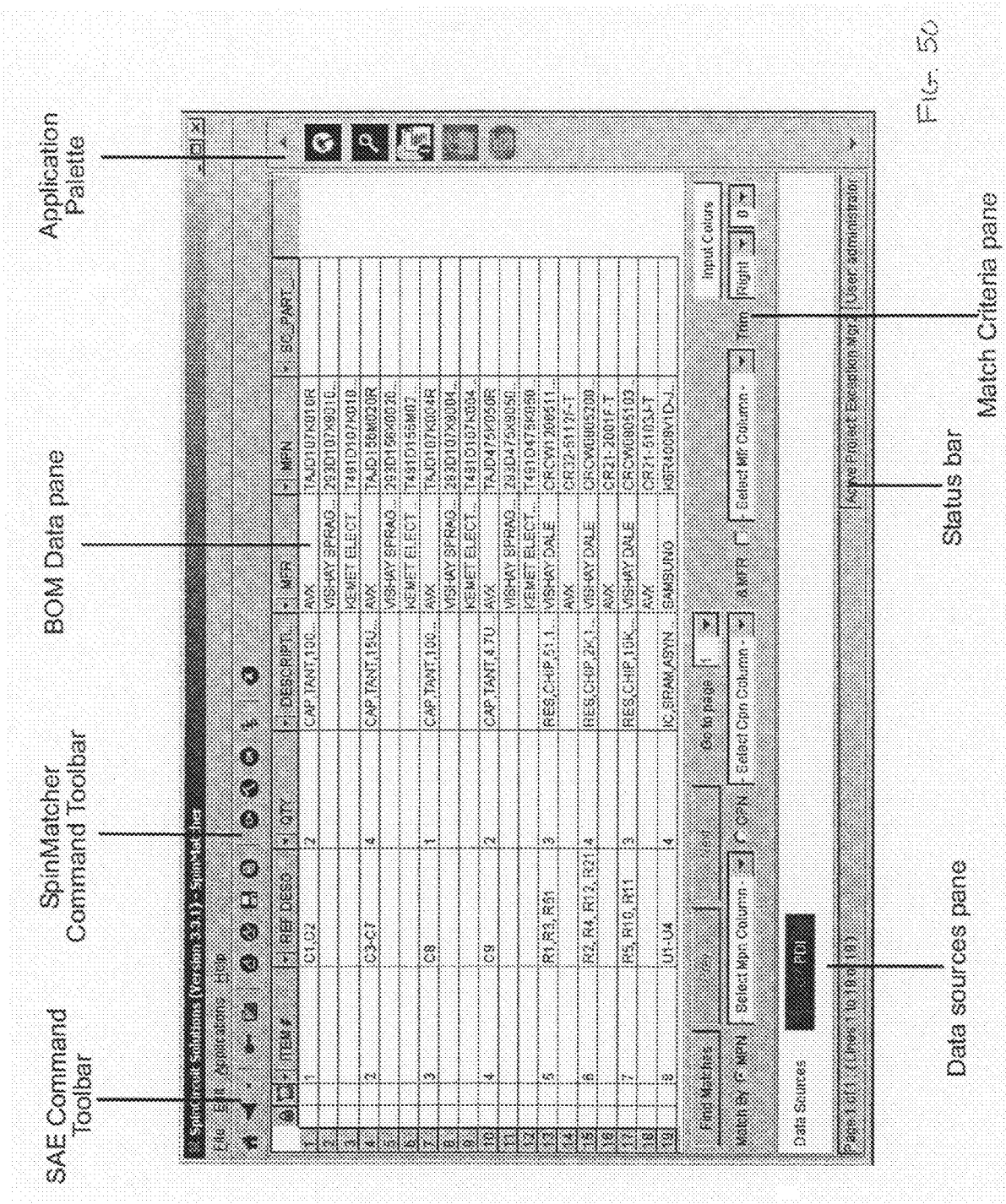

To access SpinMatcher, a file for the matcher process may be selected in SpinDirector. The SpinMatcher main window as shown in FIG. 50 includes the SAE command toolbar, the Match criteria and Data sources panes, the SpinMatcher command toolbar, the application palette, and the status bar.

The SAE Command toolbar contains buttons for accessing SpinCircuit Application Environment (SAE) commands. The SpinMatcher Command toolbar can contain buttons for accessing frequently used SpinMatcher commands. The BOM data pane shows a column-by-column representation of the input BOM file. Match criteria pane Allows a user to set specific match criteria for the columns displayed in the BOM data pane, and change input data column colors. The Data sources pane shows the data sources referenced by the BOM file. The Status bar shows the current active project and user. The Application palette contains buttons for accessing other SpinCircuit applications or plug-ins.

The Match criteria pane allows a user to refine the data displayed in the BOM data pane. From the MPN and CPN dropdown lists, the user can select the columns in which the MPN or CPN might appear. The available column headings in this list come from the columns contained in the BOM file. The Match By options indicate whether SpinMatcher should find matching parts based on the MPN or CPN. The user can also match using MFR. The trimming options may be set by choosing Right or Left and the number of characters to trim from the Trim dropdown lists. After setting the match criteria, the user can initiate the match process by clicking the Find Matches button to start the search.

The other controls on this pane relate to viewing properties. The Input Colors button allows a user to change the text and cell colors of the columns in the BOM data pane. The user can use the Prey and Next buttons to page to the next line items available for viewing. The user can jump to any page by choosing the page number from the Go to page dropdown list.

The Data sources pane shows the data sources the user can reference when matching the input BOM. The data sources are set up in the application options. Each data source is represented by a button in the Data sources pane. The user can make data sources active or inactive by clicking the arrow on the data source button and choosing Set Inactive or Set Active. The user can set the search order on multiple data sources, by right-clicking the data source and choosing Raise search priority or Lower search priority.

The Match criteria pane is used to perform searches on the BOM data and find matching parts. SpinMatcher displays the matches in the BOM data pane. The types of matches found by SpinMatcher include exact matches, neutralized matches, trimmed matches, and no match.

An exact match occurs if the input MPN matches the output MPN exactly, including characters and numbers, spacing, dashes, slashes, and underscores, such as those shown in the table below.

| Input MPN | Match MPN |
|---|---|
| TAJD336K020S | TAJD336K020S |
| CRCW0805-1002FT | CRCW0805-1002FT |
| 767169 9 | 767169 9 |

To find a Neutralized match, SpinMatcher ignores spaces, slashes, dashes and underscores in the input MPN to find matches, such as those shown in the table below.

| Input MPN | Match MPN | Search Method |
|---|---|---|
| TAJD336K-020-S | TAJD336K020S | Dash ignored |
| MCR10*ZH1471 | MCR10FZH1471 | Asterisk * treated as wildcard |
|  | MCR10EZH1471 |  |
| CRCW 0805 1002-F | CRCW0805-1002FT | Ignores spaces and dash |
|  | CRCW0805-1002FTR1 |  |
| 767-169-9 | 767169-9 | Ignores dashes |

A Trimmed match is performed using a wildcard search of the prefixes or suffixes of an input MPN or CPN. For example, specifying a right trim of 1 instructs the SpinMatcher process to treat the last character of an MPN or CPN as a wildcard token, as shown in the table below.

| Input MPN | Trim From | Trim Length | Search Method | Match MPN |
|---|---|---|---|---|
| TAJD336K020S | Right | 0 | Exact match | TAJD336K020S |
| TAJD336K020S | Right | 1 | TAJD336K020* | TAJD336K020S |
|  |  |  |  | TAJD336K020R |
|  |  |  |  | TAJD336K020 |
| TAJD336K020S | Left | 2 | *JD336K020S | TAJD336K020S |
|  |  |  |  | REJD336K020S |

No match occurs when SpinMatcher fails to find a match. There are various reasons why SpinMatcher might not find a selectable match option. For example, the input MPN might be incorrect. The input MPN may not exist in SpinCircuit or the reference data sources. The prefix of the input MPN may be incorrect or incomplete. Also, an incomplete MPN may be located in the middle of the part number, the Manufacturer may not be in the SpinCircuit database, or the MPN fields might contain data other than the proper MPN, such as descriptions, CPNs, or blanks for example.

The SpinMatcher summary report feature can be used to generate statistics detailing SpinMatcher's success in finding matches. The summary report provides information such as the Total number of parts in the BOM; the total number and percentage of parts from SpinCircuit with selectable output; the total number and percentage of parts from each data source with selectable output; the hit Ratio (percentage of successful matches); and a Graphical representation of statistics in a pie chart.

SpinConnect

SpinConnect process can be used to convert a BOM file from a *.csv (comma separated value) or *.xls (Microsoft Excel) format to a *.pdx format. The converted BOM can then be imported into a Product Data Management (PDM) system.

SpinServices

SpinServices is a set of services that allow a user to get information on the Pricing and Availability of each part in a Bill of Materials (BOM), configure a Bill of Material (BOM), and add the Valor Package Library (VPL) names associated with parts to a BOM.

For example, the Pricing and Availability service may be used to obtain book price and availability information for each part in a BOM file. This service allows a user to optimize the BOM based on price or lead time. The process can create and display the pricing and availability report in the browser window. The view of the pricing and availability report can be optimized (sorted) by lead time or pricing.

The BOM Configuration service reformats a BOM file from a format such as the SpinCircuit internal format to another format such as a comma-delimited ASCII format. The user can specify which BOM fields the user wants included in the ASCII file. The user can add an empty column to the BOM file where custom data can be entered at a later time. The user can also set up multiple templates and format a BOM file with any of the pre-defined templates.

Valor Services annotate Valor Package Library information to BOM files. This process retrieves encrypted Valor Package Library (VPL) names that are mapped to parts in a SpinCircuit database and adds them to the BOM file. The user can save and download the annotated BOM to the computer as a Microsoft Excel file.

Exception Manager

An Exception Manager process helps the user resolve mapping exceptions. For example, the Exception Manager process can resolve and map unmatched part attributes such as manufacturer and company part numbers to their corresponding universal part numbers, and resolve unmatched manufacturer names. The Exception Manager process can include four modes. The Manufacturer Exceptions mode and the Part Exceptions mode allow the user to search the private parts database for manufacturer name and part exceptions. The Mapped Manufacturers mode and the Mapped Parts mode show the user mapped manufacturers and parts and allow the user to unmap items or reset changes.

Figure 51:
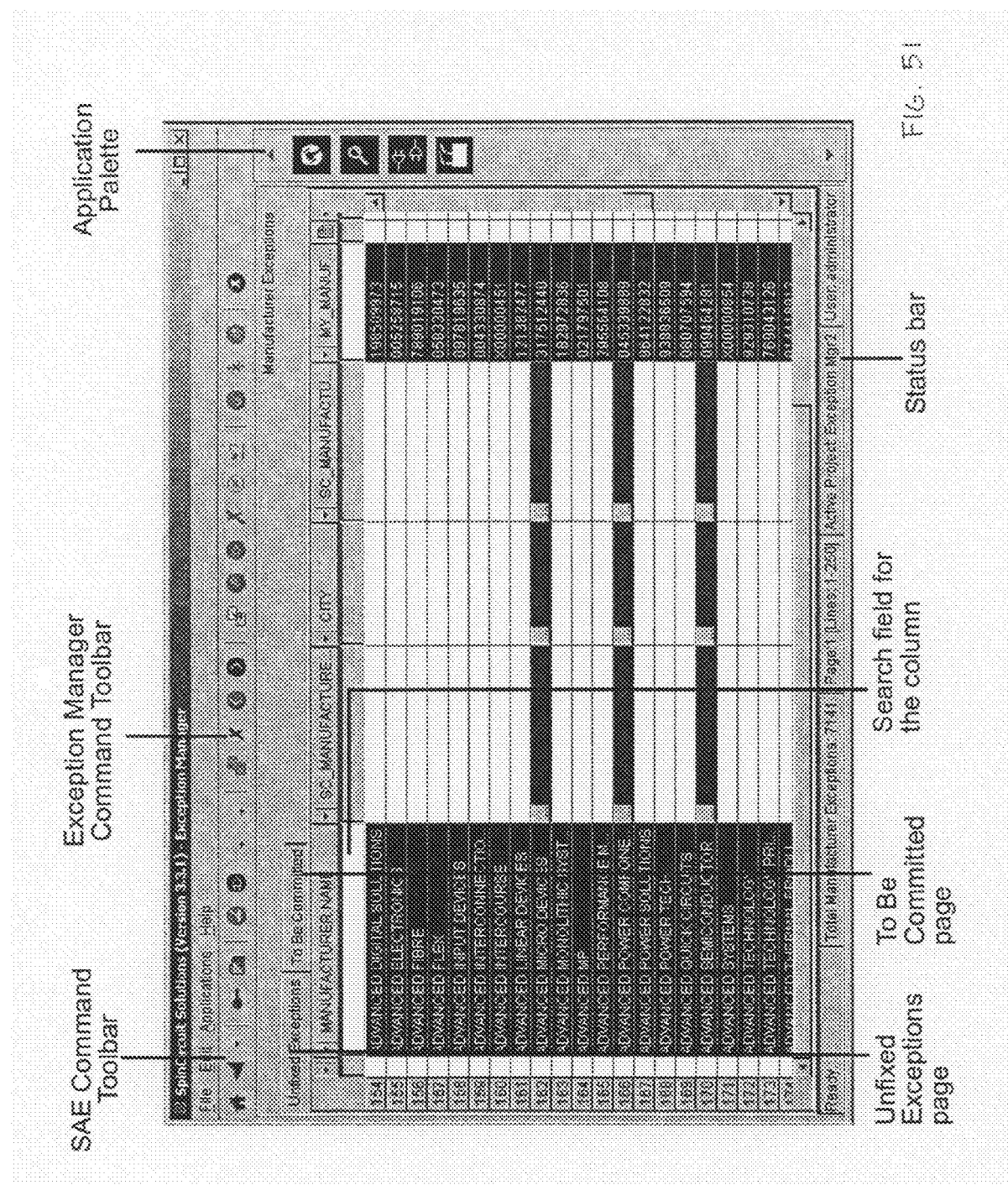

The Exception Manager interface as shown in FIG. 51 includes the SAE command toolbar, the Unfixed Exceptions page and the To Be Committed page, the application palette, and the status bar. These interface features may be present in each of the Exception Manager modes. The MFGSelect window is available for mapping matches to manufacturer name exceptions.

The Unfixed Exceptions page shows manufacturer name or part exceptions, depending on the mode. The user use this page to search for manufacturer name or part exceptions, find matches to these exceptions, and map the exceptions to matches.

Figure 52:
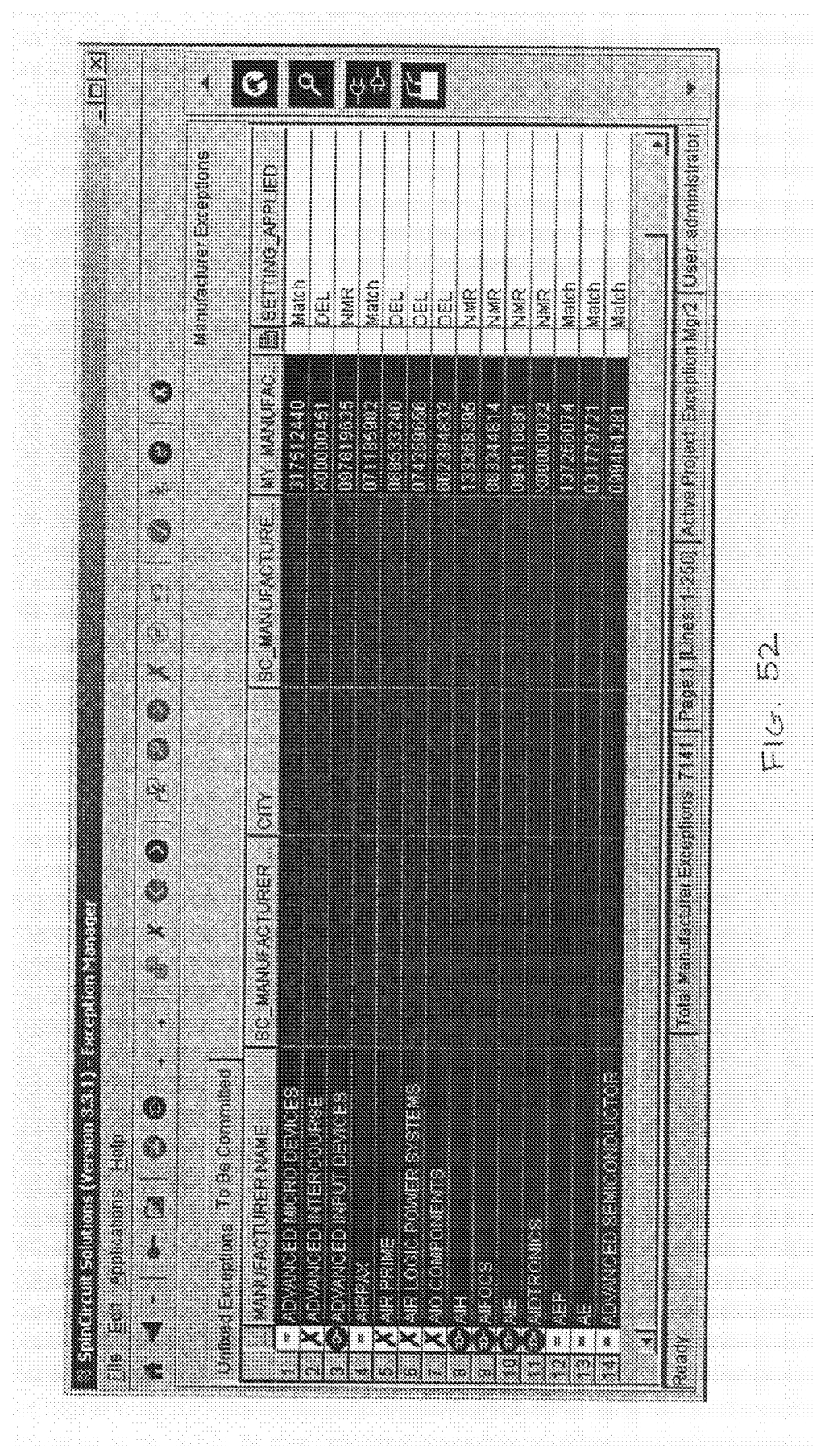

The To Be Committed page as shown in FIG. 52 shows the changes the user made to manufacturer name or part exceptions, depending on the mode. The user use this page to review changes such as newly mapped matches, deleted items, or new manufacturers or parts the user marked as new requests. When the user commit mapped matches on this page, the user can later view these matches using the Mapped Manufacturers mode or the Mapped Parts mode.

Figure 53:
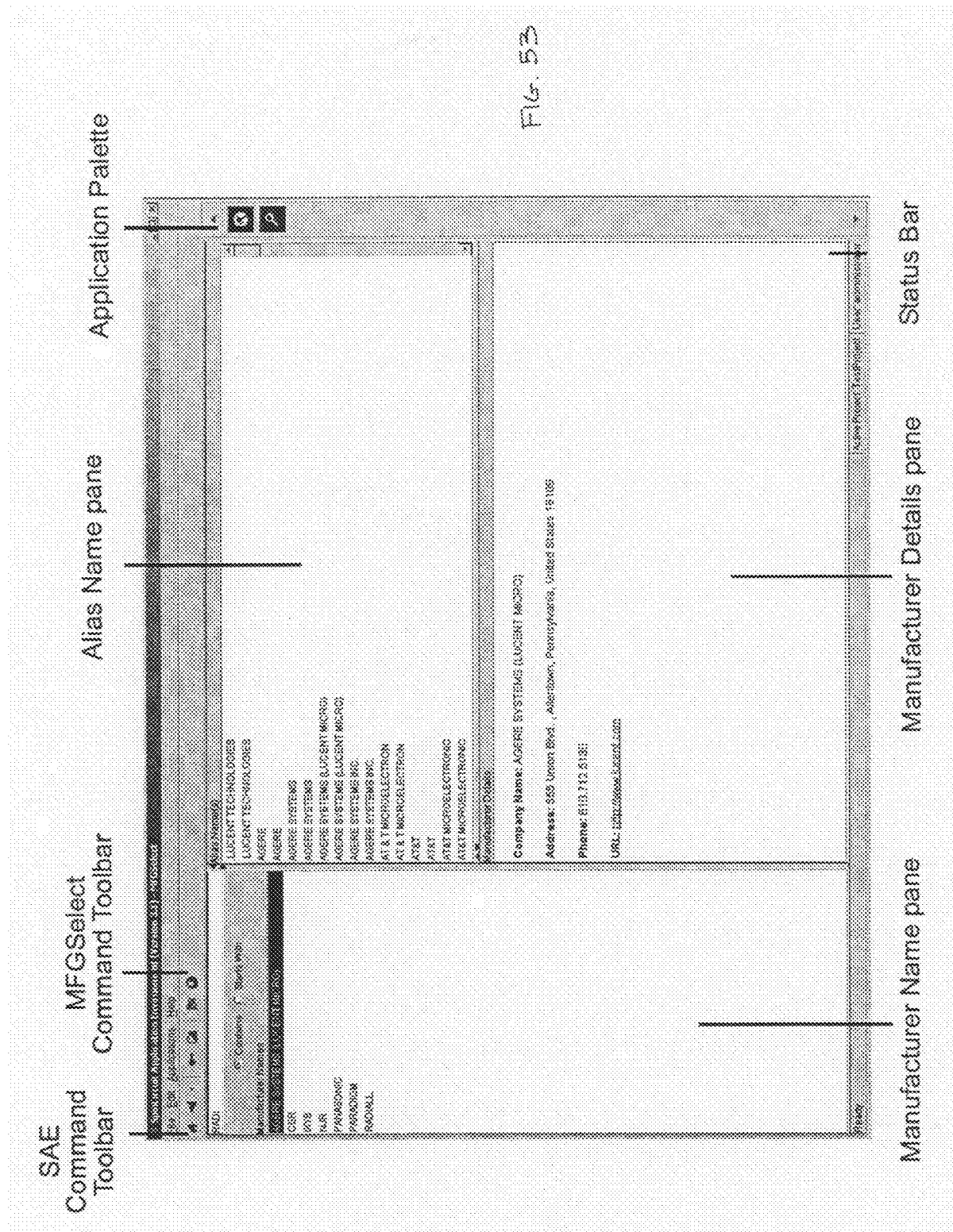

In the MFGSelect window as shown in FIG. 53 the user can map manufacturer name exceptions to existing manufacturer names. It includes of the SAE and MFGSelect command toolbars, the Manufacturer Name, Alias Name and Manufacturer Details panes, the application palette, and the status bar.

The Exception Manager Command toolbar gives the user convenient access to frequently used commands in the SpinMatcher application. The user can also access several of these commands by right-clicking on an item and selecting the command from the right-click menu.

The Exception Manager Command toolbar can contain multiple command buttons. A Manufacturer Name Exceptions Mode button converts Exception Manager to Manufacturer Name Exceptions mode. A Part Exceptions Mode button converts Exception Manager to Part Exceptions mode. A Mapped Manufacturers Mode button converts Exception Manager to Mapped Manufacturers mode. A Mapped Parts Mode converts Exception Manager to Mapped Parts mode. A Load Search Filters button searches for items based on the criteria the user entered in the search fields beneath exception columns. A Clear Search Filters button clears the search criteria the user entered in the search field beneath exception columns. A Get Previous Exceptions button moves to the previous page of exceptions. A Get Next Exceptions button moves to the next page of exceptions. A Find Matches button searches the SpinCircuit public database for matches to manufacturer name or part exceptions. A Find Item button launches MFGSelect to manually search for the selected manufacturer name or SpinSelect to manually search for the selected part. A New Manufacturer Request or New Part Request button requests SpinCircuit to add a new manufacturer or part. A Delete Item button removes the selected item from the list of exceptions. An Unmap Item button unmaps the match for the selected item.

The Exception Manager process helps the user to resolve manufacturer name exceptions in the private parts database by searching for manufacturer name exceptions in the private parts database, finding matches to the exceptions in the public parts database, mapping the exceptions to these matches, and updating the private parts database with the mapping selection.

The Exception Manager process allows a user to resolve part exceptions in the private parts database by causing the system to search for part exceptions in the private parts database, find matches to the exceptions in the public parts database, map the exceptions to these matches, and update the private parts database with the mapping selection.

SpinRequest

While using SpinSelect or SpinMatcher, the user might discover that SpinCircuit does not have the parts the user need to use, or the user might find parts that need to be modified before the user can use them. The user can request SpinCircuit to add new parts and review existing parts for modification.

For example, with SpinSelect and SpinMatcher, the user can request SpinCircuit to add a new part if it does not exist in the SpinCircuit parts database. The SpinCircuit Content Services group will process the request and inform the user via e-mail when the part is available.

In Exception Manager, the user can request SpinCircuit to add a new manufacturer name if it does not exist in the SpinCircuit database. The SpinCircuit Content Services group will process the request and inform the user via e-mail when the manufacturer name is available.

The user can request SpinCircuit to add multiple new parts if they do not exist in the SpinCircuit database. The SpinCircuit Content Services group will process the request and inform the user via e-mail when the parts are available.

Business Rules and Filtering

Figure 54:
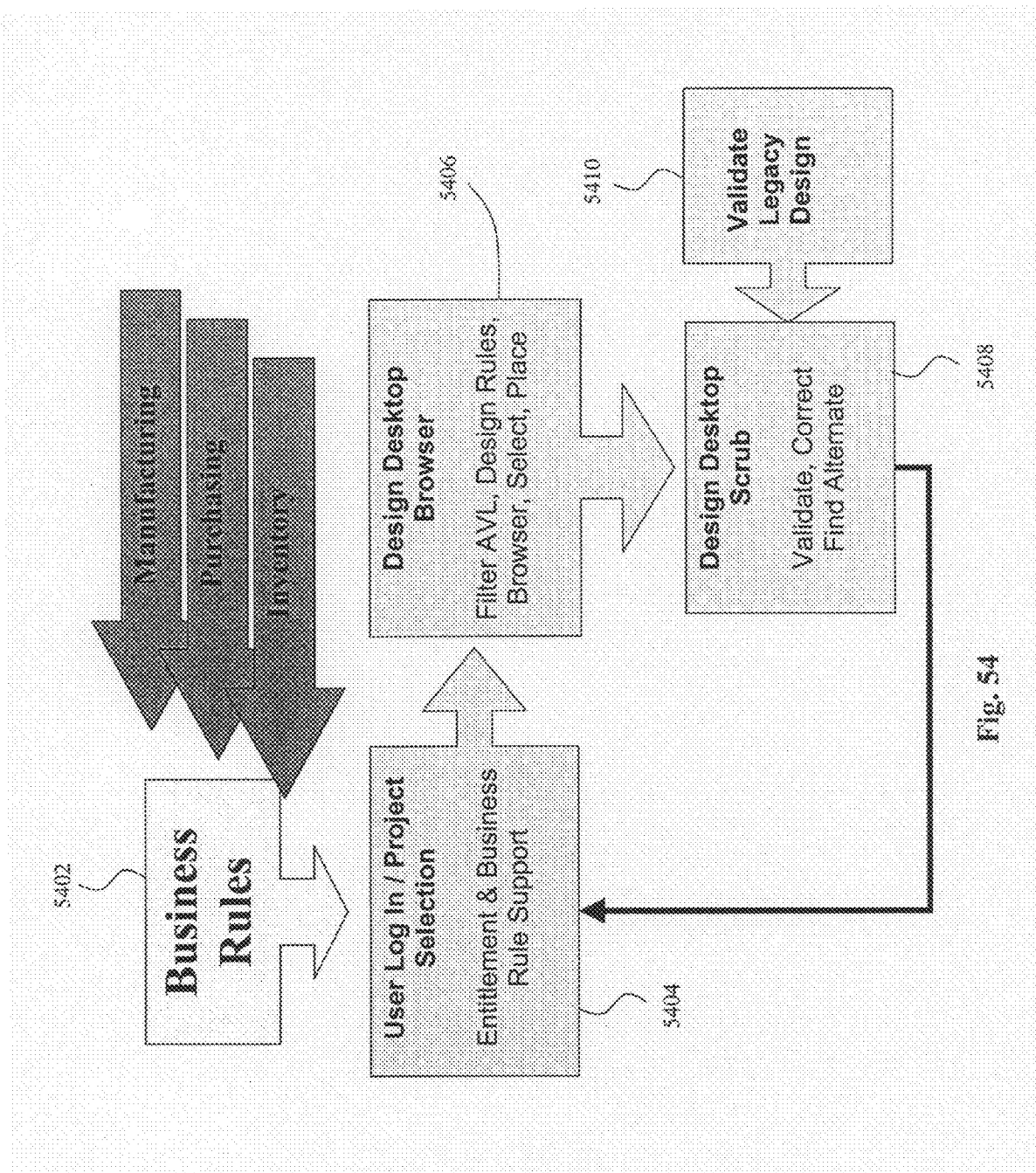
FIGS. 54 and 55a-55b show illustrative process flow diagrams according to some embodiments of the invention.

Business Rules and Filtering can be applied to process and control the type, amount, content, and presentation of data that is returned to the user. FIG. 54 shows a process diagram of a system in which business rules and filtering are performed. The business rules may be defined with respect to the objective or purpose to which the system is applied, e.g., relative to manufacturing, purchasing, or inventory (5402). At 5404, log-in/project selection is performed. At the desktop browser 5406, filtering, browsing, selection, and placement occur. The design scrubbing is performed at 5408, which may include the actions of validating, correcting, or determining alternate parts. Validation of the legacy design may occur at 5410.

Some actions performed by a business rules mechanism in an embodiment include: (a) filtering out specific parts from queries; (b) performing server-side operations on a query return dataset; (c) enforcing certain actions based on business rule evaluation results; and/or (d) displaying business rule evaluation results. These actions may also be performed using scripting.

Filtering rules are implemented to limit the types of parts that are returned to the user. Examples of such filtering rules include:

"Only return parts with a STATUS value of APPROVED"

"Only return parts with a STATUS value of APPROVED or STATUS value of PENDING, in addition an IN INVENTORY value of YES"

"If a part has a COMMODITY value of FIXED RESISTOR then only return if TOLERANCE is less than 10%"

"If a part has a COMMODITY value of FIXED CAPACITOR then only return if TOLERANCE is less than 5%"

In one embodiment, business rules can essentially be viewed or implemented as a database statement (e.g., a SQL statement) in which the predicate corresponding to the business rule is evaluated to determine if a part should be returned. Therefore, rules correspond to an expression that is to be evaluated. In the present embodiment, some or all of the expression capabilities for SQL are supported for the business rules. For example, rules may include: (a) nested AND statements; (b) nested OR statements; (c) new metadata business attributes instead of field names; (d) basic mathematic operations (e.g., add, subtract, multiply, divide); and/or (e) less than, greater than, less than or equal to, greater than or equal to evaluations.

At least two types of filtering rules can be utilized in the present embodiment—server-side and client-side rules.

A server-side filter rule is a rule that can be applied during a server-side query evaluation. The rule should be included in the application requested query. For example, assume that the user performs a query for a fixed resistor with a RESISTANCE VALUE of 10 ohms and there are 1000 such parts in the PDI. The application can be configured to obtain the first 250 of these 1000 parts. It is noted that if a rule is applied after a dataset of 250 parts is created it is possible that none of the 250 parts will be returned leaving the other 750 parts untested and a return of 0 parts to SpinSelect.

Client-side filtering is similar to server-side filtering with the exception that the filtering takes place on the client after the server has returned a dataset. One reason a user may want to perform filtering on the client-side of a query is to reduce the number of dynamic filters that are applied and to be able to see what is filtered out of the dataset. An example of such a rule is the following: "Hide parts with COMMODITY value of FIXED CAPACITOR and TOLERANCE value less than 5%".

Another aspect of the present embodiment is the functionality to modify a dataset value in a specific column on the server-side before the dataset is returned to the client. The reason for this is so an organization can shield the user from certain data. For example, an organization may have a field that contains their cost for a part and they want to apply a certain mark-up or discount depending on target customer and/or project. So in this case they may want to create a rule that does the following:

If a part has a COMMODITY value of FIXED RESISTOR, add 10% to VALUE.
    If a part has a COMMODITY value of FIXED RESISTOR, subtract 10% from VALUE.
    If a part has a COMMODITY value of FIXED RESISTOR and the COST value is BELOW 50 then set COST to 1, else if the COST value is BELOW 100 then set COST to 2, else set COST to 3.

Figure 55A:
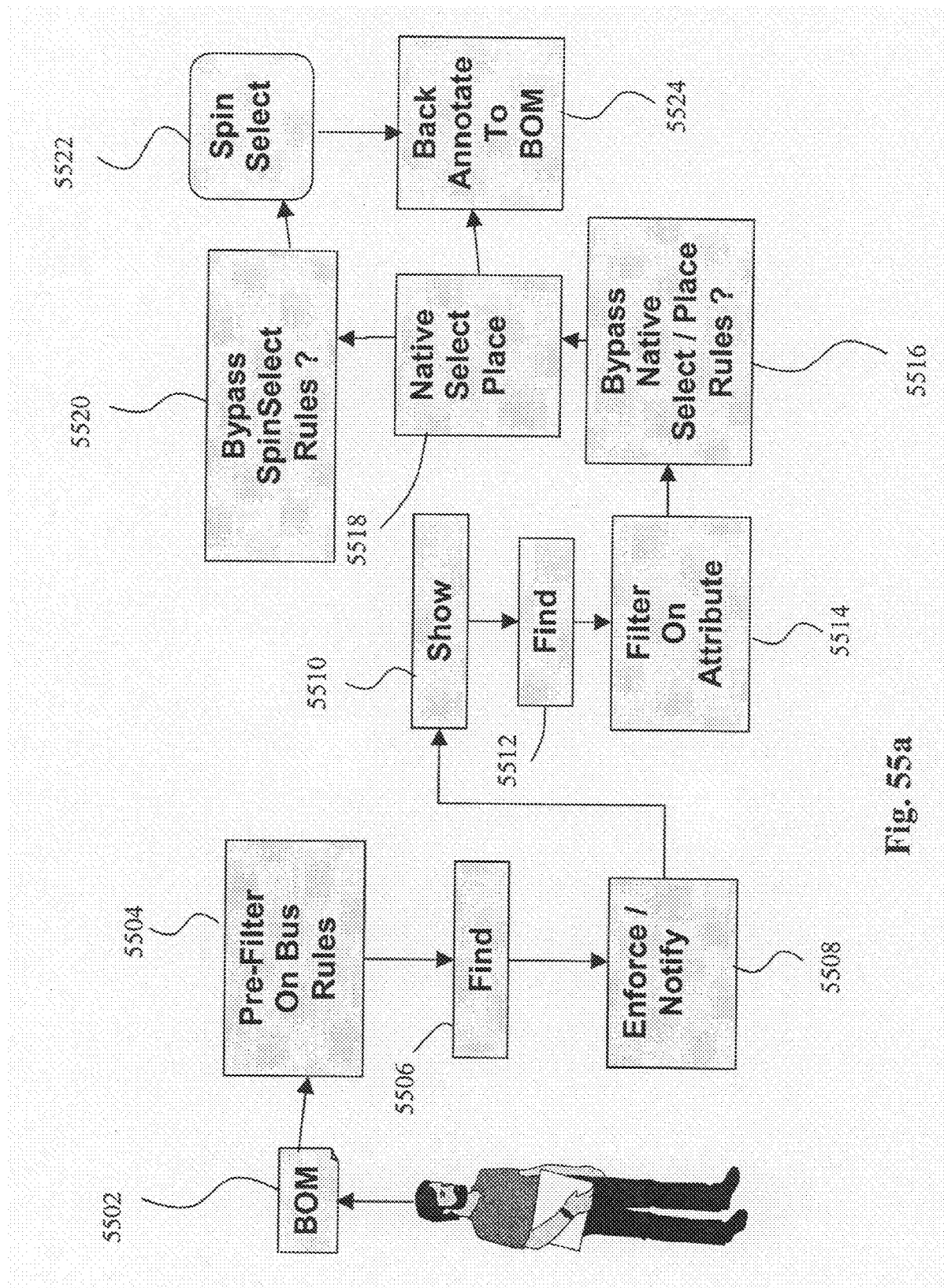

FIG. 55a shows an example process flow in which business rules are employed to perform part matching. The process begins when a BOM is received and/or generated, e.g., from a user or other entity in the system (5502). A pre-filtering action can be performed based upon business rules established for the matching process (5504). The results of the pre-filtering action are found at 5506.

In the present embodiment, additional rules can be created that will be evaluated and "enforced" when the user performs certain actions (5508). Enforcement includes the ability to prevent the user from performing a specific action if the evaluation of the rule dictates it. A set of Enforcement Actions can be maintained that will grow over time. The user will include an enforcement action in the rule expression. For example consider the following enforcement rule: "If a part has a STATUS does not have a value of APPROVED then do not allow PLACE PART." Some functions that may be performed by the enforcement action include the filter function, place function, publish function, and optimize function.

Rules can be defined for presentation (5510). For example, the presentation rules may show results based upon user preferences. In addition, the presentation rules may show the output based upon a defined presentation algorithm.

When a non-filtering rule has been evaluated the user may want to display the results as normal data in the column created by the rule. However, in some cases the user may want to configure a Custom Column (e.g., using a Virtual Column plug-in) to display the data in a more intelligent way. For example consider the following non-filtering business rule: "If a part has a COMMODITY value of FIXED RESISTOR and the COST value is BELOW 50 then set COST to 1, else if the COST value is BELOW 100 then set COST to 2, else set COST to 3". For this rule, the user may not want to display 1, 2 or 3 but may want to display a part grade based on the values 1, 2 or 3. In this case, the user can configure a custom column and display red if the value is 3, yellow if the value is 2, and green if 1. This will provide a visual clue as to the nature of the cost.

Filtering may be enabled for the system/user. If so, then filtering is applied to the data, as described in more detail below (5514).

A configuration determination can also be made whether to bypass native select and/or place rules (5516). If not, then the native select/place rules are evaluated (5518). The results can be used to back annotate to the BOM (5524). A determination can be made whether to bypass the SpinSelect rules (5520). If not, then the SpinSelect rules are processed (5522) and the results also used to back annotate to the BOM (5524).

Figure 55B:
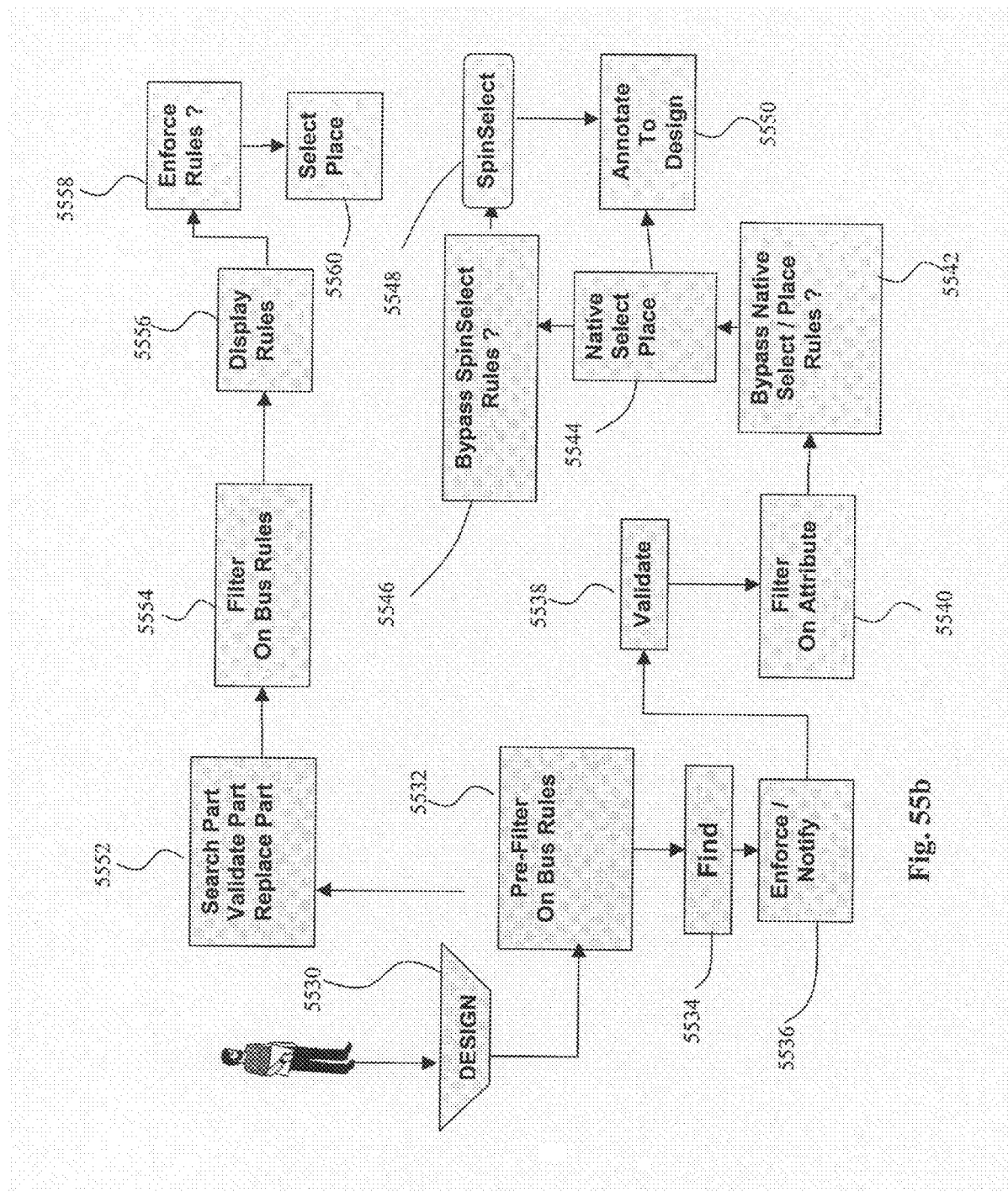

FIG. 55b shows an example process flow in which business rules are used to select/scrub parts for a design. At 5530, a design is received/generated. Actions can be taken to search for, validate, and/or replace parts in the design (5552). A filter can be applied based upon one or more defined business rules, as described in more detail above (5554). The applicable rules may be displayed to the user (5556). A determination is made whether enforcement of the rules is performed (5558). At 5560, the Select Place action is performed.

For the scrubbing process, after the design is received/generated at 5530, a pre-filtering action can be performed based upon business rules established for the matching process (5532). The results of the pre-filtering action are determined at 5534. As previously noted, additional rules can be created that will be evaluated and "enforced" when the user performs certain actions (5536). A validation action occurs at 5538. A determination is made whether filtering is turned on. If so, then filtering is applied (5540).

A configuration determination can also be made whether to bypass native select and/or place rules (5542). If not, then the native select/place rules are evaluated (5544). The results can be used to annotate to the design (5550). A determination can be made whether to bypass the SpinSelect rules (5546). If not, then the SpinSelect rules are processed (5548) and the results also used to annotate to the design (5550).

Figure 55C:
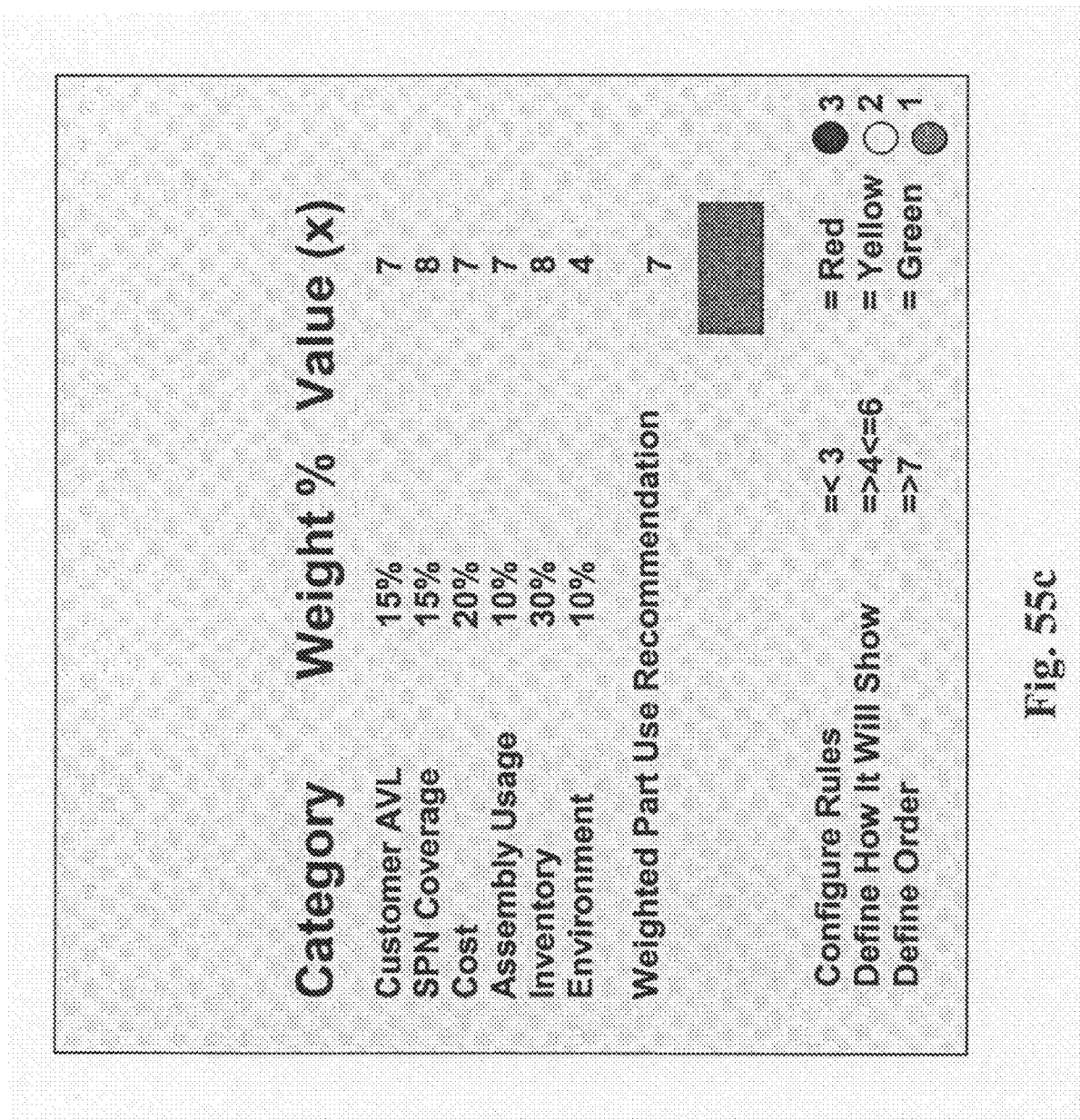
FIG. 55c illustrate an example set of weighting factors that may be used to make a parts recommendation according to an embodiment of the invention.

It is noted that weight factors can be used to implement/process rules an/or to create part use recommendations. The weighting factors can be established for any or all of the elements that are evaluated to make a parts determination. FIG. 55c shows an example set of weighting factors that may be used to make a parts recommendation.

The present embodiment of the invention includes a filtering mechanism to change and optimize the presentation of data to the user. Different preferences can be set to determine the type of presentation that is displayed. This type of filtering is particularly useful if data from a number of different organizations are to be accessed and presented.

Different organizations may store data in different ways. For example, some organizations may store local CAD data (e.g., library database) by CPN in which the underlying MPN for each part is not embedded or available in the data. Traditionally this has been difficult to tie together because of the dynamic nature of the "vendors" that are approved to supply that CPN. With the dynamic nature of data and the need to present this to the designer so that he has information such as spec sheets, EOL, PCN, availability, and pricing at the designer's fingertips, it is often important to know the actual AVL for each CPN. By delivering this information simultaneous to the CAD information, it is possible to give true "vendor" specific information.

The data may be available from a variety of databases. For example, data could come directly from an ERP (Management Information System (MIS)) system, from a database that is populated from either an ERP or a PDM system, or, in some cases, actually managed directly within the database by a component engineering group. Other sources include the PDM system that is not limited to specific vendors. Additional sources could be ASCII files that are deposited by IT groups so that access to the ERP system does not "bog" down system resources when scheduled machine usage is at peak.

The present embodiment of the invention provides a mechanism that allows a user to tie internal private data to that of the public information aggregated using the invention. Engineers could be one of the primary user groups of the "tied" data. It is possible that the "tied" data will be access by other tools outside the DMZ and integrated using our API.

In this embodiment, several functional preferences with regard to presentation of data may exist, e.g., with regard to primary viewing and filtering of data as well as a preference for organizational usage for group(s) of parts. For instance, consider an engineer that is looking for a certain voltage regulator. The engineer selects a tree view of voltage regulators and from the parametrics, selects 12V. With this sort of selection, the returned records could be many. But the present embodiment provides a filtering system that details the priority for usage, for example, using part exclusion, sorting, and detailing.

With sorting, the returned data will be sorted based upon one or more selected preferences. An example of these preferences could be a preference between approved parts versus non-approved parts. Other examples include preferences relating to cheapest parts, shortest lead time, samples available, symbol available and even parts that may fit a given attribute criteria better than another (e.g., selecting parts that are "close enough" to 100K). This would allow the sorting of all resistors but not exclude those that do not meet the criteria. The ability to sort by records, showing certain preferences, first or even by some color greatly delivers "choices" when selecting a part, which is different from elimination, based on un-known attributes.

Another type of sorting that may be performed is by performing exclusion actions. Removing certain records from the results set can be used to help eliminate certain criteria. For instance a user or company may want to exclude any suppliers from a particular geographic region, from a particular manufacturer, or even identified competitors.

Detailing may also be performed to show certain rows with high preference by some sort of indicator, e.g., using different colors. This allows immediate and quick determination of best usages. Other graphic indicators may also be employed that helps to identify and determine the optimal choices.

Filtering may be performed to resolve issues relating to public versus private columns. For example, column sorting may be performed. Much like for record sorting, column sorting allows for particular information within a column to be used. Preference can be given to private data (or set by user) to columns where data is redundant. For instance, assume that a company has their own attribute in their local database for speed, which is also kept within the central database. In this case, it may be desirable for the user to give preference for sorting to one field over another.

In addition, it may be desirable to exclude from view certain private or public information contained within a column. This may be for all data or may be for a certain leaf node.

Highlighting may be performed against private or public column data, e.g., by using either a graphic or color indicators. In this manner, certain data can be highlighted to identify which data is important when selecting a component.

Column metering can be performed. Certain fields of either private or public (or both) data could be combined to show a "rating" in a field. This rating could be either a toggle of certain colors, e.g., "red" or "Green"; or could be a number based on the summation and/or averages of data M a certain field or group of fields. For instance, consider the situation if an organization wishes to add the Vendor rating and their internal rating of a component together to show an "over all rating", e.g., in which vendors are rated on a scale from 1-50, where 50 is the highest rating a vendor can be given but points are taken away for certain items particular to the company. This may be quality, time delivery or even purchasing "well being". Another organization may grade parts based on quality aspects where this data is given to the engineer. With such database information it can be foreseen for a system that would allow the combination of these two fields, in which one would take an average and display a single solution to the engineer. Perhaps the division would want to use the 1-50 internal rating system by stating "A">35, "B">20, "C">10 etc., or the data is graded from A, B, C . . . for a grading system of A-D. The UI in the present embodiment allows for graphic picking and displaying in a cell based on field(s) data summary and possibly data normalization, e.g., 12V=Green, 14V=RED. The summary of information may come from Private or Public cells and could be multiple or single columns.

Different users can be associated with different views and viewing preferences. For example, the engineer may wish to have a different presentation than the architects or purchasing users. In an embodiment, a standard filter is implemented with multiple views from same user id. For instance, purchasing might sort on parts from a different perspective than the quality person. The Engineer might sort on parts different from the component engineer. Each person in the entire company would want the Engineer to look at the data from "their point of view". One example approach is to have user defined tabs across the UI that allows for easy access to different views for a given record set.

In one embodiment, user views and attribute setting options can be inherited from different administrator setups. There may be different levels of viewing and inheritance. At the corporate level, corporate administrators may allow some features and views to be optional, but some may have a mandate that such sorting can not be turned off or on. At the divisional level, divisions may want to override these inheritances and have their own versions of these views or data combinations. For instance, it is conceivable that corporate may mandate that private price is visible but a division that makes product that is not price sensitive might want to override this function. At even lower levels, for a given project or user, it might be desirable to have different types and preferences of sorting and filtering.

Figure 56:
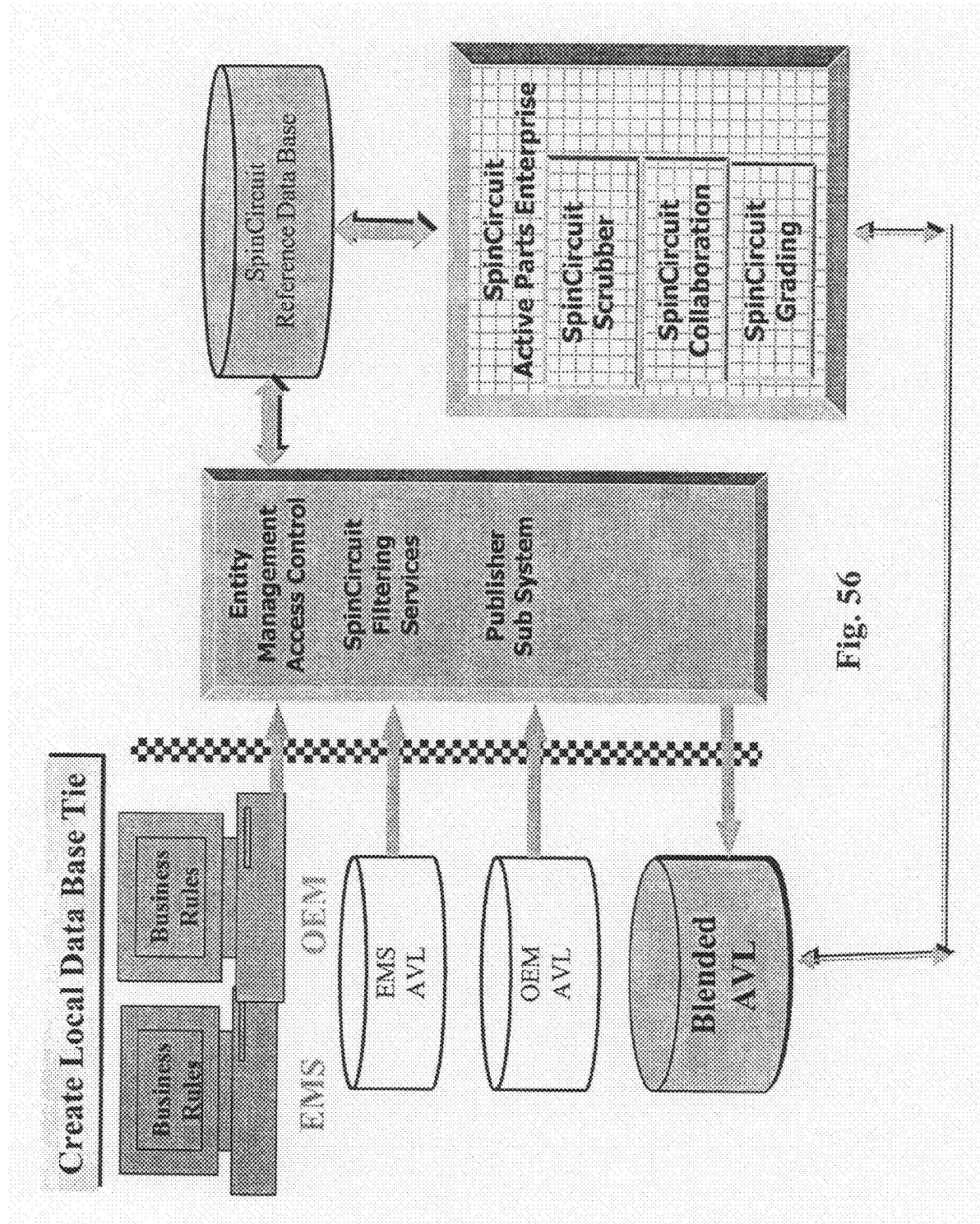
FIG. 56 depicts a process flow for example filtering services according to one embodiment of the invention.

FIG. 56 shows a process flow for example filtering services according to one embodiment of the invention. The process flow includes pre-process actions (e.g., during design) that include the actions of (a) generating/identifying engineering views that identify preferred parts (e.g., AVL) and preferred manufacturers; (b) generating/identifying private data flags view of public data; and (c) generating/identifying AVL and AML (Approved Manufacturer List) used in Scrubbing.

The process flow includes post-process actions (e.g., during the processing to create BOMs) that include the actions at the EMS/distributor to: (a) receiving and filtering the BOM, e.g., for part match and preferred parts; (b) uploading AVL with OEM (Original Equipment Manufacturer) data to create blended AVL, e.g., per product to be prototypes, per revisions, etc.; and (c) producing an output that is a blended BOM for PDM or ERP systems.

Example filtering services that may be implemented for EMS include: (a) Bill of Material Mapping for UPN, OPN (Original Part Number), MPN; (b) BOM Normalization/Standardization; (c) BOM Enrichment; and/or (d) filtering to merge EMS AVL with OEM AVL. In addition to these filtering services, example filtering services for the distributor may include BOM Grading and Quoting Services. Example filtering services that may be implemented for the OEM user include: (a) creating a Preferred Parts List (AVL) view for Design; (b) scrubbing a BOM with the Preferred Parts List; (c) making AML linked to AVL; (d) merging EMS AVL with OEM AVL; and/or (e) forming a link to available inventory and price/availability services.

Mappings

A description will now be made regarding how to implement an embodiment of a mechanism for performing content mapping in a browser tool, e.g., the C-Surfer tool described above. This section will also describe how to address "many to many" relationships that may occur for parts from different data sources. In general, a browser tool should be able to query the database and behave in a predictable pattern for a particular user. However, each user/organization may a unique definition to define a Company Part Number (CPN) and Manufacture Part Number (MPN), as well as other unique company ID numbers. Due to diverse data schema conditions, the browser tool should be able to calibrate to a given database.

To accomplish this, this section details a central nomenclature definition. This central definition will be mapped to a user/customer/organizational nomenclature to determine data schema calibration. The following nomenclature definitions will be used in the present embodiment:

(a) Equivalent Part Number (EPN) will be defined that comprises an identification scheme that allows the grouping of "like" components. The grouping of "like" components are unique to a company and may have different qualification (e.g., envelope spec, same form/fit/function (FFF), etc. . . . ).

(b) Single Part Number (SPN) is formed that is a definition of an identification scheme that identifies a singular component via the identification scheme. (e.g., by defining a UPN (universal part number) as a SPN, while a user/customer may use a combination of MPN and CPN to define a singular component. In an embodiment, the CPN equates to the EPN and comprises a unique reference number.

(c) Manufacture Part Number (MPN) is formed that is an identification part number that enables the identify of a single part number associated to a manufacture. The MPN is a naming convention for the manufacture to identify the manufacture, form, fit and function of a single part. In an embodiment, the MPN comprises a unique orderable part number for a given manufacturer. The CPN may be mapped to multiple MPNs. Two different CPNs may map to the same MPN.

(d) Base Manufacture Part Number (BMPN) is formed as an identifiable scheme that enable the identification of components (e.g., functional envelope specifications) to a single manufacture. The BMPN in an embodiment may use the additional of a prefix and/or suffix designation to complete the form and fit of a component.

(e) Generic Part Number (GPN) is formed as an identifiable part number that enables the identification of a component family from different manufacturers. The GPN may comprise an industry accepted identifiable part number naming convention to describe the function of a part.

In one embodiment, a comparable part number may be defined which is the CPN unique number plus the equivalent part number. The CPN is used to find alternate parts. For an CPN, all MPNs have the same form/fit/function value. A search on a single MPN may net a single orderable part number, but may also net multiple CPN values.

Mapping the centrally defined nomenclature to the user/customer's nomenclature will be made based upon the user/customer's use model. The details of the specific use model to which the invention is directed will therefore dictate the equivalent mapping that will be made.

Figure 57:
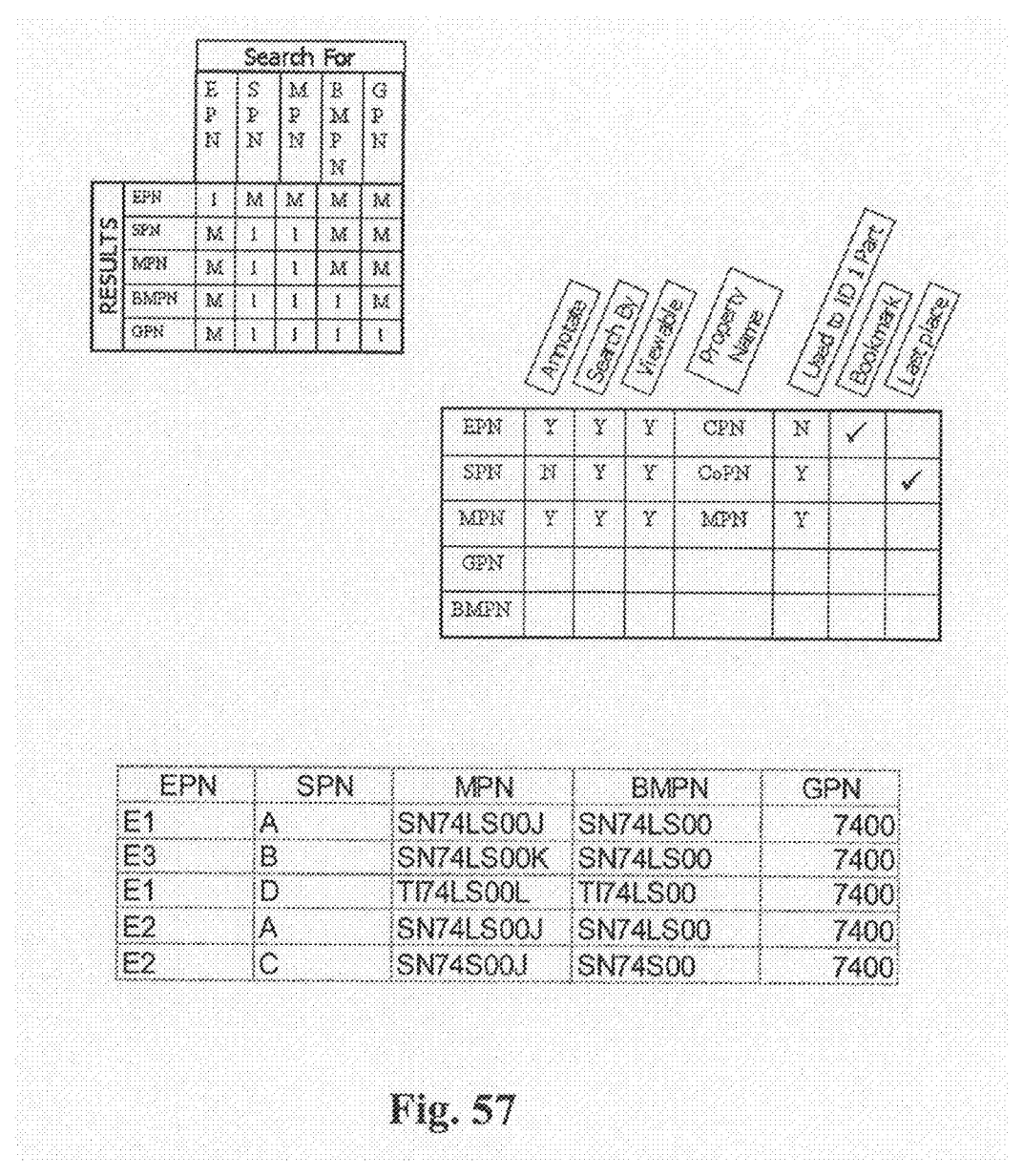

For example, consider the example mapping shown in FIG. 57. In this example, the mapping between the central nomenclature and the user/customer's use model is as follows:

Equivalent Part Number (EPN)=Company Part Number (CPN)

The example shows a grouping of "like" components based on form fit and function. This mapping has defined the CPN as an EPN function.

Single Part Number (SPN)=Corporate Part Number (CoPN)

The example shows how this customer might identify a single part. A CoPN is unique to the customer and there will be only one instance of it. This mapping has defined the CoPN as a SPN function.

Some customers may combine the CPN+MPN to define the SPN.

Manufacture Part Number (MPN)

This example shows how a customer define the Manufacture Part Number. This mapping has defined the MPN as a MPN function.

Another example company schema is shown in FIG. 58, in which the company use model and FFF factors are shown in the example mapping diagram.

The many-to-many schema may be used for the Bookmarking function, which may require the storage of a part based on the customer's use model. Some users may want to bookmark an equivalent part number or a unique part number. In both cases, the data schema and use model will dictate C-Surfer use model. For example, if a customer wishes to bookmark an Equivalent Part Number, then the bookmark function will save the Company Part Number. However, if the customer wishes to bookmark a specific (unique) part, then the Single Part Number will be used. This SPN may be the CoPN or a combination of MPN and CPN as well as other numbers. The many-to-many schema may be used for a Last-placed-part function, which may require the storage of a part based on Single Part Number.

In addition, the many-to-many schema may be used for a scrubbing process. The customer use model will dictate the scrub process, and the scrub may be based on Equivalency or Uniqueness. In the equivalency mode, the scrub process will validate the design with components matching "like" or "envelope spec" criteria, while the uniqueness mode scrub will validate the design based on exact match criteria.

The following section defines the behavior characteristic of the scrubber in both modes based on "Many to Many" schema. The description is may by way of example, using the following assumption for an example database containing the following information:

| MPN | CPN |
|---|---|
| 12065C562KATMA | AFC2410-0005-00 |
| 12065C562KATMA | AFC2410-0023-00 |
| C1206C104M5RAC | ASP0505-0104 |
| MCH315104KP | ASP0505-0104 |

The unique mode example is based on a database contain the following information:
Input

| Ref ID | CPN | MPN |
|---|---|---|
| C1 | AFC2410-0005-00 | 12065C562KATMA |
| C2 | none | 12065C562KATMA |
| C3 | AFC2410-0023-00 | 12065C562KATMA |
| C4 | ASP0505-0104 | none |
| C5 | none | C1206C104M5RAC |

This produces the following result, in which rows identified by Ref IDs C1, C3, and C5 are mapped based upon the example input:

| Ref ID | CPN | MPN | Status |
|---|---|---|---|
| C1 | AFC2410-0005-00 | 12065C562KATMA | OK |
| C2 | No Default ▼ | 12065C562KATMA | Warning |
| C3 | AFC2410-0023-00 | 12065C562KATMA | OK |
| C4 | ASP0505-0104 | No Default ▼ | Warning |
| C5 | ASP0505-0104 | C1206C104M5RAC | OK |

With respect to row identified by Ref ID C2, it is noted that the Input is missing the CPN. Here, the scrubbing process will find that that MPN [12065C562KATMA] is mapped to two CPN [AFC2410-0005-00 and AFC2410-0023-00]. Since this is a scrub for uniqueness, either, or none may be used. An automatic selection may be performed, or the mechanism can be set such that one is not automatically selected. Instead, the user can be provided with a control interface, e.g., a drop down option, with which one of two CPN can be selected.

With respect to the row identified by the Ref ID C4, it is noted that the Input missing the MPN. Here, the scrubbing process will find that the CPN [ASP0505-0104] mapped to multiple MPN [C1206C104M5RAC and MCH315104KP]. Since this is a scrub for uniqueness, either, or none may be used. An automatic selection may be performed, or the mechanism can be set such that one is not automatically selected. Instead, the user can be provided with a control interface, e.g., a drop down option, with which one of two MPN can be selected.

With respect to the row identified by Ref ID C5, it is noted that the Input is missing the CPN. However, it can be seen that the scrubbing process can map the MPN [C1206C104M5RAC] to a single CPN [ASP0505-0104] based upon the example database information. Since this is a scrub for uniqueness, a determination was made in this case which one to use.

The equivalent mode example is based on a database contain the following sample information:
Input

| Ref ID | CPN | MPN |
|---|---|---|
| C1 | AFC2410-0005-00 | 12065C562KATMA |
| C2 | AFC2410-0023-00 | none |
| C3 | none | 12065C562KATMA |
| C4 | ASP0505-0104 | C1206C104M5RAC |
| C5 | none | C1206C104M5RAC |
| C6 | ASP0505-0104 | none |

This produces the following result for the present example:
Result

| Ref ID | CPN | MPN | Status |
|---|---|---|---|
| C1 | AFC2410-0005-00 ▼ | 12065C562KATMA | OK |
| C2 | AFC2410-0023-00 ▼ | 12065C562KATMA | OK |
| C3 | AFC2410-0005-00 ▼ | 12065C562KATMA | OK |
| C4 | ASP0505-0104 | C1206C104M5RAC ▼ | OK |
| C5 | ASP0505-0104 | C1206C104M5RAC ▼ | OK |
| C6 | ASP0505-0104 | C1206C104M5RAC ▼ | OK |

With respect to the row identified by Ref ID C1, it is noted that the Input contains MPN and CPN (with multiple CPN values in the database). Here, the scrubbing process finds that the MPN [12065C562KATMA] is mapped to two CPN [AFC2410-0005-00 and AFC2410-0023-00]. Since this is a scrub for equivalency, it does not matter which one is used. For this example, the input CPN is used, and a control interface, e.g., a drop down option, can be provided to give the user the option to select a different CPN.

With respect to the row identified by Ref ID C2, it is noted that the Input is missing the MPN value. The scrubbing process will find that the CPN [AFC2410-0023-00] is mapped to a single MPN [12065C562KATMA]. Since only one MPN is found, that MPN value will be used.

With respect to the row identified by Ref ID C3, it is noted that the Input is missing the CPN value. The scrubbing process finds that the MPN [12065C562KATMA] is mapped to two CPN [AFC2410-0005-00 and AFC2410-0023-00]. Since this is a scrub for equivalency, it does not matter which one is used. For this example, since no CPN was defined, the first CPN is used, and a control interface, e.g., a drop down option, can be provided to give the user the option to select a different CPN.

With respect to the row identified by Ref ID C4, the Input contains MPN and CPN (Multiple MPN in database). The scrubbing process finds that the CPN [ASP0505-0104] is mapped to two MPN [C1206C104M5RAC and MCH315104 KP]. Since this is a scrub for equivalency, it does not matter which one is used. For this example, the input MPN is used, and a control interface, e.g., a drop down option, can be provided to give the user the option to select a different MPN.

With respect to the row identified by Ref ID C5, it is noted that the Input is missing the CPN. Here, the scrubbing process will find that that MPN [C1206C104M5RAC] is mapped to a single CPN [ASP0505-0104]. Since only one CPN is found, that CPN value will be used.

With respect to the row identified by Ref ID C6, the Input is missing the MPN (Multiple MPN in database). Here, the scrubbing process finds that that the CPN [ASP0505-0104] is mapped to two MPN [C1206C104M5RAC and MCH315104KP]. Since this is a scrub for equivalency, it does not matter which one is used. For this example, the input MPN is used, and a control interface, e.g., a drop down option, can be provided to give the user the option to select a different MPN.

Use Cases

A description of a target solution user model/case will now be described. The target cost solution spans both the schematic design and bill of material (BOM) optimization phase of a product life cycle. The Target Cost solution for schematic design phase addresses the need for a design engineer to create a specified schematic design parts list based on a predetermined target cost parameter. The Target Cost solution for BOM optimization phase addresses the need for a NPI engineer to optimize the BOM based on a pre-determined target cost parameter.

This feature is designed to help control the exit/completion criteria of a design or BOM optimization. In an embodiment, a simple YES/NO decision may be used to determine if a target cost parameter has been met.

This will allow a design engineer and/or a component engineer to substitute components for design/BOM cost management. Clients may be able to provide rough target cost compliance to its customers without showing individual part cost. Clients may also be able to mask actual cost with a cost index filter (e.g., for a user defined %) enabling the client to hide internal purchase price with a "marked up" cost.

In one approach, the target cost calculation can be a sequential-linear process, in which a user performs an action and then initiates second process instead of all process being completed via single user initiation. The OEM and EMS will control private data such as part cost via entitlement to allow per-part cost visibility and total cost roll up cost calculations. A global component cost index (% mark up) is employed to multiply actual cost. Total cost calculation delta or deviation of the design/BOM is configured to exclude components not present in the database (such as mechanical parts, connectors, customer IC, etc.). Design and BOM optimizing cycles based on target cost derivatives can be tracked to show progress and target cost compliance.

Figure 59:
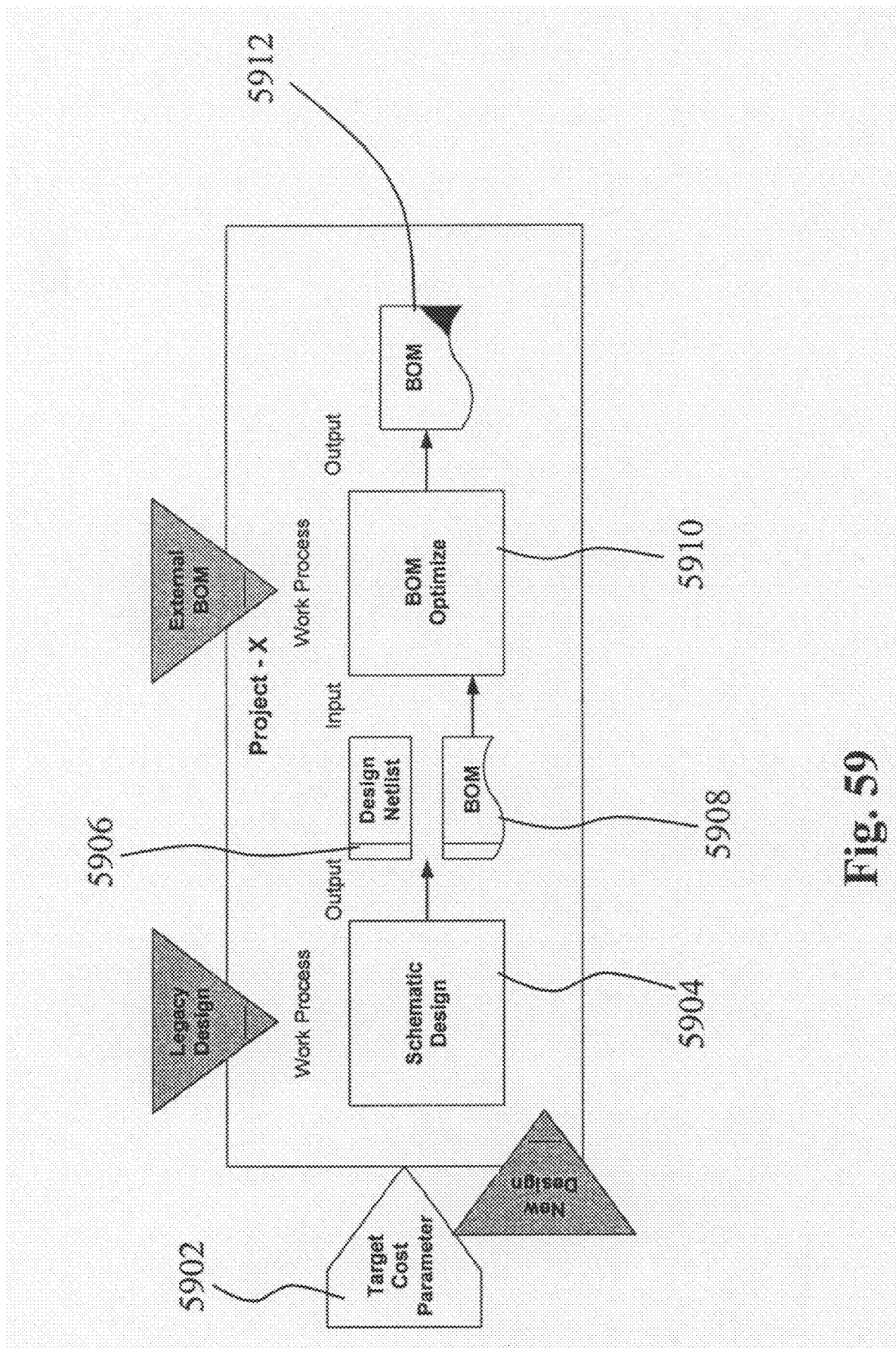
FIG. 59 illustrates a life cycle target cost workflow according to an embodiment of the invention.

FIG. 59 shows a life cycle target cost workflow according to an embodiment of the invention. This diagram shows that both the schematic design and BOM optimize (NPI) work process may be impacted by the target cost determinations. In this example, the target cost parameter 5902 is project based. The schematic design work process 5904 creates a schematic design using authorized components defined by the project. The target cost parameter 5902 is defined for the project and the design engineer should design within the target cost parameter. The design netlist 5906 and bill of material 5908 are generated from the schematic design work process 5904. The optimization work process 5910 will then take the bill of material to optimize cost, procurement, lead-time and/or other factors. A final bill of material 5912 is then generated for procurement.

Figure 60:
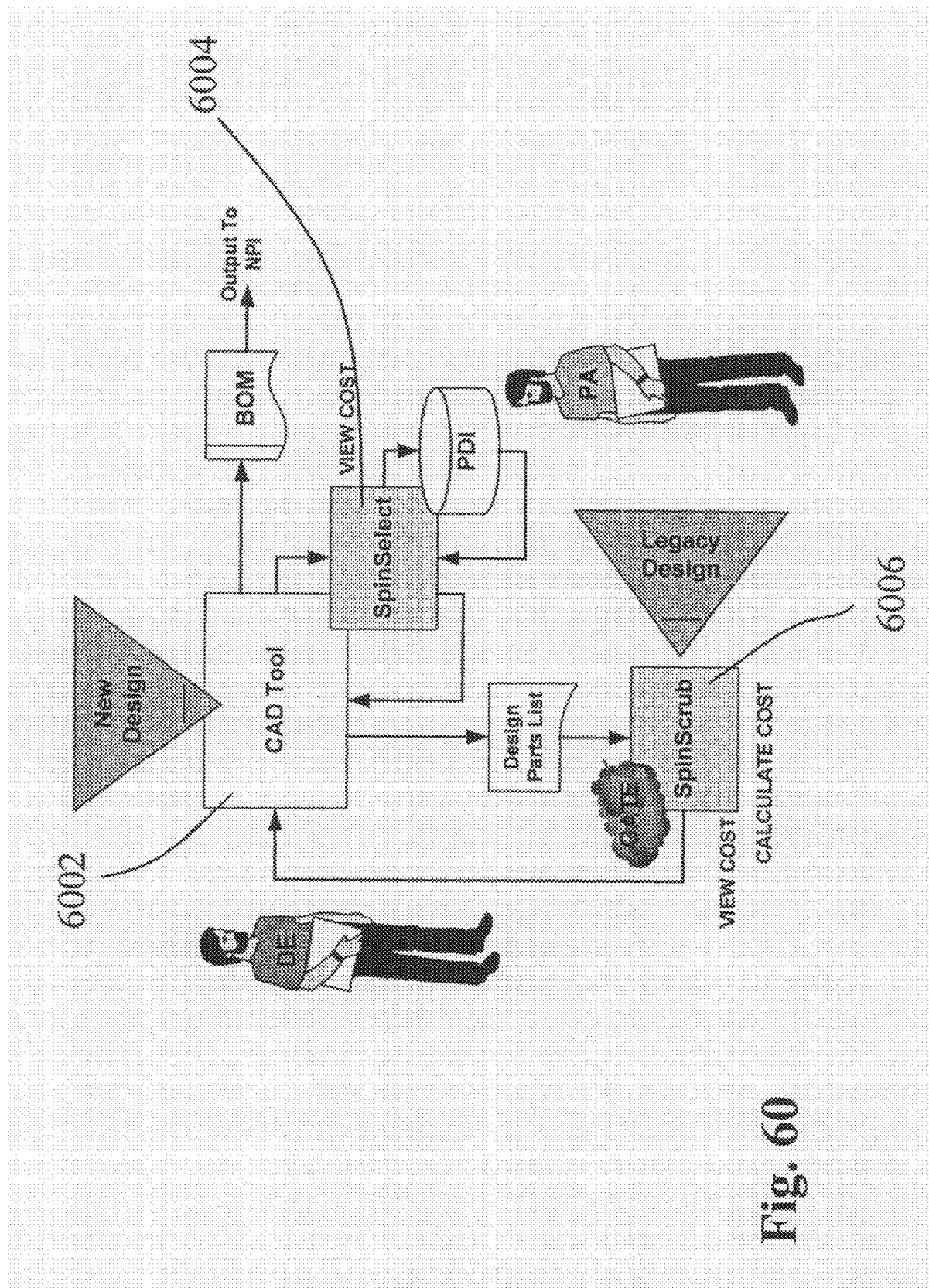
FIG. 60 depicts an example schematic design work process flow according to one embodiment of the invention.

Referring to FIG. 60, an example use case for the schematic design work process will now be described. The schematic design phase addresses the need for a design engineer to create a specified schematic design parts list based on a pre-determined target cost parameter. Project parameters (target cost, AVL, application behavior, entitlements etc) are defined, e.g., by the project team. The project is configured, e.g., by a project administrator (PA), with parameters. For target cost, some parameters to configure could include, for example, attribute visibility (component cost) during part selection, part list target cost parameters, and exit criteria definition. The project can also be configured with cost index parameters (alternative use case) to mask actual cost. One or more gates will be configured for the project.

The target cost and acceptable delta or deviation (alternative use case) will now be defined. Delta or deviation will cover the "slush" factor for all parts including non-covered parts such as mechanical screws, risers, heat sink and missing parts. The logic can be based upon target cost and actual cost. For example, the following can be used:
 If total cost<=target cost, the status will be GREEN
 If total cost<=target cost+delta, the status will be YELLOW
 If total cost>target cost+delta, the status will be RED
The view can also be defined, as shown in the following examples:
 Show calculated total cost, target cost, difference between them and status. Do not show individual part cost.
 Show calculated total cost, target cost, difference between them and status and show individual part cost.
The exit criteria can also be defined, as shown in the following examples:
 If status is GREEN, the user can publish BOM
 If status is YELLOW, the user can publish BOM with approval from manager
 If status is RED, the user cannot publish BOM (need some override)

A CAD tool 6002 is used to create a schematic design, e.g., by the design engineer (DE). Components meeting engineering parameters will be identified and a part will be selected from search results (6004). A design will be initiated for supply chain validation by executing a scrubbing tool 6006. Validation of components will be performed based on project rules. Target cost calculations will be initiated from scrubbing tool 6006. The components cost will be calculated and compared against the defined project target cost. Target cost results can be locked to show results to non-entitled users. The exit criteria from design will be gated by scrubbing tool 6006.

Figure 61:
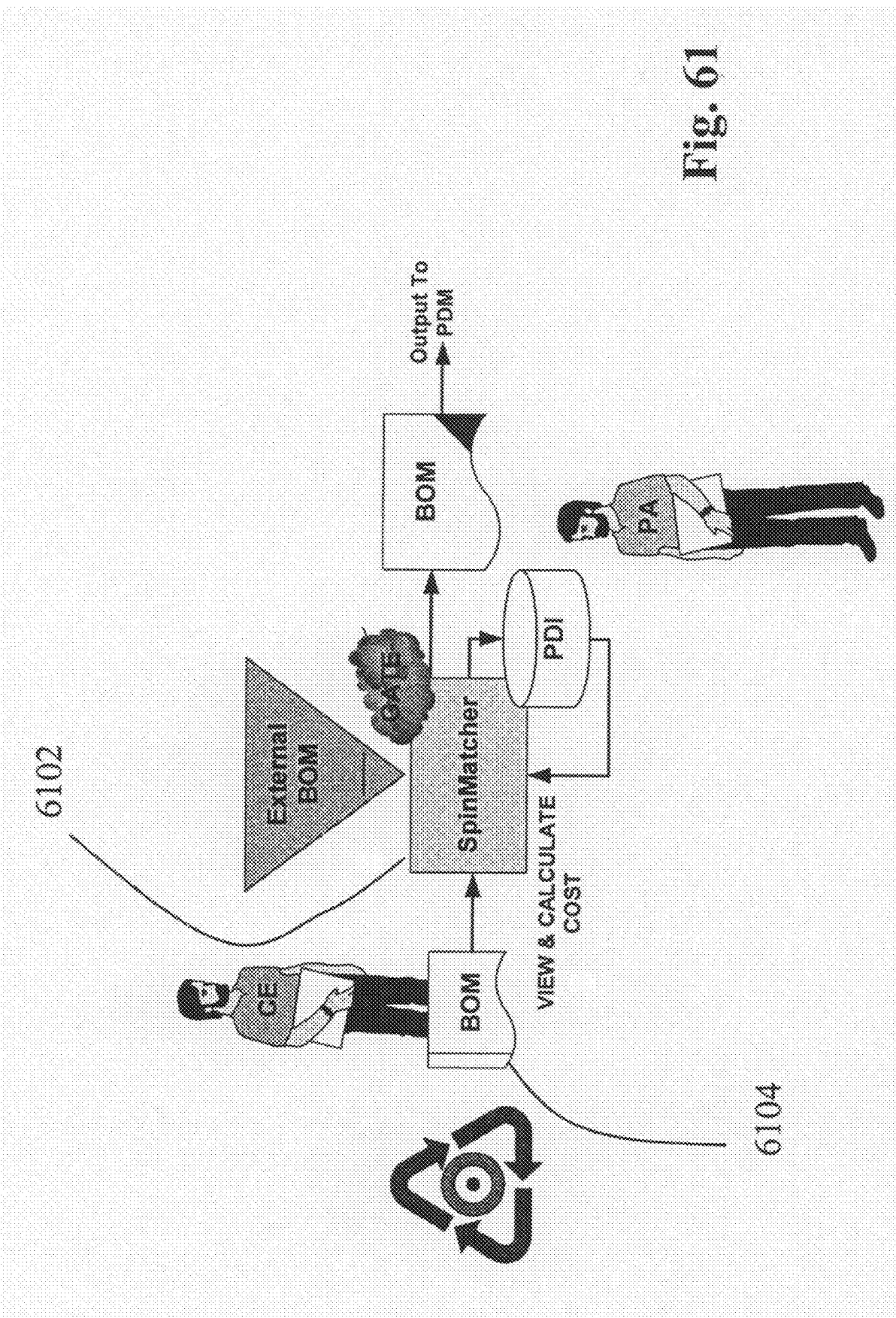
FIG. 61 is an example BOM optimize work process flow according to an embodiment of the invention.

Referring to FIG. 61, an example use case for the BOM optimize work process will now be described. The BOM optimization phase addresses the need for a NPI (new part introduction) engineer to optimize the BOM based on a pre-determined cost parameter. Project parameters (target cost, AVL, application behavior, entitlements, etc.) are defined, e.g., by the project team. The project is configured, e.g., by a project administrator (PA), with parameters. For target cost, some parameters to configure could include, for example, attribute visibility (component cost) during part selection, part list target cost parameters and exit criteria definition. The project can also be configured with cost index parameters (alternative use case) to mask actual cost. One or more gates will be configured for the project.

As before, the target cost and acceptable delta or deviation (alternative use case) will now be defined. Delta or deviation will cover the "slush" factor for all parts including non-covered parts such as mechanical screws, risers, heat sink and missing parts. The logic can be based upon target cost and actual cost. For example, the following can be used:
 If total cost<=target cost, the status will be GREEN
 If total cost<=target cost+delta, the status will be YELLOW
 If total cost>target cost+delta, the status will be RED
Similar to above, the view can also be defined. For example, the following can be defined:
 Show calculated total cost, target cost, difference between them and status. Do not show individual part cost.
 Show calculated total cost, target cost, difference between them and status and show individual part cost.
The exit criteria can also be defined, as shown in the following examples:
 If status is GREEN, the user cannot publish BOM
 If status is YELLOW, the user can publish BOM with approval from manager
 If status is RED, the user cannot publish BOM Part matches on a BOM 6104 will be identified, e.g., by a component engineer (CE) using a matching tool 6102. BOM 6104 is cleaned, correct parts are identified, and alternate parts are found. Components will be identified that meet the engineering parameters and replacement parts are found if required. The visible cost data per part can be seen during this process. Target cost calculations will then be initiated. Matching tool 6102 will total the components cost and compare against the defined project target cost. Target cost results can be locked to show results to non-entitled users. The exit criteria from NPI will be gated by matching tool 6102.

The delta or deviation will cover the "slush" factor for parts including non-covered parts, such as non-covered mechanical screws, risers, heat sink and missing parts. This delta is applied to the entire design/BOM. Alternatively, a use case can be defined for "covered" components via commodity code or taxonomy ID. This will allow a more accurate BOM cost where the delta will only be applied to covered parts. For example, consider if a project administrator defines covered components via a taxonomy ID such as SDRAM, fixed resistor, variable resistors, fixed capacitors, variable capacitors, etc., used by the design. The project administrator may define the delta with a percentage (%). The design/component engineer thereafter runs a target cost calculation. In this example, the calculation will total the covered components and apply the delta against it.

A description of a part request use model/case will now be described. Part request is a generic term to describe the need for engineers to use parts in a design or BOM. As used for purposes of explanation in this section, the term "part" defines a component for database record, e.g., using a unique or specific identifier. An "attribute" includes supplemental information to the "part" attribute, e.g., description, datasheet URL, symbol, value, inventory, or preference.

The parts request mechanism of the present embodiment allows engineers to utilize parts on the design and/or BOM, even if the part is incorrect, missing attributes or part not approved. Therefore, the following example situations can be addressed by this use case: (a) the part does not exist in the PDI; (b) centrally defined part does not exist; (c) symbol is missing; (d) one or more attributes are incorrect or missing.

Figure 62:
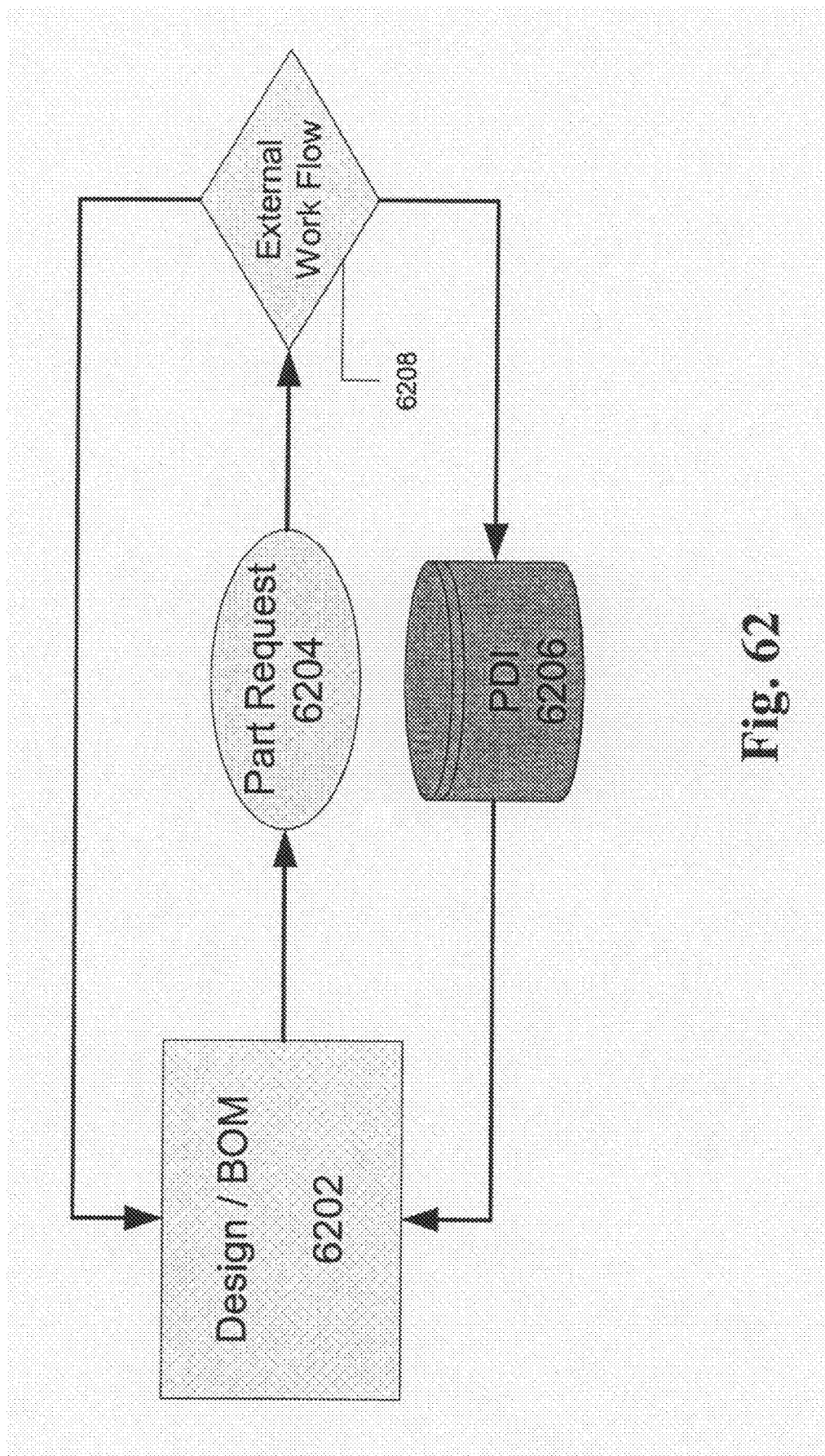
FIG. 62 shows an example workflow for a parts request use case according to one embodiment of the invention.

FIG. 62 shows an example workflow for the parts request use case. In this workflow, a parts request 6204 is initiated, e.g., by an engineer. One or more external work flow processes 6208 are initiated. The external work flow 6208 provide temporary information to allow engineer to continue work. The external work flow 6208 completes and updates the PDI 6206 and the design or BOM 6202 is updated with new attributes.

Figure 63:
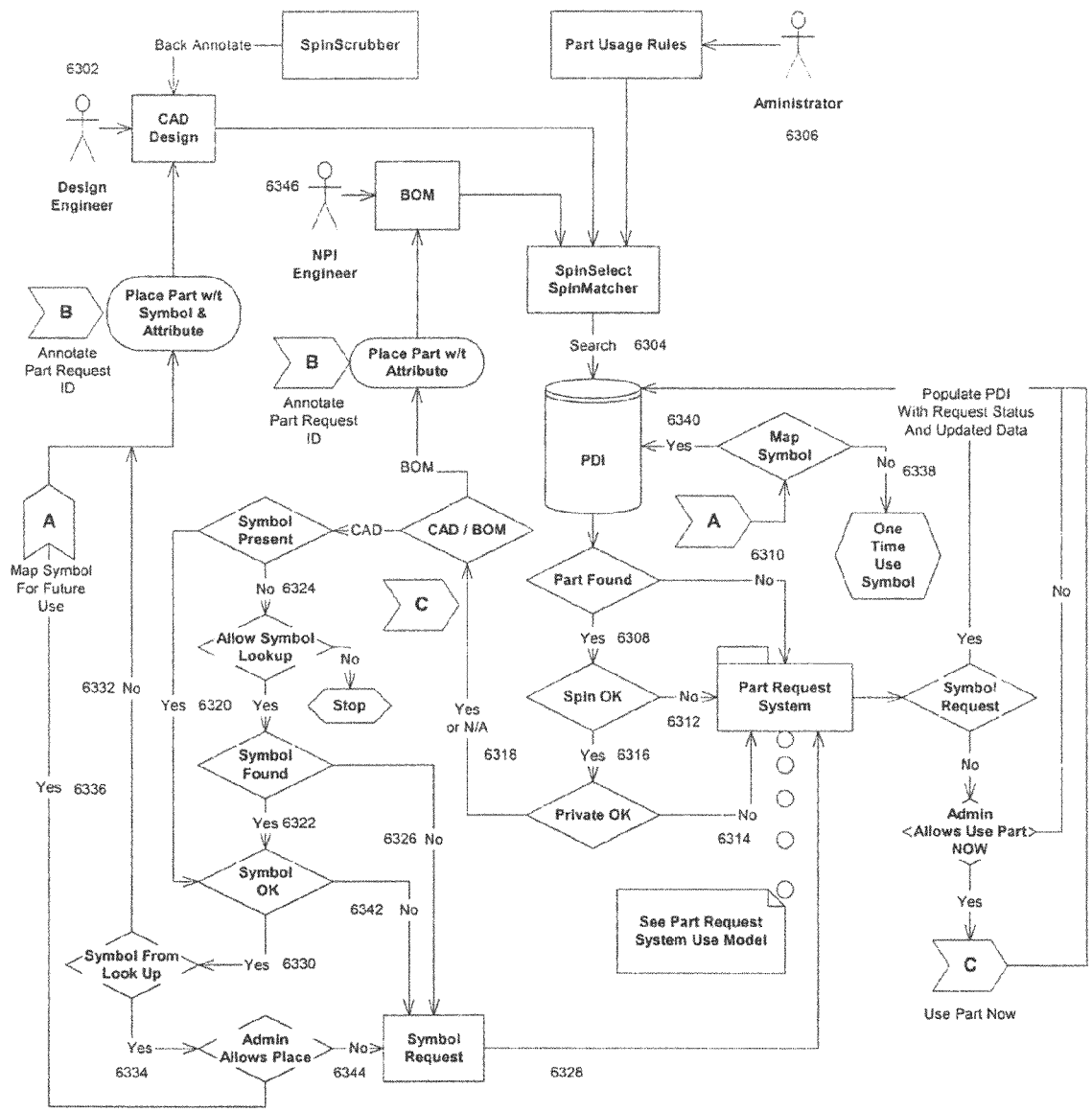
FIG. 63 illustrates design and new part introduction process flows according to some embodiments of the invention.

Design and new product introduction process flows according to some embodiments of the invention are depicted in FIG. 63. For the design flow, a design engineer uses a CAD tool to create a design (6302). SpinSelect is used to search for a part to use in the design (6304). Part usage rules from an administrator may affect the part selected for the design (6306). SpinSelect will search for the part in a PDI. If the part is found (6308), then a check is made to see if corresponding SpinCircuit and company part numbers are available. If the part is not found (6310), then a new part request will be made using a Part Request System.

When a corresponding SpinCircuit or company part number is not available (6312-6314), the Part Request System is used to request the SpinCircuit and/or company part numbers. When corresponding SpinCircuit and company part numbers are available (6316-6318), a determination is made as to whether a symbol is available for the part. If the design engineer finds a symbol for the part (6320-6322), then a check is made to see if the symbol is acceptable. If the design engineer is unable to find a symbol for the part (6324-6326), a request can be made for a new symbol using the Part Request System (6328).

If the symbol is acceptable (6330) and symbol lookup is not used to find the symbol (6332), then the part is placed in the design. When the symbol is found as a result of a symbol lookup (6334) and the administrator allows the symbol to be placed (6336), the part is placed in the design. The design engineer can decide whether the symbol should be a one-time use symbol (6338) or be mapped for future use (6340). If the symbol is not acceptable (6342) or is not allowed to be placed (6344), a new symbol request can be made using the Part Request System (6328). The parts placed in the design can later be outputted to a BOM for further processing by a manufacturing department.

For the new part introduction flow, an NPI engineer receives a BOM (6346) and uses SpinMatcher to check whether parts in the BOM are in the PDI (6304). For the parts that are found (6308) and have corresponding SpinCircuit and company part numbers (6316-6318), the parts are used in the BOM for manufacturing. For the parts that are not found (6310) or do not have corresponding SpinCircuit or company part numbers (6312-6314), part requests can be made using the Part Request System.

Figure 64:
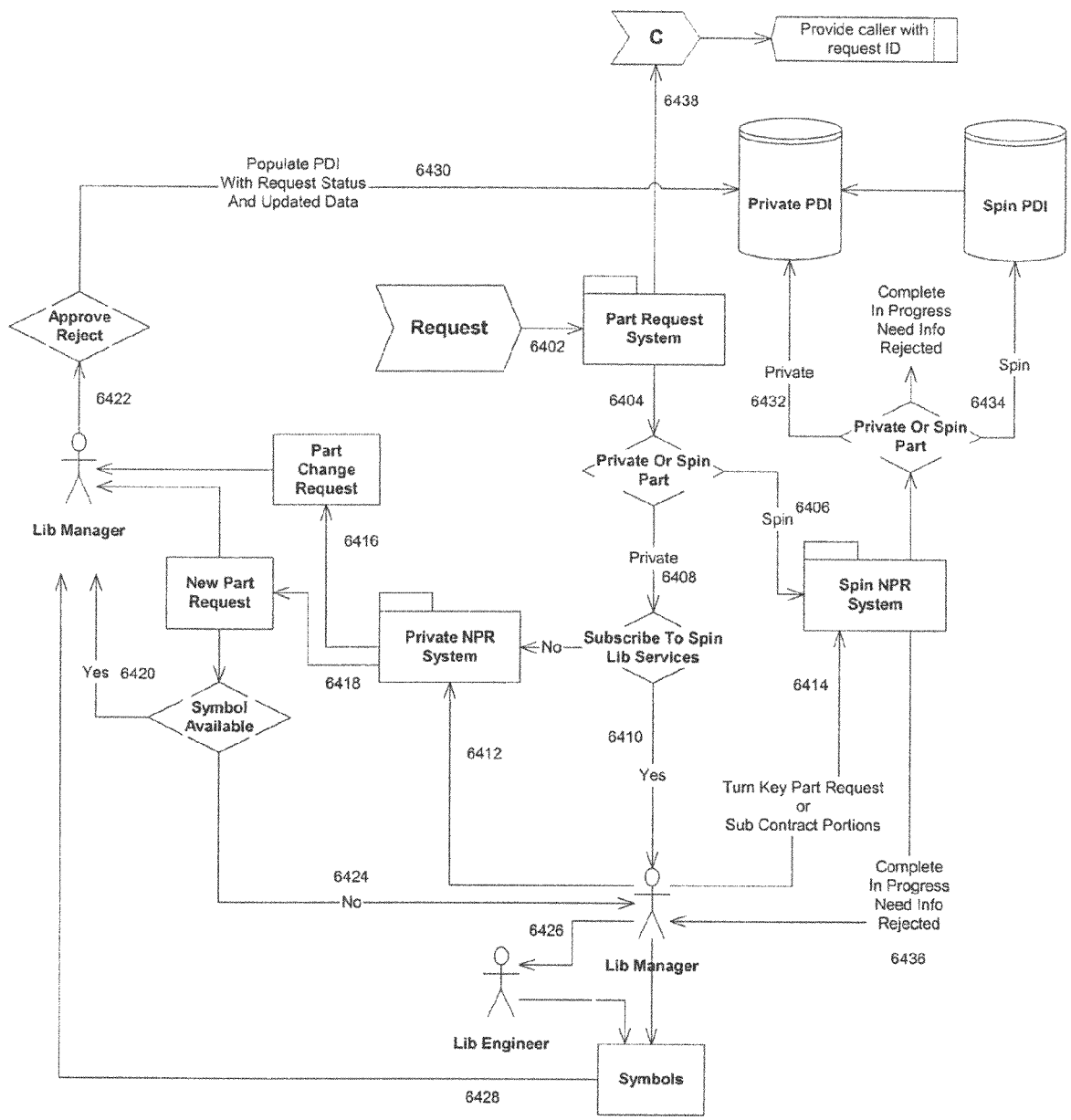
FIG. 64 is a process flow for generating a new part based on a part request according to an embodiment of the invention.

Illustrated in FIG. 64 is a process flow for generating a new part based on a part request according to one embodiment of the invention. A part request (6402) coming from a design or NPI engineer (not shown) through a Part Request System (6404) may be directed to a Spin NPR (New Part Request) System (6406) or a Private NPR System (6408). If the request is directed to the Private NPR System and there is a subscription to Spin Library Services, the request may be divided between the Private NPR System (6412) and the Spin NPR System (6414) by a librarian manager.

If the request is a part change request (6416) or if the request is a new part request (6418) where a symbol is available for the part (6420), then it is up to a librarian manager to accept or reject the request (6422). If the request is a new part request (6418) and a symbol is not available for the part (6424), then a librarian manager can assign a librarian engineer to create the symbol (6426). The symbol created by the librarian engineer will then be submitted to the librarian manager for approval (6428). Symbols and requests approved by the librarian manager can be stored in a private PDI (6430).

Newly created parts from the Spin NPR System may be stored in the Private PDI (6432) or a Spin PDI (6434). Symbols created by the Spin NPR System may be sent to the librarian manager (6436) for approval (6428). A part request ID may also be provided to the requesting engineer (6438). Once the part is stored in a PDI, it can be accessed by the design or NPI engineer for use.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A federated system comprising:
a plurality of data sources, at least two data sources of the plurality of data sources comprising content; and
one or more nodes, one or more of the plurality of data sources being defined on the at least one node, the at least one node further comprising one or more mappings between the content from the at least two data sources, wherein the content is obtained from the at least two data sources and merged using the one or more mappings, and the merged content from the at least two data sources are provided to one or more clients, wherein the one or more mappings between the content from the at least two data sources is created at least in part by:
normalizing the content from the at least two data sources;
comparing values of same object type from the at least two data sources; and
creating one or more mappings between matching values of the same object type from the at least two data sources.

2. The system of claim 1, wherein less than all of the content from the at least two data sources are mapped or merged.

3. The system of claim 1, wherein at least one of the one or more mappings between the content from the at least two data sources is created automatically, dynamically or statistically.

4. The system of claim 1, wherein the content of at least one of the plurality of data sources comprises values, at least one of the values being of an object type.

5. The system of claim 1, wherein at least two of the plurality of data sources reside at different locations.

6. The system of claim 1, wherein the content of at least one of the plurality of data sources is different from the content of at least one other data source.

7. A physical storage device comprising instructions, the instructions being executable by a computer to cause the computer to perform a process, the process comprising:
   accessing a plurality of data sources, at least two of the plurality of data sources comprising content;
   obtaining content from the at least two of the plurality of data sources;
   creating one or more mappings between the content from the at least two data sources, wherein the one or more mappings between the content from the at least two data sources comprise:
   normalizing the content from the at least two data sources;
   comparing values of same object type from the at least two data sources; and
   creating one or more mappings between matching values of the same object type from the at least two data sources;
   merging the content from the at least two data sources using the one or more mappings; and
   providing the merged content from the at least two data sources to one or more clients.

8. The device of claim 7, wherein less than all of the content from the at least two data sources are mapped or merged.

9. The device of claim 7, wherein at least one of the one or more mappings between the content from the at least two data sources is created automatically, dynamically or statistically.

10. The device of claim 7, wherein the content of at least one of the plurality of data sources comprises values, at least one of the values being of an object type.

11. The device of claim 7, wherein the act of normalizing comprises converting one or more of the values from the at least two data resources into one or more standard formats.

12. The device of claim 11, wherein merging the content from the at least two data sources using the one or more mappings comprises:
   selecting one of the object types in both of the at least two data sources; and
   merging the obtained content based at least in part upon the values of the selected object type from the at least two data sources using the one or more mappings.

13. A method comprising:
   accessing a plurality of data sources, at least two of the plurality of data sources comprising content;
   obtaining content from the at least two of the plurality of data sources;
   creating one or more mappings between the content from the at least two data sources, wherein the one or more mappings between the content from the at least two data sources comprise:
   normalizing the content from the at least two data sources;
   comparing values of same object type from the at least two data sources; and
   creating one or more mappings between matching values of the same object type from the at least two data sources;
   merging the content from the at least two data sources using the one or more mappings; and
   providing the merged content from the at least two data sources to one or more clients.

14. The method of claim 13, wherein less than all of the content from the at least two data sources are mapped or merged.

15. The method of claim 13, wherein at least one of the one or more mappings between the content from the at least two data sources is created automatically, dynamically or statistically.

16. The method of claim 13, wherein the content of at least one of the plurality of data sources comprises values, at least one of the values being of an object type.

17. The method of claim 13, wherein at least two of the plurality of data sources reside at different locations.

18. The method of claim 17, wherein merging the content from the at least two data sources using the one or more mappings comprises:
   selecting one of the object types in both of the at least two data sources; and
   merging the obtained content based at least in part upon the values of the selected object type from the at least two data sources using the one or more mappings.

19. The method of claim 17, wherein normalizing the content from the at least two data sources comprising:
   converting one or more of the values from the at least two data resources into one or more standard formats.

20. The method of claim 17, wherein at least one of the data sources comprises one or more data sources, the one or more data sources comprising content.

* * * * *